US012509349B2

(12) United States Patent
Apollonio et al.

(10) Patent No.: US 12,509,349 B2
(45) Date of Patent: Dec. 30, 2025

(54) NITRIC OXIDE GENERATION PROCESS CONTROLS

(71) Applicant: Third Pole, Inc., Waltham, MA (US)

(72) Inventors: Benjamin J. Apollonio, Lunenburg, MA (US); Gregory W. Hall, Belmont, MA (US)

(73) Assignee: Third Pole, Inc., Waltham, MA (US)

( * ) Notice: Subject to any disclaimer, the term of this patent is extended or adjusted under 35 U.S.C. 154(b) by 1053 days.

(21) Appl. No.: 17/503,223

(22) Filed: Oct. 15, 2021

(65) Prior Publication Data

US 2022/0135406 A1 May 5, 2022

Related U.S. Application Data

(60) Provisional application No. 63/093,040, filed on Oct. 16, 2020.

(51) Int. Cl.
*C01B 21/20* (2006.01)
*H05H 1/46* (2006.01)

(52) U.S. Cl.
CPC ............. *C01B 21/203* (2013.01); *H05H 1/46* (2013.01); *H05H 2242/22* (2021.05)

(58) Field of Classification Search
CPC ........ C01B 21/203; C01B 21/32; H05H 1/46; H05H 2242/22; H05H 2277/10; H05H 1/466; H05H 2245/32; H05H 2245/34; A61M 16/024; A61M 16/0666; A61M 16/0093; A61M 16/12; A61M 16/107; A61M 16/022; A61M 16/202; A61M 16/04; A61M 16/101; A61M 2205/3584; A61M 2209/088; A61M 2205/05; A61M 2205/054; A61M 2202/0283; A61M 2205/502; A61M 2205/80; A61M 2202/0275; A61M 2205/125; A61M 2205/8206; A61M 2202/0007; A61M 2202/0057; A61K 33/00; A61B 18/042; A61B 18/1206; A61B 2018/00732; A61B 2018/00863

See application file for complete search history.

(56) References Cited

U.S. PATENT DOCUMENTS

| 709,867 A | 9/1902 | Bradley et al. |
|---|---|---|
| 2,485,478 A | 10/1949 | Cotton |
| 2,485,481 A | 10/1949 | Cotton |
| 2,525,938 A | 10/1950 | Peck |
| 2,684,448 A | 7/1954 | Nilles |
| 3,047,370 A | 7/1962 | Aviges et al. |
| 3,225,309 A | 12/1965 | Phelps |
| 3,805,590 A | 4/1974 | Ringwall et al. |
| 4,287,040 A | 9/1981 | Alamaro |
| 4,500,563 A | 2/1985 | Ellenberger et al. |
| 4,505,795 A | 3/1985 | Alamaro |
| 4,680,694 A | 7/1987 | Huynh et al. |
| 4,695,358 A | 9/1987 | Mizuno et al. |
| 4,705,670 A | 11/1987 | O'Hare |
| 4,816,229 A | 3/1989 | JeRnsen et al. |
| 4,877,589 A | 10/1989 | Conrad |
| 5,285,372 A | 2/1994 | Huynh et al. |
| 5,378,436 A | 1/1995 | Endoh et al. |
| 5,396,882 A | 3/1995 | Zapol |
| 5,413,097 A | 5/1995 | Birenheide et al. |
| 5,471,977 A | 12/1995 | Olsson et al. |
| 5,485,827 A | 1/1996 | Zapol et al. |
| 5,531,218 A | 7/1996 | Krebs |
| 5,546,935 A | 8/1996 | Champeau |
| 5,558,083 A | 9/1996 | Bathe et al. |
| 5,573,733 A | 11/1996 | Salama |
| 5,674,381 A | 10/1997 | Dekker |
| 5,692,495 A | 12/1997 | Sheu |
| 5,732,693 A | 3/1998 | Bathe et al. |
| 5,749,937 A | 5/1998 | Detering et al. |
| 5,752,504 A | 5/1998 | Bathe |

(Continued)

FOREIGN PATENT DOCUMENTS

| CA | 2413834 | 6/2004 |
|---|---|---|
| CN | 1099997 | 3/1995 |

(Continued)

OTHER PUBLICATIONS

Beanland et al., "PreInsertion Resistors in High Voltage Capicitor Bank Switching", prepared for Western Protective Relay Conference, Oct. 19-21, 2004, Spokane, WA.
DiBlasi et al., "Evidence-Based Clinical Practice Guideline: Inhaled Nitric Oxide for Neonates With Acute Hypoxic Respiratory Failure", Respiratory Care (2010), vol. 55, No. 12, pp. 1717-1745.
Edwards et al., "Current Modes of Conventional Ventilation in Intensive Care", BJA CEPD Reviews, vol. 2, No. 2, pp. 41-44, Apr. 1, 2002.

(Continued)

*Primary Examiner* — Xiuyu Tai
(74) *Attorney, Agent, or Firm* — Greenberg Traurig LLP; David J. Dykeman; Jaime Burke

(57) ABSTRACT

The present disclosure describes systems and methods for controlling the electrical generation of nitric oxide. In some aspects, a system for generating nitric oxide comprises a plasma chamber housing two or more electrodes in communication with a resonant high voltage circuit configured to send a signal to the plasma chamber for generating nitric oxide in a product gas from a flow of a reactant gas, and a controller configured to generate a pulse width modulation signal having multiple harmonic frequencies to excite the resonant high voltage circuit. The controller is configured to adjust the duty cycle of the pulse width modulation signal, the controller selecting the duty cycle based on a target voltage before plasma formation and a target current after plasma formation in the plasma chamber.

12 Claims, 78 Drawing Sheets

(56) References Cited

U.S. PATENT DOCUMENTS

| | | |
|---|---|---|
| 5,827,420 A | 10/1998 | Shirazi et al. |
| 5,839,433 A | 11/1998 | Higenbottam |
| 5,845,633 A | 12/1998 | Psaros |
| 5,918,596 A | 7/1999 | Heinonen |
| 6,089,229 A | 7/2000 | Bathe et al. |
| 6,109,260 A | 8/2000 | Bathe |
| 6,125,846 A | 10/2000 | Bathe et al. |
| 6,164,276 A | 12/2000 | Bathe et al. |
| 6,186,140 B1 | 2/2001 | Hoague |
| 6,186,142 B1 | 2/2001 | Schmidt et al. |
| 6,197,091 B1 | 3/2001 | Ji et al. |
| 6,224,653 B1 | 5/2001 | Shvedchikov et al. |
| 6,250,302 B1 | 6/2001 | Rantala |
| 6,290,683 B1 | 9/2001 | Erez et al. |
| 6,296,827 B1 | 10/2001 | Castor et al. |
| 6,365,868 B1 | 4/2002 | Borowy et al. |
| 6,432,077 B1 | 8/2002 | Stenzler |
| 6,532,956 B2 | 3/2003 | Hill |
| 6,536,429 B1 | 3/2003 | Pavlov et al. |
| 6,581,599 B1 | 6/2003 | Stenzler |
| 6,612,306 B1 | 9/2003 | Mault |
| 6,668,828 B1 | 12/2003 | Figley et al. |
| 6,758,214 B2 | 7/2004 | Fine et al. |
| 6,920,876 B2 | 7/2005 | Miller et al. |
| 6,955,171 B1 | 10/2005 | Figley et al. |
| 6,955,790 B2 | 10/2005 | Castor et al. |
| 6,984,256 B2 | 1/2006 | Lamprecht et al. |
| 6,986,351 B2 | 1/2006 | Figley et al. |
| 7,025,869 B2 | 4/2006 | Fine et al. |
| 7,040,313 B2 | 5/2006 | Fine et al. |
| 7,122,018 B2 | 10/2006 | Stenzler et al. |
| 7,220,393 B2 | 5/2007 | Miller et al. |
| 7,255,105 B2 | 8/2007 | Figley et al. |
| 7,299,785 B1 | 11/2007 | Lee |
| 7,312,584 B2 | 12/2007 | Tamita et al. |
| 7,335,181 B2 | 2/2008 | Miller et al. |
| 7,485,324 B2 | 2/2009 | Miller et al. |
| 7,498,000 B2 | 3/2009 | Pekshev et al. |
| 7,516,742 B2 | 4/2009 | Stenzler et al. |
| 7,520,866 B2 | 4/2009 | Stenzler et al. |
| 7,523,752 B2 | 4/2009 | Montgomery et al. |
| 7,531,133 B2 | 5/2009 | Hole et al. |
| 7,560,076 B2 | 7/2009 | Rounbehler et al. |
| 7,589,473 B2 | 9/2009 | Suslov |
| 7,597,731 B2 | 10/2009 | Palmerton et al. |
| 7,618,594 B2 | 11/2009 | Rounbehler et al. |
| 7,744,812 B2 | 6/2010 | Witherspoon et al. |
| 7,861,516 B2 | 1/2011 | Allanson et al. |
| 7,861,717 B1 | 1/2011 | Krebs |
| 7,914,743 B2 | 3/2011 | Fine et al. |
| 7,947,227 B2 | 5/2011 | Fine et al. |
| 7,955,294 B2 | 6/2011 | Stenzler et al. |
| 8,030,849 B2 | 10/2011 | Suslov |
| 8,043,252 B2 | 10/2011 | Miller et al. |
| 8,057,742 B2 | 11/2011 | Rounbehler et al. |
| 8,066,904 B2 | 11/2011 | Fine et al. |
| 8,079,998 B2 | 12/2011 | Hole et al. |
| 8,083,997 B2 | 12/2011 | Rounbehler et al. |
| 8,091,549 B2 | 1/2012 | Montgomery et al. |
| 8,151,791 B2 | 4/2012 | Arlow et al. |
| 8,173,072 B2 | 5/2012 | Fine et al. |
| 8,187,544 B2 | 5/2012 | Fine et al. |
| 8,211,368 B2 | 7/2012 | Fine et al. |
| 8,221,800 B2 | 7/2012 | Fine et al. |
| 8,226,916 B2 | 7/2012 | Rounbehler et al. |
| 8,246,725 B2 | 8/2012 | Rounbehler et al. |
| 8,267,884 B1 | 9/2012 | Hicks |
| 8,268,252 B2 | 9/2012 | Fuller et al. |
| 8,277,399 B2 | 10/2012 | Hamilton et al. |
| 8,282,966 B2 | 10/2012 | Baldassarre et al. |
| 8,291,904 B2 | 10/2012 | Bathe et al. |
| 8,293,284 B2 | 10/2012 | Baldassarre et al. |
| 8,328,998 B2 | 12/2012 | Wada et al. |
| 8,344,627 B1 | 1/2013 | Hooke et al. |
| 8,371,296 B2 | 2/2013 | Fine et al. |
| 8,377,462 B2 | 2/2013 | DesNoyer et al. |
| 8,397,721 B2 | 3/2013 | Montgomery et al. |
| D679,366 S | 4/2013 | Fuller |
| 8,408,206 B2 | 4/2013 | Montgomery et al. |
| 8,431,163 B2 | 4/2013 | Baldassarre et al. |
| D688,352 S | 8/2013 | Montgomery et al. |
| 8,518,457 B2 | 8/2013 | Miller et al. |
| 8,573,209 B2 | 11/2013 | Bathe et al. |
| 8,573,210 B2 | 11/2013 | Bathe et al. |
| 8,574,531 B2 | 11/2013 | Miller et al. |
| 8,580,109 B2 | 11/2013 | Kruckenberg et al. |
| 8,607,785 B2 | 12/2013 | Fine et al. |
| 8,607,792 B2 | 12/2013 | Montgomery et al. |
| 8,609,026 B2 | 12/2013 | Fine et al. |
| 8,609,028 B2 | 12/2013 | Rounbehler et al. |
| 8,613,958 B2 | 12/2013 | Fine |
| 8,616,204 B2 | 12/2013 | Montgomery et al. |
| 8,646,445 B2 | 2/2014 | Fine et al. |
| D701,963 S | 4/2014 | Abarbanel et al. |
| 8,685,467 B2 | 4/2014 | Miller et al. |
| 8,701,657 B2 | 4/2014 | Fine et al. |
| 8,715,577 B2 | 5/2014 | Fine et al. |
| 8,717,733 B2 | 5/2014 | Gefter et al. |
| 8,720,440 B2 | 5/2014 | Montgomery et al. |
| 8,741,222 B2 | 6/2014 | Fine et al. |
| 8,757,148 B2 | 6/2014 | Montgomery et al. |
| 8,770,199 B2 | 7/2014 | Flanagan et al. |
| 8,776,794 B2 | 7/2014 | Bathe et al. |
| 8,776,795 B2 | 7/2014 | Bathe et al. |
| 8,790,715 B2 | 7/2014 | Montgomery et al. |
| 8,795,222 B2 | 8/2014 | Stenzler et al. |
| 8,795,741 B2 | 8/2014 | Baldassarre |
| 8,808,655 B2 | 8/2014 | Solovyov et al. |
| 8,821,801 B2 | 9/2014 | Rounbehler et al. |
| 8,821,828 B2 | 9/2014 | Hilbig et al. |
| 8,846,112 B2 | 9/2014 | Baldassarre |
| 8,887,720 B2 | 11/2014 | Fine et al. |
| 8,893,717 B2 | 11/2014 | Montgomery et al. |
| 8,944,049 B2 | 2/2015 | Fine et al. |
| 9,035,045 B2 | 5/2015 | Chu et al. |
| 9,067,788 B1 | 6/2015 | Spielman et al. |
| 9,095,534 B2 | 8/2015 | Stenzler et al. |
| 9,108,016 B2 | 8/2015 | Acker et al. |
| 9,180,217 B2 | 11/2015 | Arnold et al. |
| 9,192,718 B2 | 11/2015 | Fine |
| 9,260,399 B2 | 2/2016 | Ruan et al. |
| 9,265,911 B2 | 2/2016 | Bathe et al. |
| 9,279,794 B2 | 3/2016 | Tolmie et al. |
| 9,295,802 B2 | 3/2016 | Bathe et al. |
| 9,351,994 B2 | 5/2016 | Montgomery et al. |
| 9,408,993 B2 | 8/2016 | Bathe et al. |
| 9,408,994 B2 | 8/2016 | Fine et al. |
| 9,522,249 B2 | 12/2016 | Rounbehler et al. |
| 9,550,039 B2 | 1/2017 | Flanagan et al. |
| 9,550,040 B2 | 1/2017 | Acker et al. |
| 9,562,113 B2 | 2/2017 | Ruan et al. |
| 9,573,110 B2 | 2/2017 | Montgomery et al. |
| 9,604,028 B2 | 3/2017 | Fine et al. |
| 9,701,538 B2 | 7/2017 | Fine et al. |
| 9,713,244 B2 | 7/2017 | Tabata et al. |
| 9,770,570 B2 | 9/2017 | Schnictman et al. |
| 9,795,756 B2 | 10/2017 | Flanagan et al. |
| 9,895,199 B2 | 2/2018 | Montgomery et al. |
| 9,896,337 B2 | 2/2018 | Montgomery et al. |
| 9,956,373 B2 | 5/2018 | Rounbehler et al. |
| 9,982,354 B2 | 5/2018 | Kim |
| 10,081,544 B2 | 9/2018 | Fine et al. |
| 10,086,352 B2 | 10/2018 | Fine et al. |
| 10,099,029 B2 | 10/2018 | Montgomery et al. |
| 10,124,142 B2 | 11/2018 | Rounbehler et al. |
| 10,179,222 B2 | 1/2019 | Fine et al. |
| 10,188,822 B2 | 1/2019 | Flanagan et al. |
| 10,213,572 B2 | 2/2019 | Gellman et al. |
| 10,226,592 B2 | 3/2019 | Acker et al. |
| 10,232,138 B2 | 3/2019 | Acker et al. |
| 10,239,038 B2 | 3/2019 | Zapol et al. |
| 10,279,139 B2 | 5/2019 | Zapol et al. |
| 10,286,176 B2 | 5/2019 | Zapol et al. |
| 10,293,133 B2 | 5/2019 | Zapol et al. |

(56) References Cited

U.S. PATENT DOCUMENTS

| | | |
|---|---|---|
| 10,328,228 B2 | 6/2019 | Zapol et al. |
| 10,398,820 B2 | 9/2019 | Potenziano et al. |
| 10,426,913 B2 | 10/2019 | Tolmie et al. |
| 10,434,276 B2 | 10/2019 | Zapol et al. |
| 10,532,176 B2 | 1/2020 | Zapol et al. |
| 10,548,920 B2 | 2/2020 | Montgomery et al. |
| 10,556,082 B2 | 2/2020 | Flanagan et al. |
| 10,556,086 B2 | 2/2020 | Goldstein et al. |
| 10,576,239 B2 | 3/2020 | Zapol et al. |
| 10,646,682 B2 | 5/2020 | Zapol et al. |
| 10,682,486 B1 | 6/2020 | Moon et al. |
| 10,695,523 B2 | 6/2020 | Zapol et al. |
| 10,737,051 B2 | 8/2020 | Gellman et al. |
| 10,750,606 B1 | 8/2020 | Liu et al. |
| 10,758,703 B2 | 9/2020 | Kohlmann et al. |
| 10,773,046 B2 | 9/2020 | Schnitman et al. |
| 10,773,047 B2 | 9/2020 | Zapol et al. |
| 10,780,241 B2 | 9/2020 | Fine et al. |
| 10,814,092 B2 | 10/2020 | Rounbehler et al. |
| 10,946,163 B2 | 3/2021 | Gillerman et al. |
| 11,007,503 B2 | 5/2021 | Zapol et al. |
| 11,033,705 B2 | 6/2021 | Zapol et al. |
| 11,045,620 B2 | 6/2021 | Hall et al. |
| 11,376,390 B2 | 7/2022 | Gillerman et al. |
| 11,478,601 B2 | 10/2022 | Hall et al. |
| 11,479,464 B2 | 10/2022 | Hall et al. |
| 11,524,134 B2 | 12/2022 | Zapol et al. |
| 11,554,240 B2 | 1/2023 | Hall et al. |
| 11,660,416 B2 | 5/2023 | McAuley et al. |
| 11,691,879 B2 | 7/2023 | Kondiboyina et al. |
| 11,754,538 B1 | 9/2023 | Fine |
| 11,827,989 B2 | 11/2023 | Silkoff et al. |
| 11,833,309 B2 | 12/2023 | Gillerman et al. |
| 11,877,378 B2 | 1/2024 | Wu et al. |
| 11,911,566 B2 | 2/2024 | Zapol et al. |
| 11,975,139 B2 | 5/2024 | Miles et al. |
| 2001/0031230 A1 | 10/2001 | Castor et al. |
| 2001/0035186 A1 | 11/2001 | Hill |
| 2002/0111748 A1 | 8/2002 | Kobayashi et al. |
| 2002/0185126 A1 | 12/2002 | Krebs |
| 2004/0019274 A1 | 1/2004 | Galloway, Jr. et al. |
| 2004/0028753 A1 | 2/2004 | Hedenstierna et al. |
| 2004/0031248 A1 | 2/2004 | Lindsay |
| 2004/0050387 A1 | 3/2004 | Younes |
| 2004/0074493 A1 | 4/2004 | Seakins et al. |
| 2004/0149282 A1 | 8/2004 | Hickle |
| 2004/0168686 A1 | 9/2004 | Krebs |
| 2004/0181149 A1 | 9/2004 | Langlotz et al. |
| 2005/0172971 A1 | 8/2005 | Kolobow et al. |
| 2005/0218007 A1 | 10/2005 | Pekshev et al. |
| 2005/0263150 A1 | 12/2005 | Chathampally et al. |
| 2005/0274381 A1 | 12/2005 | Deane et al. |
| 2005/0281465 A1 | 12/2005 | Marquart et al. |
| 2006/0025700 A1 | 2/2006 | Fallik |
| 2006/0090759 A1 | 5/2006 | Howes et al. |
| 2006/0172018 A1 | 8/2006 | Fine et al. |
| 2006/0173396 A1 | 8/2006 | Hatamian et al. |
| 2006/0207594 A1 | 9/2006 | Stenzler et al. |
| 2006/0276844 A1 | 12/2006 | Alon et al. |
| 2007/0051712 A1 | 3/2007 | Kooken et al. |
| 2007/0113851 A1 | 5/2007 | Delisle et al. |
| 2007/0151561 A1 | 7/2007 | Laurila |
| 2007/0181126 A1 | 8/2007 | Tolmie et al. |
| 2007/0190184 A1 | 8/2007 | Montgomery et al. |
| 2008/0017030 A1 | 1/2008 | Fleck |
| 2008/0078382 A1 | 4/2008 | LeMahieu et al. |
| 2008/0119754 A1 | 5/2008 | Hietala |
| 2008/0135044 A1 | 6/2008 | Freitag et al. |
| 2008/0176335 A1 | 7/2008 | Alberti et al. |
| 2008/0202509 A1 | 8/2008 | Dillon et al. |
| 2010/0030091 A1 | 2/2010 | Fine |
| 2010/0043789 A1 | 2/2010 | Fine et al. |
| 2010/0076325 A1 | 3/2010 | Cho et al. |
| 2010/0089392 A1 | 4/2010 | Fine et al. |
| 2010/0189808 A1 | 7/2010 | Gupta et al. |
| 2010/0275911 A1 | 11/2010 | Arlow et al. |
| 2010/0330193 A1 | 12/2010 | Baldassarre et al. |
| 2011/0140607 A1 | 6/2011 | Moore et al. |
| 2011/0240019 A1 | 10/2011 | Fine et al. |
| 2012/0093948 A1 | 4/2012 | Fine et al. |
| 2012/0279500 A1 | 11/2012 | Singvogel et al. |
| 2012/0285449 A1 | 11/2012 | Fine et al. |
| 2012/0296265 A1 | 11/2012 | Dobrynin et al. |
| 2013/0123801 A1 | 5/2013 | Umasuthan et al. |
| 2013/0150863 A1 | 6/2013 | Baumgartner |
| 2013/0239963 A1 | 9/2013 | Goldstein et al. |
| 2013/0309328 A1 | 11/2013 | Watts et al. |
| 2014/0020685 A1 | 1/2014 | Szabo |
| 2014/0031668 A1 | 1/2014 | Mobasser et al. |
| 2014/0127081 A1 | 5/2014 | Fine et al. |
| 2014/0127330 A1 | 5/2014 | Fine et al. |
| 2014/0144436 A1 | 5/2014 | Fine et al. |
| 2014/0144444 A1 | 5/2014 | Fine et al. |
| 2014/0155684 A1 | 6/2014 | Ehrenreich |
| 2014/0158121 A1 | 6/2014 | Flanagan et al. |
| 2014/0166009 A1 | 6/2014 | Flanagan et al. |
| 2014/0216452 A1 | 8/2014 | Miller et al. |
| 2014/0251787 A1 | 9/2014 | Montgomery et al. |
| 2014/0363525 A1 | 12/2014 | Montgomery et al. |
| 2014/0377378 A1 | 12/2014 | Baldassarre |
| 2015/0000659 A1 | 1/2015 | Martin |
| 2015/0004248 A1 | 1/2015 | Morfill et al. |
| 2015/0034084 A1 | 2/2015 | Av-Gay et al. |
| 2015/0044305 A1 | 2/2015 | Av-Gay et al. |
| 2015/0072023 A1 | 3/2015 | Greenberg et al. |
| 2015/0075522 A1 | 3/2015 | Acker et al. |
| 2015/0090261 A1 | 4/2015 | Crosbie |
| 2015/0101600 A1 | 4/2015 | Miller et al. |
| 2015/0101604 A1 | 4/2015 | Crosbie |
| 2015/0174158 A1 | 6/2015 | Av-Gay et al. |
| 2015/0190565 A1 | 7/2015 | Ohdaira et al. |
| 2015/0238248 A1* | 8/2015 | Thompson ........... A61B 18/042 |
| | | 606/50 |
| 2015/0272988 A1 | 10/2015 | Av-Gay et al. |
| 2015/0273176 A1 | 10/2015 | Acker et al. |
| 2015/0328430 A1 | 11/2015 | Miller et al. |
| 2016/0022731 A1 | 1/2016 | Av-Gay et al. |
| 2016/0030699 A1 | 2/2016 | Zapol et al. |
| 2016/0038710 A1 | 2/2016 | Zapol et al. |
| 2016/0045685 A1 | 2/2016 | Hyde et al. |
| 2016/0106946 A1 | 4/2016 | Gellman et al. |
| 2016/0106949 A1 | 4/2016 | Kohlmann et al. |
| 2016/0121071 A1 | 5/2016 | Moon et al. |
| 2016/0151598 A1 | 6/2016 | Fine |
| 2016/0183841 A1 | 6/2016 | Duindam et al. |
| 2016/0191887 A1 | 6/2016 | Casas |
| 2016/0193336 A1 | 7/2016 | Nelson et al. |
| 2016/0228670 A1 | 8/2016 | Av-Gay et al. |
| 2016/0243328 A1 | 8/2016 | Tolmie et al. |
| 2016/0271169 A1 | 9/2016 | Potenziano et al. |
| 2016/0279165 A1 | 9/2016 | Av-Gay et al. |
| 2016/0310693 A1 | 10/2016 | Bathe et al. |
| 2016/0324580 A1 | 11/2016 | Esterberg |
| 2016/0367775 A1 | 12/2016 | Tolmie et al. |
| 2017/0014571 A1 | 1/2017 | Deem et al. |
| 2017/0014591 A1 | 1/2017 | Tolmie et al. |
| 2017/0014592 A1 | 1/2017 | Tolmie et al. |
| 2017/0021124 A1 | 1/2017 | Tolmie et al. |
| 2017/0065631 A1 | 3/2017 | Av-Gay et al. |
| 2017/0095634 A1 | 4/2017 | Miller et al. |
| 2017/0112871 A1 | 4/2017 | Nelson et al. |
| 2017/0128694 A1 | 5/2017 | Acker et al. |
| 2017/0143758 A1 | 5/2017 | Greenberg et al. |
| 2017/0165294 A1 | 6/2017 | Dasse et al. |
| 2017/0182088 A1 | 6/2017 | Dasse et al. |
| 2017/0232166 A1 | 8/2017 | Potenziano et al. |
| 2017/0239289 A1 | 8/2017 | Av-Gay et al. |
| 2017/0259025 A1 | 9/2017 | Fine et al. |
| 2017/0296463 A1 | 10/2017 | Minton et al. |
| 2017/0348503 A1 | 12/2017 | Westermark |
| 2018/0049622 A1 | 2/2018 | Ryan et al. |
| 2018/0071467 A1 | 3/2018 | Fine et al. |
| 2018/0104432 A1 | 4/2018 | Flanagan et al. |
| 2018/0125883 A1 | 5/2018 | Av-Gay et al. |

(56) References Cited

U.S. PATENT DOCUMENTS

| | | |
|---|---|---|
| 2018/0126111 A1 | 5/2018 | Moon et al. |
| 2018/0133246 A1 | 5/2018 | Av-Gay et al. |
| 2018/0169370 A1 | 6/2018 | Montgomery et al. |
| 2018/0228836 A1 | 8/2018 | Nelson et al. |
| 2018/0243527 A1 | 8/2018 | Zapol et al. |
| 2018/0243528 A1 | 8/2018 | Zapol et al. |
| 2018/0264032 A1 | 9/2018 | Jaffri et al. |
| 2018/0280920 A1 | 10/2018 | Zapol et al. |
| 2018/0296790 A1 | 10/2018 | Zapol et al. |
| 2018/0304038 A1 | 10/2018 | Jafri et al. |
| 2018/0311460 A1 | 11/2018 | Rounbehler et al. |
| 2018/0328842 A1 | 11/2018 | Kjaer |
| 2019/0038864 A1 | 2/2019 | Montgomery et al. |
| 2019/0083699 A1 | 3/2019 | Spohn et al. |
| 2019/0092639 A1 | 3/2019 | Fine et al. |
| 2019/0127223 A1 | 5/2019 | Montgomery et al. |
| 2019/0134574 A1 | 5/2019 | Tsuchiya et al. |
| 2019/0135633 A1 | 5/2019 | Montgomery et al. |
| 2019/0143068 A1 | 5/2019 | Rounbehler et al. |
| 2019/0184116 A1 | 6/2019 | Acker et al. |
| 2019/0209993 A1 | 7/2019 | Fine et al. |
| 2019/0217042 A1 | 7/2019 | Zapol et al. |
| 2019/0217043 A1 | 7/2019 | Fine et al. |
| 2019/0233288 A1 | 8/2019 | Montgomery et al. |
| 2019/0233289 A1 | 8/2019 | Montgomery et al. |
| 2019/0276313 A1 | 9/2019 | Montgomery et al. |
| 2019/0314596 A1 | 10/2019 | Zapol et al. |
| 2019/0374739 A1 | 12/2019 | Tolmie et al. |
| 2020/0030553 A1 | 1/2020 | Keip et al. |
| 2020/0094011 A1 | 3/2020 | Zapol et al. |
| 2020/0139071 A1 | 5/2020 | Fine et al. |
| 2020/0139072 A1 | 5/2020 | Zapol et al. |
| 2020/0139073 A1 | 5/2020 | Tector et al. |
| 2020/0163989 A1 | 5/2020 | Montgomery et al. |
| 2020/0171259 A1 | 6/2020 | Flanagan et al. |
| 2020/0171264 A1 | 6/2020 | Goldstein et al. |
| 2020/0180958 A1 | 6/2020 | Fine et al. |
| 2020/0188319 A1 | 6/2020 | Quinn et al. |
| 2020/0197318 A1 | 6/2020 | Widgerow et al. |
| 2020/0254199 A1 | 8/2020 | Bassin |
| 2020/0282375 A1 | 9/2020 | Fine et al. |
| 2020/0308032 A1 | 10/2020 | Domrese et al. |
| 2020/0360647 A1 | 11/2020 | Quinn et al. |
| 2020/0360649 A1 | 11/2020 | Hall et al. |
| 2020/0360690 A1 | 11/2020 | Evans et al. |
| 2020/0361772 A1 | 11/2020 | Hall et al. |
| 2020/0361773 A1 | 11/2020 | Gillerman et al. |
| 2020/0390994 A1 | 12/2020 | Gillerman et al. |
| 2021/0214222 A1 | 7/2021 | Kondiboyia et al. |
| 2021/0220586 A1 | 7/2021 | Shah et al. |
| 2021/0268221 A1 | 9/2021 | Gillerman et al. |
| 2021/0330957 A1 | 10/2021 | Potenziano et al. |
| 2021/0353898 A1 | 11/2021 | Hall et al. |
| 2021/0386954 A1 | 12/2021 | Tamiya et al. |
| 2021/0395905 A1 | 12/2021 | Silkoff et al. |
| 2022/0047837 A1 | 2/2022 | Zapol et al. |
| 2022/0080147 A1 | 3/2022 | Shah et al. |
| 2022/0096535 A1 | 3/2022 | Shah et al. |
| 2022/0135406 A1 | 5/2022 | Apollonio et al. |
| 2022/0162070 A1 | 5/2022 | Silkoff et al. |
| 2022/0193623 A1 | 6/2022 | Nakao |
| 2022/0211967 A1 | 7/2022 | Hall et al. |
| 2022/0296845 A1 | 9/2022 | Jackson et al. |
| 2022/0298653 A1 | 9/2022 | Silkoff et al. |
| 2022/0339391 A1 | 10/2022 | Gillerman et al. |
| 2023/0001119 A1 | 1/2023 | Richardson et al. |
| 2023/0053201 A1 | 2/2023 | Miles et al. |
| 2023/0058407 A1 | 2/2023 | Hall |
| 2023/0098706 A1 | 3/2023 | Miles et al. |
| 2023/0112963 A1 | 4/2023 | Yuen et al. |
| 2023/0149556 A1 | 5/2023 | Hall et al. |
| 2023/0158064 A1 | 5/2023 | Shah |
| 2023/0158260 A1 | 5/2023 | Shah et al. |
| 2023/0158261 A1 | 5/2023 | Trias et al. |
| 2023/0201497 A1 | 6/2023 | Dekker |
| 2023/0263986 A1 | 8/2023 | Hall et al. |
| 2023/0330359 A1 | 10/2023 | Scholz et al. |
| 2024/0067523 A1 | 2/2024 | Hall et al. |
| 2024/0076185 A1 | 3/2024 | Hall et al. |
| 2024/0076186 A1 | 3/2024 | Kondiboyina et al. |
| 2024/0209521 A1 | 6/2024 | Silkoff et al. |
| 2024/0253990 A1 | 8/2024 | Apollonio et al. |
| 2024/0325672 A1 | 10/2024 | Gillerman et al. |
| 2025/0128946 A1 | 4/2025 | Silkoff et al. |

FOREIGN PATENT DOCUMENTS

| | | |
|---|---|---|
| CN | 1730115 | 2/2006 |
| CN | 201037113 | 3/2008 |
| CN | 100404083 | 7/2008 |
| CN | 101036482 | 12/2010 |
| CN | 110662339 A | 1/2020 |
| CN | 110872714 | 3/2020 |
| DE | 101 51 270 | 10/2006 |
| EP | 621051 | 10/1994 |
| EP | 0763500 | 3/1997 |
| EP | 0878208 A2 | 11/1998 |
| EP | 1036758 | 9/2000 |
| EP | 2151554 | 2/2010 |
| EP | 1854494 | 6/2012 |
| EP | 2565157 | 10/2017 |
| EP | 3372267 | 12/2018 |
| JP | H04132560 | 5/1992 |
| JP | 2000102616 | 4/2000 |
| JP | 2003339872 A | 12/2003 |
| JP | 2004065636 | 3/2004 |
| JP | 2006273677 | 10/2006 |
| KR | 100841741 B1 | 6/2008 |
| KR | 20100087977 | 8/2010 |
| RU | 2199167 | 2/2003 |
| WO | WO199507610 | 3/1995 |
| WO | WO2004032719 | 4/2004 |
| WO | WO2005094138 | 10/2005 |
| WO | WO2005110441 | 11/2005 |
| WO | WO2008/019102 | 2/2008 |
| WO | WO2008/112143 | 9/2008 |
| WO | 2008116991 A2 | 10/2008 |
| WO | WO2009018837 | 2/2009 |
| WO | WO2010021944 | 2/2010 |
| WO | WO2011/002606 | 1/2011 |
| WO | 2012014805 A1 | 2/2012 |
| WO | WO2012/034089 | 3/2012 |
| WO | WO2012/094008 | 7/2012 |
| WO | WO2012/155213 | 11/2012 |
| WO | WO2013/052548 | 4/2013 |
| WO | WO2013/070712 | 5/2013 |
| WO | WO2013/181179 | 12/2013 |
| WO | WO2014/085719 | 6/2014 |
| WO | 2014144184 A2 | 9/2014 |
| WO | WO2014/143842 | 9/2014 |
| WO | WO2014/144151 | 9/2014 |
| WO | WO2015/049783 | 4/2015 |
| WO | WO2015/066278 | 5/2015 |
| WO | WO2015/127085 | 8/2015 |
| WO | 2015168517 A1 | 11/2015 |
| WO | 2015172160 A1 | 11/2015 |
| WO | WO2016/064863 | 4/2016 |
| WO | WO2018/157172 | 8/2018 |
| WO | WO2018/157175 | 8/2018 |
| WO | WO2019/046413 | 3/2019 |
| WO | WO2019/046415 | 3/2019 |
| WO | WO2019/133776 | 7/2019 |
| WO | WO2019/133777 | 7/2019 |
| WO | WO2019/222640 | 11/2019 |
| WO | WO2020/033768 | 2/2020 |
| WO | 2020115473 A1 | 6/2020 |
| WO | WO2020/142658 | 7/2020 |
| WO | WO2020/148155 | 7/2020 |
| WO | WO2020/150195 | 7/2020 |
| WO | WO2020/232414 | 11/2020 |
| WO | WO2020/232419 | 11/2020 |
| WO | WO2021/087382 | 5/2021 |
| WO | WO2021/142472 | 7/2021 |
| WO | 2021154833 A1 | 8/2021 |

(56) References Cited

FOREIGN PATENT DOCUMENTS

| WO | 2021245667 A1 | 12/2021 |
|----|---------------|---------|
| WO | WO2021/258025 | 12/2021 |
| WO | 2022123567 A1 | 6/2022 |
| WO | 2022123574 A1 | 6/2022 |
| WO | 2022123580 A1 | 6/2022 |
| WO | 2022192757 A1 | 9/2022 |
| WO | 2023018992 A1 | 2/2023 |
| WO | 2023049873 A1 | 3/2023 |
| WO | 2023092103 A1 | 5/2023 |
| WO | 2023201363 A1 | 10/2023 |

OTHER PUBLICATIONS

Ehrenwerth et al., Anesthesia Equipment, Principles and Applications, Chapter 6, Anesthesia Ventilators, pp. 140-171, Mosby Publishing, 1993.
Engstrom Ventilator Technical Reference Manual.
Ikaria, INOmax DSIR® Operation Manual (2012).
Kirmse et al., "Delivery of Inhaled Nitric Oxide Using the Ohmeda INOvent Delivery System", Chest (1998), vol. 113, Issue 6, pp. 1650-1657.
Maeda et al., "Generation Mechanism of Micro-Bubbles in a Pressurized Dissolution Method", Experimental Thermal and Fluid Science, vol. 60, pp. 201-207, Jan. 1, 2015.
Malik, "Nitric Oxide Production by High Voltage Electrical Discharges for Medical Uses: A Review" Plasma Chem Plasma Process, (2016), vol. 36, pp. 737-766.
Montgomery et al., "Inhaled Nitric Oxide Delivery and Monitoring", Journal of Clinical Monitoring and Computing (1999), vol. 15, pp. 325-335.
Shoobert et al., "Iridium Electrodes Increase Spark Plug Life", Platinum Metals Rev., 1962, vol. 6, No. 3, pp. 92-94.
Ventilator/Respirator Hardware and Software Design Specification, Rev. 0, Nov. 2011, Freescale Semiconductor, Inc.
Young et al., "Delivery and monitoring of inhaled nitric oxide", Intensive Care Med. (1996), vol. 22, pp. 77-86.
Lovich et al., "Generation of Purified Nitric Oxide from Liquid N2O4 for the Treatment of Pulmonary Hypertension in Hypoxemic Swine", Nitric Oxide vol. 37, pp. 66-77, Feb. 15, 2014.
U.S. Appl. No. 15/907,241 2018/0243527 U.S. Pat. No. 10,286,176, Feb. 27, 2018 Aug. 30, 2018 May 14, 2019, Systems and Methods for Generating Nitric Oxide, Woodward, Valerie Lynn.
U.S. Appl. No. 15/907,258 2018/0243528 U.S. Pat, No. 10,328,228, Feb. 27, 2018 Aug. 30, 2018 Jun. 25, 2019, Systems and Methods for Ambulatory Generation of Nitric Oxide, Woodward, Valerie Lynn.
U.S. Appl. No. 16/363,505 2019/0217042 U.S. Pat. No. 10,576,329, Mar. 25, 2019 Jul. 18, 2019 Mar. 3, 2020, Systems and Methods for Ambulatory Generation of Nitric Oxide, Woodward, Valerie Lynn.
U.S. Appl. No. 16/388,464 2019/0314596 U.S. Pat. No. 10,532,176, Apr. 18, 2019 Oct. 17, 2019 Jan. 14, 2020, Systems and Methods for Generating Nitric Oxide, Woodward, Valerie Lynn.
U.S. Appl. No. 16/697,498 2020/0094011 U.S. Pat. No. 10,695,523, Nov. 27, 2019 Mar. 26, 2020 Jun. 30, 2020, Systems and Methods for Generating Nitric Oxide, Woodward, Valerie Lynn.
U.S. Appl. No. 16/724,233 2020/0139072 U.S. Pat. No. 11,033,705, Dec. 21, 2019 May 7, 2020 Jun. 15, 2021, Systems and Methods for Ambulatory Generation of Nitric Oxide, Woodward, Valerie Lynn.
U.S. Appl. No. 16/875,971 2020/0361772, May 15, 2020 Nov. 19, 2020, Systems and Methods for Generating Nitric Oxide, Tai, Xiuyu.
U.S. Appl. No. 16/875,687 2020/0360649 U.S. Pat. No. 11,045,620, May 15, 2020 Nov. 19, 2020 Jun. 29, 2021, Electrodes for Nitric Oxide Generation, Tai, Xiuyu.
U.S. Appl. No. 16/875,914 2020/0361773, May 15, 2020 Nov. 19, 2020, Architectures for Production of Nitric Oxide, Not Yet Assigned.
U.S. Appl. No. 17/146,468 2021-0214222, Jan. 11, 2021 Jul. 15, 2021, Systems and Methods for Nitric Oxide Generation with Humidity Control, Tai, Xiuyu.
U.S. Appl. No. 16/909,722 2020/0390994 U.S. Pat. No. 10,946,163, Jun. 23, 2020 Dec. 17, 2020 Mar. 16, 2021, Systems and Methods for Generating Nitric Oxide, Woodward, Valerie Lynn.
U.S. Appl. No. 17/197,911 2021/0268221, Mar. 10, 2021 Sep. 2, 2021, Systems and Methods for Generating Nitric Oxide, Woodward, Valerie Lynn.
U.S. Appl. No. 17/332,915 2022/0047837, May 27, 2021 Feb. 17, 2022, Systems and Methods for Ambulatory Generation of Nitric Oxide, Woodward, Valerie Lynn.
U.S. Appl. No. 17/331,793 2021/0353898, May 27, 2021 Nov. 18, 2021, Electrodes for Nitric Oxide Generation, Tai, Xiuyu.
U.S. Appl. No. 17/352,225 2021/0395905, Jun. 18, 2021 Dec. 23, 2021, Systems and Methods for Preventing and Treating Infections with Nitric Oxide, Tai, Xiuyu.
U.S. Appl. No. 17/670,655, filed Feb. 14, 2022, Systems and Methods for Generating Nitric Oxide, Tai, Xiuyu.
Arjunan Thesis—Plasma Produced Reactive Oxygen and Nitrogen Species in Angiogenesis—May 2011—Krishna Priya Arjunan.
Arora et al., Nitric Oxide Regulation of Bacterial Biofilms, Biochemistry, vol. 54, pp. 3717-3728, May 21, 2015.
Barraud et al., Involvement of Nitric Oxide n Biofilm Dispersal of Pseudomonas Aeruginosa, Journal of Bacteriology, vol. 188, No. 21, pp. 7344-7353, Nov. 2006.
Bellerophon, "A Dose Escalation Study to Assess the Safety and Efficacy of Pulsed iNO in Subjects With Pulmonary Fibrosis", Aug. 30, 2017, https://clinicaltrials.gov/ct2/show/NCT03267108.
Bentur et al., Pilot Study to Test Inhaled Nitric Oxide in Cystic Fibrosis Patients with Refractory *Mycobacterium* Abscessus Lung Infection, Journal of Cystic Fibrosis, vol. 19, pp. 225-231, May 23, 2019.
Birkeland, K., "On the Oxidation of Atmospheric Nitrogen in Electric Arcs", A Paper read before the Faraday Society on Monday, Jul. 2, 1906, Published on Jan. 1, 1906.
Bogdonovski et al., Anti-Mycobacterial Activity of High-Dose Nitric Oxide Against *Mycobacterium* Abscessus In Vitro, National Institutes of Health Poster, Jul. 8, 2018.
Charles, et al., "SiO2 Deposition from Oxygen/Silane Pulsed Helicon Diffusion Plasmas" Applied Physics Letters, vol. 67, No. 1, pp. 40-42, Jul. 3, 1995.
Deppisch et al., Gaseous Nitric Oxide to Treat Antibiotic Resistant Bacterial and Fungal Lung Infections in Patients with Cystic Fibrosis: A Phase I Clinical Study, Infection, vol. 44, pp. 513-520, Feb. 9, 2016.
Dobrynin et al. "Direct and Controllable Nitric Oxide Delivery into Biological Media and Living Cells by a Pin-to-Hole Spark Discharge (PHD) Plasma" Journal of Physics D: Applied Physics, vol. 44, pp. 1-10, Jan. 28, 2011.
Donohoe et al., "Production of O3, NO, and N2O in a Pulsed Discharge at 1 Atm", Ind. Eng. Chem., Fundam., vol. 16, No. 2, pp. 208-215, May 1977.
Encyclopaedia Britannica, "Soda Lime" published Nov. 12, 2018, https://www.britannica.com/science/soda-lime.
Feigerle, C., et al., "Multiphoton Ionization of Vibrationally Hot Nitric Oxide Produced in a Pulsed Supersonic Glow Discharge", Journal of Chemical Physics, vol. 90, Issue 6, pp. 2900-2908, Mar. 15, 1989.
Fowler, "Exercise Intolerance in Pulmonary Arterial Hypertension", Pulmonary Medicine, vol. 2012, Article ID 39204, 11 pages, (2012).
Habib, Bassam Hanna, "A Simple Model of Spark Gap Discharge Phase", Eng. & Tech. Journal, vol. 31, Part (A), No. 9, pp. 1692-1704, 2013.
Hanning et al., "Pulse Oximetry: A Practical Review", British Medical Journal, vol. 311, pp. 367-370, Aug. 5, 1995.
Heli, Study on the Removal of Byproduct Nitrogen Dioxide from the Mixture of Inhaled Nitric Oxide Produced by Pulsed Arc Discharge, Thesis for Degree of Master of Engineering, Huazhong University of Science & Technology, China, Apr. 2006, 78 pages (Includes English Language Translation of Title Page and Abstract).
Higenbottam et al., "The Direct and Indirect Action of Inhaled Agents on the Lung and Its Circulation: Lessons from Clinical Science," Environmental Health Perspectives, vol. 109, Supplement 4, pp. 559-562, Aug. 2001.

(56) References Cited

OTHER PUBLICATIONS

Howlin et al., Low-Dose Nitric Oxide as Targeted Anti-Biofilm Adjunctive Therapy to Treat Chronic Pseudomonas Aeruginosa Infection in Cystic Fibrosis, Molecular Therapy, vol. 25, No. 9, pp. 2104-2116, Sep. 2017.
Hu, Hui et al., "Study on Production of Nitric Monoxide for Respiratory Distress by Pulsed Discharge", Proceedings of the CSEE, vol. 23, No. 2, Jan. 2005.
Hu, Hui et al., "Study on Pulsed Arc Discharge Conditions on Production of Nitric Oxide for Medical Application", High Voltage Apparatus, Issue 3, Mar. 2005.
Hu et al., "Study on Production of Inhaled Nitric Oxide for Medical Applications by Pulsed Discharge" IEEE Transactions on Plasma Science, vol. 35, No. 3, pp. 619-625, Jun. 2007.
Hu, Hui et al., "The Effect of Flow Distribution on the Concentration of NO Produced by Pulsed Arc Discharge", Plasma Science and Technology, vol. 9, No. 6, pp. 766-769, Dec. 2007.
Hu, Hui, Research on the Production of Nitric Oxide by Pulsed Arc Discharge and the Curing of Respiratory Distress Instrument, Dissertation for Degree of Doctor of Philosophy in Engineering, Huazhong University of Science and Technology, China, Apr. 2005, 138 pages (Includes English Language Translation of Title Page and Abstract).
Intersurgical Complete Respiratory Systems, Carbon Dioxide Absorbents Catalogue, www.intersurgical.com/distributors, Issue 5, Oct. 17, 2021.
Johns Hopkins University—"American Chemical Journal vol. XXXV"—No. 4, Reports Chapter, pp. 358-368, Apr. 1906.
Keshav, Saurabh. "Using Plasmas for High-speed Flow Control and Combustion Control" Diss. The Ohio State University, 2008.
Kornev, J., et al., "Generation of Active Oxidant Species by Pulsed Dielectric Barrier Discharge in Water-Air Mixtures", Ozone: Science & Engineering, vol. 28, Issue 4, pp. 207-215, Jul. 2006.
Kuo, Spencer P. "Air Plasma for Medical Applications" J. Biomedical Science and Engineering, vol. 5, pp. 481-495, Sep. 2012.
Li, Z. et al., "Development of Miniature Pulsed Power Generator," 2005 IEEE Pulsed Power Conference, Monterey, CA, pp. 1053-1056, Jul. 2005.
Li et al., Production of Medically Useful Nitric Monoxide Using AC Arc Discharge, Nitric Oxide, vol. 73, pp. 89-95, Feb. 28, 2018.
Lorente L., "Respiratory Filters and Ventilator-Associated Pneumonia: Composition, Efficacy Tests and Advantages and Disadvantages", Humidification in the Intensive Care Unit, pp. 171-177, Springer, Berlin, Heidelberg 2012.
Matsuo, K. et al., "Nitric Oxide Generated by Atmospheric Pressure Air Microplasma," 2009 IEEE Pulsed Power Conference, Washington, DC, Jun. 28-Jul. 2, 2009, pp. 999-1003, Jan. 19, 2010.
McMullin et al., The Antimicrobial Effect of Nitric Oxide on the Bacteria That Cause Nosocomial Pneumonia in Mechanically Ventilated Patients in the Intensive Care Unit, Respiratory Care, vol. 50, No. 11, pp. 1451-1456, Nov. 2005.
Miller et al., Gaseous Nitric Oxide Bactericidal Activity Retained During Intermittent High-Dose Short Duration Exposure, Nitric Oxide, vol. 20, Issue 1, pp. 16-23, Feb. 2009.
Miller et al., Inhaled Nitric Oxide Decreases the Bacterial Load in a Rat Model of Pseudomonas Aeruginosa Pneumonia, Journal of Cystic Fibrosis, vol. 12, pp. 817-820, Mar. 6, 2013.
Miller et al., Nitric Oxide is a Potential Antimicrobial Against Slow and Fast Growing Mycobacteria, Online Abstracts Issue, American Journal Respiratory Care Medicine, vol. 193, A7498, May 18, 2016.
Miller et al., A Phase I Clinical Study of Inhaled Nitric Oxide in Healthy Adults, Journal of Cystic Fibrosis, vol. 11, pp. 324-331, Apr. 18, 2012.
Mok et al. "Application of Positive Pulsed Corona Discharge to Removal of SO2 and NOx," Proceedings, ICESP VII, Sep. 20-25, 1998, Kyongiu, Korea.
Namihira et al., Production of Nitric Monoxide Using Pulsed Discharges for a Medical Application, IEEE Transactions on Plasma Science, vol. 29, No. 1, pp. 109-114, Feb. 2000.
Namihara et al., "Production of NO Using Pulsed Arc Discharges and Its Medical Applications", Journal of Plasma and Fusion Research, vol. 79, No. 1 pp. 35-38, Jun. 25, 2002.
Namihira et al., "Production of Nitric Monoxide in Dry Air Using Pulsed Ddischarge," Digest of Technical Papers. 12th IEEE International Pulsed Power Conference. (Cat. No. 99CH36358), Monterey, CA, pp. 1313-1316 vol. 2, Aug. 6, 2002.
Namihira et al., Production of Nitric Oxide Using a Pulsed Arc Discharge, IEEE Transactions on Plasma Science, vol. 30, No. 5, pp. 1993-1998, Oct. 2002.
Namihira et al., "Temperature and Nitric Oxide Generation in a Pulsed Arc Discharge Plasma" Plasma Science and Technology, vol. 9, No. 6, pp. 747-751, Dec. 2007.
Navarro-Gonzalez et al., "The Physical Mechanism of Nitric Oxide Formation in Simulated Lightning" Geophysical Research Letters, vol. 28, No. 20, pp. 3867-3870, Oct. 15, 2001.
Olivier et al., Treatment of Refractory *Mycobacterium* Abscessus Lung Infection with Inhaled Intermittent Nitric Oxide, Poster, Jul. 8, 2018.
Overzet, et al. "Why and How to Pulse a Plasma"—slide show presentation, Oct. 1997.
Patil et al., Plasma Assisted Nitrogen Oxide Production from Air, AiChE Journal, vol. 64, Issue 2, Aug. 14, 2017.
Pawlat et al., Evaluation of Oxidative Species in Gaseous, Plasma Chemistry and Plasma Processing, vol. 39, pp. 627-642, Mar. 28, 2019.
Pontiga, F., et al., "Nitrogen Oxides Generation Induced by Negative Corona Discharge in N2 + 02 Mixtures," 2006 IEEE Conference on Electrical Insulation and Dielectric Phenomena, Kansas City, MO, pp. 264-267, Oct. 2006.
Sakai, et al., "A Compact Nitric Oxide Supply for Medical Application," 2007 16th IEEE International Pulsed Power Conference, Albuquerque, NM, pp. 752-755, Oct. 14, 2008.
Sakai et al., "Nitric Oxide Generator Based on Pulsed Arc Discharge" Acta Physica Polonica A, vol. 115, No. 6, pp. 1104-1106, Jun. 2009.
Schilz, "Treatment of Pulmonary Hypertension Related to Disorders of Hypoxia" Advances in Pulmonary Hypertension, vol. 4, No. 2, pp. 14-22, May 2005.
Takaki, et al., "Resistance of Pulsed Arc Discharge in Air and SF/sub 6", Pulsed Power Plasma Science, vol. 2, pp. 1758-1761, Jun. 2001.
Tal et al., Nitric Oxide Inhalations in Bronchiolitis: A Pilot, Randomized, Double-Blinded, Controlled Trial, Pediatric Pulmonology, vol. 53, Issue 1, pp. 95-102, Jan. 2018.
Tsukahara et al., "Gas-Phase Oxidation of Nitric Oxide: Chemical Kinetics and Rate Constant," Nitric Oxide: Biology and Chemistry, vol. 3, No. 3, pp. 191-198, Jun. 1999.
Wang et al., Gliding Arc Plasma for CO2 Conversion, Chemical Engineering Journal, vol. 330, pp. 11-25, 2017.
Yaacoby-Bianu et al., Compassionate Nitric Oxide Adjuvant Treatment of Persistent *Mycobacterium* Infection in Cystic Fibrosis Patients, The Pediatric Infectious Disease Journal, vol. 37, No. 4, Apr. 2018.
Yu, et al., "Detection and Removal of Impurities in Nitric Oxide Generated from Air by Pulsed Electrical Discharge", Nitric Oxide, vol. 60, pp. 16-23, Nov. 30, 2016.
Yu, et al. "Development of a Portable Mini-Generator to Safely Produce Nitric Oxide for the Treatment of Infants with Pulmonary Hypertension", Nitric Oxide, vol. 75, pp. 7-76, May 1, 2018.
International Search Report in PCT/US2021/055318 mailed Jan. 25, 2022.

\* cited by examiner

Example intra-pulse current modulation scheme, with high a2 at the start of the pulse and high a1 later in the pulse. Current is normalized to the nominal case of d1 = 33% and d2 = 0% (maximized second harmonic without wave shaping)

Transformer primary current sense (CH1) and GDN input current (CH4) for one pulse with intra-pulse current modulation

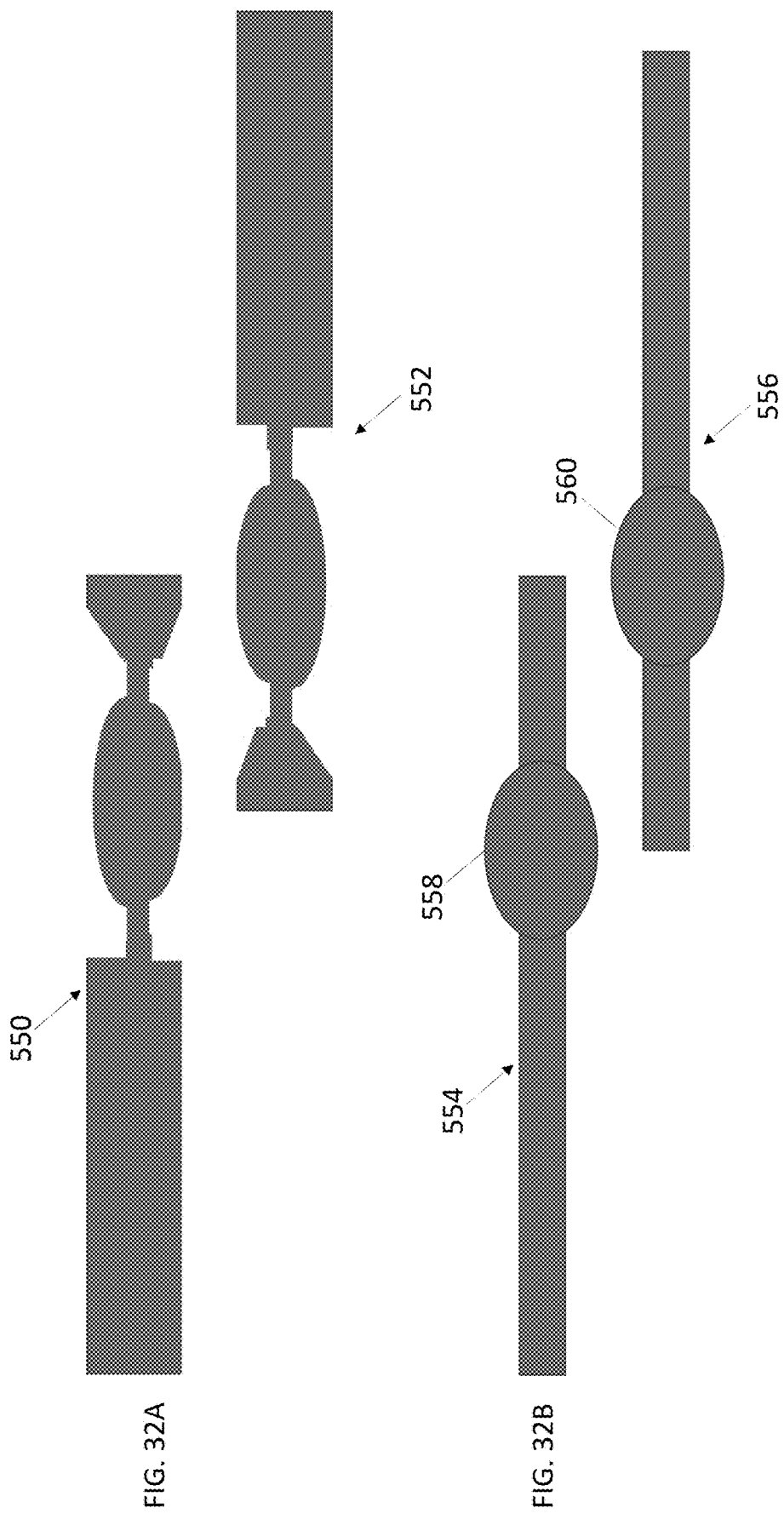

Multi Nozzle

Square Slit Nozzle

Rounded Slit Nozzle

Circular Nozzle

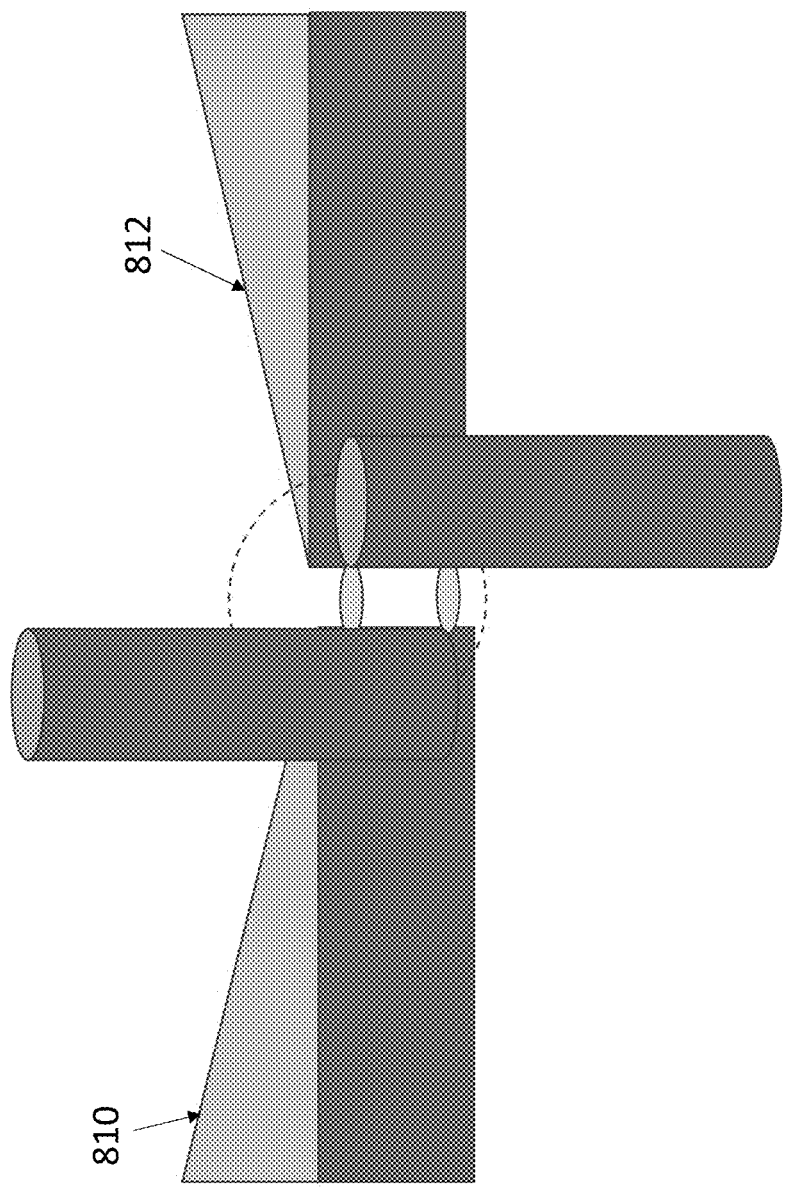

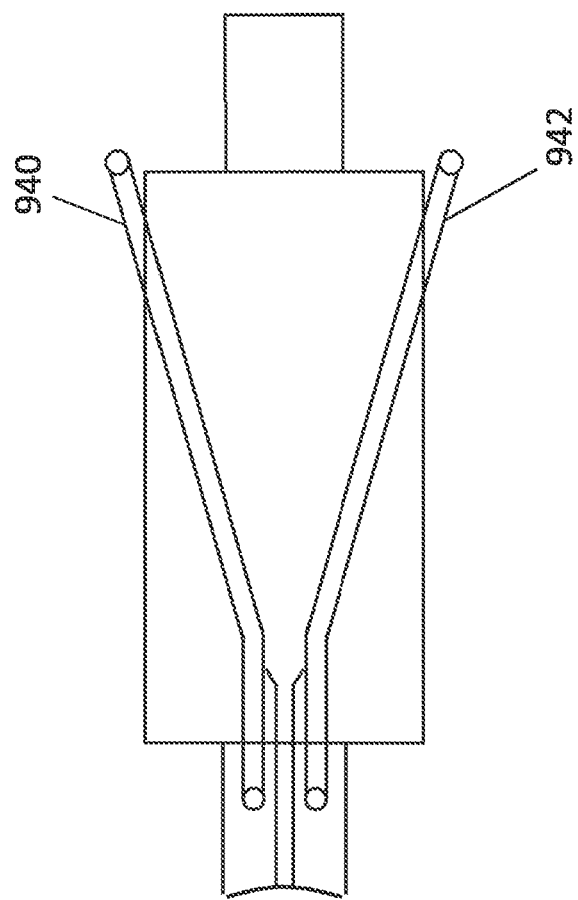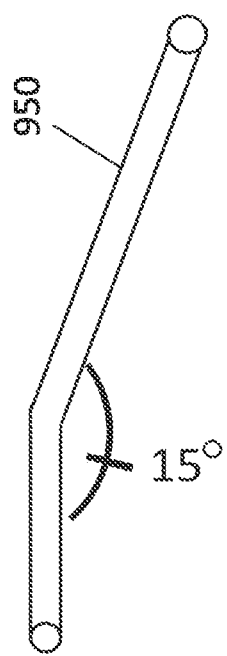

NITRIC OXIDE GENERATION PROCESS CONTROLS

RELATED APPLICATIONS

This application claims the benefit of and priority to U.S. Provisional Application No. 63/093,040 filed Oct. 16, 2020, and the contents of which is hereby incorporated herein by reference in its entirety.

FIELD

The present disclosure relates to systems and methods for generating and delivering nitric oxide for use with various ventilation devices, and more particularly to nitric oxide generation process controls.

BACKGROUND

Nitric oxide (NO) has been found to be useful in a number of ways for treatment of disease, particularly cardiac and respiratory ailments. Previous systems for producing NO and delivering the NO gas to a patient have a number of disadvantages. For example, tank-based systems required large tanks of NO gas at a high concentration and are required to purge with NO when treatment is resumed. Synthesizing NO from $NO_2$ or $N_2O_4$ requires the handling of toxic chemicals. Prior electric generation systems involve generating plasma in the main flow of air to be delivered to patients or pumped through a delivery tube.

SUMMARY

The present disclosure relates to systems and methods for generating and/or delivering nitric oxide.

In some aspects, the present disclosure provides a system for generating nitric oxide that comprises a plasma chamber housing two or more electrodes in communication with a resonant high voltage circuit configured to send a signal to the plasma chamber for generating nitric oxide in a product gas from a flow of a reactant gas, and a controller configured to generate a pulse width modulation signal having multiple harmonic frequencies to excite the resonant high voltage circuit. The controller is configured to adjust the duty cycle of the pulse width modulation signal, the controller selecting the duty cycle based on a target voltage before plasma formation and a target current after plasma formation in the plasma chamber.

In some embodiments, the voltage before plasma formation and the current after plasma formation are independently controlled by varying harmonic amplitudes in the pulse width modulation signal. In some embodiments, the harmonic amplitudes are varied by alternating between two or more duty cycles of the pulse width modulation signal. In some embodiments, control of the current after plasma formation allows for current modulation within a plasma pulse. In some embodiments, the controller is configured to pulse modulate the plasma to control the NO production rate.

In some embodiments, the controller is configured to adjust a concentration of nitric oxide in the product gas. In some embodiments, the controller is configured to facilitate breakdown in an electrode gap in the plasma chamber. In some embodiments, the controller is configured to optimize a ratio between NO and $NO_2$ in the product gas. In some embodiments, the controller is configured to compensate for changes to an electrode in the plasma chamber, such as electrode wear. In some embodiments, the controller is configured to compensate for reactant properties in the system, including at least one of humidity, oxygen/nitrogen ratio, temperature and pressure.

A system is provided for generating nitric oxide that comprises a plasma chamber housing two or more electrodes in communication with a resonant high voltage circuit configured to send a signal to the plasma chamber for generating nitric oxide in a product gas from a flow of a reactant gas, and a controller in communication with the resonant high voltage circuit for independently controlling a voltage to form a plasma in the plasma chamber and a current in a plasma in the plasma chamber by alternating between two or more duty cycles to independently adjust the amplitudes of the waveform's harmonic frequencies.

In some embodiments, the controller is configured to adjust a concentration of nitric oxide in the product gas. In some embodiments, the controller is configured to facilitate breakdown in an electrode gap in the plasma chamber. In some embodiments, the controller is configured to optimize a ratio between NO and $NO_2$ in the product gas. In some embodiments, the controller is configured to compensate for changes to an electrode in the plasma chamber, such as electrode wear. In some embodiments, the controller is configured to compensate for reactant properties in the system, including at least one of humidity, oxygen/nitrogen ratio, and pressure.

A method for generating nitric oxide is provided that comprising energizing a plasma chamber using a resonant high voltage circuit to generate nitric oxide in a product gas from a flow of a reactant gas, and controlling, using a controller in communication with the resonant high voltage circuit, a voltage that forms a plasma in the plasma chamber and a current that sustains a plasma in the plasma chamber by adjusting a duty cycle of a waveform used to excite the resonant high voltage circuit using multiple harmonic frequencies. In some embodiments, the voltage before plasma formation and the current after plasma formation are independently controlled by varying the harmonic amplitudes in the pulse width modulation signal.

BRIEF DESCRIPTION OF THE DRAWINGS

The present disclosure is further described in the detailed description which follows, in reference to the noted plurality of drawings by way of non-limiting examples of exemplary embodiments, in which like reference numerals represent similar parts throughout the several views of the drawings, and wherein:

FIG. 32A and FIG. 32B illustrate exemplary embodiments of electrodes with non-uniform profile;

FIG. 56 illustrates an exemplary embodiment of a gliding arc electrode;

FIG. 67A and FIG. 67B illustrate exemplary embodiments of tubular electrodes with a single bend or arc;

Figure 1:
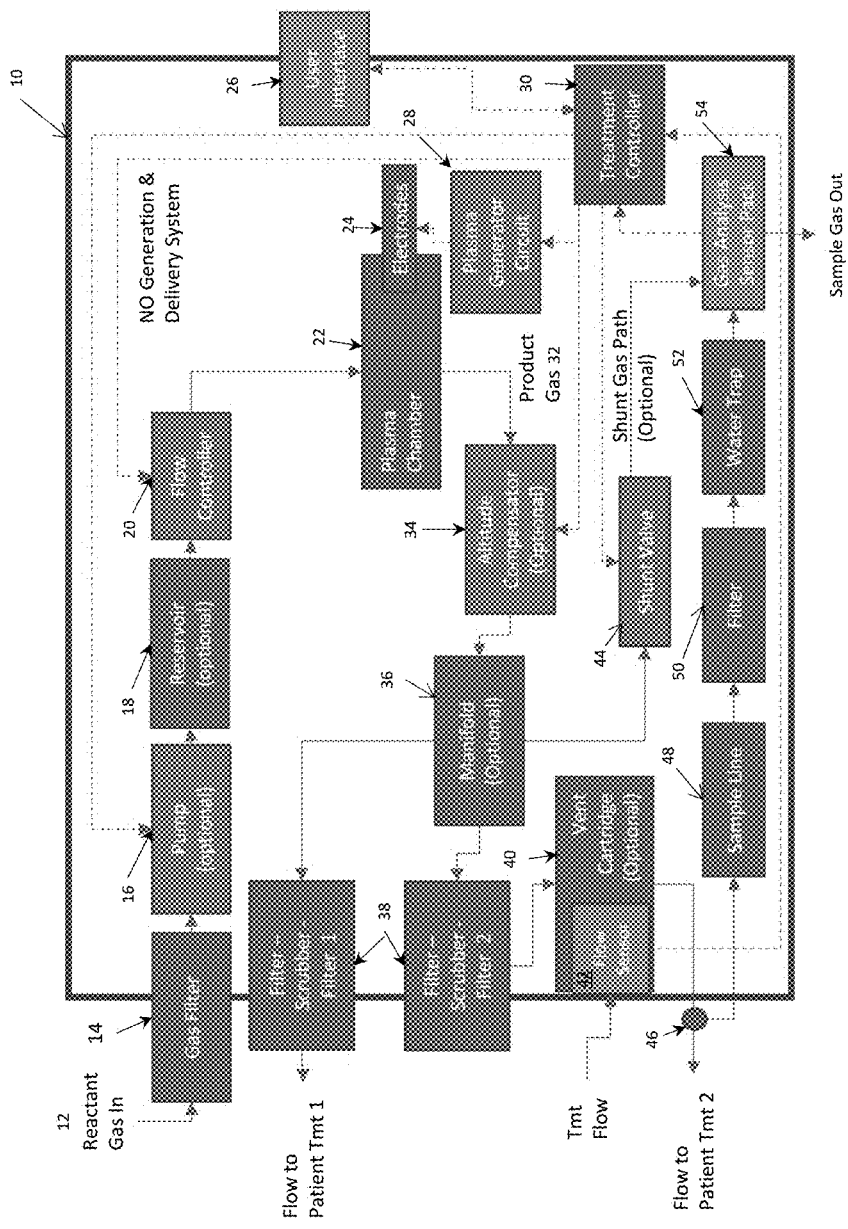
FIG. 1 is an exemplary embodiment of a system for generating a NO-enriched product gas.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. It will be understood that various changes may be made in the function and arrangement of elements without departing from the spirit and scope of the presently disclosed embodiments.

Specific details are given in the following description to provide a thorough understanding of the embodiments. However, it will be understood by one of ordinary skill in the art that the embodiments may be practiced without these specific details. For example, systems, processes, and other elements in the presently disclosed embodiments may be shown as components in block diagram form in order not to obscure the embodiments in unnecessary detail. In other instances, well-known processes, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

Subject matter will now be described more fully with reference to the accompanying drawings, which form a part hereof, and which show, by way of illustration, specific example aspects and embodiments of the present disclosure. Subject matter may, however, be embodied in a variety of different forms and, therefore, covered or claimed subject matter is intended to be construed as not being limited to any example embodiments set forth herein; example embodiments are provided merely to be illustrative. The following detailed description is, therefore, not intended to be taken in a limiting sense.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure relates to systems and methods of nitric oxide (NO) delivery for use in various applications, for example, inside a hospital room, in an emergency room, in a doctor's office, in a clinic, and outside a hospital setting as a portable or ambulatory device or gas source during patient transport. An NO generation and/or delivery system can take many forms, including but not limited to a device configured to work with an existing medical device that utilizes a product gas, a stand-alone (ambulatory) device, a module that can be integrated with an existing medical device, one or more types of cartridges that can perform various functions of the NO system, a compact NO inhaler, and an electronic NO tank. The NO generation system uses a reactant gas containing a mixture of at least oxygen and nitrogen, including but not limited to ambient air, and an electrical discharge (plasma) to produce a product gas that is enriched with NO.

An NO generation device can be used with any device that can utilize NO, including but not limited to a ventilator, an anesthesia device, a defibrillator, a ventricular assist device (VAD), a Continuous Positive Airway Pressure (CPAP) machine, a Bilevel Positive Airway Pressure (BiPAP) machine, a non-invasive positive pressure ventilator (NIPPV), a nasal cannula application, a nebulizer, an extracorporeal membrane oxygenation (ECMO), a bypass system, an automated CPR system, an oxygen delivery system, an oxygen concentrator, an oxygen generation system, and an automated external defibrillator AED, MRI, and a patient monitor. In addition, the destination for nitric oxide produced can be any type of delivery device associated with any medical device, including but not limited to a nasal cannula, a manual ventilation device, a face mask, inhaler, or any other delivery circuit. The NO generation capabilities can be integrated into any of these devices, or the devices can be used with a NO generation device as described herein.

The present disclosure includes ideas in the areas of NO generation and NO delivery. It should be noted that NO delivery concepts can be applicable to NO delivered from a multitude of sources, including NO tanks, electrically-generated NO and chemically-derived NO.

NO therapy involves delivering known quantities of NO to a patient. Doses for NO therapy can be prescribed in terms of inhaled concentration (e.g. ppm) or a number of moles of NO per unit time (e.g. mg/hr). When prescribed as concentration, the intention is for the inspiratory gas to be a homogeneous mixture of NO and other gases so that the lung is filled with a consistent concentration of NO throughout.

Gas containing NO within a NO generator is referred to as "product gas." Some NO devices generate NO from a reactant gas containing nitrogen and oxygen, while other devices derive NO from solid and/or liquid reagents.

NO rapidly oxidizes into $NO_2$ in the presence of oxygen and therefore cannot be stored for long periods of time without significant loss. This chemistry fact is an issue whenever NO coexists with oxygen, regardless of how the NO was generated, be it by electrical discharge, RF heating, or chemical derivation.

This rapid conversion of NO to $NO_2$ in the presence of oxygen presents a challenge since NO must be transported from its place of generation, through a pathway within the NO device to a pneumatic conduit carrying inspiratory gas. NO can be lost to oxidation within the pathway, surface materials within the pathway and scrubbing materials within the pathway.

A constant inhaled concentration of NO can be achieved by introducing the correct number of NO molecules to the inspiratory flow. In some embodiments, this is achieved in a constant inspiratory flow by delivering the appropriate concentration of product gas to the inspiratory flow at a constant flow rate. Achieving a constant inhaled concentration in a variable inspiratory flow can be challenging, however. One approach is to deliver product gas at a constant flow rate and vary the concentration of the product gas so that an appropriate number of moles of NO are added to the inspiratory flow at each flow level. It is challenging to maintain the correct concentration of NO at the injector at all times with this approach since there is transit time, diffusion, surface losses and scrubber losses taking place as the product gas is transferred from the location of generation to the injector. Flow restrictive components within the product gas pathway (e.g., scrubbers and filters) introduce a time lag which can limit the level of inspiratory flow variability that a NO generation system can accurately dose. The transit time between the location of generation and the injector further requires the production rate to be predictive, making variable concentration/constant flow solutions unsuitable for inspiratory flows that are not periodic.

Another approach to dosing a variable inspiratory flow is to generate constant concentration product gas that is injected at variable flow rates. To achieve constant inspiratory flow concentration, the NO gas is injected at a flow rate that is directly proportional to inspiratory flow. The ratio of injected flow to inspiratory flow is referred to as the "dilution ratio."

NO production rate is defined as the mathematical product of NO concentration in ppm and the gas mass flow rate in (slpm), and can be measured in units of ppm·slpm, or abbreviated as ppm·lpm. Although it is fairly simple to create an electrical discharge in a gas, it is incredibly challenging to generate known quantities of NO using this method. NO production is dependent on a multitude of factors, including but not limited to the level of plasma activity, the flow rate of reactant gas and environmental factors (pressure, temperature, and humidity). Once formed, the rate of loss of NO is dependent on the residence time, pressure, temperature, scrubber, and other factors.

The fewer variables present in an NO generation process, the greater the ability to control NO production to accurate levels. For example, the risk of humidity effects on NO generation can be eliminated by using dry reactant gas. The risk of reactant gas flow rate effects on NO generation can be eliminated by operating at a fixed reactant gas flow rate.

In some embodiments, NO is delivered into an inspiratory limb gas flow, thereby diluting the inspiratory gas and adding volume/pressure to that flow. When NO-containing gas is added to a ventilator circuit, for example, the additional volume of gas can increase the pressure at the patient, interfere with ventilator operation and dilute medicinal gases in the ventilator circuit (e.g., $O_2$). For this reason, it can be beneficial to dilute an inspiratory gas flow as little as possible. Higher concentrations of NO enable lower levels of dilution but can increase the loss of NO to oxidation, making it more difficult to know the concentration of NO injected. Higher concentrations of NO within the system can also result in higher $NO_2$ levels pre-injector.

In embodiments where constant concentration is delivered at variable mass flow rates, and where NO is produced on-demand, the production rate of NO is matched to the mass flow rate being injected. This results in the NO production rate bandwidth requirements being close to the flow control bandwidth requirements. Most NO sensing technologies, particularly the small, inexpensive ones suitable for integration into portable devices, have insufficient bandwidth and insufficient response time to support closed-loop regulation of the NO production rate. A high-bandwidth NO generation device must therefore utilize accurate, open-loop process controls to obtain the required bandwidth. In some embodiments, high bandwidth open-loop controls are combined with low-bandwidth closed loop controls to improve overall accuracy. An open-loop process controller accounts for process variables by either controlling them directly (independent variables) or adjusting the operating point of the plant to correct for them (dependent variables). In a NO generation device, process variables include, but are not limited to, plasma parameters (e.g., intensity, duty cycle, etc.), reactant gas flow rate, reactant gas pressure, temperature, and humidity.

In some embodiments, the bandwidth requirements of the NO production rate may be reduced by diverting excess NO to a waste path. In some embodiments the bandwidth requirements may be reduced by temporarily storing product gas in a reservoir.

In this document, references to flow are inclusive of mass flow. In many embodiments, NO is added to an inspiratory flow. The inspiratory flow can be within the inspiratory limb of a ventilator, within an inhaler, or other device delivering gas to a patient. In some embodiments, NO is delivered though a delivery device and introduced to an inspiratory flow at the patient (e.g., a nasal prong delivering flow directly to the patient's nose).

Discharge plasmas can be DC or AC. In some embodiments, the reactant gas flow makes the plasma arc increase beyond the length of the electrode gap. NO production for a given electrode spacing is maximized by stretching the arc with reactant gas flow.

In some embodiments, plasma is generated with radio frequency energy (e.g., RF heating, microwave). In some embodiments, NO generation can be modulated by adjusting one or more of the following parameters: RF Frequency, wave guide spacing, antenna location, flow, pressure, temperature, etc. as variables in production. In some embodiments, the plasma generator circuit is a radio frequency (RF) power generator delivering RF power to one or more RF antennas. In some embodiments, the RF power operates around 13.56 MHz with power in the 50-100 W range, however other power ranges can be effective depending on antenna design, production targets and reactant gas conditions. In some embodiments, RF power operates around 2.45 GHz for improved coupling and excitation of $N_2$ molecules with peak power up to 100 W. In another embodiment, the system operates at roughly 2.5 GHz and less than 4 W to generate up to 500 ppm·lpm. In some embodiments, the range of possible RF frequencies that can be utilized to generate NO is 30 kHz to 300 GHz.

FIG. 1 illustrates an exemplary embodiment of a NO generation system 10 that includes components for reactant gas intake 12 and delivery to a plasma chamber 22. The plasma chamber 22 includes one or more electrodes 24 therein that are configured to produce, with the use of a high voltage circuit (plasma generator) 28, a product gas 32 containing a desired amount of NO from the reactant gas. The system includes a controller 30 in electrical communication with the plasma generator 28 and the electrode(s) 24 that is configured to control the concentration of NO in the product gas 32 using one or more control parameters relating to conditions within the system and/or conditions relating to a separate device for delivering the product gas to a patient and/or conditions relating to the patient receiving the product gas. In some embodiments, the plasma generator circuit is a high voltage circuit that generates a potential difference across an electrode gap.

In some embodiments, the NO system pneumatic path includes a pump pushing air through a manifold 36. In some embodiments, the manifold is configured with one or more valves: three-way valves, binary valves, check valves, and/or proportional orifices. The treatment controller 30 controls the flow of the pump, the power in the plasma and the direction of the gas flow post-electrical discharge. By configuring valves, the treatment controller can direct gas to the manual respiration pathway, the ventilator pathway or the gas sensor chamber for direct measurement of NO, $NO_2$ and $O_2$ levels in the product gas. In some embodiments, respiratory gas (i.e. the treatment flow) can be directed through a ventilator cartridge that measures the flow of the respiratory gas and can merge the respiratory gas with NO product gas.

The output from the NO generation system in the form of the product gas 32 enriched with the NO produced in the plasma chamber 22 can either be directed to a respiratory or other (e.g. external applicator) device for delivery to a patient, or can be directed to a plurality of components provided for self-test or calibration of the NO generation system. In some embodiments, the system collects gases to sample in two ways: 1) gases are collected from a patient inspiratory circuit near the patient and pass through a sample line 48, a filter 50, and a water trap 52, or 2) gases are shunted directly from the pneumatic circuit as they exit the plasma chamber 22. In some embodiments, product gases are shunted with a shunt valve 44 to the gas sensors after being scrubbed but before dilution into a patient airstream. In some embodiments (not shown), shunted product gas is diluted to reduce the concentration before delivery to gas sensors. In some embodiments, product gases are collected from an inspiratory air stream near the device and/or within the device post-dilution. Within the gas analysis portion of the device, the product gas passes through one or more sensors to measure one or more of temperature, humidity, concentrations, pressure, and flow rate of various gasses therein.

Figure 2:
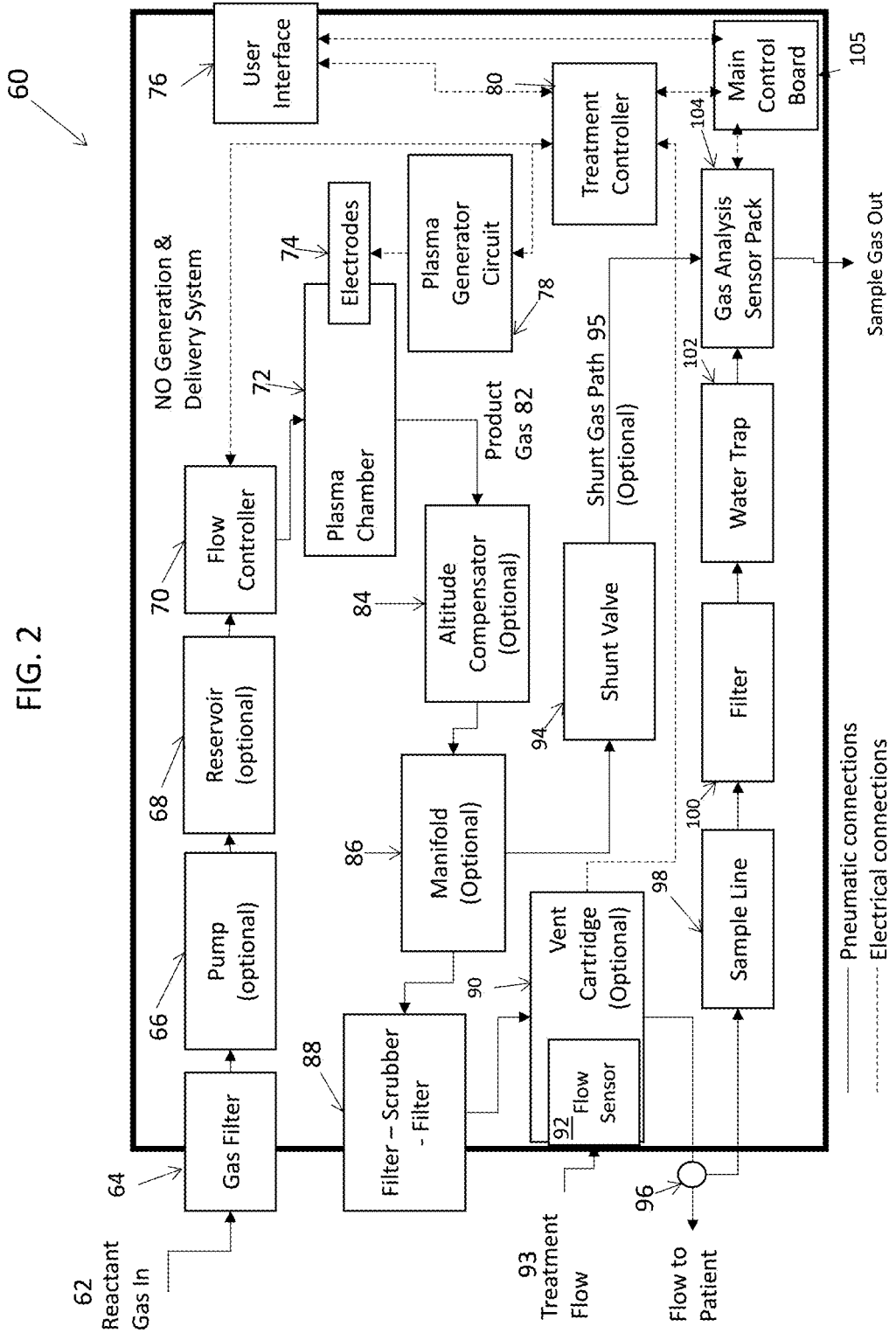
FIG. 2 is an exemplary embodiment of a system for generating a NO-enriched product gas.

FIG. 2 depicts an embodiment of a NO generation and delivery system 60. Reactant gas 62 enters the system through a gas filter 64. A pump 66 is used to propel gas through the system. Whether or not a system includes a pump can depend on the pressure of the reactant gas supply. If reactant gas is pressurized, a pump may not be required. If reactant gas is at atmospheric pressure, a pump or other means to move reactant gas through the system is required. A reservoir 68 after the pump attenuates rapid changes in pressure and/or flow from a pump. Coupled with a flow controller 70, the reservoir, when pressurized, can enable a system to provide flow rates to the plasma chamber 72 that are greater than the pump 66 flow rate. Electrodes 74 within the plasma chamber 72 are energized by a plasma generation circuit 78 that produces high voltage inputs based on desired treatment conditions received from a treatment controller 80. A user interface 76 receives desired treatment conditions (dose, treatment mode, etc.) from the user and communicates them to the main control board 105. The main control board 105 relays to the treatment controller 80 a target dose and monitors measured NO concentrations from the gas analysis sensor pack 104. The main control board 105 monitors the system for error conditions and can generate alarms, as required. Reactant gas 62 is converted into product gas 82 when it passes through the plasma chamber 72 and is partially converted into nitric oxide and nitrogen dioxide. An altitude compensator 84, typically consisting of one or more valves (i.e. proportional valves, binary valves, 3-way valves, etc.), is optionally used to provide a back-pressure within the plasma chamber 72 for additional controls in nitric oxide production. Product gases pass through a manifold 86, as needed, to reach a filter-scavenger-filter 88 assembly that removes nitrogen dioxide and/or particulates from the product gas. From the filter-scavenger-filter 88, product gas is introduced to a patient treatment flow directly, or indirectly through a vent cartridge 90. In some embodiments, the vent cartridge 90 includes a flow sensor 92 that measures the treatment flow 93. The treatment flow measurements from the flow sensor 92 serve as an input into the reactant gas flow controller 70 via the treatment controller 80. After product gas 82 is introduced to the treatment flow, it passes through inspiratory tubing. Near the patient, a fitting 96 is used to pull a fraction of inspired gas from the inspiratory flow, through a sample line 98, filter 100, water trap 102 and Nafion (or equivalent) tubing to prepare the gas sample and convey it to gas sensors 104. The Nafion tubing adds ambient humidity to the gas sample when dry calibration gas is used and removes water from the same when humid gas samples are collected to protect the gas sensors from gas humidity levels that are out of range. Sample gas exits the gas analysis sensor pack 104 to ambient air. In some embodiments, the system 60 can optionally direct gas through a shunt valve 94 and shunt gas path 95 directly to the gas sensor pack and out of the system. In some embodiments involving the shunt valve 94, the manifold 86 includes a valve (not shown) to block flow to the filter-scavenger-filter when the shunt valve 94 is open. In some embodiments (not shown), the shunted product gas is diluted with non-NO containing gas prior to delivery to the gas sensors.

Figure 3:
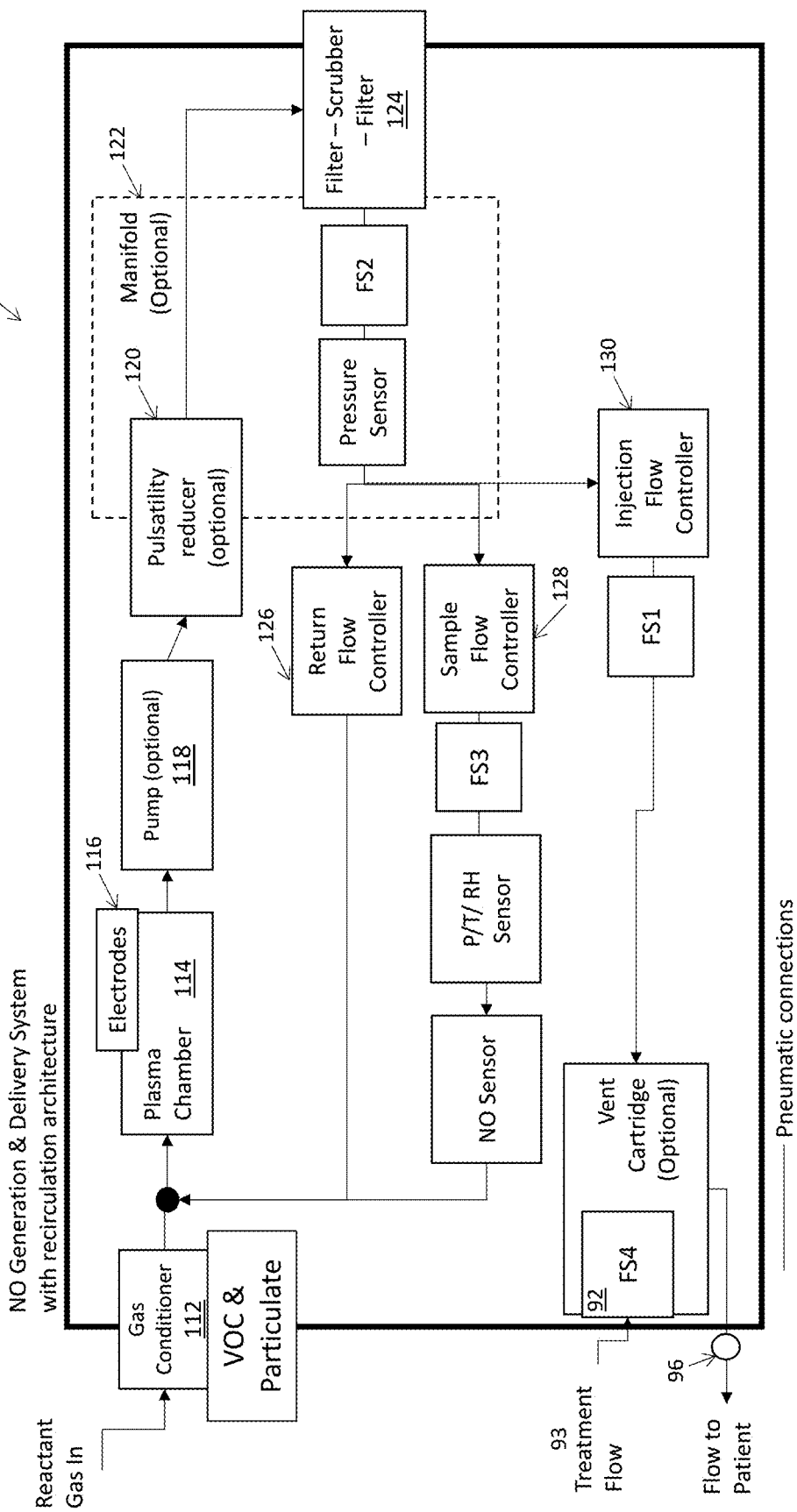
FIG. 3 is an exemplary embodiment of a system for generating a NO-enriched product gas that utilizes a recirculation architecture.
Figure 4:
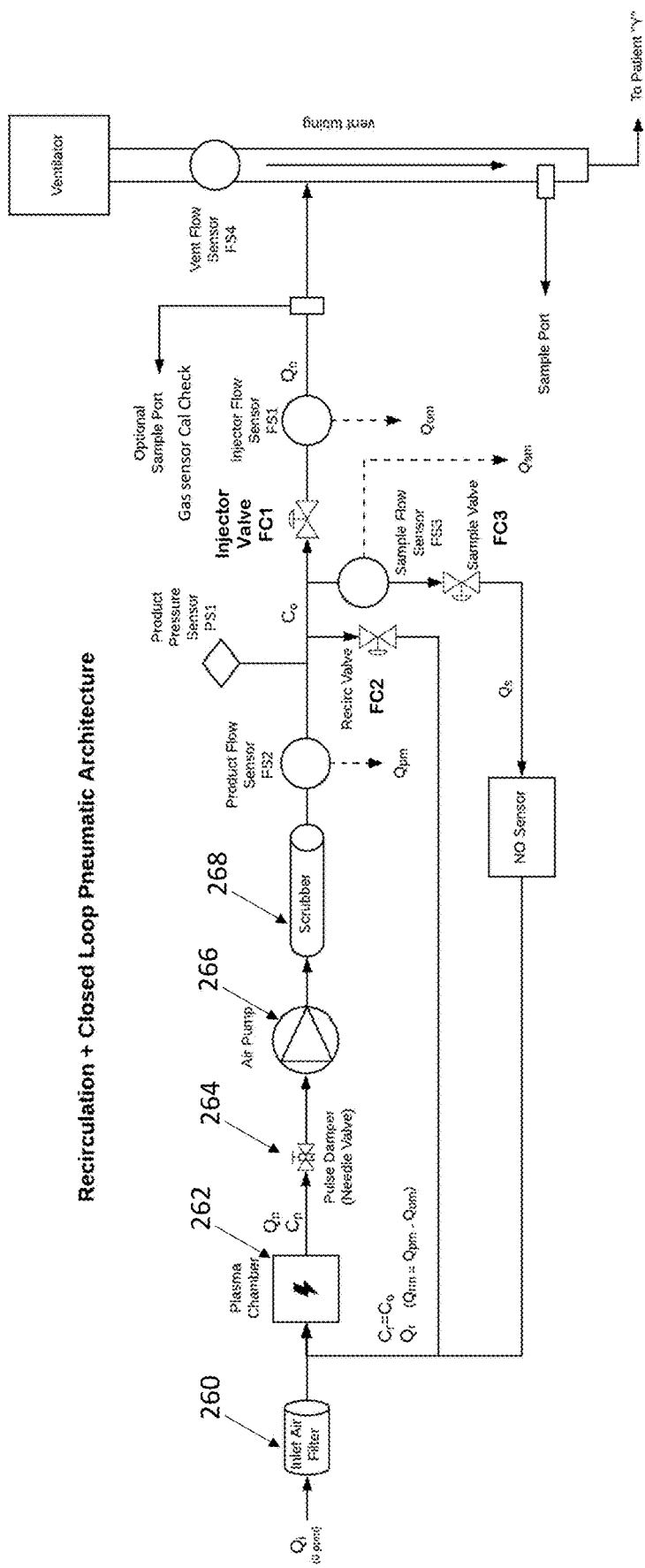
FIG. 4 illustrates an exemplary embodiment of a NO generation system having recirculation architecture.

FIG. 3 and FIG. 4 illustrates embodiments of NO systems with a recirculation architecture, a NO system design in which a portion of product gas is injected into an inspiratory stream and a portion is not injected. FIG. 3 depicts an embodiment of a NO generation and delivery system 110 that utilizes a recirculation architecture with reactant gas entering the system and passing through a gas conditioner 112 containing one or more of a particulate filter, VOC scrubber (e.g. activated charcoal), desiccant (e.g. molecular sieve, silica gel), and $NO_2$ scrubber (e.g. soda lime). Gas flows to a plasma chamber 114 where high voltage is applied to electrodes 116 to generate nitric oxide product gas. Product gas passes through a pump 118 and on through an optional pulsatility reducer 120 to decrease fluctuations in the pressure and/or flow rate of the product gas. A dashed line encloses components that can be part of or attach to a manifold 122 to simplify pneumatic routing. After passing through the pulsatility reducer, product gas passes through a filter/scrubber/filter 124. The filter/scrubber/filter removes particulate and $NO_2$ from the product gas. It should be noted that some scrubbers (e.g., one using sheet material) do not include one of the filters in some embodiments due to the lack of scrubber particulate generated. In some embodiments, the filter/scrubber/filter is user replaceable. From the filter/scrubber/filter, pressure and flow of the product gas is measured prior. Then, the product gas is divided into one to three separate flow paths. In one path, product gas flows through a return flow controller 126, back to before the plasma chamber. In another path, product gas flows through a sample flow controller 128, flow sensor, pressure sensor, temperature sensor, humidity sensor, and NO sensor. In another path, product gas flows through an injection flow controller 130 and flow sensor prior to being injected into a treatment flow of gas. Gas flowing through the return path merges with incoming reactant gas prior to entering the plasma chamber. In some embodiments, the plasma chamber is at or near atmospheric pressure. In some embodiments, the pressure within the plasma chamber is below atmospheric pressure, due to the flow restriction of the inlet filter/scrubber. Lower pressure within the chamber can reduce break-down voltage requirements and enable low levels of NO production. The return flow controller is modulated to maintain a constant pressure within the tubing upstream of the flow controllers while the sample flow controller maintains a target flow rate for the product gas NO sensor and the injection flow controller releases product gas at a target flow rate. In some embodiments, the target injection flow rate is proportional to the treatment flow. A constant pressure upstream of the injection flow controller improves flow control and dose accuracy.

AC Waveform Control

In some embodiments, the modulation of current and voltage in a plasma can be achieved by manipulating harmonics of an AC waveform. This is particularly valuable in plasma generation because the electrical load of the plasma changes between before and after electrical breakdown and during plasma generation, which may cause changes in the operating mode of a resonant circuit. In the case of a gliding arc electrode, the load also changes as the arc glides down the electrode with increases in the gap. Compensation from warm-up in a plasma generation system can also be accomplished with these techniques by varying plasma current.

In some embodiments, current can be modulated as a function of duty cycle. In some embodiments, short duty cycle events have lower current than long duty cycle events. This can provide a broader range of production for an NO system. In some embodiments, the electrical current within the plasma is ramped as a function of elapsed time. The elapsed time can be relative to the time voltage was set high or from the time of plasma formation (e.g. electrical breakdown between electrodes). This approach enables a broad range of NO production with added resolution, as needed. In some embodiments, current modulation is utilized with a variable gap electrode (gliding arc, gliding torch, etc.). By varying the current as a function of time, plasma current is effectively mapped to specific locations on the electrode with specific electrode gap, owing to the fact that the arc moves along the electrodes in a predictable manner based on the reactant gas velocity through the plasma chamber. In some embodiments, at the time of electrical discharge, the current is kept low to enable low production values and minimize the power within the plasma at the short electrical gap. The arc travels along the electrodes at a velocity dictated by the reactant gas velocity. Design attention to the interplay between electrode geometry, reactant gas velocity and intra pulse current modulation can enable fine production resolution, where needed, while still supporting a wide range of production values. In some embodiments, the plasma power can be minimized when the arc is in the short gap thereby minimizing electrode temperature and wear in the short gap region.

Given the interplay between reactant gas velocity, plasma current and electrode geometry, there are multiple combinations that can achieve the same production output for a discharge duration. In some embodiments, a gliding arc electrode has straight edges (linear increase in gap over time for a constant velocity) and intra pulse current is varied as a second order polynomial in time. In some embodiments, a gliding arc electrode has curved edges (non-linear increase in gap over time for a constant velocity), and intra pulse current is varied linearly in time. These two examples could have equivalent NO production and serve only as examples of the way electrode gap and current can be designed and controlled. In some embodiments, straight-edged electrodes are preferred for their manufacturability.

Breakdown happens within a few usec of high voltage being applied to the electrodes. Current ramp rate can be influenced by how much gliding occurs (for example, as it relates to flow rate, electrode geometry, etc.).

Pulse Parameter Measurement Circuit (PPMC)

In some embodiments, a NO generation system includes features within the high voltage circuit to measure current, voltage and/or power within the plasma. This feature can provide insights into the electrical discharge activity and health of a NO generator system. In some embodiments, plasma power is measured and utilized as an indicator for NO production. It will be understood by those skilled in the art that there is a direct correlation between the plasma power and the concentration level produced by the NO generator system. In some embodiments, a NO generator alters plasma activity in response to increases/decreases in plasma power with respect to expected levels. For example, if plasma power is measured to be lower than expected, plasma power can be increased and or prolonged (e.g., a duty cycle increase) to make up for lost NO production. In some embodiments, if electrical break-down is detected to be delayed, the plasma pulse can be prolonged to compensate for lost production from the delay.

In some embodiments, plasma voltage, current and/or power measurements are utilized to inform the NO generator system about the condition of electrodes. For example, a system can detect whether or not arcing occurs at all or whether it is delayed. In another embodiment, a mechanical sensor may be used to detect the presence or absence of electrical discharges. An example of a mechanical sensor is a sound measuring device located either in fluid communication with the plasma chamber or outside the plasma chamber that detects changes in sound pressure. The sound measuring device is able to sense that electrical discharges are occurring. In some embodiments, the mechanical sensor is an accelerometer that detects motions associated with the electrical discharge and pressure wave. In another embodiment, an electrical sensor is used to detect the presence or absence of electrical discharges. In some embodiments, the electrical discharges are detected with an antenna that receives an EMF signal generated by the arc. In some embodiments, a temperature sensing device may be used to detect the presence or absence of electrical discharges. The temperature sensing device measures levels within the plasma chamber or outside the plasma chamber that are indicative of heat generated as arcing occurs.

Decreases in electrode activity could indicate a worn, contaminated, or defective electrode or electrical creepage along the surfaces of the plasma chamber (internal or external). A worn electrode (larger gap) can be detected by detecting higher voltage required to breakdown at the gap, and/or an increase in time from pulse initiation to electrical breakdown. A NO generation system can respond by applying additional voltage/power/current to compensate and/or alert the user that device service is required or switch the device to a secondary back-up NO generation system.

In some embodiments, one or more of the following parameters is determined by the plasma electrical monitoring feature: breakdown voltage, max breakdown voltage, min breakdown voltage, time to breakdown, maximum plasma current, max plasma voltage, minimum plasma voltage, RMS power per cycle, number of pulses in plasma cycle, duration of plasma cycle, and number of missed or misidentified waveforms. It should be noted that maximum and minimum values can be determined for the positive half of the waveform and the negative half of the waveform. This level of information on each and every electrical discharge can provide a profound understanding of the actual NO concentration production occurring and health of a system. In turn, a system can utilize this information to optimize plasma control and/or adjustment parameters to deliver accurate levels of NO.

Plasma electrical monitoring also benefits fault detection. For example, a NO generation system can detect one or more of the following: electrical creepage (rather than arcing) between electrodes within the chamber, arcing/creepage outside of the plasma chamber, conditions that could generate/alter EMI emissions, arcing to other components within the device (e.g. the enclosure or low voltage circuitry), an inability to generate NO, and the potential for ozone generation by the electrical circuitry. For example, delays to arc formation can be associated with high voltage applied to the electrodes which has the potential to generate corona and ozone.

Figure 5A:
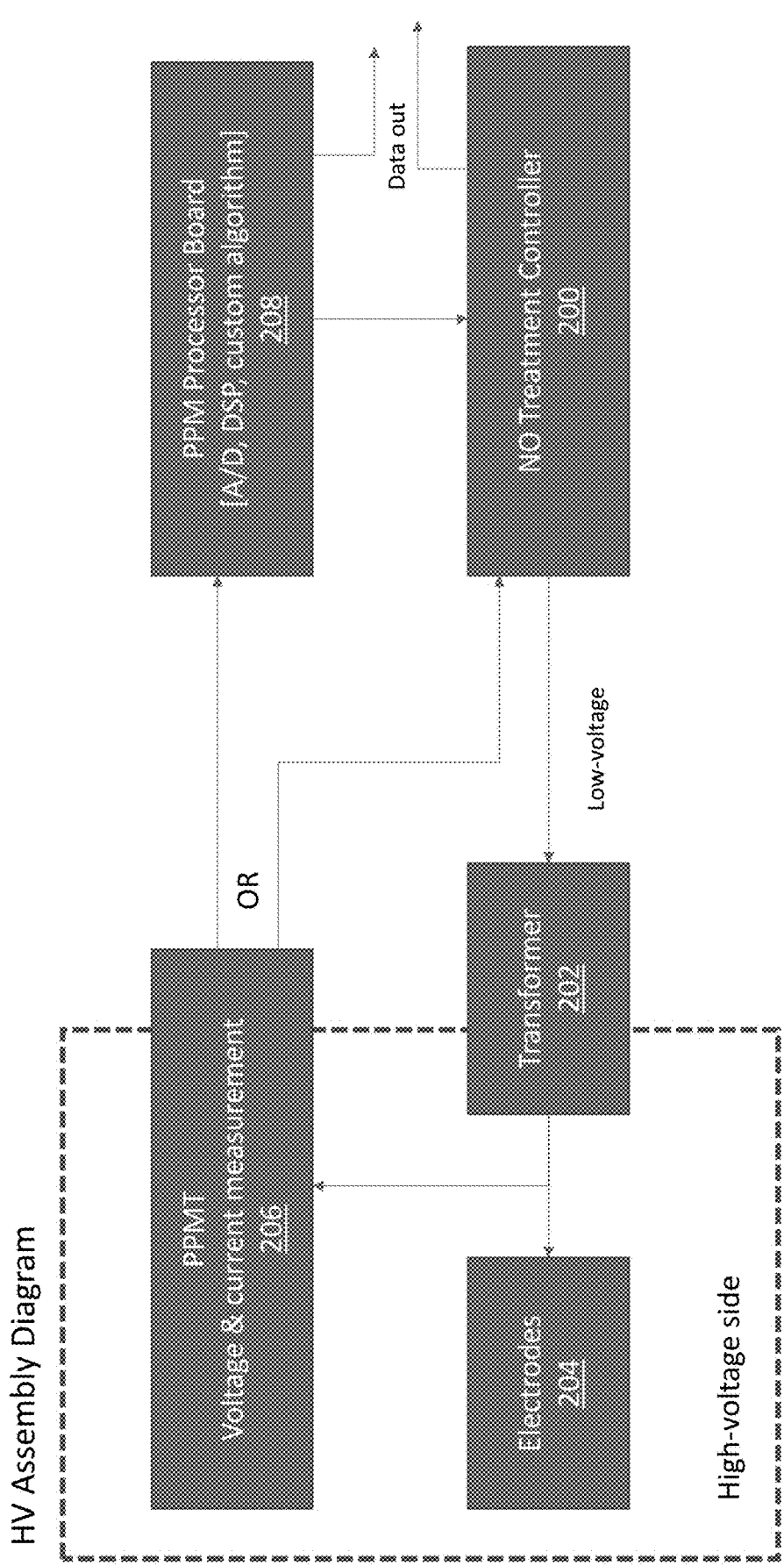
FIG. 5A is an exemplary plasma power measurement scheme.
Figure 5B:
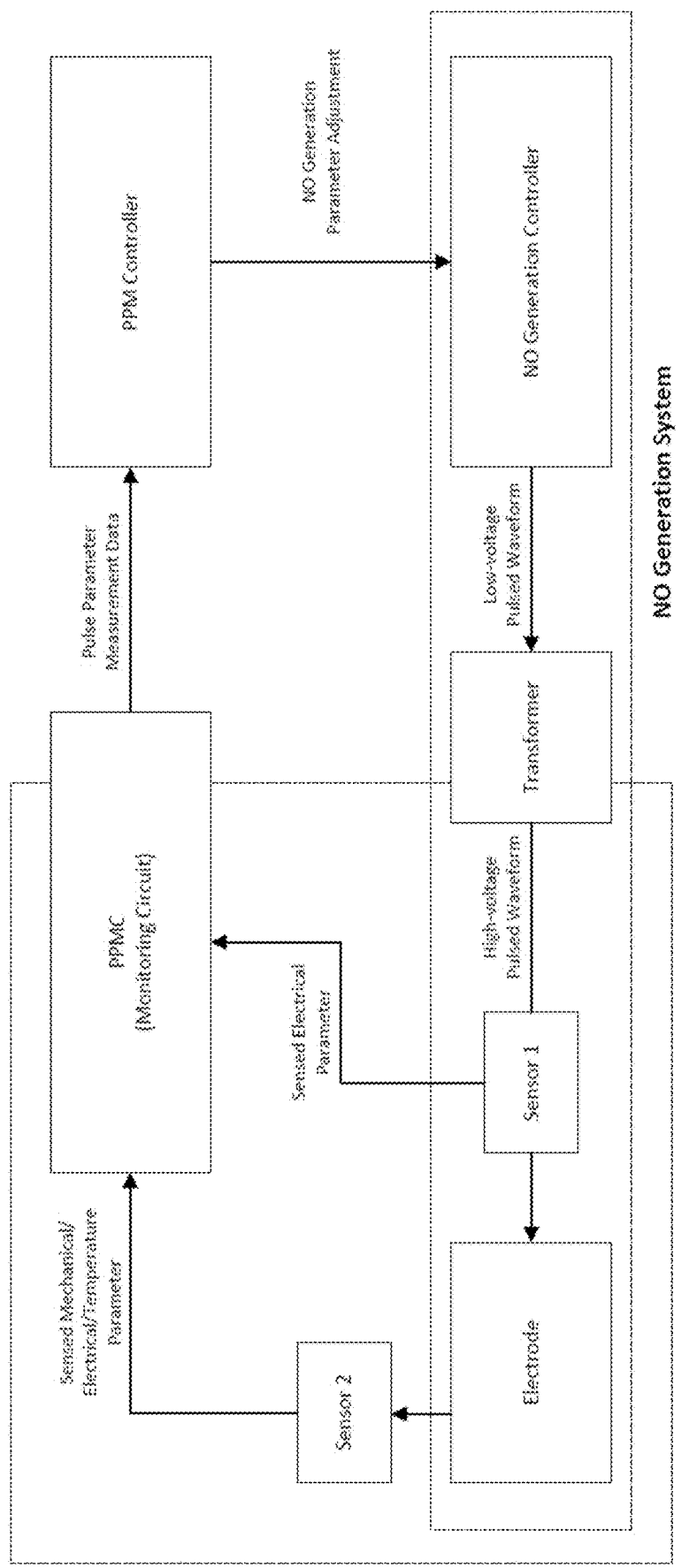
FIG. 5B is an exemplary plasma power measurement scheme.
Figure 5C:
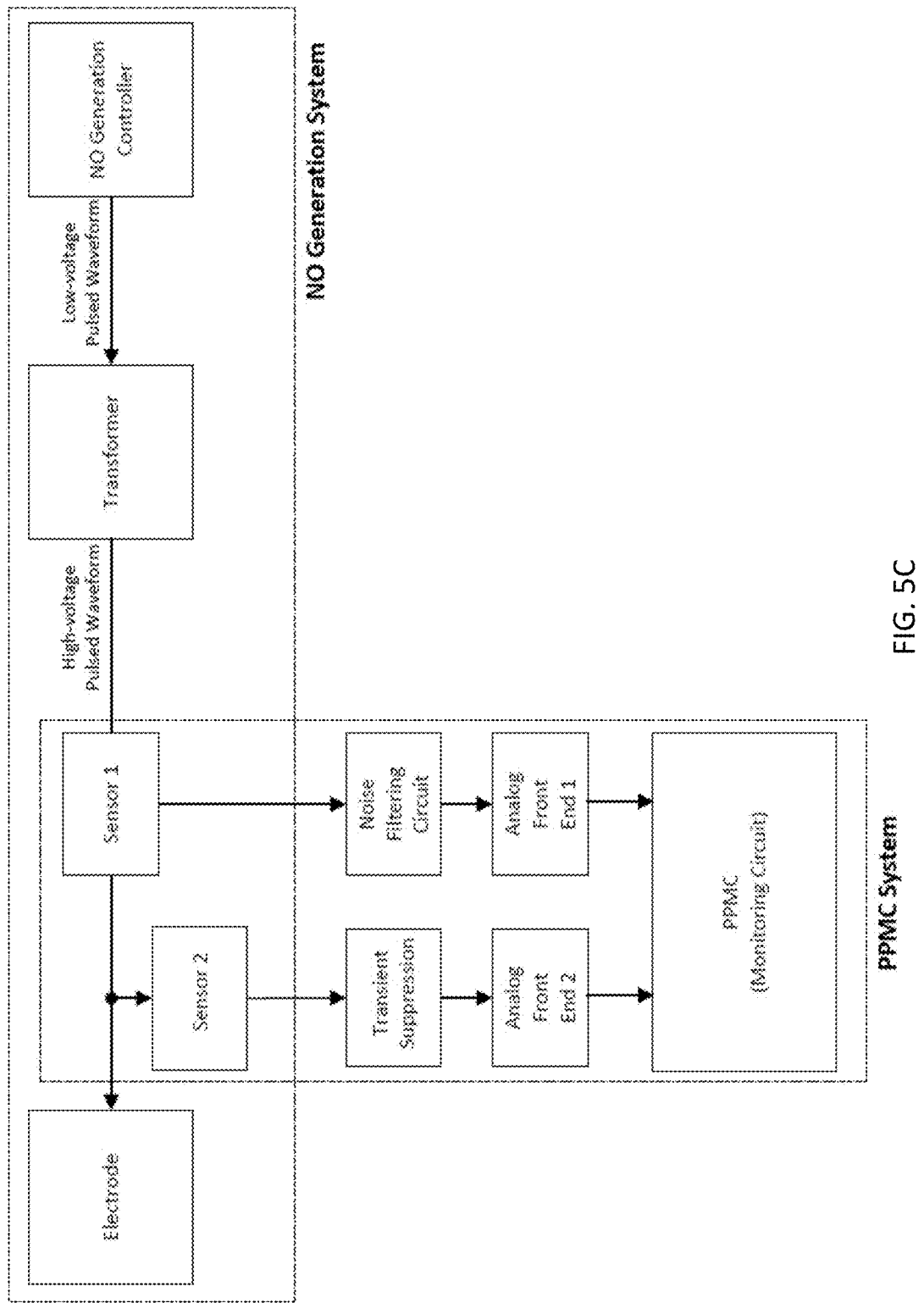
FIG. 5C is an exemplary plasma power measurement scheme.

Exemplary plasma power measurement scheme are depicted in FIGS. 5A, 5B, and 5C. At the bottom of the figure, a NO generation controller sends a low-voltage (e.g., 30V) pulsed waveform to the primary winding of a transformer. On the left side of the figure, the transformer converts the low-voltage pulsed waveform to a high-voltage pulsed waveform on the secondary winding. The high-voltage pulsed waveform is applied to electrodes, which produces an arc to generate NO. A sensor is used to measure electrical parameters of the high-voltage pulsed waveform. The parameters of the waveform are monitored by a pulse parameter measurement circuit (PPMC) that measures at least one of the plasma current, voltage, power and waveform timing. In some embodiments, the PPMC uses a transformer for sensing the switching current through the secondary wire. In some embodiments, a second sensor is used to measure mechanical, electrical and/or temperature parameters within or around the plasma chamber (in communication with the electrodes). The sensor may measure electrical parameters including, but not limited to EMF, RF, electric fields, voltage potentials, light spectra, etc. and may use a device such as an antenna as described above. The sensor may also be used detect mechanical parameters including, but not limited to motion (acceleration, velocity, g-force, vibration, etc.) and/or changes in sound pressure level using a device such as a microphone. The sensor may also be used to detect changes in temperature through the use of, for example, a thermistor, thermocouple or thermopile. In some embodiments, measurement data from the PPMC goes to a separate PPM controller that converts analog signals to digital signals, filters the signals and post-processes the data to determine parameters including but not limited to peak voltage, peak current, plasma power and breakdown time. The PPM controller sends adjustment information to the NO generation controller so it may make adjustments to the pulsed waveform. Those skilled in the art can appreciate, the NO generation system in concert with the PPM system in FIG. 5A forms a closed-loop system. The feedback provided by the PPM system allows the NO generation system to make adjustments to the pulsed waveform in real-time to produce accurate NO concentration levels. Changes made to the NO generation system may also compensate for changes in environmental conditions, such as changes in temperature, barometric pressure and/or relative humidity or wear in electrical components as described above. In some embodiments, the functions of the PPM controller are incorporated into the NO generation controller.

An exemplary plasma power measurement circuit system is depicted in FIG. 5C. In this exemplary figure, two sensors are used to measure plasma power. In some embodiments, the PPMC system uses a first sensor (e.g., Sensor 1) to measure the current of the high-voltage pulsed waveform. The sensor may consist of one of a current transformer, inductive coil, flux gate, hall-effect, magneto-resistive or any other current sensing mechanisms known to those skilled in the art. It can be appreciated that the wire may not be required to physically come in contact with the secondary wire, but may instead pass through, loop through, loop around or come in proximity of the wire. In some embodiments, as shown in FIG. 5C the measured current signal is sent to a filtering circuit to remove noise. The filtering circuit may consist of an inductor-capacitor, resistor-capacitor, Pi filter, low-pass, high-pass or similar filter configuration know to those skilled in the art. The circuit shown also may contain an analog front end circuit (e.g. Analog Front End 1). The front end circuit may consist of an operational amplifier in a configuration as a low-gain amplifier, a high-gain amplifier, an active filter, a differential amplifier, a current-to-voltage amplifier or similar circuit which is sent to the PPMC monitoring circuit. In some embodiments, the PPMC system uses a second sensor (e.g., Sensor 2) to measure the voltage of the high-voltage pulsed waveform. Sensor 2 may use a high-impedance node to sense the voltage of the high-voltage pulsed waveform. The high-impedance node may contain a series resistor configuration and is used to separate the measuring circuit of the PPM system from the high-voltage circuit of the NO generation system. In the event that high-voltage transients are able to enter the measuring circuit they are suppressed as shown in the transient suppression block. The signal is sent to an analog front end (e.g. Analog Front End 2) and may use a similar configuration to Analog Front End 1 as described above. The PPMC monitoring circuit contains analog to digital converter (ADC) circuits and is able to digitize measured signals. The PPMC is able to obtain voltage, current, timing and power information of the plasma generated by the NO generation system shown in FIG. 5C. This information is not limited to the plasma but may also include information about the electrode breakdown when the arcing occurs.

In some embodiments, the PPM controller contains a microprocessor or microcontroller and an analog to digital converter (ADC). In some embodiments, the sensor signals are delivered as analog signals to avoid operating a microprocessor in a high-EMI environment, as found near a plasma chamber. In some embodiments, the PPM controller ADC sampling frequency is at least 5 times the frequency of the fundamental frequency of the AC plasma. In some embodiments, a 1 MHz sample rate is used to measure a 115 kHz AC plasma waveform. Other sampling frequencies can work depending on the level of resolution and accuracy needed for voltage and current data. In the event that a dedicated PPMC processer is utilized, that processor communicates the plasma power to the NO generation controller.

Figure 6A:
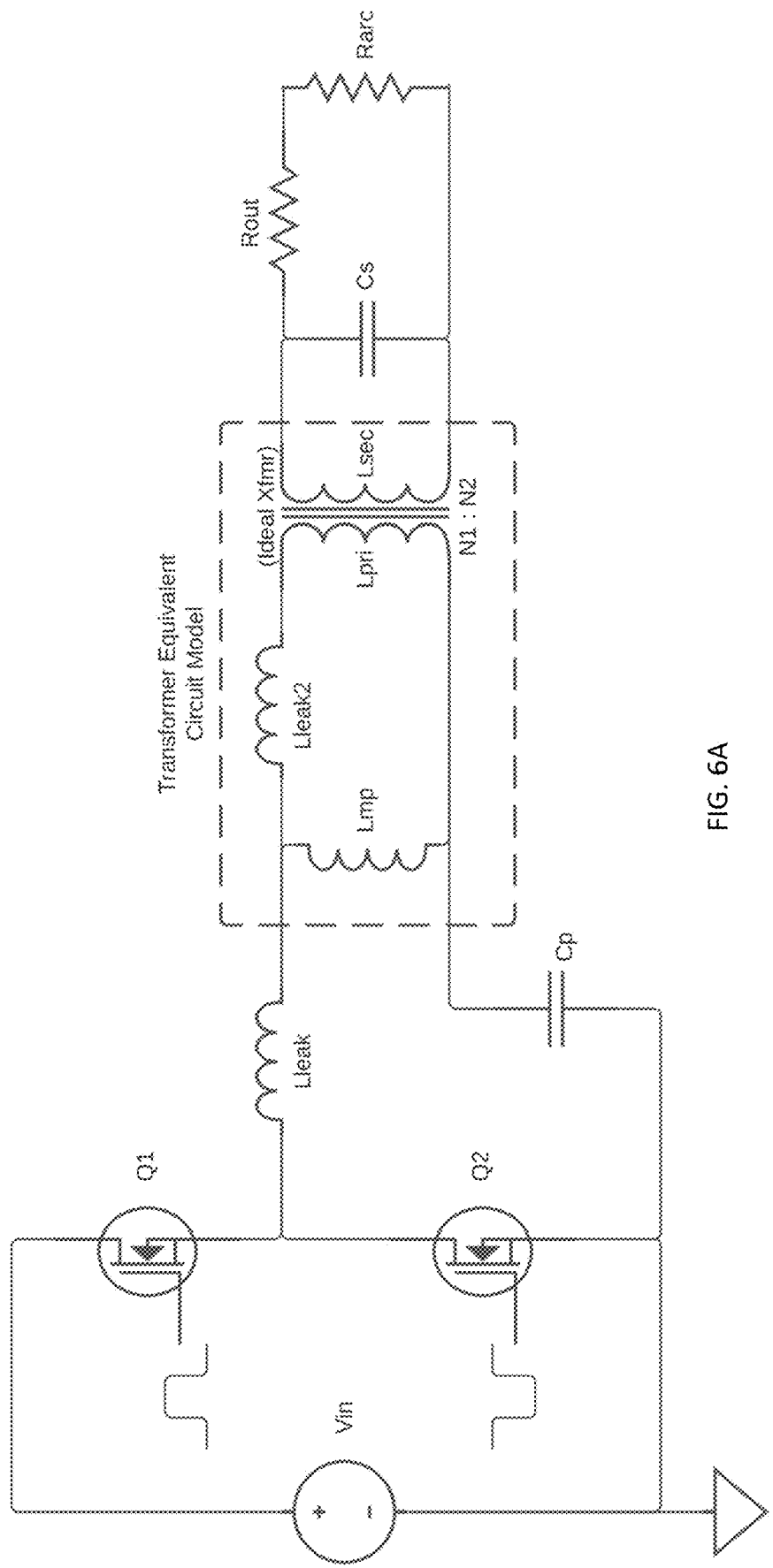
FIG. 6A is an exemplary resonant circuit utilizing a MOSFET half bridge.

In some embodiments, primary side measurements can provide a reasonably accurate proxy for the plasma voltage and current on the secondary side. After plasma formation, transformer primary current is directly proportional to plasma current and may either be measured directly or can be measured indirectly (albeit out of phase) by observing the voltage on the primary-side DC blocking capacitor (Cp, as indicated in FIG. 6A). The secondary side voltage prior to breakdown/plasma formation can also be inferred from the primary side current measurement if the frequency is known, the value of the secondary side capacitance (Cs) is known, and a correction is applied for the current flowing in the transformer magnetizing inductance (Lmp). Breakdown events can be detected by observing changes in the operating frequency of the circuit, high dv/dt across the transformer, or high di/dt in the transformer primary. Other calculations/inferences are also possible when the values of the circuit elements are known such as correcting for the inductances to obtain an estimate of secondary side voltage by measuring the primary-side transformer voltage.

Electrode performance is expected to change over time due to a combination of contamination, erosion, oxidation, electrical creepage, changes in gap and other factors. These changes manifest themselves as changes in the NO production calibration curve, break-down timing, plasma voltage, and plasma current. A PPM controller system can be used to detect these changes in performance so that a NO generation system can apply appropriate mitigations to keep the generated NO levels accurate. The PPMC provides one or more of voltage level and high voltage current level. These measurements enable a NO generation system to monitor electrode status, provide feedback for the NO generation algorithm, and enable real time plasma power measurement.

A PPMC can also be utilized to detect electrode and/or plasma chamber failure, electrode erosion (larger gap), and other changes to the electrode performance. In some embodiments, when a PPMC does not detect current when electrodes are energized, it can be inferred that the system has failed (e.g., transformer failure, electrode gap too large). In some embodiments, a PPMC can detect electrical creepage along the internal or external walls of the plasma chamber that results in change in the rate of rise in the voltage. In another embodiment, a PPMC can detect electrical creepage in the chamber by detecting an operating frequency that is indicative of a low impendence path (an absence of the operating frequencies associated with an open circuit condition before breakdown). This is also detectible by a marked shift in NO levels in the product gas. In some embodiments, a PPMC detects an elevated breakdown voltage or delayed breakdown which can be indicative of increased electrode gap or a faulty connection in the circuit. In some embodiments, when these measurements reach a threshold, the NO generation system recommends electrode and/or plasma chamber replacement. In some embodiments, a NO generator compensates for the level of electrode wear by altering the timing of the electrical discharges or by adjusting the NO production calibration curve. In some embodiments, the adjustments to the NO production curve are made based on prior characterization work that have been recorded in a table or formula. In some embodiments, a NO generation device prompts NO production calibration to be done either manually or automatically, using a calibrated NO sensor. The calibrated NO sensor can by either internal or external to the NO generation system.

In some embodiments, a PPMC is used to sample n plasma cycles every time patient therapy starts. This can be done during device calibration, system self-test, or actual treatment. The system software then calculates the slope (Theta1) and error ($R^2$) over every plasma cycle. In some embodiments, reduced slope (less NO produced for a given power level) and increased in R^2 (greater data variance) are indicative of electrode wear.

A PPMC provides feedback for a NO generation algorithm by providing actual breakdown timing. A PPMC enables a NO generation controller to detect the actual breakdown time and thus adjust the electrical discharge end point for each discharge so that the discharge ends only after the target discharge duration (AKA duty cycle). Similarly, the timing of a current ramp can be shifted back in time to account for the delay in break-down, as required. This NO generation feature can provide significant improvements in NO production accuracy over the service life of the device. The change in break-down time and/or measured breakdown voltage can also be an indication as to the level of wear of the electrode and prompt electrode replacement and/or recalibration if it exceeds acceptable limits.

The mathematical product of the PPMC outputs of secondary circuit voltage and current is the plasma power. In some embodiments, a NO generator drives an electrode pair to a specific power level for a specific duration, using the PPMC output to calculate a real time plasma power level during discrete electrical discharges. In some embodiments, NO production calibration for a given reactant gas flow rate is stored within the device in terms of power level and discharge duration.

Copious amounts of data can be collected by a NO generator for additional analysis of system performance and dose accuracy improvements. In some embodiments, a NO generator measures one or more of the following parameters for one or more electrical discharges: maximum breakdown voltage, minimum breakdown voltage, voltage at the breakdown, time to breakdown, maximum plasma current (positive half of the waveform), maximum plasma current index, minimum plasma current (negative half of the waveform), minimum plasma current index, maximum plasma voltage (positive half of the waveform), maximum plasma voltage index, minimum plasma voltage (negative half of the waveform), minimum plasma voltage index, RMS power per cycle (sum((V*I)^2)/N), number of pulses in plasma cycle, duration of plasma cycle in msec, and number of missed or misidentified waveforms.

A PPMC affects the characteristics of the high voltage circuit being measured (e.g., natural frequency). By integrating the PPMC into the actual hardware of a NO generation system so that it is present all of the time, the characterization of the system (e.g., NO production calibration) is inclusive of any effects from the PPMC, thereby rendering their effects on production moot.

NO Production Control

It is possible to detect electrical discharge. In some embodiments, a NO generation system detects a breakdown event. This can be done by detecting a change in voltage (dV/dt), current (dI/dt), and/or frequency (dω/dt). Voltage across the electrode gap increases until electrical breakdown. The drop-in voltage associated with breakdown can be detected as an indication of electrical discharge. Likewise, breakdown can also cause a sudden spike in current. In some embodiments, electrical breakdown occurs within a few microseconds of the application of high voltage (pulse initiation).

Dithering Plus Controlled Duration

In some embodiments, a NO generation system operating with fixed pulse modulation frequency and using a dithering method alternates the pulse width of finite length electrical discharges to produce an average NO production rate that is between the finite rates. In some embodiments, the system alternates between the two discrete electrical discharge lengths in a ratio of 50/50. In some embodiments, the ratio of different discharge lengths is a non-equal (i.e., non-50/50) ratio for additional NO production resolution. In some embodiments, one of the pulse widths and production rates is zero. In some embodiments, dithering is combined with plasma current modulation to provide finer resolution control of the production rate.

Finite Duration Production

The time to achieve electrical breakdown within the electrode gap can vary with one or more of the following parameters: voltage rate of rise, reactant gas humidity, electrode temperature, electrode type, electrode wear, plasma chamber pressure, and the presence or absence of free ions. This variation in breakdown time can affect the amount of NO generated during a discharge event. For example, if a NO generation system applies high voltage to the electrode for a set duration of time, increases or decreases in electrical breakdown time will inversely affect the pulse duration after breakdown occurs, decreasing or increasing NO production, respectively. In some embodiments, a NO generation system detects the breakdown event and maintains the plasma for a set amount of time after the breakdown event. This approach can be used with a either a fixed electrode gap design or a variable electrode gap design, such as a gliding arc electrode. In a gliding arc electrode, the electrode gap increases with time as the arc travels along the electrode edges. Thus, variation in the duration of electrical discharge can have even more significant effects on NO production than in a fixed-gap design because the highest magnitude of NO production occurs towards the end of the discharge event where the electrode gap is largest.

Flow Control

Flow Control

An iNO delivery system can include one or more gas flow controllers to deliver nitric oxide therapy. At a minimum, reactant gas and injector flow are controlled. In some embodiments this is accomplished with a single flow controller (reactant gas flow is equal to injector flow). Some embodiments incorporate several flow and pressure controllers, such as those described for the recirculating architecture. Exemplary embodiments of a recirculation, closed loop pneumatic architecture are shown in FIG. 3 and FIG. 4.

Linear Flow Control

In some embodiments, one or more valves acts as a linear flow controller. In some embodiments, referred to as linear architectures, a flow controller supplies reactant gas flow, which also becomes product gas flow and injected gas flow. In some embodiments, including the recirculating architecture, plasma chamber flow and injected product gas flow are independently controlled. In some embodiments, a bypass architecture is utilized which is similar to a linear architecture with the flow divided between the plasma chamber and a bypass around the plasma chamber. This approach enables injected flow to differ from plasma chamber flow as well as rapid dilution of product gas after formation to reduce NO concentration and $NO_2$ formation.

A flow controller can include one or more pumps, valves, inlet and/or outlet pressure sensors, and a flow sensor. In some embodiments, the valve is a proportional valve. The flow sensor is used for closed loop control of the proportional valve while the pressure sensors are used for feed-forward control. A proportional valve or pump can be driven by a variable voltage or current source including the use of pulse width modulation to vary the applied voltage.

Feed-Forward

In some embodiments, feed-forward control is used to improve the step response of the valve. In some embodiments, the feed-forward control uses the equation for the flow through an orifice plate. After simplifying all parameters that are a function of the orifice geometry into a single constant, K, the equation becomes:

$$Q_m = K\sqrt{2\rho_1 \times dp}$$

where, $Q_m$ is mass flow (kg/s)

K is the orifice constant $\rho_1$ is upstream fluid density (kg/m³)

dp is the pressure drop (Pa)

Figure 7:
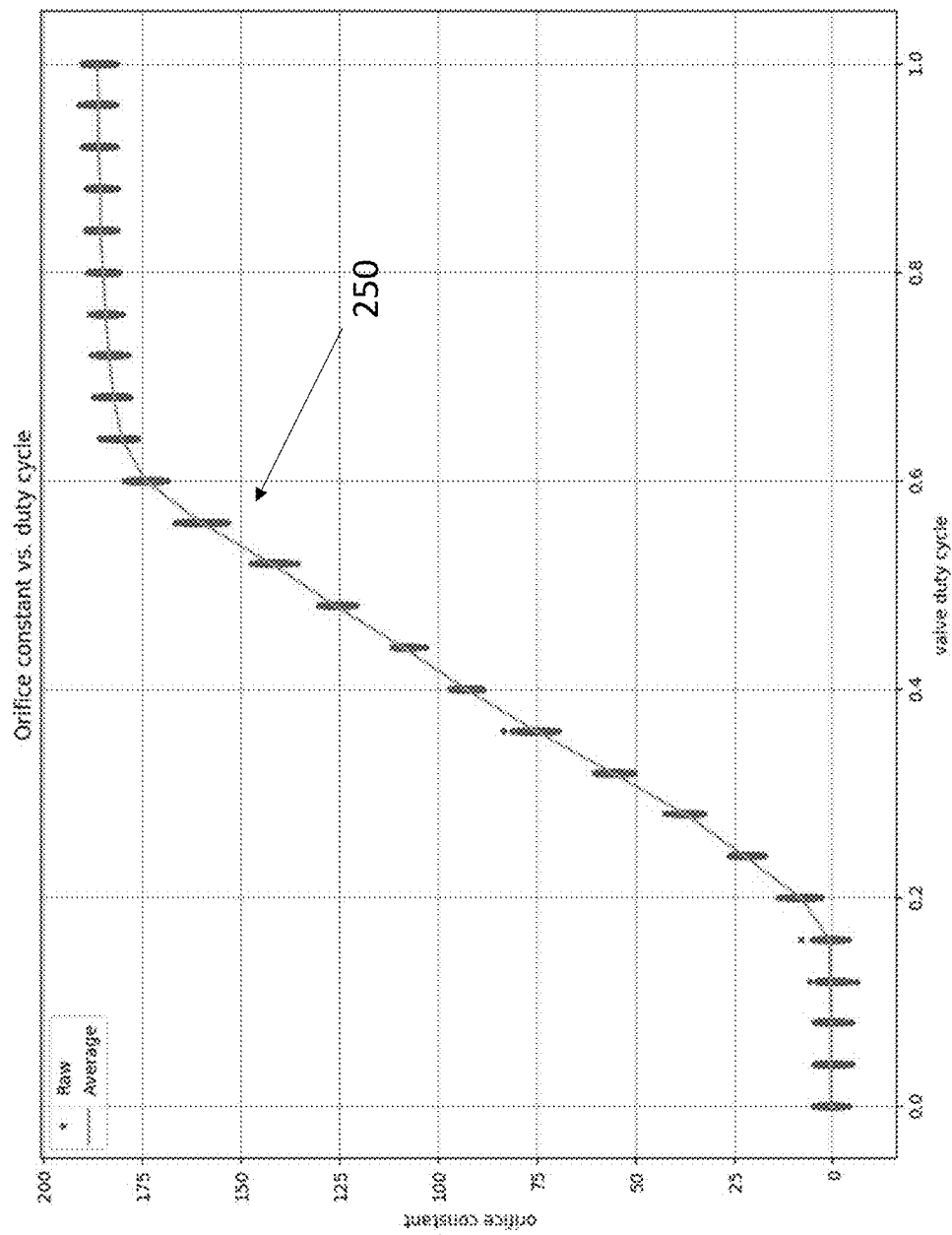
FIG. 7 illustrates an exemplary graph showing a proportional valve calibration curve.

In some embodiments, a proportional valve's orifice can be treated like a linear resistor. A calibration curve can model a valve "conductance," in units of flow divided by pressure, as a function of control signal. FIG. 7 illustrates an exemplary graph showing a proportional valve calibration curve 250 where the control signal is a PWM duty cycle applied to the valve. NO production is most consistent and accurate when the pressure and flow rate through the plasma chamber are constant. Pressure within the plasma chamber is a function of the flow rate, pump location, flow restriction upstream of the plasma chamber and the flow restriction downstream of the plasma chamber. It is beneficial to maintain a constant flow restriction/pressure drop downstream of the plasma chamber. This presents a challenge when the flow can be directed in one or more directions at a time. The following architectural approaches are used to maintain a constant pressure within the plasma chamber. It should be noted that the terms "pressure drop", "back pressure" and "flow restriction" are all related to this issue.

Flow Divider Control

In some embodiments, including the recirculating architecture, as well as any other constant concentration/constant reactant gas flow architecture, a fixed product gas flow rate is divided between the injector, the recirculation path and optionally, a NO sensor path without disturbing the reactant gas flow rate or pressure. This reduces the range of process variables that affect NO production rate and would otherwise need to be compensated dynamically. In some embodiments, a proportional flow divider therefore can be designed to maintain a constant product gas pressure downstream of the scrubber.

Mechanical Control

In some embodiments, the flow divider is implemented with a 3-port proportional valve that is sized such that the total pressure drop into an inlet port is constant as flow transitions from one outlet port to the other.

Open-Loop Control

In some embodiments, two or more adjustable valves are electronically controlled to divide the flow such that their total pressure drop is constant for a given input flow. In some embodiments, two matched valves are calibrated to determine their percent open as a function of drive voltage/current. A flow sensor and controller regulate the flow through one of the valves. In some embodiments, the controller servos the desired open fraction, and a feed-forward lookup computes the drive voltage/current. The other valve is then driven to the inverse open fraction, also using feed-forward, such that the sum of the two valves is equal to 100%.

In some embodiments, dissimilar valves are calibrated for flow restriction with respect to drive voltage/current. The controller servos the desired operating point of the injector valves to regulate the injector flow. The controller drives the other valves to the inverse flow restriction to maintain a constant flow restriction through the pair (injector and return path).

Valve calibration linearizes the valve response by mapping a control signal to percent open. This allows the flow controller to drive the two valves opposite each other such that the two valves add up to 100% open, providing a constant pressure drop. In some embodiments, the control signal is a PWM duty cycle. In some embodiments, calibration is accomplished by driving one valve to 100% open and sweeping the other over its drive range (voltage or current). In some embodiments, the sweep is run with both increasing and decreasing drive signal to compensate for any hysteresis in the valve. For each operating point (duty cycle), the mean percent open is used to minimize the error due to hysteresis in either direction.

Figure 8:
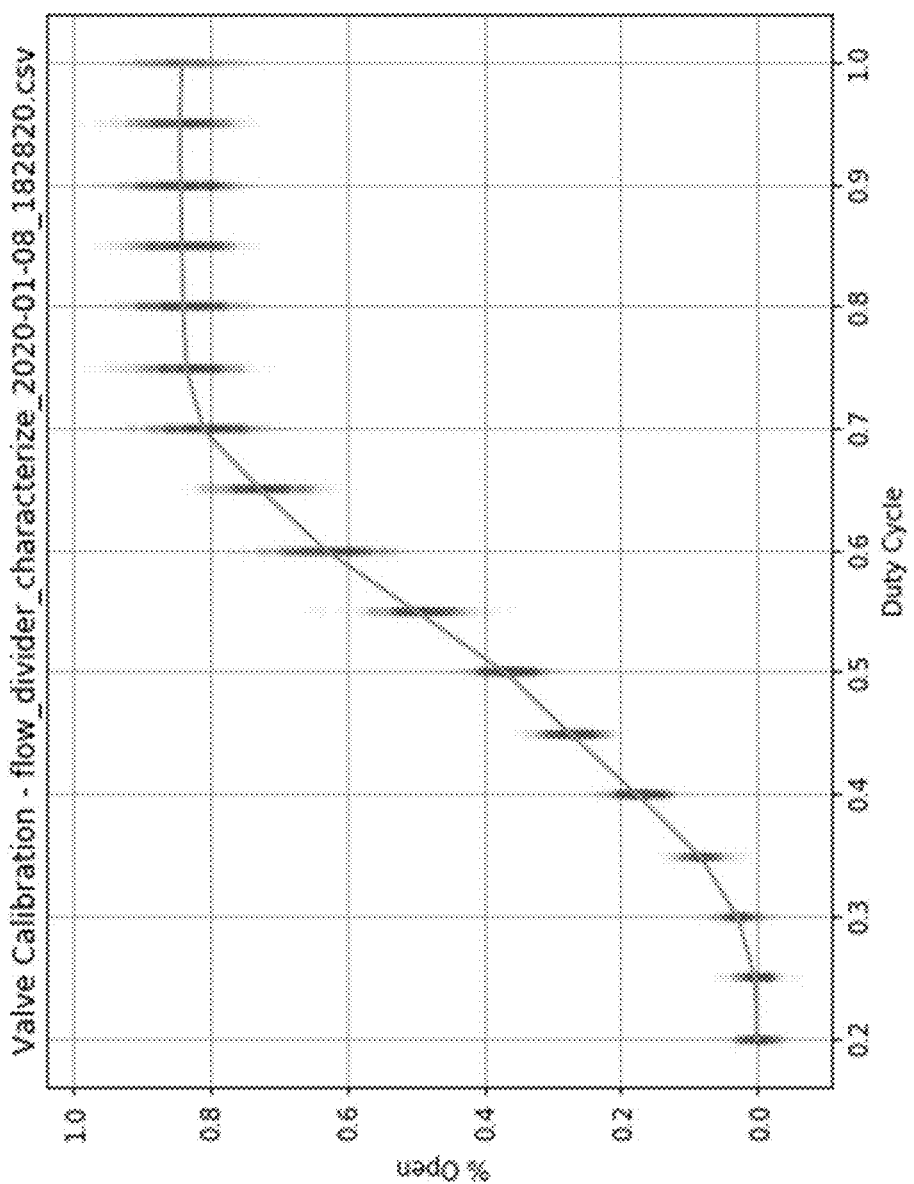
FIG. 8 illustrates an exemplary graph showing valve calibration.

FIG. 8 illustrates an exemplary graph showing valve calibration. The percent open is calculated by comparing the injector flow to the total flow.

$$\% \text{ open} = \frac{X_i / X_t}{1 - X_i / X_t}$$

where $X_i$ is the injector flow and $X_t$ is the total flow through both valves.

Closed-Loop Pressure Control

In some embodiments, a closed loop pressure control on the inlet of the injector valve (outlet of the scrubber) can be used. In this context, "closed loop" is intended to mean the inlet pressure is measured and a negative feedback controller (e.g. PID) is used to regulate it. By using closed loop control, which compensates such imperfections as hysteresis, stiction, and model error, these embodiments may achieve tighter control of the pressure drop across the flow divider than is possible with open loop control. A closed-loop control can also compensate for variations in ventilator circuit pressure at the outlet of the injector. In some embodiments, two proportional valves form the flow divider: one to control injector flow and another to control recirculation flow (or waste flow in architectures that do not recirculate excess product gas). In these embodiments, the recirculation valve acts as a backpressure regulator, i.e. it regulates the upstream pressure by bleeding off excess flow. In some embodiments, the injector valve acts as a simple linear flow controller, as described above, fed by a constant pressure source. In some embodiments, a plurality of valves can be used to provide finer control of the injector flow or inlet pressure to the flow divider. In some embodiments, a plurality of valves can control a plurality of output flows. In some embodiments, a total of three valves can be used to control inlet pressure, an injector flow, and a sample gas flow to a nitric oxide sensor, respectively.

In some embodiments, the recirculation (or waste) valve is controlled using a PID controller with a pressure sensor as its feedback source.

In some embodiments, it can be necessary to provide extra dead volume in the product gas path (in addition to the dead volume in the pneumatic and scrubber design). This acts as an accumulator to supply the injector valve gas without significant pressure variation during the brief delay required for the pressure controller to actuate. The flow restriction of the scrubber and/or pump should generally isolate the plasma from this transient.

Recirculation

The recirculating architecture is one in which the system operates at a fixed flow through the plasma chamber and a fixed product gas concentration. To regulate the injected dose, only a portion of the product gas is directed to the patient, and the remaining flow can be purged or, as in the case of the recirculating architecture, recirculated back to the input. In all cases, injector flow control is achieved using a proportional flow divider, consisting of two variable orifices, instead of a single proportional valve with a single variable orifice. Where the single orifice changes flow by changing the flow restriction, with the effect of increased back-pressure under a constant flow condition, the two orifices of the flow divider are electrically controlled or mechanically linked such that the total flow restriction through the combination of orifices is approximately constant. This results not only in constant flow but also in constant pressure within the eNO plant (i.e., plasma chamber, scrubber), regardless of injector flow.

The recirculating architecture mitigates several constraints that can otherwise limit the effective performance of eNO dose delivery. For example, the product gas flow slew rate is limited by the compressibility of the gas and the dead volume/flow restriction of the scrubber, which limits the ability of linear architectures to track fast-changing ventilator flows. non-recirculating architectures may also result in variable residence time in the scrubber and other dead volumes, which can result in hard-to-compensate NO loss rates. By eliminating variable flow through the plasma chamber, recirculation removes a process variable that must otherwise be compensated for. Variable flow through the plasma chamber is also generally incompatible with gliding arc electrodes. Recirculating architecture systems are designed to minimize the quantity of NO post-scrubber because of the tendency of NO to react with oxygen to form $NO_2$ and the desire to accurately know the concentration of NO at the injector.

FIG. 4 illustrates another exemplary embodiment of a NO generation system having recirculation architecture. The system includes an inlet filter 260 that is configured to remove particulates and other contaminants such as VOCs from the inlet. A plasma chamber 262 is configured to create a plasma between a plurality of electrodes in a reactant gas (air) stream to produce NO. A pulse damper 264 is used to smooth pulsatile pump inlet flow to produce smooth flow through the plasma chamber 262. An air pump 266 can draw ambient room air, mixed with recirculated product gas, through the plasma chamber and supply it, as product gas, through the scrubber to the injector. A scrubber 268 can remove $NO_2$ from the product gas stream. Filters (not shown) before and after the scrubber can be used to collect particulate from the electrodes and scrubber. A product gas flow sensor FS2 can sense the product gas flow out of the scrubber, can be used to control the air pump speed to a fixed flow, and can also be used to compensate plasma intensity for reactant gas flow. In some embodiments, the flow through the plasma chamber is fixed at 3 lpm. This flow rate provides sufficient gas-plasma interaction, gas turnover and NO production for most clinical applications. In some embodiments, the fixed flow rate through the plasma chamber is in the range of 0.5 to 10 lpm. The injection flow controller FC1 is used to regulate the injector flow. An injector flow sensor FS1 senses the injector flow and can be used for feedback to control the injector valve. In some embodiments, multiple sense elements are combined to increase the dynamic range of the sensor. A recirculation flow controller FC2 is used to recirculate excess product gas to the plasma chamber inlet. It can maintain a constant or near-constant product gas pressure at the scrubber outlet regardless of injector flow. A sample flow controller FC3 is a proportional valve used to regulate product gas flow to the NO sensor. A sensor in the flow path of the NO sensor measures one or more of pressure, temperature and humidity in the sample gas. Information from this sensor can be used to determine status of the scrubber and whether or not humidity controls are required to protect the NO sensor. This information can also be used to compensate the NO sensor measurement for temperature, pressure and humidity, as needed. A sample flow sensor FS3 can sense the product gas flow to the NO sensor. It can be used to control the sample valve. A vent flow sensor FS4 can sense the ventilator air flow rate and can be used to control the injector flow and the production rate. In some embodiments, pressure, temperature and/or humidity of the ventilator air flow rate are measured by either FS4 or one or additional sensors. A NO sensor is used to measure the product gas NO concentration and can be used as input to the NO dose control algorithm to compensate for NO losses in the system. A product pressure sensor can sense the product gas pressure at the scrubber outlet/common valve inlet. It can be used to control the recirculation valve. An injector injects product gas into a ventilator air flow stream. In some embodiments, a patient inspiration flow sensor (AKA vent flow sensor) and NO injection take place within a removable cartridge.

In some embodiments, reactant gas is drawn from the inlet through the plasma chamber by the air pump at a constant flow rate. The pump can be located after the plasma chamber to avoid pressurizing the plasma chamber. As the pump is drawing a vacuum, the chamber operates at atmospheric pressure, minus the pressure drop of the inlet filter.

Because the NO production rate is sensitive to flow, especially if gliding arc electrodes are used, in some embodiments a pulse damper is used to smooth the pulsatile input flow of the air pump. This consists of a flow restriction and/or a dead volume between the flow restriction and the pump inlet. In some embodiments, the flow restriction consists of a fixed orifice (e.g. 0.030" diameter), the size of which depends on the target flow rate, the amount of dead volume present, and the frequencies being damped.

In some embodiments, the electrical discharge frequency is set to match or be a multiple of the pump pulse frequency (e.g. ½ the frequency, or every other pump pulse). Electrical discharges are generated at the same point in the pump pulsatility cycle for each electrical discharge, eliminating NO production variation resulting from electrical breakdown and arcing at varying pressure levels within the plasma chamber. In one example, the pump flows at a constant 3 lpm, generating pulsations at a frequency of 75 Hz. The plasma discharges are programmed to be generated at the same frequency, in phase with the pump pulsations. In another embodiment, the discharges are triggered when the plasma chamber pressure reaches a certain level (e.g. lowest pressure level, zero crossing point, highest pressure) within the pump pressure cycle, as sensed by the plasma chamber pressure sensor. In another embodiment, an encoder on the pump is used to trigger electrical discharges at the same point in the pump cycle every time.

After the pump, the product gas is passed through a soda lime or other scrubber to remove $NO_2$. NO naturally decays to $NO_2$ in the presence of oxygen, so the pneumatic path between the scrubber and the injector is minimized. In some embodiments, one or more particulate filters are located before and/or after the scrubber component to capture particles from the electrodes, scrubber material, pump and other sources.

After the scrubber, a proportional flow divider, consisting of a flow controller FC1 and a flow controller FC2, is used to direct a controlled flow to the injector while maintaining a constant product gas pressure at the scrubber outlet. In some embodiments, the pump cannot be controlled as fast as the injector flow, so changes in injector flow that change pressure drop across the scrubber would adversely affect reactant and product gas flow. Maintaining a constant pressure at the injector ensures the pump can operate at a constant or nearly constant speed.

The flow divider can be implemented using a single 3-way valve, a pair of proportional valves controlled opposite each other to maintain a constant pressure drop, or a pair of valves operating as a flow controller (injector valve) and a backpressure regulator (recirculation valve).

A small, constant sample flow is also drawn off the post-scrubber product gas flow to be sensed by the electrochemical NO sensor, which in some embodiments is cross-sensitive to changes in flow. Maintaining a constant flow improves its stability and repeatability. As both the target flow and input pressure are constant, this flow controller may have low bandwidth and appears primarily as a steady-state flow offset to the flow divider control. In some embodiments, the sample gas flow is 200 ml/min. Sample flow rates from 10 to 1000 ml/min can be utilized, however.

Gas which is not directed to the injector, including the gas that flows through the NO sensor, is recirculated back to the plasma chamber inlet and mixed with the room air to form the reactant gas stream, thus forming a closed system. The flow of room air into the system can be equal to the injector flow leaving the system.

Dose Control Algorithm

In some embodiments, a dose control algorithm for the recirculating architecture operates much like the dose control algorithm for other architectures. Mainly, the injector concentration cannot be varied fast enough to support dose delivery methods other than constant concentration with fixed dilution fraction and the production rate must be regulated using open-loop process control due to the slow response of available NO sensing technologies. The addition of a recirculating path complicates the control system: the product gas exiting the plasma chamber is partially composed of recirculated product gas. Errors in the calculated or measured recirculated mass flow of nitric oxide (ppm*slpm) therefore result in errors in the expected product gas mass flow. Because this new product gas flow is also recirculated, such errors have a tendency to accumulate with every iteration through the loop.

The required production rate of the plasma can be determined by the required mass flow of nitric oxide (ppm*slpm) in the product gas stream minus the recirculated mass flow of nitric oxide. To a first order approximation, then, the production rate should be equal to the injection rate because the product gas flow minus the recirculated flow is equal to the injector flow. If the product gas flow is constant, the product gas concentration is constant, and the size of the recirculation path is sufficiently small and/or low pressure drop, then the propagation delay of the recirculation flow rate is negligible, and this approximation holds.

There can be an issue with errors accumulating in the system. For example, the issue with the above approximation is that the amount of NO being recirculated may not be equal to the amount of product gas less the measured injection flow. NO is lost in the loop due to one or more mechanisms, including oxidation to $NO_2$. In some examples, NO is lost to direct interaction with scrubber materials as well. Additionally, errors in the injector flow rate cause an excess or deficient amount of replacement NO to be generated. Because of the recirculation loop, these errors in the inferred NO concentration can accumulate with each lap through the recirculation loop.

Errors in measured reactant/product gas flow or production rate do result in errors in output product gas concentration, but for a given bolus of gas, they appear once and decrease in magnitude with each cycle around the recirculation loop. The upper bound for error caused by these sources is therefore equal to the original error. NO loss errors, on the other hand, occur each time a particular bolus of gas transits the loop and therefore accumulate beyond the original error. Sources of NO loss or gain can include, but are not limited to, injector flow rate errors, NO lost/absorbed within the scrubber, NO converted to $NO_2$ by oxidation (and subsequently removed by the scrubber), NO wash-in/wash-out from permeable materials in the pneumatic pathway, leaks, over-estimation of NO loss (resulting in apparent NO gain), and recirculated NO destroyed by the plasma.

Figure 9:
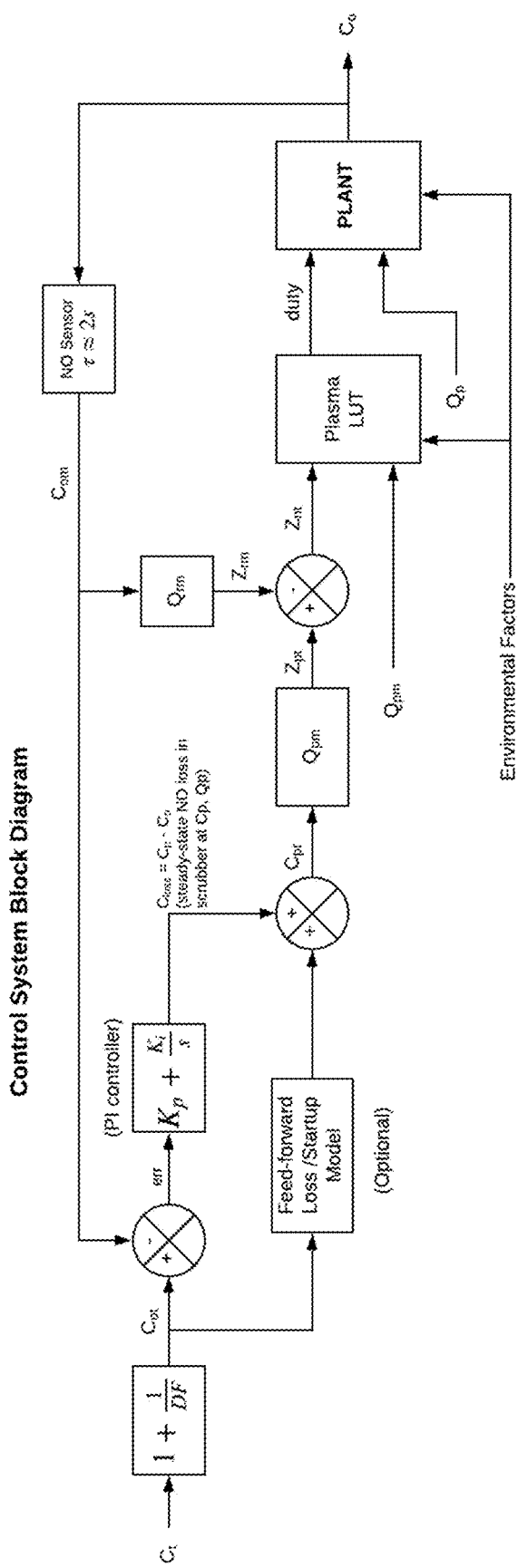
FIG. 9 illustrates an exemplary embodiment of a NO generation system having recirculation architecture.

To mitigate the accumulation of errors, a nitric oxide sensor can be employed to provide negative feedback. Because only NO loss results in accumulating error, the feedback loop can be designed to compensate NO loss specifically. Because NO loss is expected to be a steady state or slowly changing process, the performance requirements of this control loop are compatible with the slow response of electrochemical nitric oxide sensors. Fast transients, i.e. tracking of the breath cycle, still utilize open-loop process control. In some embodiments, the NO sensor measures up to 2000 ppm NO. In some embodiments, the NO sensor measures up to 5000 ppm NO. In general, the NO sensor could be rated for between 100 and 10,000 ppm of NO, depending on the clinical application and NO production required. As shown in FIG. 9, a target delivered concentration Ct is scaled by a dilution factor to result in a target injector concentration ($C_{ot}$). This is compared against a measured output concentration ($C_{om}$) to yield an error term. A process controller, e.g., PID, is used to compute the NO loss in the system, $C_{loss}$. It will be understood by persons skilled in the art that other process control algorithms are functionally equivalent to the PID for this purpose. The NO loss is summed with the target injector concentration ($C_{ot}$) to yield a target product gas concentration ($C_{pt}$) at the outlet of the plasma chamber. In some embodiments, the system performance is improved by modifying the target concentration with a feed-forward model of the system to compensate NO loss or startup behavior (loop-priming). The target product gas concentration ($C_{pt}$) is multiplied by the product gas mass flow rate ($Q_{pm}$) to produce a target NO mass flow rate $Z_{pt}$ (moles NO per second) in the product gas. The recirculated NO mass flow rate $Z_{rm}$ is subtracted from the product gas target to yield a production rate target $Z_{nt}$ within the plasma chamber. In some embodiments, the recirculated NO mass flow ($Z_{rm}$) is determined by multiplying the measured injector concentration $C_{om}$ by a measured or calculated recirculation gas mass flow rate ($Q_{rm}$). In some embodiments, the recirculated NO mass flow ($Z_{rm}$) is estimated by multiplying the target injector concentration $C_{ot}$ by a measured or calculated recirculation gas mass flow rate ($Q_{rm}$). In some embodiments, the recirculated NO mass flow ($Z_{rm}$) is estimated by time-delaying the target injector concentration $C_{ot}$ and multiplying it by a measured or calculated recirculation gas mass flow rate ($Q_{rm}$); the time delay models the propagation of NO through the recirculation loop at a controlled flow in response to a change in $C_{ot}$. The target production rate $Z_{nt}$ and the measured reactant gas flow rate $Q_{pm}$, as well as any environmental factors such as temperature, humidity, or pressure, are fed into a production rate model for the plasma system to determine an operating point for the plasma. In some embodiments, the production rate model is comprised of zero or more look-up tables combined with zero or more linear or nonlinear regression equations. The operating point for the plasma includes at least one of a duty cycle, dithering, and/or plasma current. The actual system response to this operating point yields an actual injector concentration C_o which is measured by the NO sensor.

In some embodiments, a sufficiently high bandwidth NO sensor replaces the control system described above. A measured concentration C_om is compared against the target concentration C_ot and a process controller (e.g. PID) is used to set either the target production rate Z_nt or the plasma operating point directly.

The closed loop controller also compensates errors in production rate. However, because the NO sensor and associated feedback loop are slow compared to the breath cycle, the controller cannot be expected to correct gain errors or nonlinearities in the production rate. Rather, it will adjust the average operating point of the plasma to result in the correct time-averaged concentration. In a pulsed delivery environment such as a ventilator system, this can result in the plasma alternating between operating points that have positive and negative errors such that the mean error is zero. These errors will result in an intra-breath concentration ripple/error in the product gas, and injection flows sourced from this product gas will therefore contain varying concentrations of nitric oxide. Because the injector flow rate is pulsed, the volume-averaged concentration of the injector may differ from the time-averaged concentration of the product gas. It is for this reason that the system incorporates a production rate model in addition to the NO sensor to determine the plasma operating point.

In some embodiments, product gas which is not delivered through the injector is diverted to an exhaust port, NO absorption medium, or other waste path instead of being recirculated. In these embodiments, the plasma may be operated at a constant production rate and flow that is independent of the injector flow. In such embodiments, closed loop control using a NO sensor may not have intra-breath variations in the product gas concentration and may require only the NO sensor feedback loop, without additional models, for accurate regulation of the injector concentration. In some embodiments, feed-forward control is used. The response of the closed loop control is limited by the response time of the NO sensor and the propagation delay of the loop. Although this provides acceptable performance for steady-state operation, it results in a slower response to step changes in operating point. In particular, the control responds poorly to two scenarios: step change in NO loss, and step change in concentration.

System performance can be improved by including a predictive (feed-forward) model for NO loss. In some embodiments, a predictive model for NO loss may be sufficiently accurate to eliminate the need for a NO sensor. This is most feasible when there is a high turnover rate of product gas within the recirculation loop, i.e. there are few loop iterations in which errors in the predictive model can accumulate.

In some embodiments, the dominant form of NO loss, other than errors in the injector flow rate, can be a constant function of concentration and residence time. If the system is operating at constant flow and constant product gas concentration, it should therefore have a constant NO loss offset to correct for these losses. Changes in this transfer function, for example due to scrubber aging or environmental factors, are expected to be significantly slower than the bandwidth of the injector concentration closed loop controller. It is therefore expected that the control system can be able to compensate for them.

However, in some embodiments, NO loss within a soda lime NO scrubber can also depend on other factors, such as the amount of $NO_2$ absorbed. If so, the NO loss rate can vary with $NO_2$ production rate which, in turn, varies within the breath cycle. The closed loop control responds too slowly to compensate this kind of dynamic loss. A feed-forward model that predicts $NO_2$ production and associated NO loss can therefore be used.

By un-burdening the negative feedback control system, an accurate feed-forward model also improves the startup/settling time of the control system. This can be useful given the relatively low bandwidth of the control system.

A feed-forward compensator can take into account one or more of the following factors (in no particular order): operating environment (temperature, pressure, humidity, etc.), scrubber age, manufacturing variation (e.g., per-unit calibration), production byproducts (e.g. $NO_2$), residence time of the product gas, system operating temperature, concentration of the product gas, flow rate, and oxygen content of the product gas.

Figure 10:
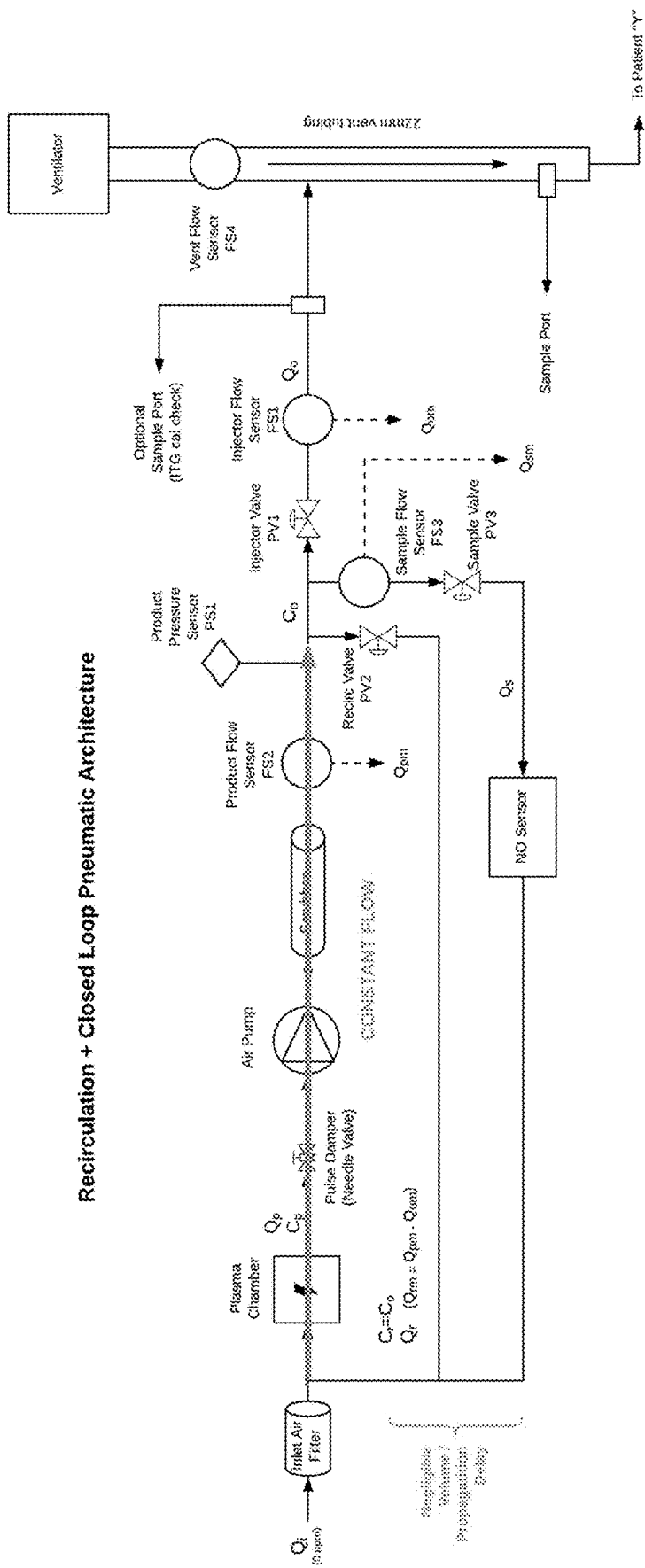
FIG. 10 illustrates an exemplary embodiment of a recirculation/closed loop pneumatic architecture with a feed-forward pneumatic volume.

There is a long propagation delay between when the NO production rate is changed and when the gas reaches the NO sensor and the sensor responds to the change. In some embodiments this delay can be between 5 and 30 seconds. In some embodiments, an extremely slow/overdamped loop response is required to mitigate the overshoot due to integrator windup during this delay period. In some embodiments, the integrator wind-up can be minimized by adding a feed-forward term to prime the loop. Because flow in the system is constant, the feed-forward can be integrated as a simple propagation delay based on the dead volumes of the system. An exemplary embodiment of a recirculation/closed loop pneumatic architecture with a feed-forward pneumatic volume is shown in FIG. 10.

The propagation delay for a given product gas bolus can be computed in software by assuming that the variable-flow recirculating volume is negligible. The remaining volume in the system is divided into a number of equal-sized volumes (i.e., discretized). A buffer stores concentration history for each of these volumes; the oldest sample therefore represents the concentration that is being recirculated into the plasma chamber. The concentration is computed from the recirculating flow and NO production rate. An integrator accumulates the mass flow of gas through the loop by adding (mass flow rate*time step) at each computation interval; the concentration history is populated according to the volume that flowed during the computation interval.

A recirculating architecture can also provide low-dose rates. Low production rates, using dithering or other means, may result in long intervals between plasma pulses. In linear architectures, this produces regions in the product gas volume that with low NO concentration and others with high NO concentration; diffusion or mixing techniques must be relied upon to minimize error in the delivered concentration. In contrast, a recirculating architecture injects only a fraction of the product gas flow during low dose conditions. As a result, the majority of the NO molecules exiting the plasma chamber are recirculated rather than newly produced, so any variation in the concentration due to large pulse spacings represents only a small fraction of the total NO concentration.

Priming of the Recirculation Loop

In some embodiments, high concentration NO can be made for one lap around the recirculation loop and plasma can be turned off prior to directing any gas to the patient. The timing of turning the plasma off is important so there is not a spike or drop in concentration within the recirculation loop. In some embodiments, a recirculation loop can be primed before injecting to the patient to reduce the time to achieve accurate dosing from a cold start.

Purging of the Recirculation Loop

NO and $NO_2$ gases should not be left in proximity with flow control and sensing elements for extended periods of time. Residual NO within the system can turn into $NO_2$ over time. Hence, it is important to clean the flow pathways within a NO generation device after use. NO and $NO_2$ can be embedded in the actual materials of the NO generator, requiring sufficient time for these materials to off-gas before device storage. In some embodiments, the recirculation loop is scrubbed of $NO/NO_2$ gas after use. In some embodiments, product gas is circulated within the recirculation loop for sufficient time for all the NO to oxidize into $NO_2$, all the $NO/NO_2$ adsorbed by the loop materials (e.g., tubing) to be released, and all $NO_2$ to be adsorbed by the scrubber. In some embodiments, loop scrubbing is completed when the $NO_2$ sensor indicates that there is no remaining $NO_2$. In some embodiments, gas is circulated for a set amount of time that has been characterized to provide sufficient time to scrub all remaining NO and $NO_2$. In some embodiments, non-$NO/NO_2$ containing gas (purge gas) is flowed through the recirculation loop and a valve is opened to release $NO/NO_2$ containing gas from the recirculation loop into the atmosphere directly or through a Nox scrubber to purge the loop. In some embodiments, a volume of purge gas flowed through the recirculation loop and out the purge valve is greater than the volume of the recirculation loop.

Ventilator Systems

In some embodiments, a ventilator provides assisted or complete ventilation of a patient with compromised lung function. It can supply either normal or oxygen-enriched air. When inhaled nitric oxide (iNO) therapy is combined with a ventilator, it can be supplied to the patient in a constant inhaled concentration dose.

Figure 11:
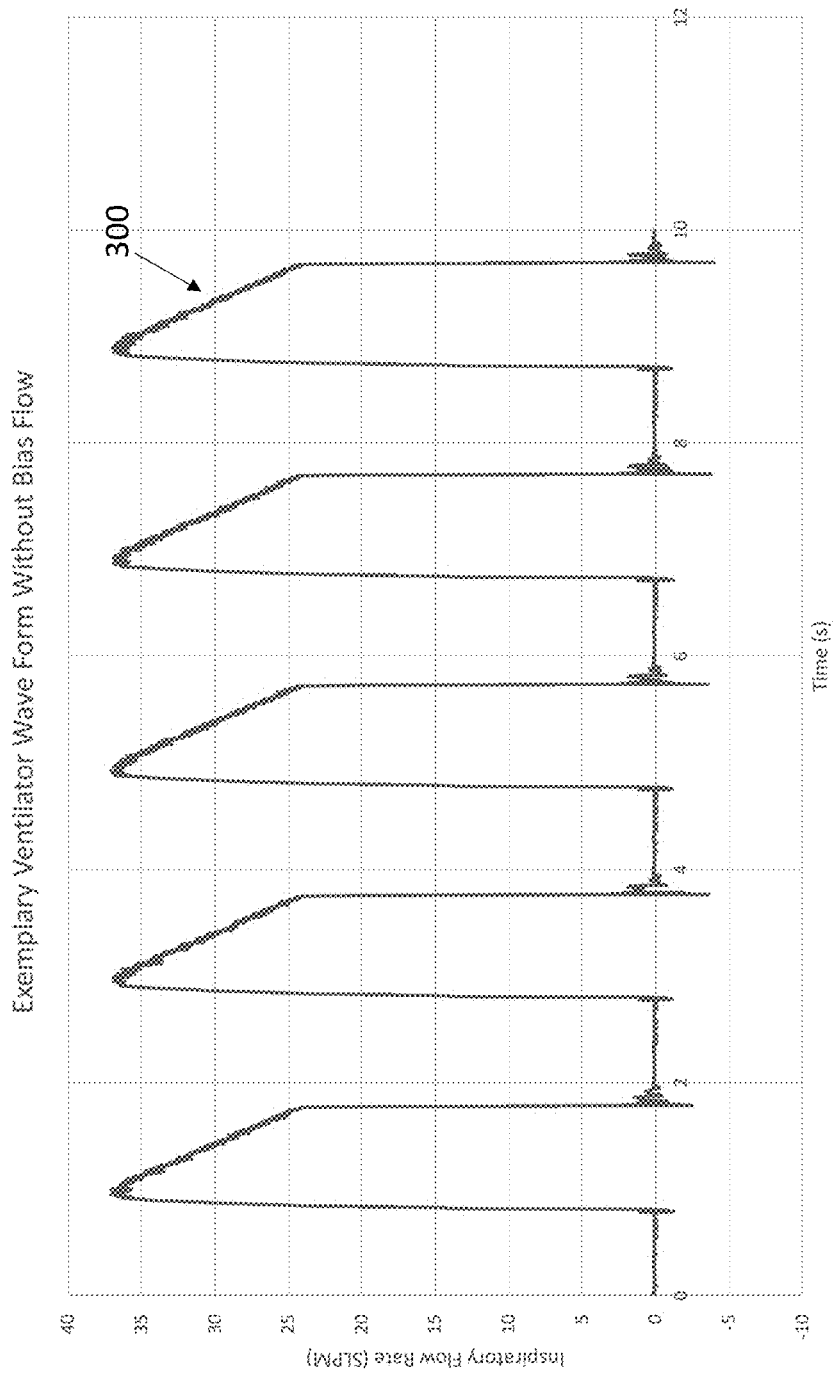
FIG. 11 illustrates an exemplary graph of a ventilator waveform.

Mechanical ventilators use a number of different ventilation modes, such as (but not limited to) constant positive airway pressure, pressure-control ventilation, volume-controlled ventilation, assist-control ventilation, and pressure support ventilation. Ventilator flow and pressure waveforms can vary dramatically depending on ventilation method, breath rate, spontaneous breathing by the patient, and other variables. Many modes involve rapid slew of air flow from a small bias flow (2-10 LPM) to large inspiratory flows (up to 150 LPM) and back. A period of no flow (0 slpm) may also occur. An exemplary ventilator waveform 300 with zero bias flow is shown in FIG. 11. A recirculation loop approach allows for NO product gas to be generated and scrubbed within the loop, even when no NO is injected into the ventilatory stream. This ensures that sufficient, accurately-concentrated NO is available at the injector when ventilatory flow resumes.

Product Gas NO Sensor Calibration

In some embodiments, calibration gas is passed by the product gas NO sensor (e.g., through the recirculation loop) to calibrate the product gas NO sensor. In some embodiments, the output of the NO device is utilized to calibrate the product gas concentration NO sensor within the NO generator. This is accomplished by generating a flow of NO and passing it to either the NO gas sensor used for inspiratory gas monitoring or an external NO sensor. In some embodiments, the NO product gas is diluted prior to passing it to the gas sensor, however this can introduce some error into the calibration. The NO concentration measured by the gas sensor is used to identify a known concentration of gas within the recirculation loop which can be used to update the calibration settings of the product gas NO sensor. In some embodiments, a correction factor is applied to the measured gas to account for additional gas aging that may be associated with traveling to the reference sensor that would not occur when traveling to the product gas NO sensor. When inspiratory gas sensors are used, this calibration is typically performed soon after sensor calibration so that their state of calibration is known.

Electrode Replacement

In some embodiments, the product gas NO sensor can be utilized for NO production calibration. NO production calibration can be done periodically throughout the service life of a system, or after one or more components have been replaced (e.g., electrodes). In some embodiments, the NO generator supplies a known flow rate of reactant gas to the plasma chamber and sweeps through a range of electrical discharge duty cycles while measuring the NO concentration within the product gas with the product gas NO sensor. In some embodiments involving a recirculation loop, the system directs all product gas flow out of the system (no recirculation) during this calibration step. In some embodiments, the system keeps the recirculation loop closed and compensates the calibration measurements for the buildup of NO within the reactant gas through the course of the calibration sequence. In some embodiments, the NO generation system requires the product gas NO sensor to be calibrated prior to being used to calibrate NO production.

In some embodiments, an external NO measurement device is utilized to measure product gas concentration from a NO generation/delivery device. Product gas is routed to the external device either from a scrubber connection, a ventilation cartridge, a ventilation cartridge connection, a bag connection or other external pneumatic connection. In this embodiment, the device sweeps through a range of NO production levels, holding each level long enough for the system and external measurement device to stabilize before moving to the next production level (e.g., 30 seconds in some applications). In some embodiments, the external NO measurement device utilizes one or more of the following methodologies to measure NO: Infrared spectroscopy, chemiluminescence, gas detector tube, photoionization and electrochemical. In some embodiments, the external device also measures $NO_2$ so that a product gas $NO/NO_2$ ratio can be determined as well.

In some embodiments, the NO generator purges the product gas NO sensor with either ambient air or another zero-gas to zero the product gas NO sensor within the device to achieve a zero value from the sensor. In some embodiments, plasma is turned off and the product gas pump is utilized to pull fresh air through the system. In some embodiments, with redundant NO generation channels, a NO generation system can zero the NO sensor in one channel while producing NO for a patient within a redundant NO generation channel. In some embodiments, purge gas that does not contain NO is passed through the recirculation loop to zero the product gas sensor (e.g., nitrogen, oxygen, air).

In some embodiments, a NO generator/delivery device can automatically rezero the NO product gas sensor after detecting a change in ambient conditions. This is because some $NO/NO_2$ measurement approaches are sensitive to one or more of temperature, humidity and pressure. In some embodiments, the $NO/NO_2$ measurement capability includes compensation for one or more of temperature, humidity and pressure variation.

Product Gas NO Sensor Redundancy

Some embodiments include more than one product gas NO sensor for redundancy. In NO generators with redundant generation channels, this can result in 4 total product gas NO sensors for single redundancy per channel and 6 product gas NO sensors for double redundancy per channel. In some embodiments, one or more central NO product gas sensors can be in fluid communication with the one or more NO generation channels, thereby reducing the total number of NO sensors required. The central bank of sensors can only measure the NO from one channel at a time, however. In some embodiments, if one channel is treating a ventilator and the other channel is treating a manual resuscitator, the central sensor bank is applied to the ventilator as priority since it is the longer term and more complex treatment.

Dose Delivery and Dose Accuracy Requirements

In some embodiments, to ensure the correct concentration of NO is inhaled by the patient, a constant concentration of NO can be maintained within the inspiratory gas flow (e.g., ventilator flow) throughout the entire breath cycle.

In ventilator applications, FDA guidance recommends a ±20% tolerance on delivered NO concentration. In some embodiments, target performance is a nominal accuracy of ≤10% based on market research and clinicians' experience with existing iNO therapies.

Because a spontaneously breathing patient can inspire any portion of air from the ventilator tubing, including air that passed by the injector during bias flow, it is necessary for the NO concentration accuracy to be maintained throughout the entirety of the breath cycle. FDA guidance indicates that the tidal volume of any breath, regardless of phasing with the ventilator resulting from variation in inspiratory limb length, shall have a NO concentration within 20% of target concentration except for 10% of the volume which may be between zero and 150% of the target concentration.

Manual Resuscitation

In some embodiments, ventilation is performed manually using a bag valve mask. The bag can be filled with air/oxygen from an external source and the patient inspiration can be generated by a caregiver squeezing the bag. NO therapy can be provided in these cases by supplying a roughly constant supply of NO-enriched air or NO-enriched oxygen from which the bag is inflated. Excess gas may be vented to the room or to a vacuum system. In these cases, the response time demands on the iNO system are comparatively low because the flow is not changing rapidly.

Pulsed NO Delivery

In some embodiments, the system can deliver NO-enriched air or oxygen in pulses via a cannula. Instead of supplying a constant concentration supply of dosed air from which the patient inspires, the system supplies a known molar mass of nitric oxide to the patient with each breath. The dose is calculated in mg/hr or equivalent units, instead of concentration (ppm). In a pulsed delivery scheme, the pulse is timed to ensure that the entirety of the NO supplied is inspired by the patient.

NO Injection Methodology

The goal of any NO injection method is to regulate the dose of NO that is inspired by the patient. In some embodiments, this can be achieved by providing sufficient gas at constant concentration to the patient.

Dilution

The dilution ratio or dilution fraction is defined as the ratio of NO-enriched flow to ventilator flow. It can be viewed as either the amount the NO dilutes the ventilator flow or the amount the ventilator flow dilutes the NO. In some embodiments, the dilution ratio is defined as the ratio of NO product gas flow to combined inspiratory flow (NO product gas+ventilator gas), however all ratios presented herein use the prior definition.

The term dilution factor is defined to be the ratio of vent flow to injector flow (i.e. the inverse of the dilution ratio):

$$DF = \frac{Q_{vent}}{Q_{injector}}$$

The NO concentration after dilution/mixing is equal to:

$$C_{mixed} = \frac{C_{injector} \times Q_{injector}}{Q_{vent} + Q_{injector}}$$

It follows that for a given diluted (ventilator) concentration and injector concentration, injector flow must be directly proportional to the ventilator flow, resulting in a constant dilution factor. Conversely, a variable dilution factor requires a variable injector concentration to maintain a constant diluted (ventilator) concentration. In other words, the mass flow of nitric oxide must be proportional to the total (post-dilution) ventilator flow to maintain constant concentration.

In some embodiments, the dilution fraction is fixed. For example, an embodiment where the dilution fraction is fixed at 10:1 for all treatments. In some embodiments, the dilution fraction is variable. In one embodiment, the dilution fraction is held constant for a particular patient treatment (combination of flow and NO dose). The actual dilution fraction selected is a function of one or more of patient dose, patient flow rate, and NO production requirements. In some embodiments, the dilution fraction is determined as a function of the dose only. Low doses can have a high dilution fraction (100:1 for example), which has the advantage of adding less volume to a patient breathing circuit. As patient doses and flow rates increase, commensurate increases in injected NO mass flow rate are required. This is addressed by increasing product gas NO concentration and/or increasing injected flow rate, effectively decreasing the dilution fraction. In some embodiments, a variable dilution fraction enables a NO system to minimize the added volume to a patient circuit, thereby minimizing the risk of affecting concomitant and/or adjunct treatments.

Oxygen Dilution

The NO-enriched air that is injected into the ventilator circuit dilutes the gas that is normally being supplied to the patient. When atmospheric levels of oxygen are administered to a patient, dilution with NO in a balance of air does not present an oxygen dilution issue. Treatment with supplemental oxygen (e.g., $O_2$ concentration >21%) will incur dilution of oxygen in proportion to the amount of NO added. For example, a treatment of 80 ppm NO from an 800 ppm NO tank will dilute the inspired oxygen 10%, turning a 100% oxygen treatment into a 90% oxygen treatment.

Units of Measure

Because concentration is an incomplete measure of NO delivery, for example as it is also dependent on flow, it is often useful to consider NO in terms of its mass flow, moles per minute or equivalent units. For working with quantities of NO being produced, injected, and diluted, units of ppm*slpm are particularly convenient. Because slpm is compensated for temperature and pressure, ppm*slpm is directly proportional to moles per minute and therefore represent a true mass flow.

Injection Modes for Constant Inspiratory Limb Concentration

As described above, maintaining a constant ventilator concentration requires maintaining a constant ratio of NO mass flow to total (post-dilution) ventilator flow. Because ventilator flows can change quickly, this requires fast dynamic performance from the system. For example, if FDA's "volumetric duration" term is interpreted to mean tidal volume, then a tidal volume of 500 ml and a peak inspiratory flow of 120 slpm, this suggests a response time of 25 ms is required to meet the 10% volumetric duration guidance from the FDA. While in some embodiments the constant concentration method described below is used, other methods can also be used.

A key constraint of any injection mode used in an eNO system is that storage time is limited due to the presence of oxygen in the product gas. NO converts to $NO_2$ in the presence of oxygen at a rate that increases with concentration, pressure, and temperature; NO produced on-demand from air, therefore, has a very short half-life; on the order of seconds. This precludes injection modes which store NO for any length of time.

Constant Product Gas Concentration

In some embodiments, a method of control is used to maintain a constant injector concentration and vary the injector flow. Mass flow controllers can be implemented with millisecond response time, supporting rapid response to changes in ventilator flow. If a constant injector concentration can be maintained, meeting the FDA guidance for 20% accuracy with 10% "volumetric duration" allowance is quite feasible. The constant concentration level of NO from a NO generator can vary with the clinical application. For example, low dose patient treatments require a lower constant concentration within the NO generator and high dose patient treatments will require higher concentrations within the NO generator. In general, the concentration of NO within the NO generator can vary from 1 to 10,000 ppm, depending on the patient dose, inspiratory limb gas flow rate, and dilution ratio.

Constant Product Gas Flow Rate

In some embodiments, a system which operates with fixed injected NO flow (variable dilution factor) varies its nitric oxide concentration to track the inspiratory flow. In some embodiments, there is a propagation delay between NO production and NO injection, influenced by pneumatic components, scrubbers, and tubing. This propagation delay makes it impossible to dose a breath in real time and meeting the "volumetric duration" requirement. It is therefore necessary for such a system to use a highly accurate predictive model such that NO is generated in advance of the breath. Such a system is likely to perform poorly when used with spontaneously breathing patients, but could function adequately during easily-predicted periodic inspirations (e.g. ventilator treatment).

The propensity for intentionally varying concentrations in the NO product gas to diffuse, and the complexity of anticipating and tracking such diffusion, further makes this architecture impractical. The flow rate of such a system must also be low to prevent excessive dilution of the ventilator circuit during bias flows. This necessitates extremely high injector concentrations to achieve high mass flow at low flow rate, which adds still more difficulties.

Variable Flow and Variable Concentration

In some embodiments, a hybrid approach with variable flow and variable concentration can be used. This adds further complexity to any predictive model or tracking algorithm: such a model must also account for the fact that propagation times are not constant but rather vary with varying injector flow.

Variable Inspiratory Limb Concentration

In some embodiments, it can be possible to circumvent the requirement for constant inspiratory limb concentration by accurately dosing a subset of the gas within the inspiratory limb that is actually inspired. This is accomplished by utilizing a known dead volume between the injector and patient as well as the inspiratory limb gas flow rate profile. In a ventilator application, for example, the dead volume would be comprised of the tubing, humidifier, and other accessories. When the flow is repeatable, and the dead volume is known, propagation time from the injector to the patient can also be known. In such cases, the subset of flow that is actually inspired can be accurately identified and dosed. It follows that maintaining constant concentration within the inspiratory limb at all times is not necessary and the system can be designed to operate with a lower peak injection rate. This approach to NO generation and delivery can help reduce power consumption, increase scrubber longevity, and decrease electrode wear owing to the fact that less NO is generated overall.

Constant NO Delivery

When NO is delivered at a constant concentration and flow rate into a dynamic inspiratory flow, concentration in the inhaled gas concentration (i.e., combined flow concentration) will vary. With this NO delivery method, periods of low inspiratory flow, i.e. bias flow between breaths, result in higher NO concentrations than periods of high inspiratory flow rate. The location of the zone of high concentration NO with respect to the patient at a point in time this a function of the volume of tubing between injection point and patient and the integral of flow since the time of injection to. This zone of high concentration can be leveraged to improve overall device efficiency if the system is designed so that the zone of high concentration NO is the volume of gas that is inspired by the patient. In some embodiments, NO is generated and delivered during periods of low velocity during a dynamic inspiratory flow and the tubing volumes are such that it is the high concentration volume that is inspired. In some embodiments, an NO generation system accurately doses a sufficient volume during low velocity flow and ensures that it is the same volume that will be inspired by the patient, thereby effectively pre-loading a lung's worth of air at the correct concentration within the inspiratory limb while running at much lower production rates than would be needed to dose the inspiratory flow. This approach can allow for continuous production while conserving power, allowing the system to be sized for a lower peak production rate, and ensuring that all generated NO is inhaled and little to no NO is released to the surroundings. Generating less overall NO results in energy savings as well as decreased wear on consumable components of a NO generator, such as scrubbers, filters, desiccant and electrodes. In some embodiments, this approach is integrated into a CPAP device.

Bias Flow Dosing

The volume of the inspiratory limb between the NO device and patient is comprised of tubing (diameter, length), humidifier, adaptors, nebulizer ports, sampling ports, and any other source of volume in the inspiratory limb. In one particular embodiment, the volume of inspiratory limb between the NO device and the patient is greater than the patient tidal volume and the bias flow is sufficiently high to refresh the volume between NO device and patient between breaths. In this case, the inspired volume is comprised entirely of bias flow. The NO device is only required to inject NO at a constant concentration and flow rate that doses the bias flow. This greatly simplifies the NO delivery controls and reduces the overall amount of NO produced since rapid gas flow rates associated with inspiratory events will be under-dosed.

In other words, NO injection at a constant flow rate and concentration will result in low NO concentration regions within the inspiratory flow associated with the high flow rates of inhalation. The subset of inspiratory gas comprised of bias flow will be dosed at a constant level and the highest NO concentration within the ventilator circuit. This zone of high concentration can be leveraged to improve overall device efficiency if the system can be designed so that the zone of high concentration NO is the volume of gas that is inspired by the patient. It follows that if a sufficient volume of bias flow is accurately dosed AND that volume is located between the NO device and the patient, arriving at the patient at the time of inspiration, the system effectively pre-loads a lung's worth of dosed inspiratory gas at the correct concentration while running at much lower production rate than would be needed to dose the peak inspiratory flow. This approach functions best when the bias flow is sufficiently high to flow the amount of the tidal volume between inspiratory breaths. In mathematical terms:

$$\text{Bias Flow} * (\text{breath period} - \text{inspiratory time}) > \text{tidal volume}$$

Variable Production

In one form of variable production, a NO device operates at low dose levels (for example, <80 ppm) to improve blood oxygenation and periodically dose the patient at high levels of NO (for example >160 ppm) to prevent or treat infection within the patient's inspiratory tract and inspiratory tubing to the patient. In some embodiments, methemoglobin levels are monitored by a NO device for patient safety. In the event that methemoglobin levels are elevated, a NO generation and/or delivery system can alarm, lower the dose, skip the high dose phase, and/or pause treatment.

eNO Production Rate Control

Some embodiments of an electric nitric oxide system generate NO on demand and must manage the NO production rate. This must be controlled to regulate injector concentration. In some embodiments, excess NO can be purged to a Nox trap, to the room, or to some form of waste disposal system. The injector delivers the required quantity of NO to accurately dose the inspiratory flow and the remaining NO is discarded. In such embodiments, the NO generator can run at a fixed operating point or one of several fixed operating points. In some embodiments, the operating points are calibrated to result in an accurate NO production rate. For some embodiments, all NO generated is delivered to the patient (minus losses in the system); in such embodiments it is necessary for the NO production rate to match the NO injection mass flow rate—on average if not instantaneously.

In process controllers, sensor feedback can be used to implement a closed-loop control. The selection of such a sensor can be matched to the bandwidth of the system. In the case of NO delivery systems, in some embodiments it is impractical to integrate a NO sensor of sufficient bandwidth to measure the instantaneous concentration within a breath waveform. It is therefore necessary to control nitric oxide production using open loop control.

Nitric oxide production rate is a function of many input variables. Some of these can be controlled variables (e.g., plasma intensity, reactant gas flow rate) and some may be uncontrolled (e.g. temperature, humidity). The bulk of dynamic range of production comes from modulating the plasma. Some additional control may be achieved by modulating flow. The remaining factors have small effects—they are errors sources that must be considered and/or compensated but do not need to be controlled in order to have sufficient control of NO production. These include but are not limited to:

Reactant gas temperature
Reactant gas humidity
Reactant gas pressure
Electrode temperature
Electrode wear
NO loss due to oxidation (conversion to $NO_2$, which is then scrubbed)
NO loss due to scrubber chemistry (subject to the same factors above)
Electrode orientation with respect to gravity (hot gas rises and can increase gas flow rate between electrodes The plasma intensity may be modulated using a combination of current modulation, voltage modulation, gap length modulation, and/or pulse modulation.

In some embodiments, a NO generator actively controls the gas pressure within the plasma chamber to enable more or less NO production. In some embodiments, a NO generator dries the reactant gas to eliminate the effects of humidity on NO production. In some embodiments, a NO generator humidifies reactant gas to a known level to eliminate variation in NO production due to humidity variation.

Figure 12:
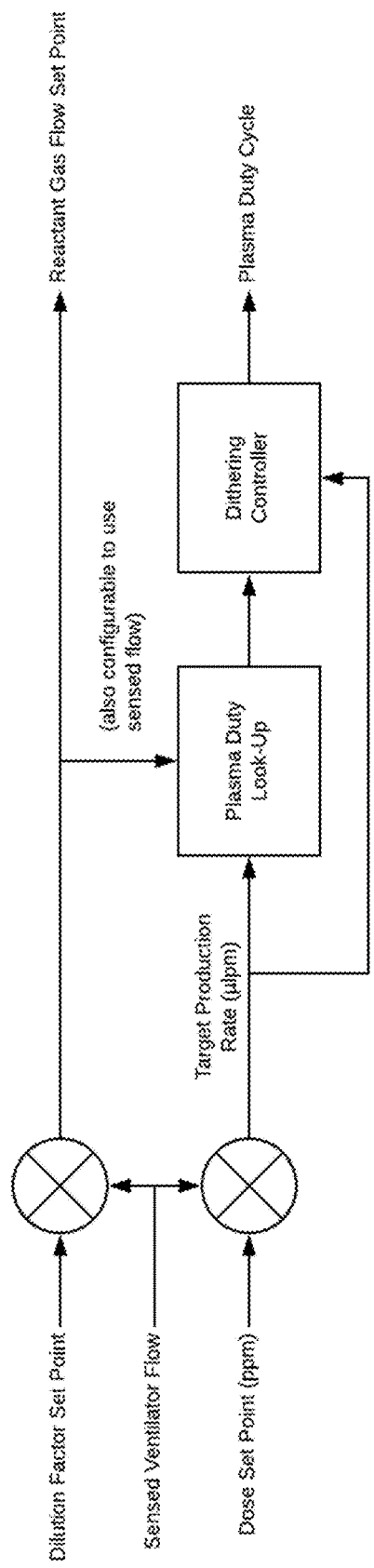
FIG. 12 illustrates an exemplary embodiment of production rate control for systems with a linear architecture.

In some embodiments, a NO generator actively controls the temperature of the reactant gas and/or electrodes and/or plasma chamber to modulate NO and/or $NO_2$ production. In some embodiments, a NO generator actively measures the electrode gap before, during and/or after treatment to compensate in variation in electrode gap over time. In one embodiment, a NO generator includes an oxygen sensor within the gas inlet or recirculation loop to actively measure and compensate of oxygen concentration variation in the reactant gas. In some embodiments, a NO generator actively controls the $N_2$ to $O_2$ ratio to vary NO production. This can be done by blending reactant gas from independent sources of $N_2$ and $O_2$, or utilizing a molecular sieve material, such as zeolite, to vary the $N_2$ to $O_2$ ratio. In some embodiments, a NO generator makes adjustments to the flow rate and/or plasma parameters (duty cycle, current) based on input from an orientation sensor Flow Modulation Schemes In some embodiments, flow modulation schemes can be defined by the architecture of the system. In linear architectures where the reactant gas flow is fed directly to the injector, flow is not an independent variable; rather it tracks the ventilator flow (scaled by the reciprocal of the dilution factor), so plasma modulation is the primary control mechanism. Dilution factor may be adjusted for different uses cases (e.g., high reactant gas flow for high dose cases, low reactant gas flow for low dose cases). An example of this control system is shown in FIG. 12. A sensed ventilator flow is multiplied by a dilution factor set point to determine a reactant gas flow set point. To deliver a constant concentration, the ventilator flow is also multiplied by a dose set point to determine a required production rate in units of ppm·lpm. A plasma duty look-up algorithm and dithering controller is used to determine plasma duty cycles to achieve the required production rate. In some embodiments, the reactant gas flow set point is also an input to the plasma duty look-up algorithm. In constant concentration/constant flow architectures, including the recirculating architecture, reactant gas flow can be held constant to reduce its significance as a process variable. The flow can be changed for different use cases (e.g., high flow for high dose cases and low flow for low dose cases) to accommodate the effect of flow on production rate and/or to improve the dynamic range of injector flow control.

In some embodiments, aside from gross adjustment for use cases, flow is treated as a dependent rather than an independent variable (i.e. it is not used to directly control production rate).

Plasma Modulation Schemes

In some embodiments, production rate is predominantly controlled by modulating the plasma. Any method or combination of methods described in the "plasma control" section of this document can be used. In some embodiments, a fixed-frequency pulse modulation scheme is used with the addition of dithering (to provide low production rate turndown and improved resolution) and intra-pulse current modulation (to improve gliding arc electrode life and resolution). In some embodiments, gap length modulation inherently results from the use of gliding arc electrodes. In some embodiments, the current in intra-pulse current modulation is a function of the elapsed time from the start of the pulse; it is, in effect, a dependent variable. The control system therefore modulates the pulse width (duty cycle) as a single independent variable. Gap length in a gliding arc is likewise a function of air velocity and plasma on-time.

Figure 13:
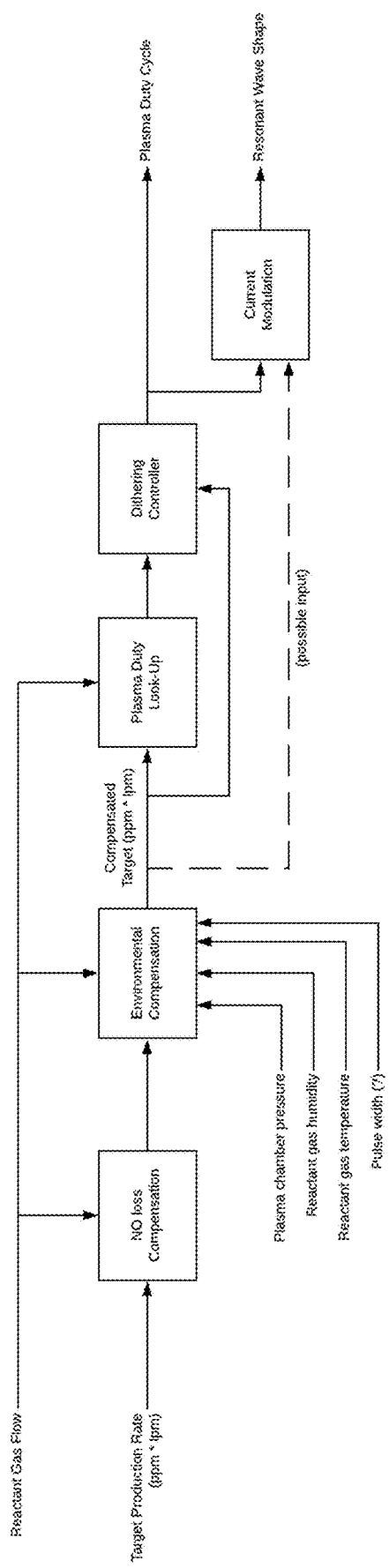
FIG. 13 illustrates an exemplary embodiment of production control scheme for a constant concentration/constant flow architecture.

Compensation for uncontrolled factors (dependent variables) that affect the production rate may be performed by applying a correction factor to a state variable in the control system such as the plasma duty cycle or the target production rate. Determining this correction factor requires thorough characterization of the NO plant under a wide range of environmental and other operating conditions. An exemplary overview of an embodiment of a production control scheme is shown in FIG. 13. A target production rate, in units for ppm·lpm, is corrected for NO loss at a measured or controlled reactant gas flow. The corrected production rate is fed into an environmental compensation algorithm or look-up that creates a compensated production target as a function of reactant gas flow, plasma chamber pressure, reactant gas humidity, reactant gas temperature, and possibly inspiratory pulse duration. The resulting compensated production rate is fed into a plasma duty look-up algorithm and dithering controller to determine plasma duty cycles that result in the correct production rates. In some embodiments, a current modulation controller also modulates a resonant circuit excitation wave shape to regulate plasma current independent of plasma duty cycle.

Plasma Duty Lookup

Figure 14:
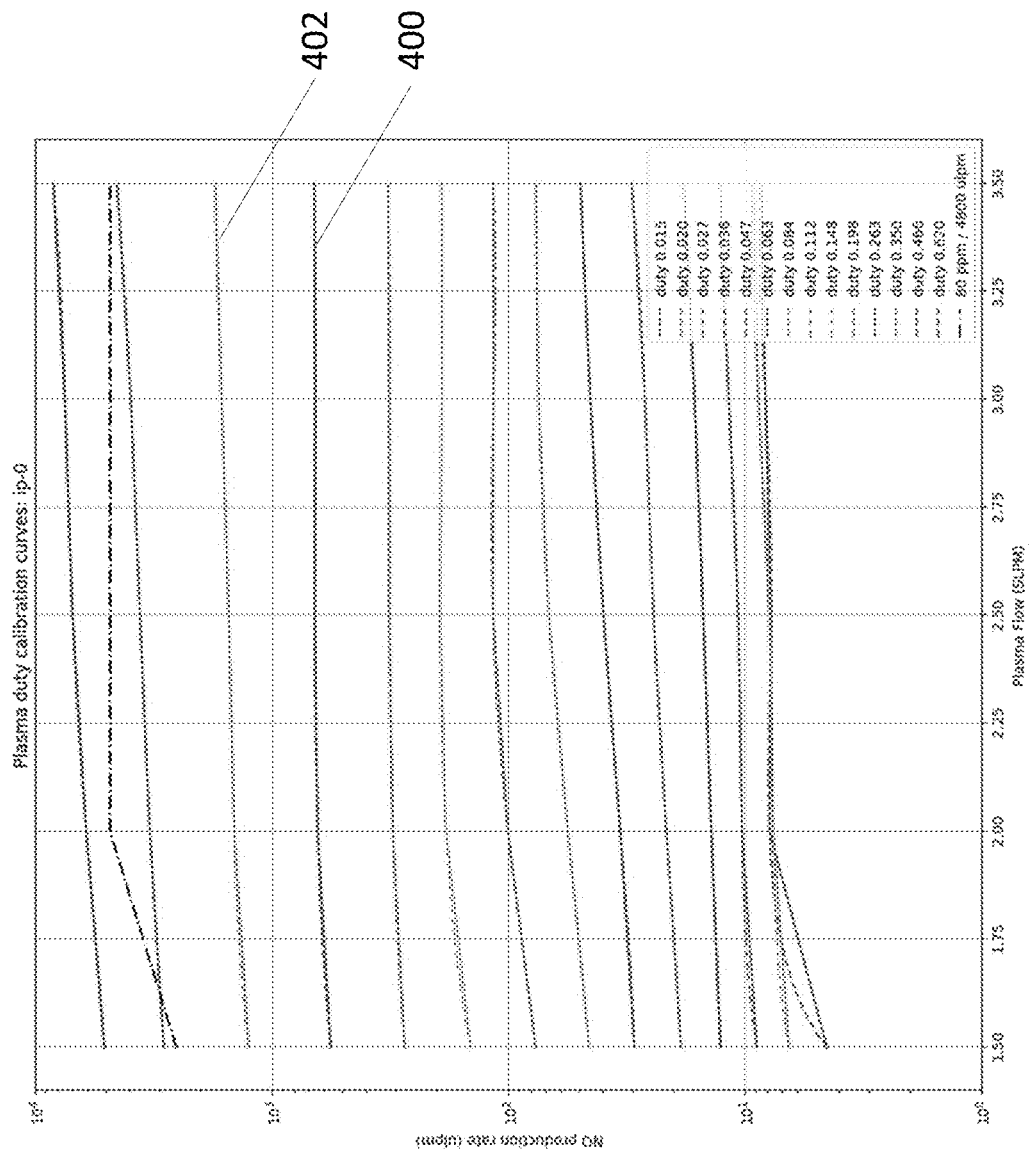
FIG. 14 illustrates an exemplary graph of a calibration curves.

In some embodiments, a plasma duty lookup table is utilized. Since the other process variables, with the exception of dithering, are effectively dependent variables, the main control variable is plasma modulation. In some embodiments, plasma parameters are covariate with a PWM duty cycle. Production rate, in units of mass flow (for example, ppm*slpm), is characterized as a function of reactant gas flow rate through the plasma chamber (labeled as plasma flow) and plasma duty cycle, as in FIG. 14. FIG. 14 demonstrates the effects of reactant gas flow rate along the X axis for various plasma duty cycles (separate curves). FIG. 14 includes a 0.015 duty cycle curve, a 0.020 duty cycle curve, a 0.027 duty cycle curve, a 0.036 duty cycle curve, a 0.047 duty cycle curve, a 0.063 duty cycle curve, a 0.084 duty cycle curve, a 0.112 duty cycle curve, a 0.148 duty cycle curve, a 0.198 duty cycle curve, a 0.263 duty cycle curve, a 0.350 duty cycle curve, a 0.466 duty cycle curve, and a 0.620 duty cycle curve. This characterization includes dependent variables such as current modulation. Curves with lower production are generated with low plasma duty cycle and/or low current. The dashed line near the top of the figure represents the maximum production requirement for an exemplary system. These production curves represent the NO generation performance for an exemplary NO generation system. Each individual system may have slightly different curves based on manufacturing variance. Thus, it is common to characterize the relationship between reactant gas flow, plasma duty cycle and NO production for each system. The results of that characterization are stored in the device for future reference. In some embodiments, the results are stored as a look-up table where the system looks up the duty cycle and/or reactant gas flow rate to operate at based on a required NO production level. In other embodiments, the NO production calibration is captured as coefficients of an equation that calculates duty cycle as a function of NO production requirements and a known reactant gas flow rate. In another embodiment, each of the curves in FIG. 14 are regressed to a polynomial and the coefficients are stored system memory. In some embodiments, the dose control software interpolates between flows and production rates to determine the correct duty cycle. FIG. 14 also illustrates the relative sensitivity of the production rate to plasma intensity (duty) vs. the relative sensitivity to flow rate which, as has been previously explained, drives the selection of duty cycle as the main independent process variable.

In some embodiments, multiple tables are generated for discrete current modulation levels. For example, when the target production rate is below what can be achieved at nominal current, the unit switches to a low current modulation scheme and its associated production curve.

Plasma Chamber

Plasma Electrical Characteristics

A plasma is defined as a gas of ions and free electrons. Air is nominally an insulator; however, when sufficient voltage is applied across an air gap, an avalanche breakdown occurs, and the air becomes a plasma. The voltage at which breakdown occurs is nominally a function of air gap distance and reactant gas pressure but is also affected by many other variables including electrode geometry, time, and the presence of free electrons.

After the breakdown occurs, the presence of ions and electrons in the plasma make it conductive; the air effectively transitions from an insulator to a conductor. Plasmas can also exhibit a negative impedance characteristic: as current increases, the number of ions and free electrons increases, and resistance drops. Thus, more current results in lower voltage drop, i.e. the effective resistance of the plasma is negative.

High Voltage Generator Circuit

In some embodiments of a NO generation device, a high voltage assembly uses a resonant transformer to efficiently produce the required breakdown voltage for plasma formation and to efficiently supply AC power to the plasma after it forms. The presently disclosed embodiment can improve on the resonant topology by tuning the circuit and controlling the harmonic content of the excitation voltage waveform to enable a single resonant transformer to provide the following: rapid initiation of high-voltage breakdown by operating at resonance with a high Q factor, controlled discharge current after plasma formation and during short circuit conditions, rapid adjustment of the discharge current, and automatic reignition of the plasma if the arc becomes extinguished.

Figure 15:
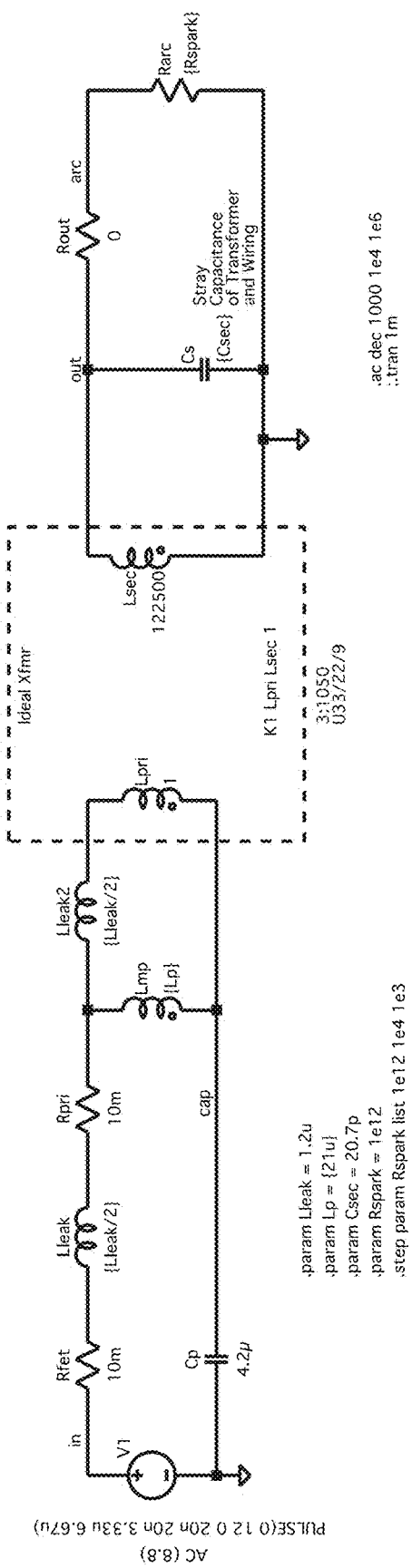
FIG. 15 illustrates an exemplary embodiment of a simulation model of a resonant circuit.

A high resonant frequency, in the range of 10-1000 kHz, minimizes the size of the transformer and other reactive components. It also provides good temporal resolution when accounting for the power fluctuation inherent in the AC waveform. Other operating frequency ranges can also be used, such as, for example, 50-400 kHz. The resonant circuit may be constructed as shown in FIG. 6A. A capacitor or plurality of capacitors (Cp) is placed in series with the transformer primary (Lpri) to block/recapture magnetizing current (Lmp) and tune the resonance. An inductance (Lleak) in series with the transformer forms an LC series-resonant tank with the capacitor. In some embodiments, the series inductance of the circuit consists solely of the leakage inductance (Lleak2) of the transformer, which may be constructed in such a manner as to produce a large and/or repeatable leakage inductance. In some embodiments, a discrete series inductor is also added to the circuit. An additional capacitance (Cs) is present on the transformer secondary. The plasma appears as a mostly resistive load (Rarc) across the transformer's secondary. In some embodiments, a series resistor Rout is added to the secondary to reduce electromagnetic interference and/or stabilize the resistance of the load. Rfet and Rpri shown in FIG. 15 are parasitic elements of the circuit.

Figure 6B:
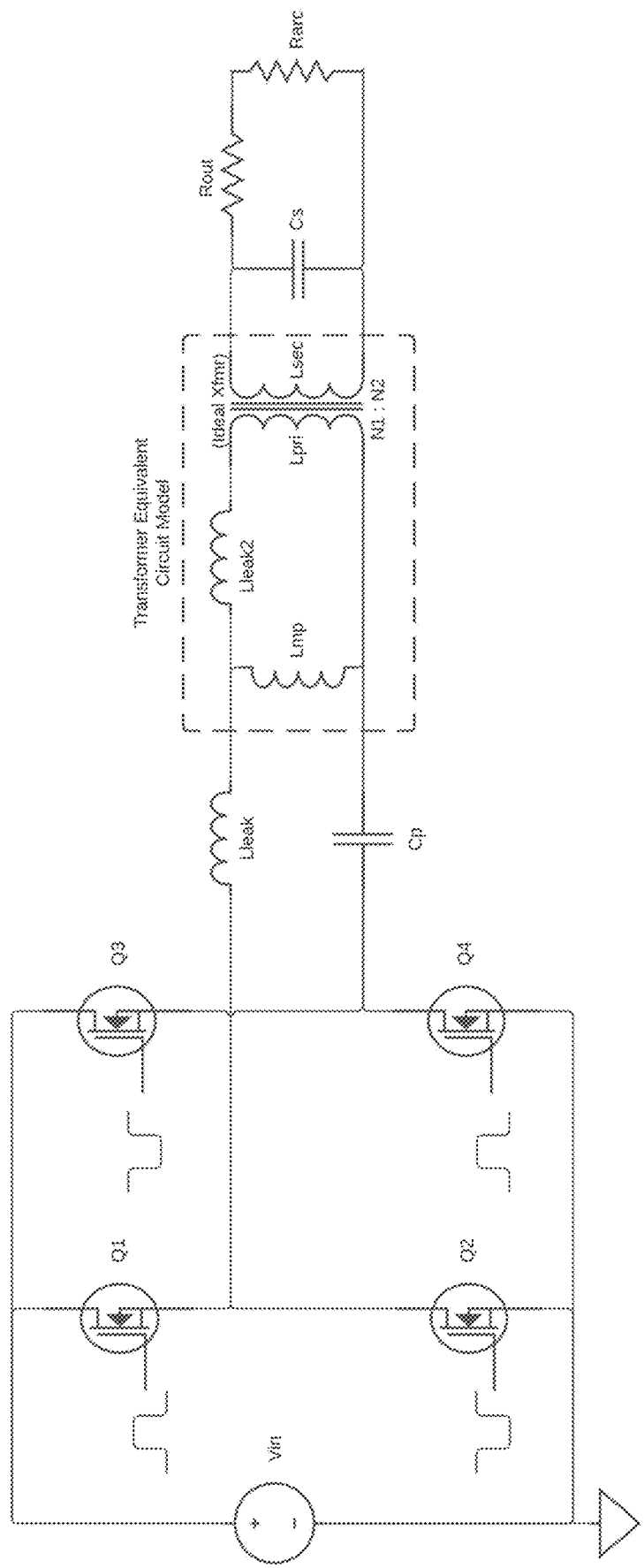
FIG. 6B is an exemplary resonant circuit utilizing a MOSFET full bridge.

The resonant circuit is excited by a MOSFET half bridge or full bridge which is digitally controlled by a microcontroller. It will be apparent to an individual skilled in the art that other semiconductor devices or topologies may be utilized to achieve comparable results, and that discrete, analog, ASIC, or programmable logic may also be used to generate the control signals. Because the LC circuit filters out harmonics of the square wave excitation, a fundamental harmonic analysis can be a reasonable approximation of resonant circuit operation, resulting in the simulation model of the resonant circuit shown in FIG. 15. A possible implementation of this circuit utilizing a MOSFET half bridge is shown in FIG. 6A. A possible implementation utilizing a MOSFET full bridge is shown in FIG. 6B.

Input voltage to the resonant circuit may be supplied from either a battery or an external power supply. In some embodiments, the input voltage is conditioned to a fixed voltage by a pre-regulator to produce repeatable resonant circuit operation when the input voltage is variable, such as when a battery discharges or when the power source is switched between battery and external supply. The pre-regulator could be any form of linear or switching power supply, including but not limited to boost, buck, or buck-boost topologies.

In some embodiments, a large bulk energy storage capacitance is employed at the output of the pre-regulator and the pre-regulator's control loop is tuned to limit the peak input current and input current ripple, as seen by the battery or power supply, that would otherwise result if the plasma is pulse modulated. This prevents the high instantaneous power of the plasma from tripping overload protection circuitry and reduces the. An example of a system power flow diagram is shown in FIG. 16.

Figure 16:
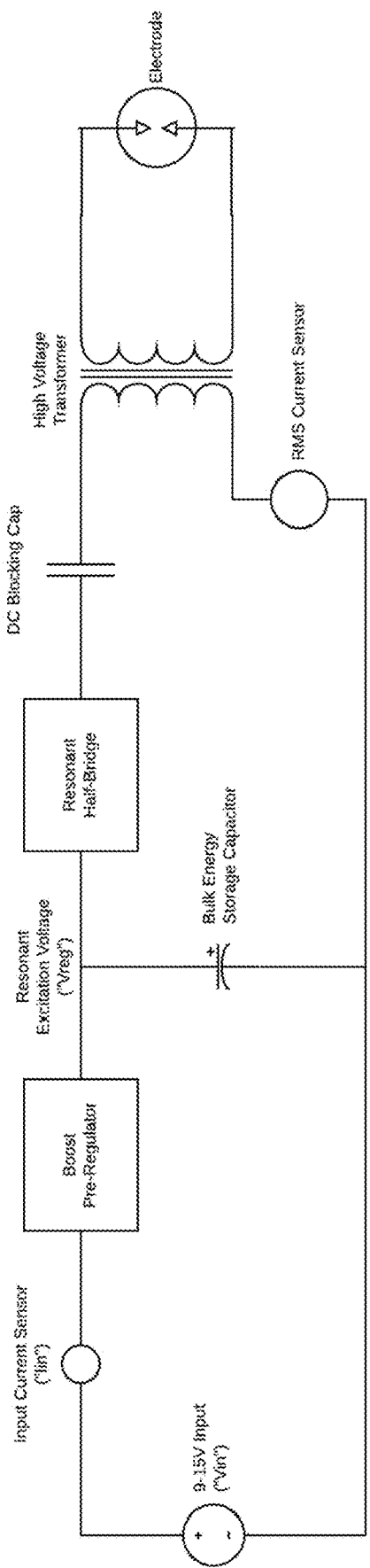
FIG. 16 illustrates an exemplary embodiment of a system power flow diagram.

FIG. 16 shows an exemplary embodiment of the aforementioned excitation circuit with a pre-regulator. The circuit is supplied from a battery or DC voltage source in the range of 9-15V DC. A DC/DC boost converter functions as the pre-regulator using a measured input current to limit the input current ripple. A bulk energy storage capacitor connected across the output of the pre-regulator supplies the energy required to generate plasma pulses. A resonant circuit consisting of a half bridge, DC blocking capacitor, and high voltage transformer generates the high voltage required to develop a plasma between the electrodes Resonant Modes of Operation Continuing to refer to the circuit in FIGS. 6A, 6B, and 15, because the impedance of the electrode gap between the electrodes varies depending on whether or not there is a plasma present, the resonant circuit effectively has two operating modes. Before plasma formation, the electrode gap is effectively an open circuit. The series inductance Lser of the circuit, consisting of Lleak+Lleak2, resonates with the series combination of the capacitance on the transformer secondary (Cs) and the DC blocking capacitor on the primary (Cp). This is hereafter referred to as the "secondary resonance." Operation in this mode produces a large voltage across the secondary capacitance (Cs). After plasma formation, the secondary side capacitance is effectively shorted out by the plasma (Rare), and the series inductance of the circuit Lser, consisting of Lleak+Lleak2, resonates with the DC blocking capacitor on the primary (Cp) forming an RCL circuit where the "R" is the impedance of the plasma plus the parasitic resistance of the circuit elements. This is hereafter referred to as the "primary resonance." Operation in this mode produces a large current in the formed plasma. Because the primary-side capacitance (Cp) is present in both modes of operation, the two resonant frequencies are necessarily different.

There is also a parallel resonance formed by the transformer's magnetizing inductance (Lmp), the secondary capacitance (Cs), and the primary capacitance (Cp). This is hereafter referred to as the "parallel resonance." In some embodiments, this resonance may be used instead of the secondary resonance to generate high voltage on the secondary and ignite the plasma.

In some embodiments, the capacitance on the transformer secondary (Cs) consists entirely of "parasitic" elements such as the transformer's inter-winding capacitance, the capacitance of the electrodes, and stray capacitance in the high voltage wiring. In some embodiments, one or more discrete capacitors are also added to the circuit. In some embodiments, the transformer turns count and construction is designed to minimize this parasitic capacitance in order to produce higher resonant frequencies and faster voltage rise times with smaller power electronic circuitry.

Figure 17:
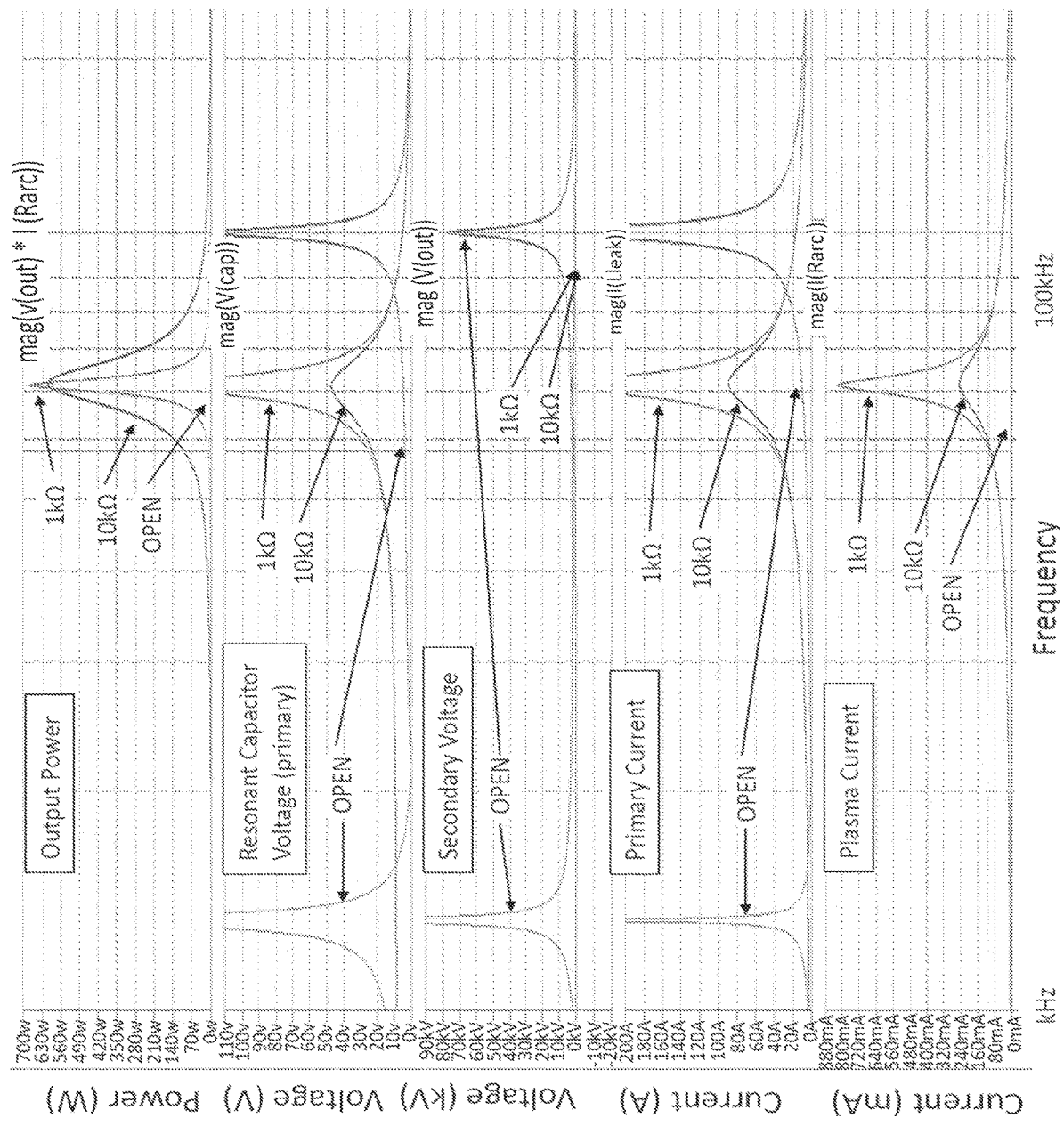
FIG. 17 illustrates an exemplary embodiment of simulation results showing resonant frequencies and plasma power for open circuit, 10 kΩ, and 1 kΩ plasma impedances.

The nature of the circuit to have different resonant frequencies depending on whether or not a plasma is present can be visualized by performing an AC analysis of the simulation model from FIG. 15 using varied values of plasma impedance. Exemplary simulation results showing resonant frequencies and plasma power for an open circuit, 10 kΩ and 1 kΩ plasma impedances are shown in FIG. 17. When the plasma is modeled as open circuit, the circuit exhibits a resonant frequency of 115 kHz, equal to the series inductance Lser=(Lleak+Lleak2) resonating with the series combination of Cs (transformed) and Cp. When the plasma is modeled as a lower impedance load (1-10 kilohms), the resonant frequency shifts to 58 kHz.

Secondary Resonance

To initiate a plasma discharge, the resonant circuit is excited at the frequency of the secondary resonance. When damping is small, each successive cycle of excitation builds energy in the resonant circuit, producing higher and higher output voltages across the transformer secondary capacitance (Cs) until a plasma forms between the electrodes or until a critical voltage/current is reached such that the losses due to damping are equal the energy being added. Damping results from a plurality of parasitic and/or intentional elements in the system, including but not limited to series resistance, parallel resistance/leakage, capacitor dielectric losses, transformer hysteresis, eddy current losses, skin and proximity effects, and magnetic core losses.

In some embodiments, a controlled amount of damping is utilized to limit the peak voltage the system can produce. This adds a degree of inherent safety and/or fault tolerance to the design. In some embodiments the transformer is designed to saturate when a maximum voltage is reached. Because the resonant circuit current is limited by the impedance of the series LC tank at the excitation frequency, the short-circuit load presented by a saturated transformer can be non-destructive.

To compute the resonant frequency, the secondary capacitance (Cs) may be reflected across the transformer and scaled by the turns ratio N2/N1. It therefore appears in series with the primary capacitance, producing a resonant frequency $w_s$ of:

$$\omega_s = \frac{1}{\sqrt{C_r \times L_{ser}}}$$

where the resonant capacitance $C_r$ is, $$C_r = \frac{1}{\frac{1}{C_{s(eff)}} + \frac{1}{C_{pri}}}$$

and the effective (transformed) secondary capacitance $C_{s(eff)}$ is, $$C_{s(eff)} = C_s \times \left(\frac{N2}{N1}\right)^2$$

The DC blocking capacitor (Cp) in series with the primary forms a capacitive voltage divider with the secondary resonance ($C_{s(eff)}$), reducing the secondary voltage. It also produces an effective resonant capacitance $C_r$, that is necessarily lower than Cs, raising the resonant frequency. A large value of Cp can be used to maximize the voltage on the secondary and minimize the effect on the resonant frequency. In some embodiments, Cs=20.7 pF, Lleak=1.2 µH, Cp=4.2 µF. Cr is therefore 1.58 µF and $\omega_s$ is 116 kHz, as shown in the impedance plots of FIG. 17.

Primary Resonance

When the circuit operates in the "primary resonance" mode of operation, the impedance of the plasma is transformed by the high turns ratio of the transformer, producing a small load impedance on the primary. The current flow in the plasma is determined by the excitation voltage and the impedance of the resulting series RCL circuit consisting of the series inductance (Lleak+Lleak2), the DC blocking capacitance (Cp), and the transformed impedance of the plasma (Rarc). Other parasitic elements in the system may also limit the current if care is not taken to minimize them. These elements may include but are not limited to series resistance, parallel resistance, capacitor dielectric losses, transformer hysteresis, eddy current losses, skin and proximity effects, and magnetic core losses.

The frequency of primary resonance is necessarily lower than the frequency of secondary resonance: because capacitors in series have an effective capacitance that is smaller than either individual capacitor, shorting out the secondary capacitance necessarily increases the effective resonant capacitance and therefore lowers the resonant frequency. To a first-order approximation, the resonant capacitance is then equal to the primary capacitance and the resonant frequency is therefore, $$\omega_p = \frac{1}{\sqrt{C_p \times L_{ser}}}$$

If the circuit is in the primary resonance mode of operation and it is operated at its resonant frequency, the reactive impedance $j\omega L - j/(\omega C)$ is zero and the plasma current is determined only by the excitation voltage, the plasma impedance, and the parasitic loss elements of the system. In some embodiments, the resulting current can be excessively high. In some embodiments, the circuit is operated at a frequency other than resonance, such that the reactive impedance of the series inductance and capacitance is non-zero and limits the current in the plasma and under short-circuit fault conditions. In some embodiments, the circuit is designed to produce a controlled plasma current by operating such that the reactive impedance is significantly larger than the plasma impedance and therefore the plasma current exhibits low sensitivity to variability in the plasma impedance.

Resonant Circuit Tuning

In some embodiments, resonant circuit tuning provides fast breakdown, a stable plasma current, and efficient operation. As is described forthwith, tuning the circuit to operate in both the primary resonance and secondary resonance modes of operation with a single excitation frequency produces suboptimal results.

To initiate plasma formation, it is generally desirable to excite the circuit with a frequency as close as possible to its natural secondary resonance. This produces the maximum voltage in the minimum amount of time. The breakdown of the air within the electrode gap when a high voltage develops causes the circuit to be self-limiting in the secondary resonance mode of operation.

After plasma formation, in some embodiments, the circuit is excited with a frequency other than natural primary resonance such that the reactive impedance $Z_r = j\omega L - j/(\omega C)$ limits the current in the circuit when driving a low-impedance plasma and/or in short-circuit fault conditions. In some embodiments, the circuit is designed to produce a controlled plasma current by operating such that the reactive impedance is significantly larger than the plasma impedance and therefore the plasma current exhibits low sensitivity to variability in the plasma impedance. Plasma impedance may exhibit variability due to various factors, especially the changing arc length that occurs in a gliding arc electrode. This produces a plasma current that is a stable function of excitation voltage:

$$I_{plasma} \approx \frac{N1}{N2} \times \frac{Vin}{Z_r}.$$

Resonant frequency and excitation frequency may drift as components age and experience changing operating temperature or other environmental conditions. Another benefit of operating the circuit at a frequency other than its natural resonant frequency is that it results in lower sensitivity to changes in operating frequency or resonant frequency: the slope $\Delta Z/\Delta f$ is highest at resonance, so circuits operating at frequencies other than resonance are less sensitive to errors in operating frequency and component value drift.

Tuning the Series Resonance for a Single Operating Frequency

For a given series inductance, smaller values of $C_p$ produce values of $\omega_s$ and $\omega_p$ that are higher and closer together such that significant plasma current can be developed if the primary resonance is excited at $\omega_s$. However, the primary voltage developed across $C_p$ also rises and the proportion of the input voltage applied across the secondary decreases; therefore to achieve the same breakdown voltage, a greater input voltage is required and a significantly higher voltage is developed on the primary capacitor. The resonant peak also becomes very narrow, resulting in high sensitivity to errors in resonant frequency.

Tuning a Parallel Resonance for a Single Operating Frequency

Tuning of the magnetizing inductance in the parallel resonance is a more viable means of 'stacking' the resonances than reducing primary capacitance. Reducing the magnetizing inductance of the transformer (e.g., by gapping the transformer core) raises the parallel resonance and can be used to bring it close to the primary resonance. Increasing the value of the primary-side capacitance can further reduce the magnitude of the change in resonant frequency when the secondary capacitance becomes shorted. However, low values of magnetizing inductance and large values of primary-side capacitance result in very large circulating currents in the parallel resonant tank.

Multi-Harmonic Tuning

To mitigate the challenges of bringing ws close to wp by tuning the primary capacitance and/or magnetizing inductance, the circuit can be designed for two different excitation frequencies. This can allow the plasma ignition and sustained current to be controlled independently by controlling the amplitudes of the different excitation frequencies. In some embodiments, the secondary resonance is used to ignite the plasma while the primary resonance is used to sustain the plasma current. In some embodiments, a high voltage generator can be designed to excite the circuit at ws/2 with a waveform that has a significant second harmonic component at ws. The primary resonance can then be tuned to be near, but not exactly at, ws/2. In some embodiments, the transformer's magnetizing inductance is maximized to reduce magnetizing currents and their associated damping/losses. In some embodiments, the circuit of FIG. 15 is capable of producing a large breakdown voltage when the circuit is excited by a 116 kHz harmonic component while a large and stable plasma current is sustained when the circuit is excited by a 58 kHz harmonic component. In some embodiments, the high voltage generator circuit and excitation waveform utilize combinations of harmonics other than the first and second (e.g. first and third, second and third, first and fourth, etc.) to excite the different operating modes of the circuit.

The DC blocking capacitor, Cp, can utilize a low-loss dielectric to prevent significant losses and heating. The DC blocking capacitor, Cp, can utilize a dielectric that is extremely stable over time, temperature, and applied voltage to prevent drift in the resonant frequencies. Non-limiting examples include polypropylene film and COG ceramic capacitors for providing the necessary performance characteristics.

Figure 18:
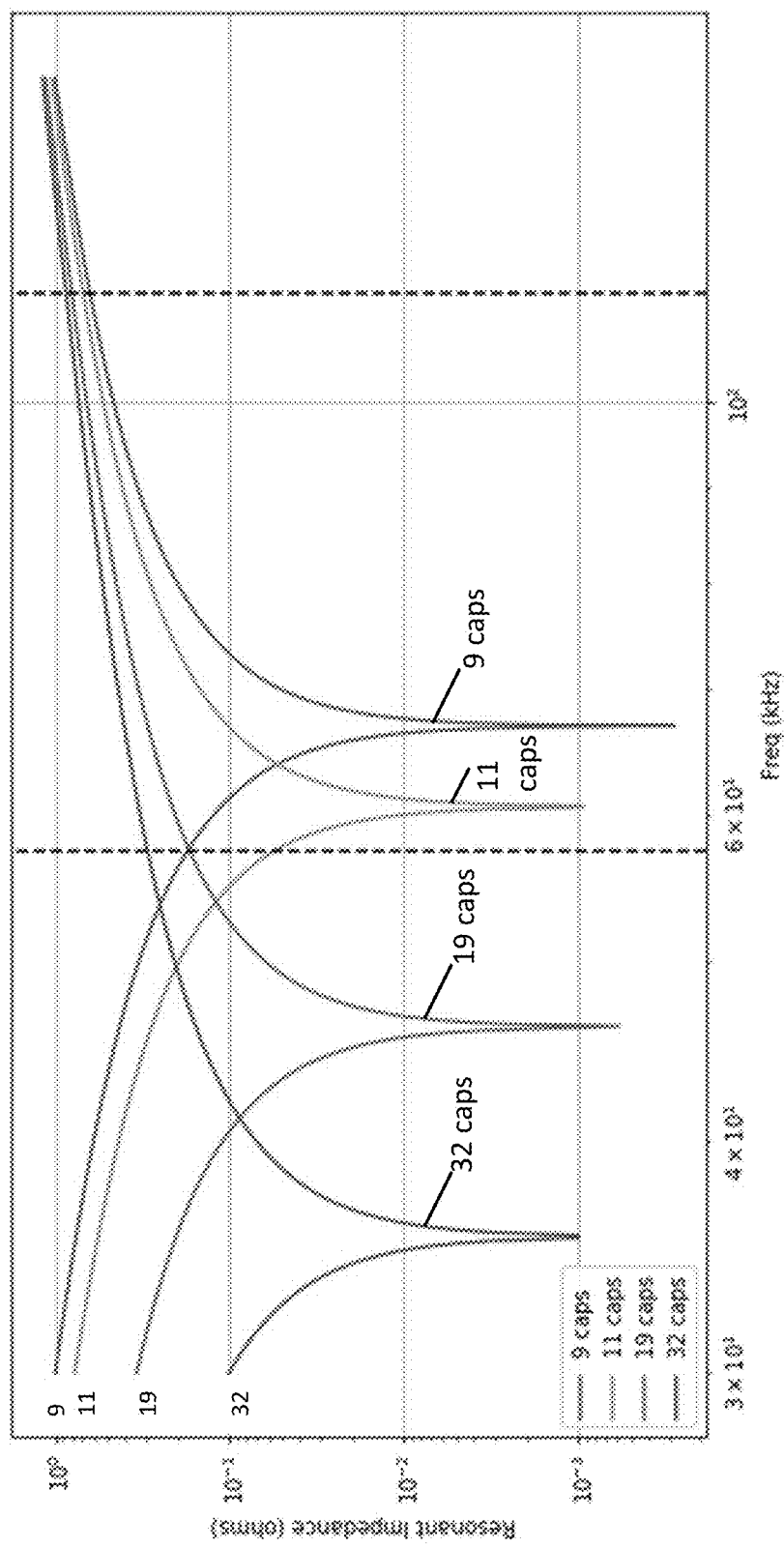
FIG. 18 is an exemplary graph showing resonant impedance with different capacitance values.

In some embodiments, the circuit is tuned such that the primary resonance is below the excitation frequency. Compared to a circuit where the primary resonance is above the excitation frequency, this produces a higher secondary voltage due to the larger ratio of $C_p/C_s$. It can also result in a larger difference in the impedance of the primary resonance between the first and second harmonics, reducing the sensitivity of each mode of operation to the harmonics that excite the other mode of operation. In particular, when a circuit operating in the primary resonance mode of operation has a finite impedance at the second harmonic frequency, the presence of a second harmonic excitation component can limit the ability of a controller to reduce the plasma current by modulation of the first harmonic component alone. In other embodiments, it is more practical to have the circuit tuned such that the primary resonance is below the operating frequency. For example, the circuit of FIG. 15 is excited below the primary resonance using an excitation frequency of 58 kHz and nine 0.47 µF capacitors to produce the Cp value of 4.2 µF. To achieve the same impedance and stability while operating the circuit above resonance would require nineteen 0.47 µF capacitors—a significant increase in cost and circuit size. FIG. 18 illustrates an exemplary graph showing resonant impedance with different capacitance values.

In some embodiments, the parallel resonance is used instead of the secondary resonance to ignite the plasma. In these embodiments the fundamental excitation frequency produces ignition while the higher-order harmonic or harmonics produce(s) controlled plasma current.

Resonant Circuit Excitation

As described above, the circuit can be tuned such that the primary and secondary resonances can be excited with different frequencies. Because the MOSFET excitation circuit, such as the embodiments shown in FIG. 6A or FIG. 6B, produces a rectangular wave, the excitation waveform necessarily contains harmonics of the fundamental excitation frequency. These harmonics can be used to excite the different resonant frequencies of the circuit. In some embodiments, the fundamental is used to excite the primary resonance and control plasma current when a plasma is present while the second harmonic is used to excite the secondary resonance and produce high voltage when a plasma is not present. The half bridge is thus excited at a fixed frequency and the circuit passively and automatically changes its operating frequency depending whether or not a plasma is present. This enables the controller to operate without explicit detection of or adjustment for the change in resonant operating mode.

In some embodiments, the excitation voltage for the primary and secondary resonances can be controlled independently by adjusting the amplitudes of the associated harmonic components of the excitation waveform. This adjustment may be accomplished by adjusting the pulse width of a rectangular excitation waveform. It is therefore possible, for example, to modulate plasma current without significantly affecting breakdown time and vice versa.

Resonant Circuit Excitation Wave Shaping/Harmonic Content

A square wave (50% duty cycle) contains only odd-ordered harmonics (1, 3, 5, 7, etc), while waveforms with other duty cycles also contain even-ordered harmonics (2, 4, 6, etc). The amplitude for a given harmonic in a generic rectangular waveform is:

$$a_1 = Ad$$
$$a_n = \frac{2A}{n\pi}\sin(n\pi d)$$

where n is the harmonic number, A is the peak-to-peak amplitude, and d is the duty cycle.

By operating the MOSFET excitation circuit with a 33.3% or 66.7% duty cycle, the amplitude of the 2nd harmonic is maximized (0.276*Vin) while the amplitude of the fundamental is 0.33*Vin. In some embodiments, a NO generator operates nominally at this operating point without current modulation.

Resonant Frequency Determination

In some embodiments, the circuit generates a harmonic component that is as close as possible to the secondary resonant frequency of the circuit to produce rapid plasma formation. Because the circuit is tuned to operate at a frequency slightly different from the primary resonance and is therefore tolerant of errors in the primary resonance excitation frequency, the fundamental excitation frequency is controlled to produce a harmonic at the secondary resonant frequency. In some embodiments, the NO generator is capable of self-determining its secondary resonant frequency by sweeping excitation frequency with a low excitation amplitude that does not produce a plasma discharge and observing the response of the circuit. In some embodiments, it measures the current in the transformer primary winding. At resonance, the reactive impedance of the circuit is zero, and the current is therefore at a maximum. It will be apparent to an individual skilled in the art that other electrical quantities in the circuit may alternately be used to detect the resonant peak, including but not limited to secondary voltage, voltage across Cp, etc.

Current Modulation

Figure 19:
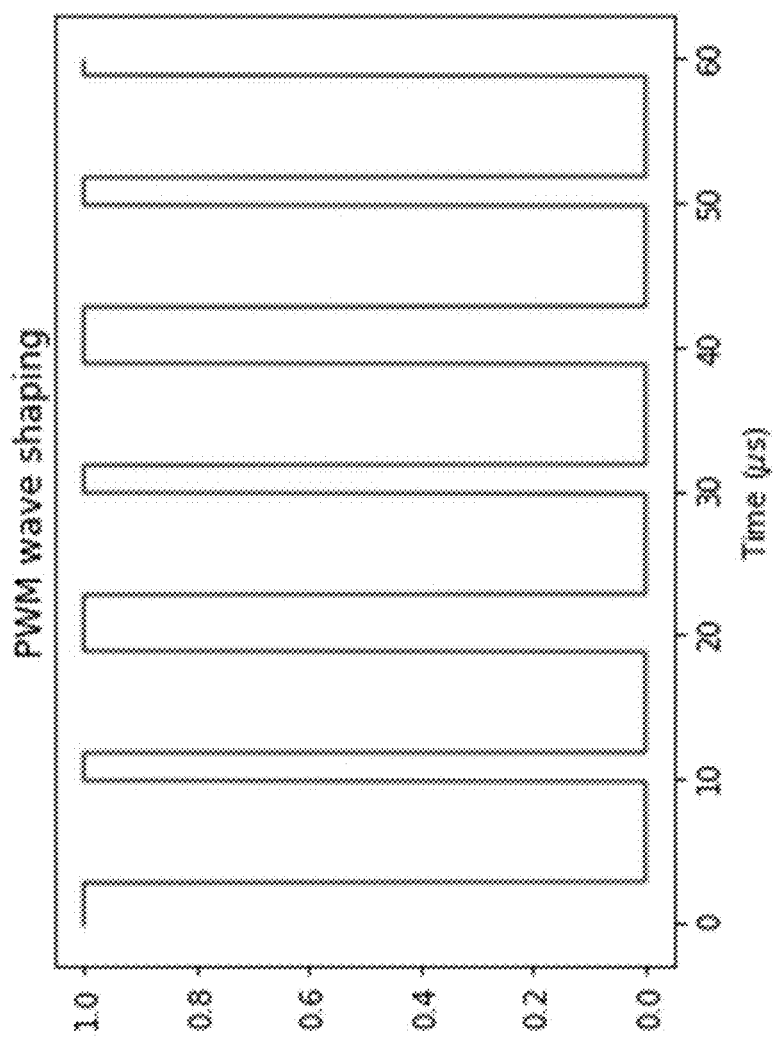
FIG. 19 is an exemplary graph showing a PWM waveform.

In some embodiments, harmonic amplitudes are modulated by changing the excitation duty cycle on a pulse-by-pulse basis. This allows the plasma current to be modulated with a time resolution as small as one period of the excitation frequency (e.g., 1 microsecond for a 1 MHz excitation frequency). The pulse width is alternated between two or more discrete duty cycles with an operating frequency equal to the higher harmonic frequency. For example, the PWM waveform shown in FIG. 19 alternates between two duty cycles to provide controlled harmonics at both 50 kHz and 100 kHz. The pulse frequency in the waveform is 100 kHz. This waveform is equivalent to the sum of two PWM waveforms with different fixed duty cycles, both operating at 50 kHz and 180 degrees out of phase. In describing the wave shaping below, the "fundamental" or "first harmonic" is the lower frequency (50 kHz) produced by the alternating duty cycles, while the "second harmonic" is the higher frequency (100 kHz) produced by the pulse rate. The harmonic waveform described previously (e.g. 50 kHz at 33% duty cycle) can then be considered a special case of the waveform below where one pulse has 66% duty cycle (at 100 kHz pulse rate) and the other has 0% duty cycle. FIG. 19 illustrates an example of PWM wave shaping.

The harmonic amplitudes of a waveform consisting of two discrete duty cycles can be determined as follows. The Fourier expansion of a PWM waveform is:

$$x(t) = a_0 + \sum a_n \cos(2\pi f t n) - \sum b_n \sin(2\pi f t n)$$
$$a_0 = Ad$$
$$a_n = \frac{2A}{n\pi} \sin(n\pi d)$$
$$b_n = 0$$

where $a_n$ is the amplitude of harmonic n, d is the duty cycle, A is the peak-peak amplitude, and $b_n$ is zero because the signal has no imaginary component. $a_0$ is the DC offset of the signal and is rejected by the blocking capacitor. When 180° phase shift is added for duty cycle $d_2$, the first and second harmonic components $x_1(t)$ and $x_2(t)$ become:

$$x_1(t) = a_n \cos(2\pi f t n + n\pi) = \frac{2A}{\pi} \sin(\pi d_2) \cos(2\pi f_1 t + \pi)$$
$$x_2(t) = a_n \cos(2\pi f t n + n\pi) = \frac{2A}{2\pi} \sin(2\pi d_2) \cos(4\pi f_1 t + 2\pi)$$

Normalizing for A and using the trigonometric identity $\cos(A+B)=\cos(A)\cos(B)-\sin(A)\sin(B)$, this simplifies to:

$$x_1(t) = -\frac{2}{\pi}(\pi d_2)\cos(2\pi f_1 t) == > a_2 = -\frac{2}{\pi}\sin(\pi d_2)$$
$$x_2(t) = \frac{1}{\pi}\sin(2\pi d_2)\cos(4\pi f_1 t) == > a_2 = \frac{1}{\pi}\sin(2\pi d_2)$$

If the two waveforms (d1 at 0° and d2 at 180°) are added, the resulting harmonic amplitudes a1 and a2 are:

$$a_1 = \frac{2}{\pi}(\sin(\pi d_1) - \sin(\pi d_2))$$

$$a_2 = \frac{1}{\pi}(\sin(2\pi d_1) + \sin(2\pi d_2))$$

Figure 20:
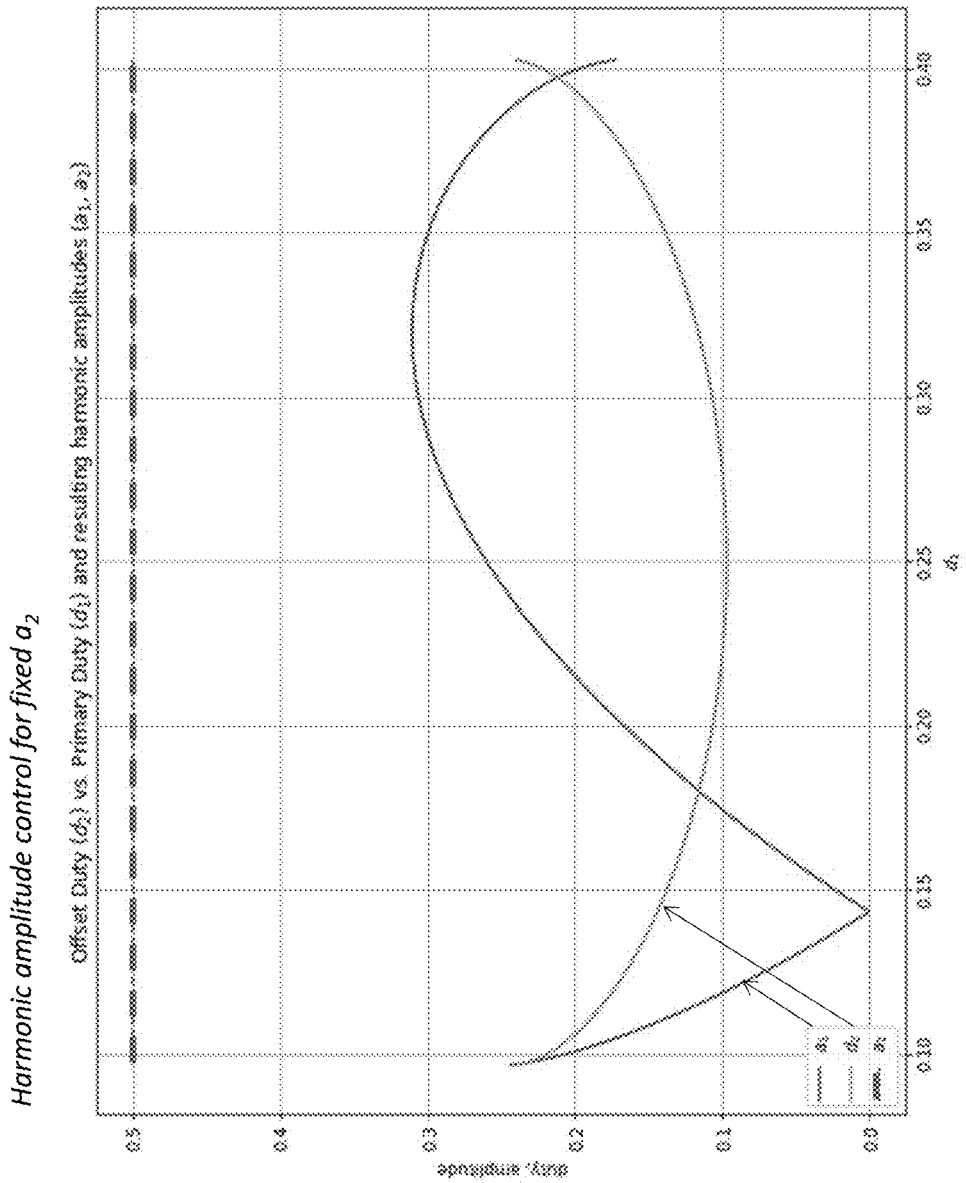
FIG. 20 illustrates an exemplary graph of harmonic amplitude control.
Figure 21:
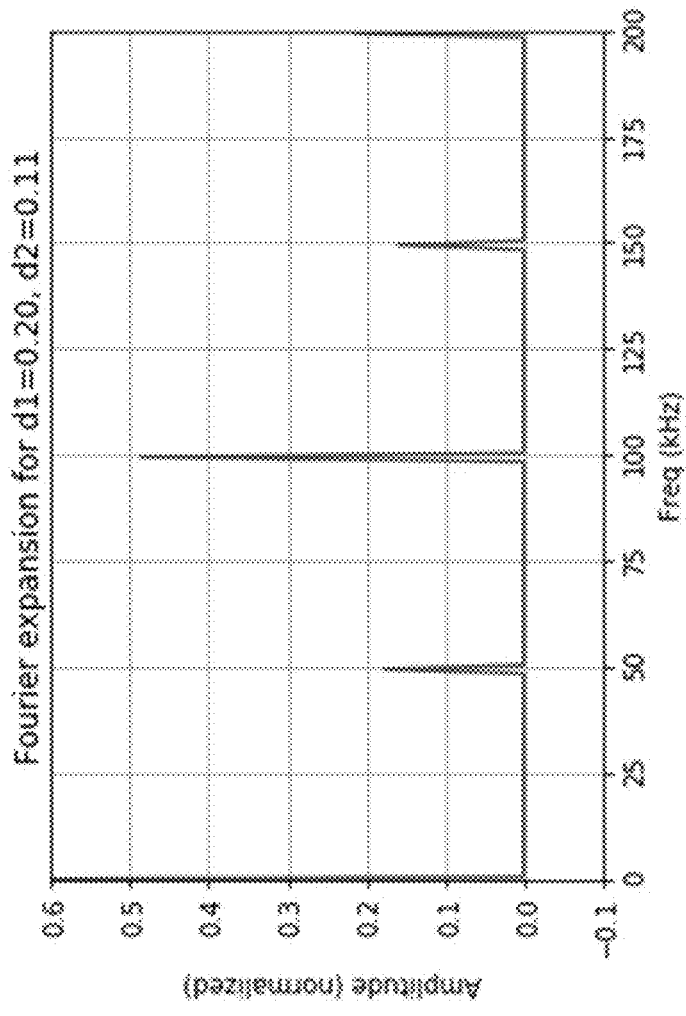
FIG. 21 illustrates an exemplary graph of FFT of a simulated shaped-harmonic excitation waveform.

In some embodiments, $d_1$ and $d_2$ are modulated to maintain a constant excitation voltage $a_2$ at the secondary resonant frequency while varying the excitation voltage $a_1$ at the primary resonant frequency. This provides consistent plasma formation time but variable current after plasma formation, allowing for modulated production rates with repeatable breakdown time. For alternating duty cycles $d_1$ and $d_2$, FIG. 20 shows $d_2$ modulated as a function of $d_1$ to maintain a constant $2^{nd}$ harmonic amplitude ($a_2$). The first harmonic amplitude ($a_1$) varies as a function of d1 and d2, allowing current to be modulated. FIG. 20 illustrates an exemplary graph of harmonic amplitude control, and FIG. 21 illustrates an exemplary graph of FFT of a simulated shaped-harmonic excitation waveform.

In some embodiments, a2 is elevated at the start of a plasma pulse to initiate faster breakdown but is reduced later in the pulse (after the plasma has formed) to allow higher values of a1 (since maximizing a2 necessarily limits a1 and vice-versa). This can be seen in the exemplary intra-pulse current modulation waveform of FIG. 22.

In some embodiments the circuit is operated using the parallel resonance and the primary resonance. In these embodiments, a1 is associated with breakdown time and a2 is associated with plasma current.

It must be noted that the fundamental harmonic approximation used to analyze the circuit produces inaccurate results when analyzing current modulation. This is because the resonant circuit does have finite impedance at frequencies other than its resonant frequencies. The fundamental component (a1) therefore does contribute some energy to producing plasma formation, while the second harmonic component (a2) does contribute some current after the plasma has formed. This is particularly important when using current modulation to reduce plasma current—the value of a2, combined with the tuning of the resonant circuit, results in a minimum current that can be produced. This can be seen in the exemplary intra-pulse current modulation waveform of FIG. 22. Close examination of FIG. 18 reveals that some tunings produce a greater change in impedance between the first and second harmonic frequencies, which allows a greater dynamic range of plasma currents for a given a2. However, increasing this differential generally means operating closer to primary resonance, which produces a trade-off between a particular circuit tuning's ability to support a large current turn-down ratio (with fixed a2) and its sensitivity to changes in operating frequency or component values.

Current modulation by shaping of the excitation waveform can result in significantly faster response times than can be achieved by varying the input voltage. The rate of change of the input voltage is limited by the capacitance of the power supply or input voltage pre-regulator, while wave shape can be adjusted at the resonant excitation frequency. By using wave shaping, the plasma current be modulated within each pulse of a pulse-modulated plasma. This is hereafter referred to as "intra-pulse current modulation." For example, current can be modulated synchronously with the location of the plasma within a gliding arc electrode to produce a current that is tailored to a particular gap length.

Figure 23:
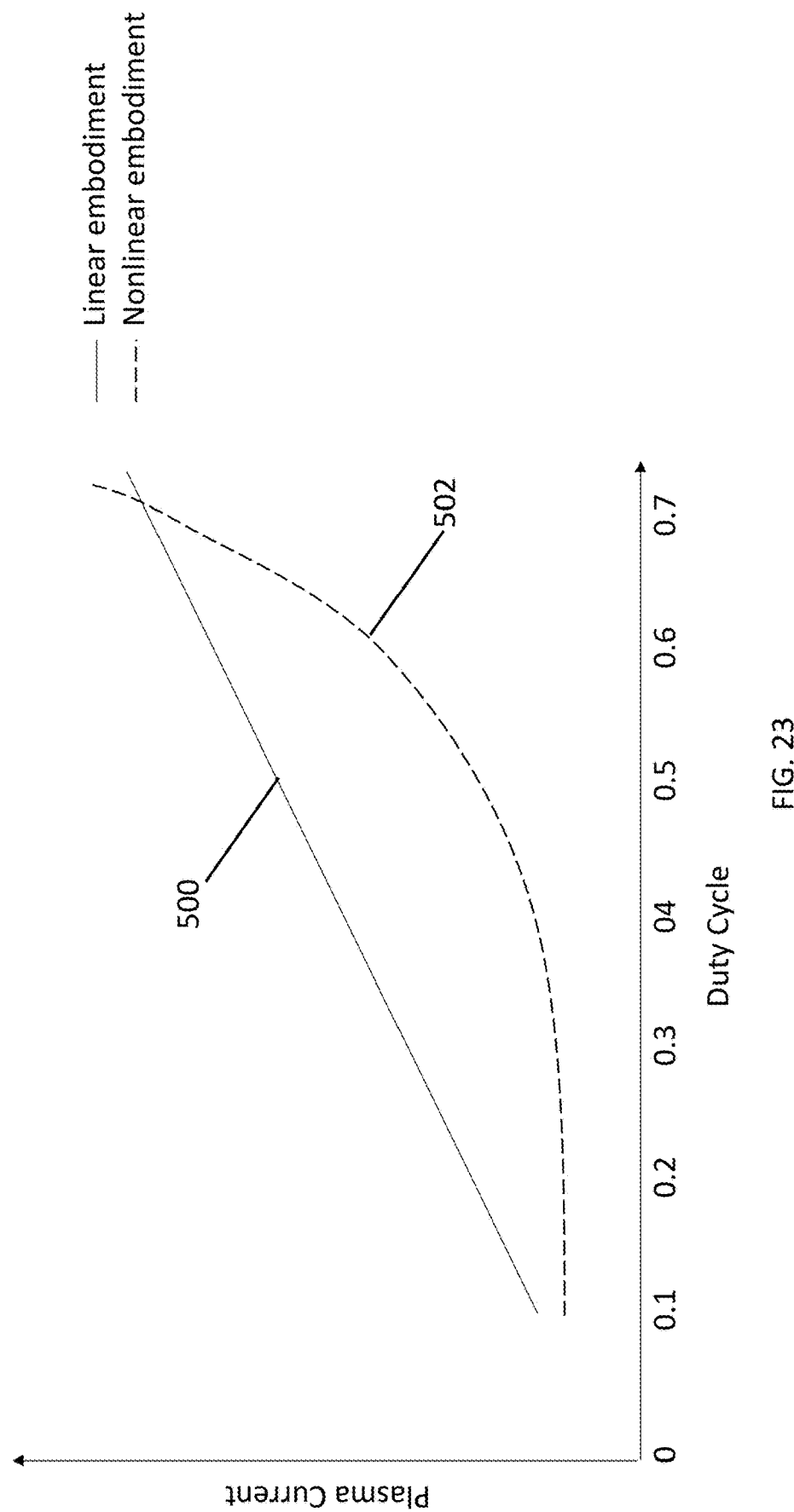
FIG. 23 illustrates an exemplary graph of two approaches to intra-pulse current modulation.

FIG. 23 depicts two approaches to intra-pulse current modulation. A solid line 500 shows a linear relationship between electrical discharge duty cycle (duration) and current through the discharge. A dashed line 502 shows a non-linear relationship between electrical discharge duty cycle and current. The non-linear design offers advantages in low end production resolution due the shallower slope at low duty cycles. The shallower slope results in smaller increments in production for a given increment in duty cycle. A corollary to this is that small deviations in duty cycle result in smaller changes in NO production when the dashed curve is used vs the solid curve, resulting in more stable NO production at low production levels Input Voltage Pre-Regulator In some embodiments, the input voltage pre-regulator serves two purposes. The first is to provide a consistent excitation voltage, independent of input voltage. The second purpose of the pre-regulator is to smooth the input power to the NO generator.

After plasma formation, the plasma current is approximately $I \approx V/Z$, where V is the excitation voltage and Z is the resonant circuit impedance, including the plasma impedance. The NO production control circuit can be supplied by a regulated DC power supply or by a battery, resulting in a wide input voltage range, so it is therefore necessary to pre-regulate the voltage to ensure consistent plasma current.

Figure 24:
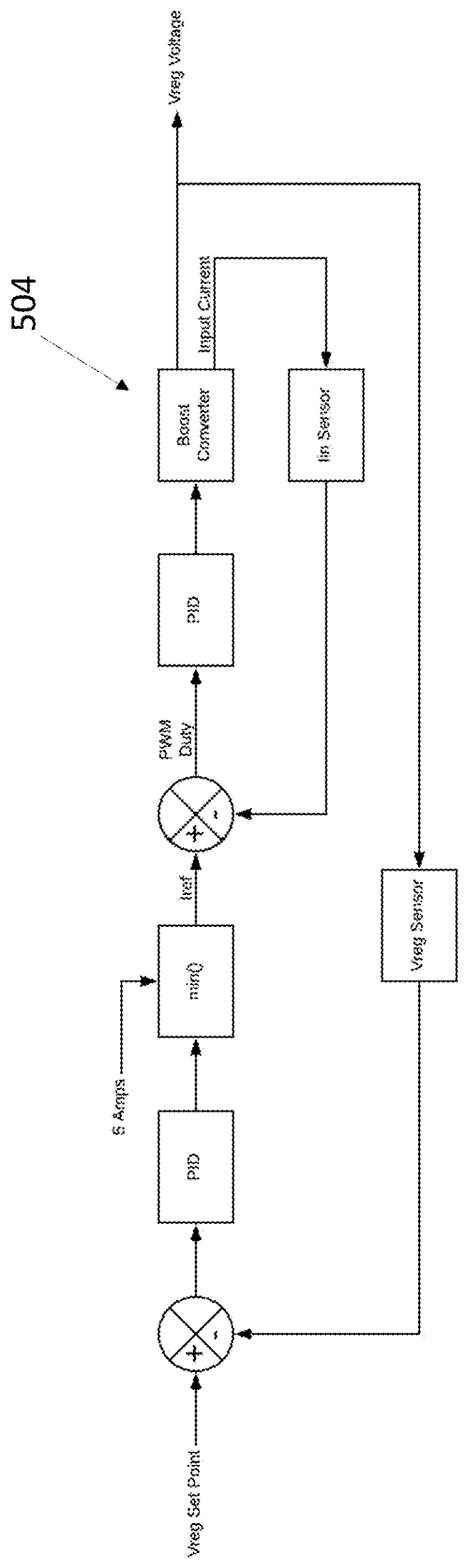
FIG. 24 illustrates an exemplary embodiment of a control system block diagram with an input voltage pre-regulator.

The NO production control circuit can be supplied by power sources with current limits, such as a battery or DC power supply. The instantaneous plasma power is high but the duty cycle is limited, so the NO production control circuit can trigger current limits even when the average power limit of the supply is not exceeded. A pre-regulator that provides tight voltage regulation will draw input power equal to its output power (plus losses) and thus will not prevent false-tripping of any input current limits. In some embodiments, the pre-regulator therefore utilizes a feedback loop which controls the average input current of the converter. The set point for this loop may be determined by an outer voltage loop. The converter employs a large output capacitance, capable of absorbing and supplying up to 50% of the pulse energy without significant voltage ripple, and the voltage loop bandwidth is tuned to be below the plasma pulse frequency. The result is that the pre-regulator acts as a ripple smoother. A control system block diagram 504 is shown in FIG. 24. An output voltage ("Vreg") is sensed and compared to a reference ("Vreg set point") to determine an error signal. The error is fed into a PID compensator to produce a current set point ("Iref"). The PID's output is clipped at a maximum current (in this case, 5 amps). The current set point is compared to a measured input current to create a second error signal that is fed into a second PID compensator to determine an operating duty cycle for a DC/DC boost converter. The physical plant ("boost converter") produces an output voltage ("Vreg voltage") and input current in response to this stimulus. The performance of the regulator can be observed from the input current waveform (CH4) shown in FIG. 26.

Plasma Intensity Control

Control of the plasma intensity is the primary means of controlling the nitric oxide production rate; in some architectures it is the only means. Plasma intensity can be controlled by excitation voltage modulation, resonant circuit excitation wave shaping, and/or pulse modulation.

Excitation Voltage Modulation

In some embodiments, plasma intensity can be modulated by varying the excitation voltage of the resonant circuit. This is accomplished by one or more of: (1) modulation of the DC input voltage to the half bridge and (2) resonant circuit excitation wave shaping.

Pulse Modulation

Figure 25:
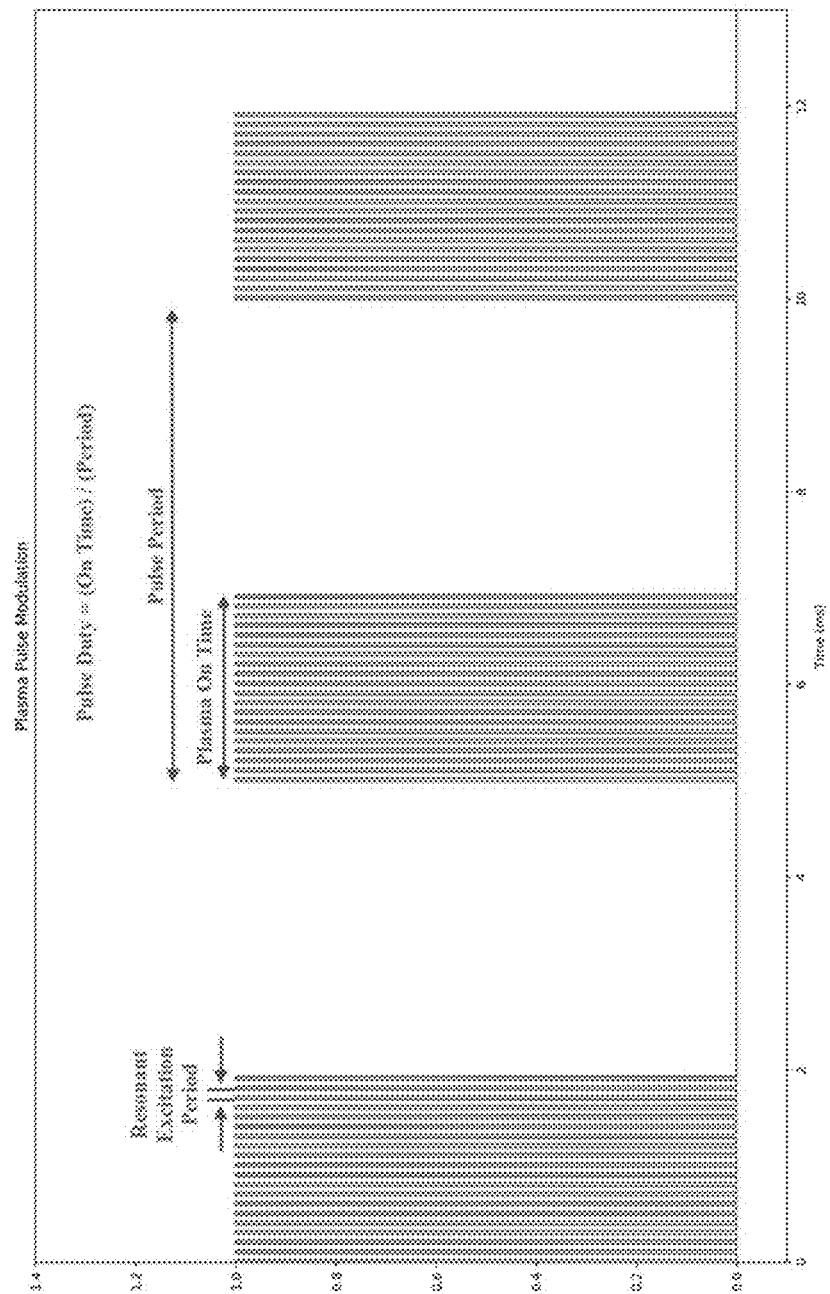
FIG. 25 illustrates an exemplary graph of plasma pulse modulation.

In some embodiments, the plasma is pulse modulated by enabling/disabling the half bridge resonant excitation at a modulation frequency that is below the operating frequency of the resonant circuit (see FIG. 25). Some examples of pulse modulation schemes that are applicable include pulse width modulation, pulse frequency modulation, and pulse grouping. For example, in some embodiments, the system nominally uses fixed frequency pulse width modulation with a 200 Hz pulse period. In some embodiments, the pulse frequency is selected to correspond to the time it takes the plasma to transit a gliding arc electrode.

In some embodiments, pulse modulation is the primary means of controlling the plasma. It provides a large dynamic range and high repeatability.

In some embodiments, such as when a digital controller is used, the plasma pulse width is adjustable over finite increments. For example, in some embodiments, the plasma pulse width can have 10 µs resolution.

In some embodiments, aliasing between pulse modulation frequency and the resonant excitation frequency can introduce some randomness into the quantity of NO produced for a given duration discharge. For example, if the resonant frequency is 50.02 kHz and a pulse is initiated every 5 ms, a 20 Hz alias appears. Each modulation pulse will start at a different point within the AC excitation waveform and the resulting impact on breakdown time and plasma duration will have a 20 Hz frequency. This effect is most pronounced when the modulation pulse width is short. In some embodiments, the magnitude of these variations may be decreased by increasing the AC excitation frequency, thereby discretizing the duration of the electrical discharge into smaller AC period-long increments. In some embodiments, the variation is eliminated by synchronizing the AC excitation frequency and the pulse modulation frequency. These improvements in pulse energy repeatability manifest as improvements in NO production consistency.

In some embodiments, synchronization is achieved by resynchronizing the AC frequency generator at the beginning of each modulation pulse. In other embodiments, synchronization is achieved by delaying the start of the modulation pulse until a particular point in the AC waveform.

Pulse Grouping

In some embodiments, production rate can be adjusted by grouping pulses. For example, the plasma can be pulse modulated at a fairly high frequency (≥1 kHz) for a finite number or "group" of pulses. This grouping is then repeated at a fixed or variable interval. The high pulse frequency, by preventing the ionized air from fully exiting the electrode gap, can shorten plasma formation times and therefore reduce ozone production (ozone rapidly combines with nitric oxide to form nitrogen dioxide). However, this approach is subject to the same minimum on time constraints as for simple pulse modulation. Thus, pulse grouping produces elevated temporal quantization of the product gas concentration, requiring a level of gas mixing downstream of the plasma chamber in some applications.

Dithering

In some embodiments, the plasma pulse width is adjustable over finite increments. The NO production control circuit also has a minimum pulse width that results in both plasma formation and a repeatable discharge duration, producing a minimum acceptable on-time and, therefore, a minimum production rate for a given pulse frequency.

To improve the effective resolution and turn-down of the NO generator, some embodiments employ a dithering algorithm to produce average production rates that are between two discrete values. For example, to achieve a production rate that is 10% of the way between two steps, the system will operate 9 out of 10 steps at the lower duty cycle and one step at the higher duty cycle. In some embodiments, one of the duty cycles is 0%. In some embodiments, the smallest non-zero duty cycle is determined by a minimum pulse width that produces a repeatable plasma duration after formation. In some embodiments, one of the duty cycles is 100%.

In some embodiments, the dithering algorithm is implemented by using a "demand" integrator and a "production" integrator. For computation interval, the desired production rate is added to the demand integrator while the expected production rate for the actual (quantized) duty cycle that just occurred is added to the production integrator. The controller determines an ideal duty cycle to set the desired production rate that is between two realizable (quantized) duty cycles. If the demand integrator is larger than the production integrator, the system will round up to the nearest duty cycle; otherwise it will round down.

The resolution limit to this dithering algorithm is a function of tolerance to error-in-time, as well as the extent to which diffusion will equalize the concentrations of nitric oxide within the stream of product gas.

Low Production Current Modulation

In some embodiments, a low production current modulation scheme can be used to overcome the temporal quantization issues of dithering at very low production rates. The system operates with one of two resonant excitation wave shapes: nominal and low-current. NO production rate is nominally controlled by plasma pulse width modulation. When production demand is sufficiently low, the excitation wave shape is switched to low current. In some embodiments this current modulation is combined with a dithering algorithm. Operating at reduced current has the effect of reducing the error-in-time of dithering at low production rates.

Inter-Pulse Current Modulation

In some embodiments, an inter-pulse current modulation scheme can be used such that the resonant excitation wave shape is modulated synchronously with the pulse modulation frequency and is determined as a function of modulation duty cycle, i.e. each duty cycle is associated with a specific wave shape. In some embodiments, where the modulation frequency is variable, the wave shape is a function of the modulation frequency. Unlike the low-production current modulation, this produces a continuous transfer function with a single independent variable (duty cycle or frequency) for the control system to adjust. The shape of the current vs. duty cycle curve can be adjusted/fine-tuned to produce the optimum resolution (ulpm per step, or % per step) that maximizes the dynamic range of the NO generator. Example inter-pulse current modulation curves are shown in FIG. 23. The relationship can be linear (solid line), second order (dashed line), exponential or a fully custom function.

In some embodiments, dithering of inter-pulse current is inherently coupled to dithering of pulse duty cycle because the excitation wave shape is a function of duty cycle. In some embodiments, pulse current is adjusted independently of modulation pulse width to produce finer resolution of production rate control. For example, 10 finite currents can be used to produce 10, linearly varying, discrete production rates between the production rates associated with discrete pulse widths of 80 µs and 90 µs to produce a 10× improvement in production rate resolution. In some embodiments, the excitation wave shape is continuously variable. In some embodiments, a finite number of discrete wave shapes is used. In some embodiments, a dithering algorithm is used to explicitly modulate between two or more discrete excitation wave shapes that produce different plasma currents to improve the production rate resolution further.

Intra-Pulse Current Modulation

Figure 22:
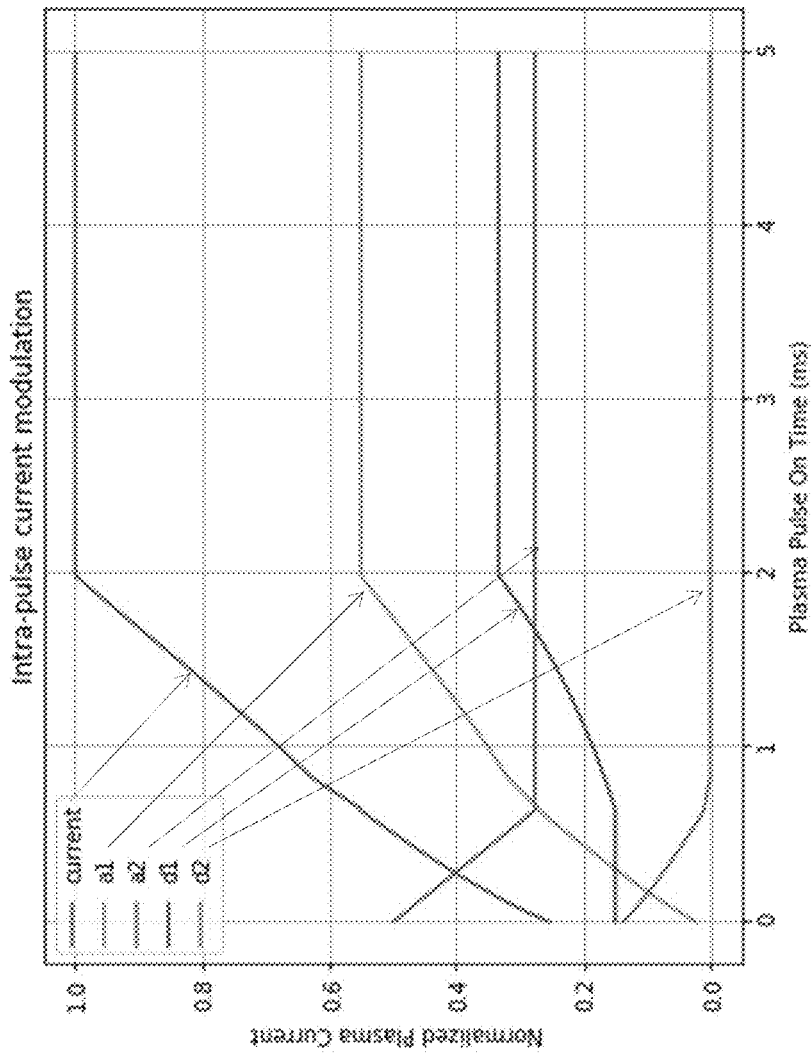
FIG. 22 illustrates an exemplary graph of an intra-pulse current modulation waveform.

In some embodiments, the resonant circuit excitation wave shape is adjusted dynamically throughout each plasma pulse to produce intra-pulse current modulation. Current is therefore a function of time since the start of the pulse. This is particularly applicable to gliding arc electrodes, where the use of a low current limits erosion/heating in the small gap at the base of the electrode while higher currents provide plasma stability and increased production in the larger gaps. This also increases the dynamic range of the system by ensuring that short pulse widths, which are associated with low production rates, have low plasma intensity and therefore high resolution (small change in production per change in time) while long pulse widths, which are associated with high production rates, end with high plasma intensity and therefore maximize production within a finite time window. In some embodiments, the second harmonic excitation voltage (a2) is held constant while the first harmonic excitation voltage (a1) is varied. In some embodiments, the second harmonic excitation voltage (a2) is also varied, either to produce a lower overall current and/or to produce a faster breakdown/plasma formation time. FIG. 22 shows a case where a2 is high at the start of the pulse to produce faster breakdown but is reduced later in the pulse to allow higher values of a1.

In some embodiments, when a dithering algorithm is applied in conjunction with intra-pulse current modulation, the plasma current ramp profile remains a fixed function of the time since the start of the modulation pulse. A combination of short pulse widths and low current at the start of the ramp profile can be used to achieve very low levels of NO production (e.g. <1 ppm·lpm). In some embodiments, different plasma current ramp profiles can be used to produce finer production rate resolution between two discrete modulation duty cycles or modulation pulse frequencies. In some embodiments, a dithering algorithm selects between two or more discrete plasma current ramp profiles to produce finer production rate resolution. In some embodiments, a discrete number of ramp profiles is used. In some embodiments, the ramp profile is continuously variable.

Figure 26:
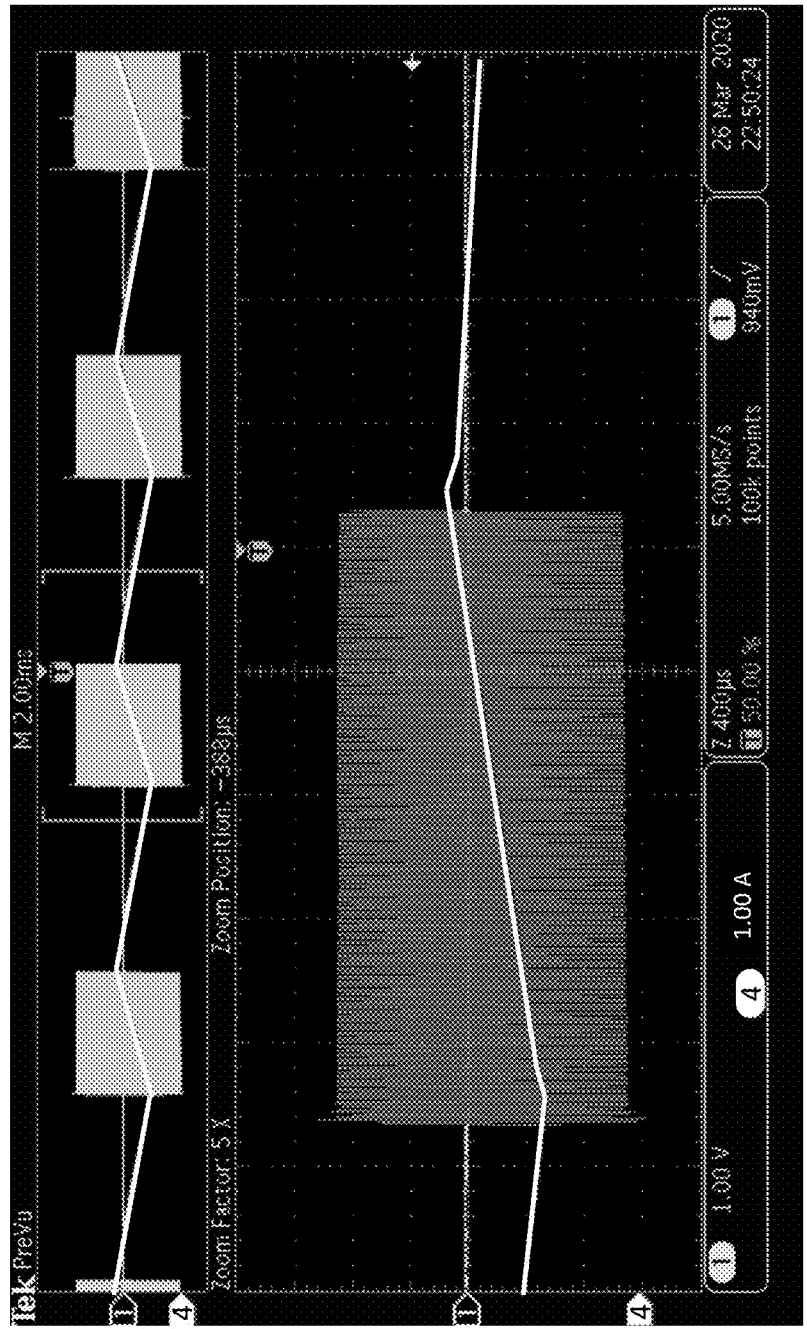
FIG. 26 illustrates an exemplary graph showing transformer primary current sense and input current for one pulse with fixed excitation.
Figure 27:
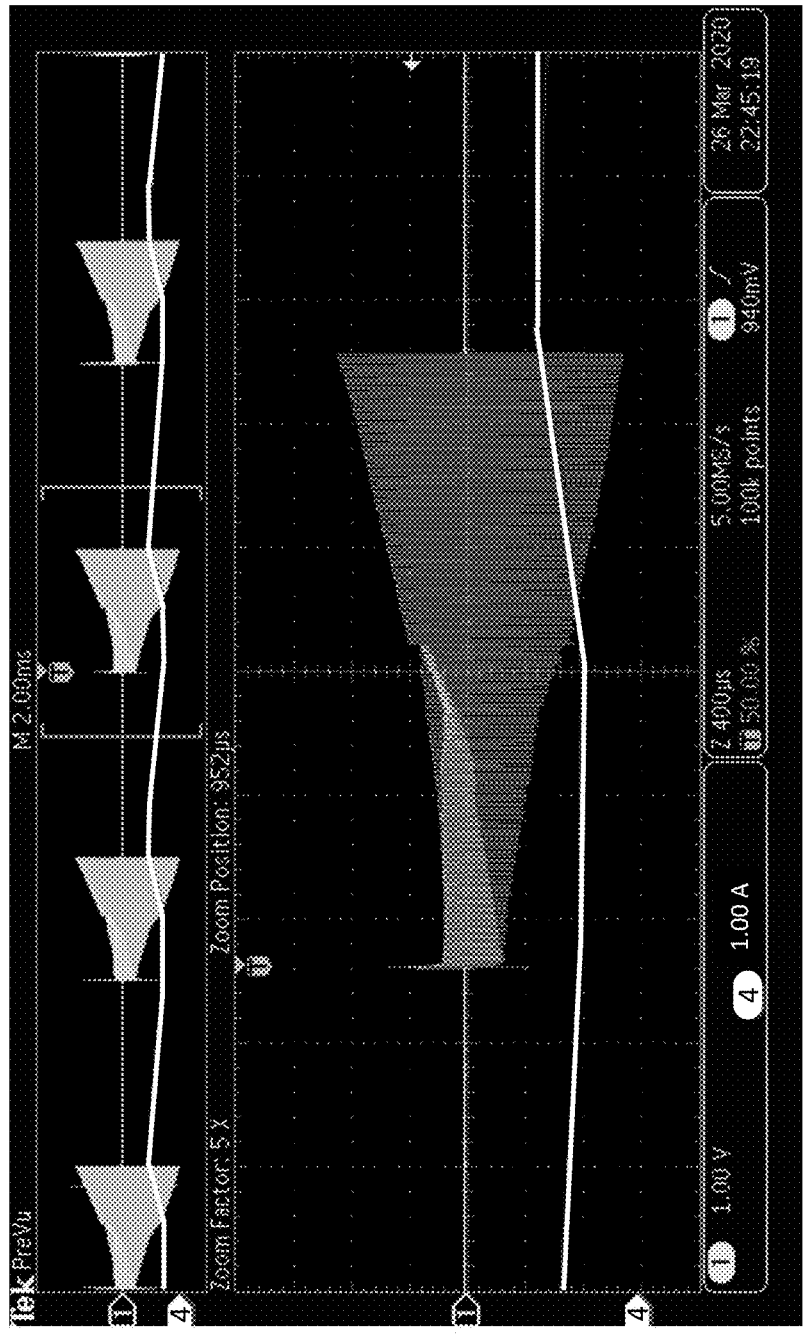
FIG. 27 illustrates an exemplary graph showing transformer primary current sense and input current for one pulse with intra-pulse current modulation.

In some embodiments, the circuit detects plasma formation and adjusts its excitation frequency and/or modulation duty cycle (i.e. the duration of the subject discharge) and/or excitation wave shape and/or plasma current ramp profile after plasma formation. In some embodiments, plasma formation can be detected by measuring and recognizing a high dv/dt in the secondary voltage, a high di/dt in the secondary current, or a change in resonant circuit operating frequency from the second harmonic to the fundamental, as shown in FIG. 26 and FIG. 27. In some embodiments, electrical breakdown takes longer than expected and a NO generator delivers more current to the electrode gap to make up for lost discharge time within a specific discharge.

Nozzles

Figure 28C:
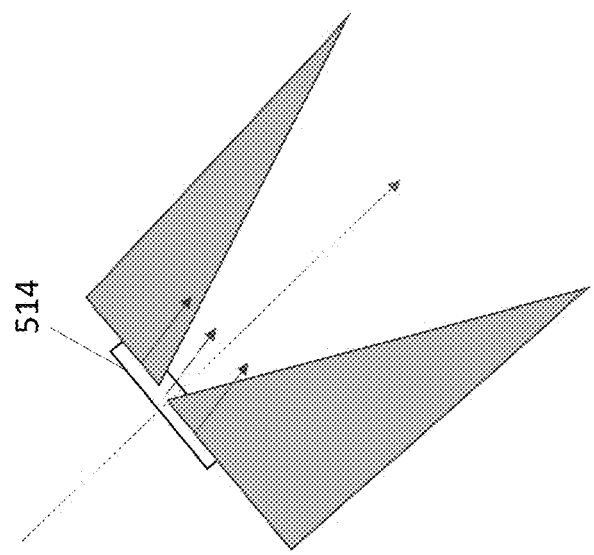
FIG. 28A, FIG. 28B, and FIG. 28C illustrate embodiments of a nozzle for directing reactant gas towards one or more electrodes.

One or more nozzles can be used to direct reactant gas through an orifice or nozzle towards one or more electrodes. In some embodiments, the nozzle 510 is a circular hole, which can help with machineability, however can generate a non-uniform flow velocity pattern as shown in FIG. 28A. The velocity of gas exiting a circular nozzle is greatest at the center of the flow and approaches zero at the edges. As reactant gas moves away from the nozzle, the central flow of reactant gas travels further than the periphery in time. This discrepancy in gas velocity can stretch a plasma arc as it glides, ultimately leading to collapse of the arc.

Figure 28B:
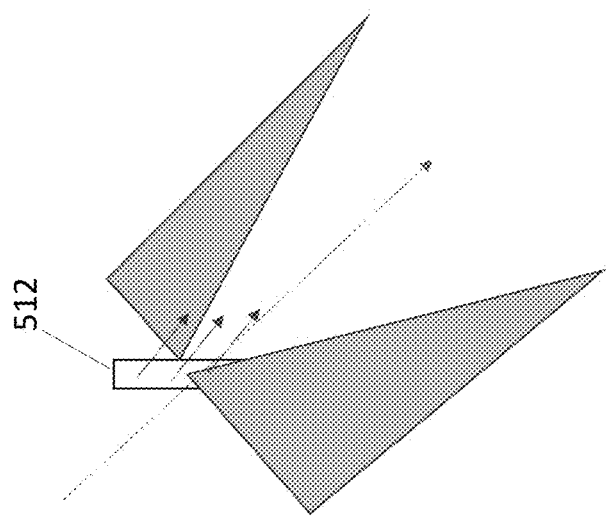
Figure 28A:
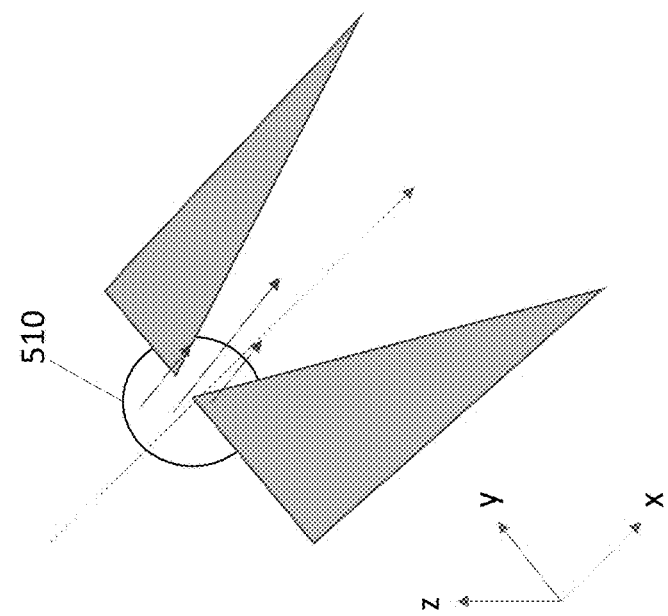

In some embodiments, the nozzle 512 is shaped like a slit, as shown in FIG. 28B. A slit provides more uniform flow in the long dimension of the slit than a circular nozzle, but flow in the narrow dimension of the slit is more narrow and has a steeper gradient. Uniformity of flow in one dimension can be useful when flowing reactant gas into a plasma chamber. In some embodiments, the slit is oriented orthogonal to the plane of gliding arc electrodes providing uniform velocity patterns in the z-axis, as defined by FIG. 28B. This eliminates sensitivity of NO production to manufacturing variation in the elevation of the electrodes with respect to the reactant gas source. In some embodiments, the slit has variable width to enable a system to adjust reactant gas flow characteristics to optimize NO production. In some embodiments, the system can change the slit width mid-treatment as a function of duty cycle and/or NO production level. In some embodiments, the slit is comprised of a duckbill valve that creates a wider slit with increases in reactant gas flow rate. In some embodiments, depicted in FIG. 28C, a slit-shaped nozzle 514 is oriented with its long axis in the plane of gliding arc electrodes. This approach provides more uniform flow of reactant gas across the electrode gap, thereby reducing stretching of the arc to provide longer glide paths with greater precision. Having the slit-shaped orifice parallel to the electrodes also decreases sensitivity of NO production to manufacturing variance in the right to left positioning of the nozzle and orientation of the nozzle with respect to the electrode gap in the plane of the electrodes. Stretching of the arc is most evident during long duty cycles when the gap increases and gas velocity within the plasma chamber becomes less uniform.

Product Gas Flow Control

Product Gas Humidity Measurement

A humidity sensor within the recirculation loop can be utilized to determine the status of the soda lime of a scavenger in the system. Soda lime requires water to absorb $NO_2$ and convert it. Soda lime typically is comprised of 15-20% water content when new. As the soda lime dries out, there is less water content to capture $NO_2$, resulting in a decreased capability to remove $NO_2$ from the product gas stream. In some embodiments, a NO system uses one or more of the ambient humidity, ambient pressure, ambient temperature, and recirculation loop humidity, recirculation loop temperature, recirculation loop pressure to determine status of scrubber water content. In some embodiments, a product gas humidity measurement is also used for compensation of the product gas NO measurement with respect to humidity.

Environmental Compensation for NO Dose Control

In some embodiments, humidity or other environmental factors can be used as input into the control algorithm. In some embodiments, the system compensates the influence of environmental factors such as ambient temperature, reactant gas humidity, reactant gas temperature, electrode temperature, and reactant gas pressure. The system can measure each of these parameters directly using dedicated sensors or may infer indirectly using other sensors and known physical properties of the system. In some embodiments, a system model consisting of regression equations and/or lookup tables determines a correction factor for the target production rate as a function of environmental factors. In some embodiments, a system model consisting of regression equations and/or lookup tables determines the NO production rate as a function of the environmental factors and a plasma operating point that consists of at least one of plasma duty cycle, frequency, dithering, and/or current. A target production rate and measured environmental conditions are then used to determine the corresponding plasma operating point.

NO Delivery Constraints

A NO delivery system injecting a fixed concentration product gas into a dynamic ventilator flow must meet certain flow response time requirements in order to produce a stable dose concentration. In some embodiments, the concentration may be permitted to deviate from the target concentration by 20%. In some embodiments, up to 10% of the volumetric duration of the breath may be permitted to be up to 150% or 0% of the target concentration. In some cases, this necessitates that an injector flow controller track the ventilator flow with a latency of at most 25 milliseconds. For example, 10% of the tidal volume will pass the injector in 25 ms for an adult patient with a peak inspiratory flow of 120 LPM and a tidal volume of 500 ml.

In some embodiments, a nitrogen dioxide scrubber has a flow restriction and dead volume that has the effect of low-pass filtering a reactant gas flow. In some embodiments, the time constant of this filtering is significantly longer than 25 milliseconds. This limits the ability of some linear architectures to meet flow response time requirements. In some embodiments this is mitigated by locating an injector flow controller downstream of the scrubber. In some embodiments this is mitigated by using a constant pressure drop flow divider to allow the scrubber to operate at a constant flow, independent of variations in injector flow. By having scrubber flow already established at the time of the inspiratory event, some architectures are able to respond more quickly with proportional NO flow.

NO Loss

The amount of NO produced in a plasma chamber is often not the amount of NO available at an injector. This can be caused by various factors, including but not limited to NO oxidation between the plasma chamber and injector, wash-in and wash-out effects of the pneumatic circuit (i.e. absorption of NO into the walls of the pneumatic pathway), and reactions with a scrubber material. In some embodiments, a NO generation system compensates for anticipated loss of NO by producing additional NO within the plasma chamber. This compensation can be a function of one or more of the product gas NO concentration, product gas temperature, product gas pressure, product gas flow rate, volume between plasma chamber and injector, scrubber interaction with NO, oxygen concentration in the reactant gas, oxygen concentration in the product gas, and $NO_2$ concentration. Increases in NO concentration relate to increased oxidation and absorption of NO into the pneumatic circuit materials. Increases in product gas pressure result in increased interaction between NO and $O_2$ in the product gas, resulting in increased NO loss. Increases in product gas flow rate produce increases in pressure due to the flow restriction of the system but also decrease transit time. Increases in the volume of the pneumatic circuit between plasma chamber and injector relate to increased transit time and greater NO loss due to oxidation. Increases in $O_2$ concentration within the product gas result in greater NO to $O_2$ interaction and NO oxidation. In some embodiments, it is assumed that equal amounts of NO and $NO_2$ are absorbed by a scrubber.

Computational feed forward algorithm can be based on one or more of the following parameters: production byproducts, environmental factors, NO oxidation models. etc. In a recirculating architecture, a product gas concentration, flow rate, and pressure may be constant. In some embodiments a feed-forward may subtract a predicted $NO_2$ production rate from a predicted NO production rate to compensate NO absorption by a scrubber. In some embodiments, a gas-phase oxidation model can be used to predict additional NO loss due to oxidation. In some embodiments, the estimated product gas NO level may be further compensated by assuming that $NO_2$ resulting from oxidation will cause a scrubber to absorb more NO.

In some embodiments, the NO absorption rate of a scrubber is characterized as a function of input NO concentration, input $NO_2$ concentration, temperature, and humidity. A feed-forward compensator uses this characterization to predict NO absorption based on the measured or modeled operating point of the system.

NO Production with High Efficiency

Figure 29:
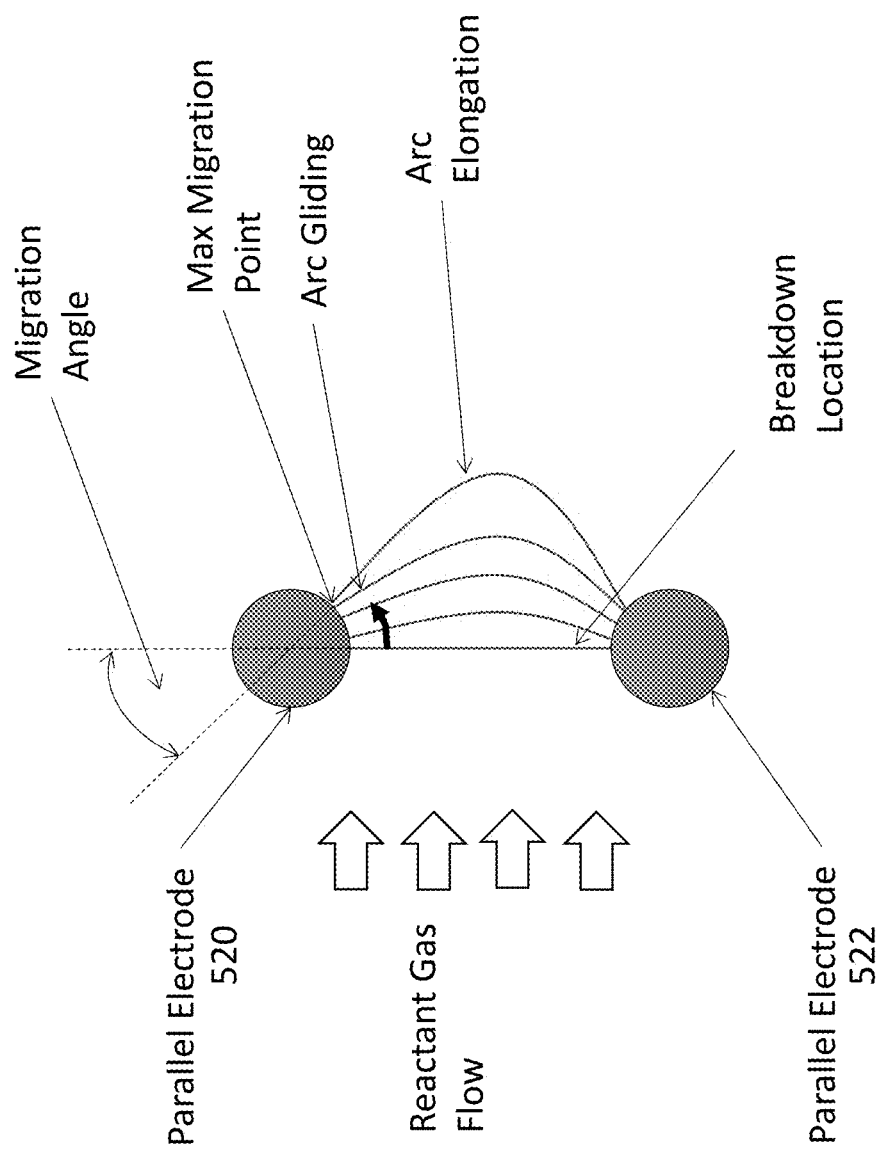
FIG. 29 depicts arc gliding and stretching with a parallel electrode.

Large electrode gaps produce NO with high electrical efficiency (ppm·lpm/watt) but require high breakdown voltage to initiate the electrical discharge. In some embodiments, a smaller break down gap is utilized to facilitate electrical break-down in combination with a high reactant gas velocity to elongate the arc, as shown in FIG. 29. The initial electrical discharge occurs between the shortest to points between the electrodes 520, 522 in a straight line. FIG. 29 depicts the arc location and shape over various time points during a single electrical discharge. Once the arc is established, sufficient reactant gas velocity and discharge duration (i.e., duty cycle) can cause the arc to migrate downstream along the electrode surface with increases in arc length from arc bending and more distant attachment points, as shown in FIG. 29. In some embodiments, reactant gas flow rates of 1-2 m/s are sufficient to make the arc migrate on the surface of the electrode. Depending on the arc length, discharge duration and reactant gas velocity, the arc will reach a maximum migration point and continue to elongate, stretched by the reactant gas flow. In some embodiments, the arc migrates from a initial small gap location (0° angle) to a maximum migration angle of 45°, as shown in the figure. These increases in arc length improve NO production efficiency. In one parallel electrode embodiment designed for low NO production with high electrical efficiency, an electrode gap of 2 mm was utilized with a reactant gas flow rate of 0.15 LPM to achieve a NO production efficiency (>80 ppm·lpm/W) in the target continuous production range (30 to 1000 ppm·lpm).

The arc stretching effect creates plasma arc lengths that are longer than the actual electrode gap. Hence, an electrode assembly with smaller gap electrode can be made more electrically efficient by "arc bending" through the use of higher reactant gas flow velocity, thereby effectively increasing the arc length of the plasma. Flow velocity affects the bend rate but not the flow rate. For example, a 1 mm gap and an air velocity of 7 m/s can generate more than 500 ppm·lpm with a flow rate of 0.15 l/mn, and the velocity can be controlled with a lower nozzle diameter. There are two ways that an arc can extinguish: 1) active shut off of the arc or 2) passive shut off as the arc elongates to a length that cannot be supported. Passive shut-off introduces variability into the NO production levels since every arc will terminate after a different duration. Active shut off, as can be done by applying an appropriate duty cycle to the high voltage, provides precise arc travel and elongation between discharge events for tighter control of NO production.

Figure 30C:
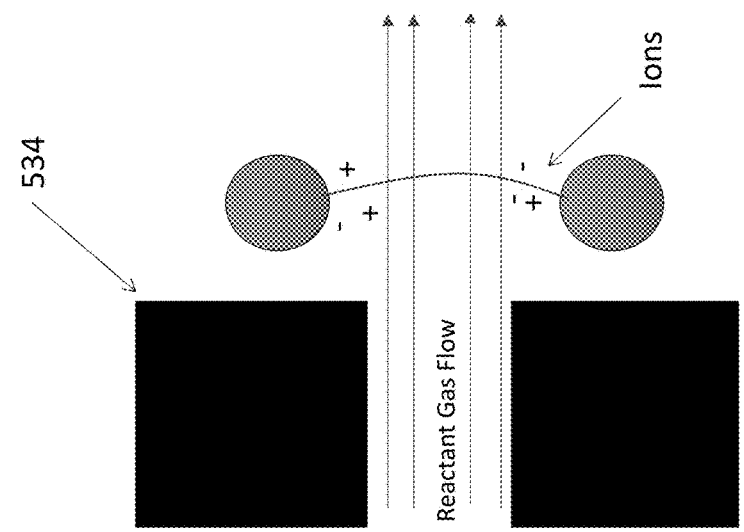
FIG. 30A, FIG. 30B, and FIG. 30C depict the effects of nozzle size on gas flow through an electrode gap.
Figure 30B:
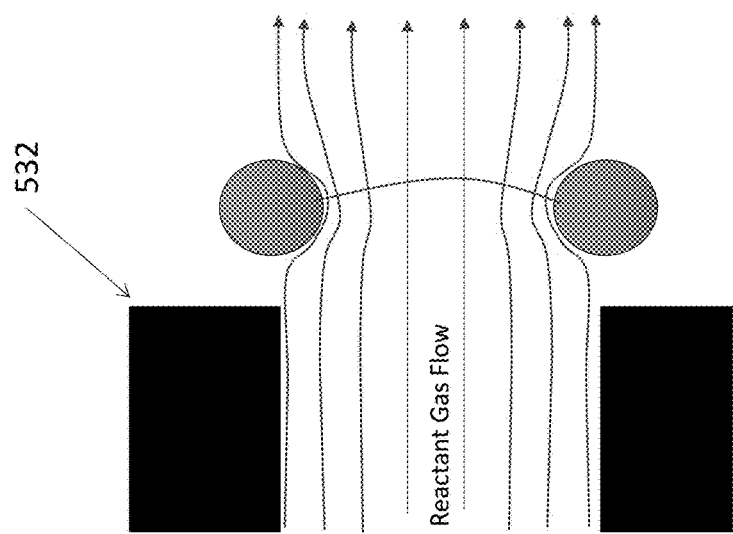
Figure 30A:
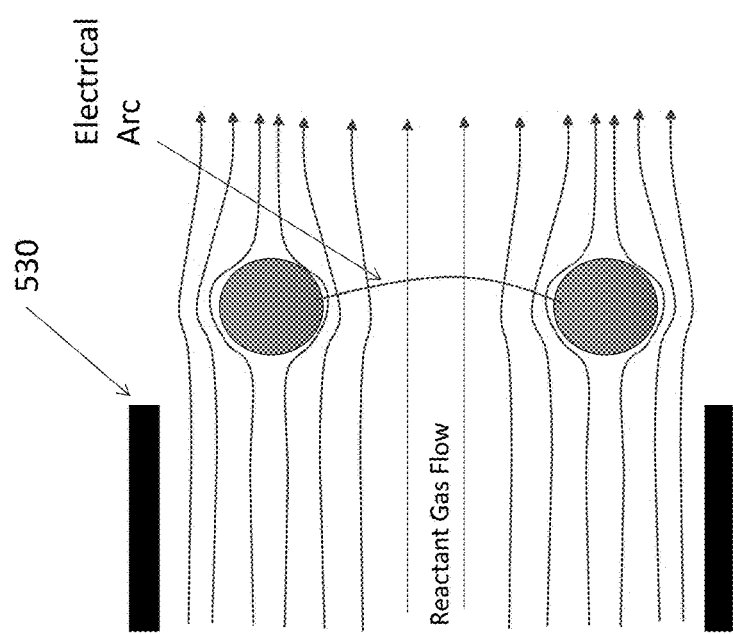

Nozzle size contributes to NO production efficiency as well, as shown in FIG. 30A, FIG. 30B, and FIG. 30C. FIG. 30A depicts a large nozzle 530 providing reactant gas to a parallel electrode pair. The reactant gas travels at slow velocity above and below the electrode gap with only a portion traveling through the electrode gap and electrical arc. This approach can be useful for achieving low production levels. FIG. 30B depicts an embodiment with a nozzle 532 that is slightly larger in diameter than the electrode gap. The majority of reactant gas flows through the electrode gap and interacts with the plasma resulting in high NO production efficiency. FIG. 30C depicts a design where a diameter of a nozzle 534 is less than the electrode gap resulting in higher gas velocity and less plasma/gas interaction. The higher velocity causes earlier arc bending and earlier arc collapse as compared to the prior to examples. However, the ions from the plasma within the gap are not as quickly flushed out of the gap in the embodiment depicted in FIG. 30C, resulting in lower break down voltages and faster breakdown. In some embodiments, a circular nozzle with an orifice size slightly greater than the electrode gap size was found to be optimal for NO production efficiency as the entire plasma arc length was being used to convert reactant gas to product gas.

In some embodiments, reactant gas velocity within the electrode gap is kept at a low enough flow rate that the arc does not glide or elongate, thereby improving the precision of production control. In one nozzle and plasma chamber embodiment, low reactant gas flow rates (e.g., 0.15 lpm) result in low reactant gas velocity (e.g., <1 m/s) resulting in a "straight" plasma arc.

Electrode Design

Electrode Materials

Electrodes are typically constructed entirely or in part with an electrically-conductive material. In some embodiments, electrodes are constructed from ruthenium, a metal with high melting temperature. Ruthenium can be used as an electrode material in its pure form but can also be alloyed with other materials to improve properties such as oxidation resistance, machineability, and cost. In some embodiments, ruthenium is alloyed with one or more of titanium, platinum, and palladium. In some embodiments, some or all of the electrode is coated with ruthenium or an alloy containing ruthenium. Other materials within the platinum metal group, namely ruthenium, rhodium, palladium, osmium, iridium, and platinum, can serve as electrode materials. In some embodiments, platinum group metals are alloyed with iron or other metals to make the resulting material magnetic. This property facilitates removal of sputtered electrode materials from a gas stream using a permanent or electro-magnet.

Parallel Electrodes

Figure 31:
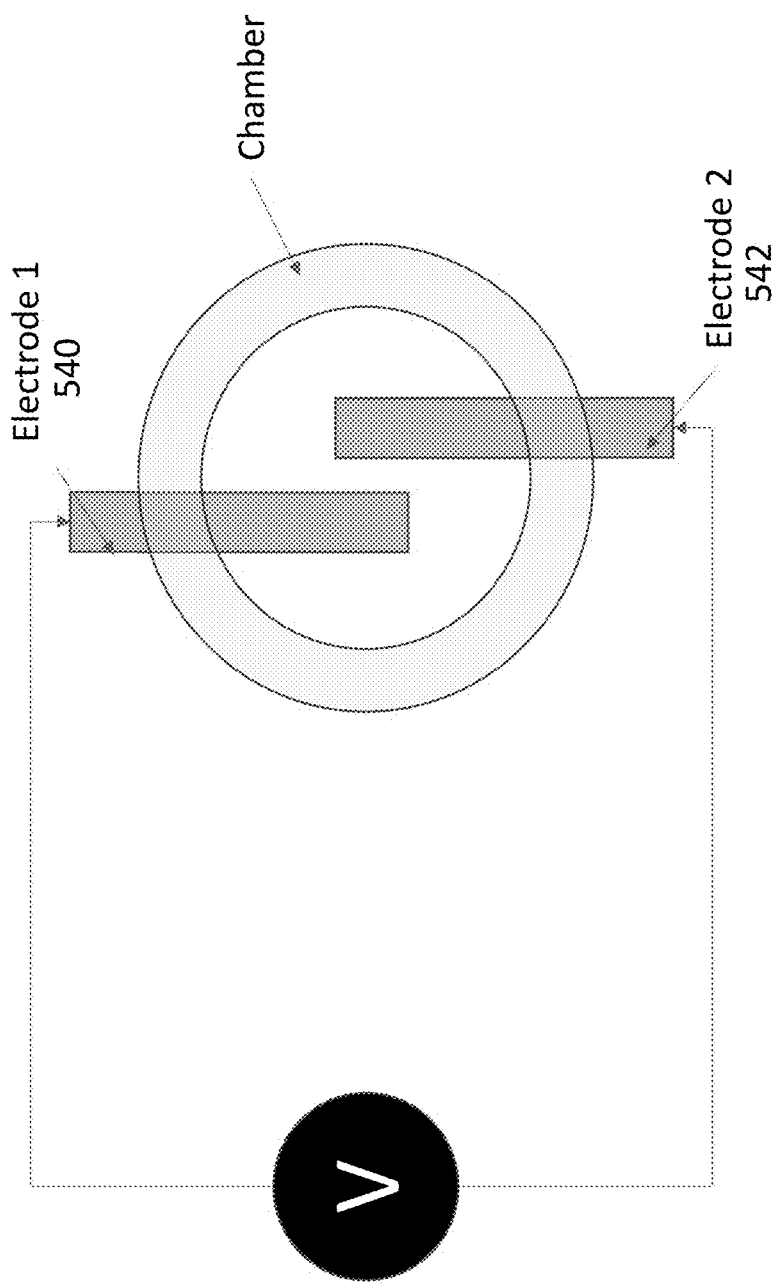
FIG. 31 illustrates an exemplary parallel electrode mounted in a plasma chamber.
Figure 33D:
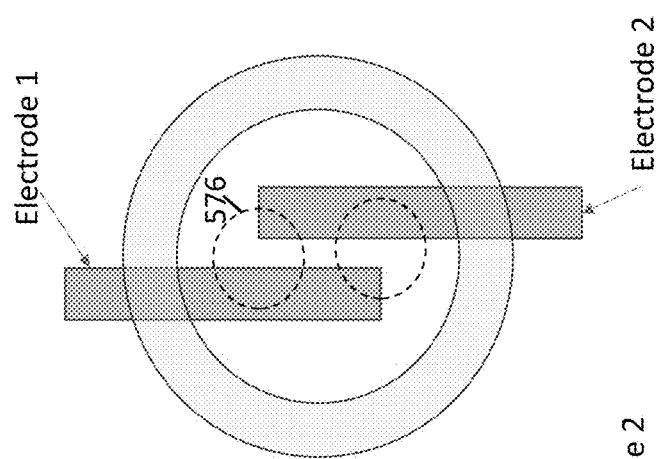
FIG. 33A, FIG. 33B, FIG. 33C, and FIG. 33D illustrate exemplary nozzle shapes and their alignment with the parallel electrode gap.
Figure 33C:
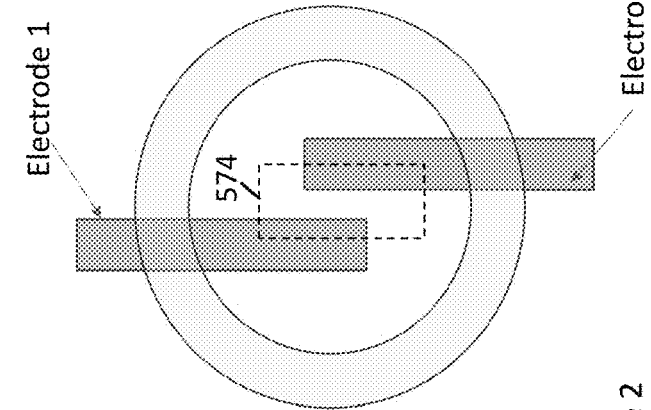
Figure 33B:
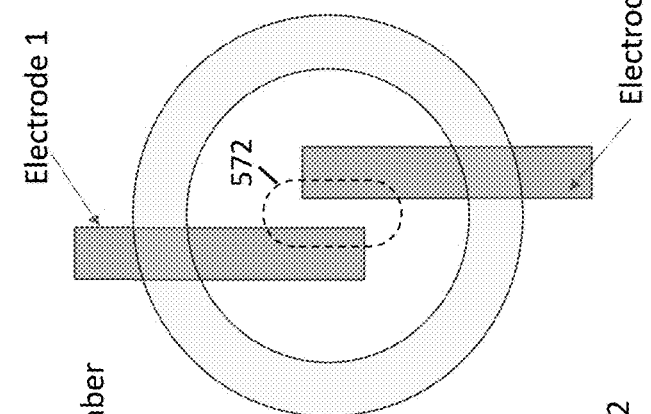
Figure 33A:
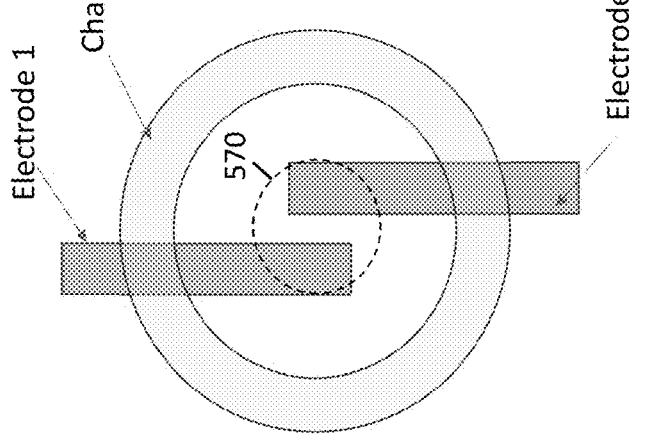

A parallel electrode design involves two or more electrodes that overlap with a gap in between them. When AC voltage is applied, arcing occurs in more than one location due to the concentration of the electric field and propensity to break down. FIG. 31 depicts an exemplary parallel electrode design with electrodes 540, 542. The electrode gap can be established by machining of the chamber, rather than insertion depth of the electrodes. Also, the overlap of the electrodes is a variable. In some embodiments, the overlap is equal to the diameter of the electrodes, providing a more focused area of arcing. This can be used for focusing reactant gas and increasing gas/plasma interaction. In some embodiments, the overlap between electrodes is many times longer than the rod diameter to provide greater surface area for longevity. When utilized with AC Voltage, breakdown occurs between the point/end edge of one electrode to the side of the other electrode and vice versa roughly equal amounts of time, providing a level of electrode redundancy. The asymmetry (point/edge on one side and plane/surface on the other side) of the parallel electrode design causes there to be a lower break down voltage from end to side than from side to end. The shape of the electrodes can vary. For example, the electrodes themselves can be circular cross-section rods that have a cross-section or another shape.

In some embodiments, parallel electrodes have non-uniform profile on their sides, as shown in FIG. 32A and FIG. 32B, for improved production stability. NO production stability is a function of arc length. By altering the side profile of the rod, the location of arcing can be focused to a more discrete region, thereby limiting the length of arcs. In FIG. 32A, arcing occurs from the tip of one rod 550 to the side of another rod 552. By removing material on the side of the rod, the location of arcing can be focused. In FIG. 32B, a similar approach is achieved by sliding a bead 558, 560 down the electrode rod 554, 556 to create a bulged profile. Arcing occurs from the tip of one rod to the bulged side of the other electrode. In some embodiments, the bead and the rod are different materials selected for their performance as anode and cathode, respectively.

In some embodiments, a manufacturable parallel electrode design can be provided. In some embodiments, a parallel design does not have a nozzle to focus reactant gas. In some embodiments, parallel electrodes are simply embedded in the wall of a tube. In some embodiments, nozzles are used to improve the stability and quantity of reactant gas flow across both arcing locations. FIG. 33A, FIG. 33B, FIG. 33C, and FIG. 33D depict various exemplary nozzle shapes 570, 572, 574, 576. Nozzle shape and size can have an impact on the flow stability and velocity at the electrodes. The multi-nozzle design shown in FIG. 33D directs gas at the discrete arcing locations at the ends of the electrodes.

Figure 34:
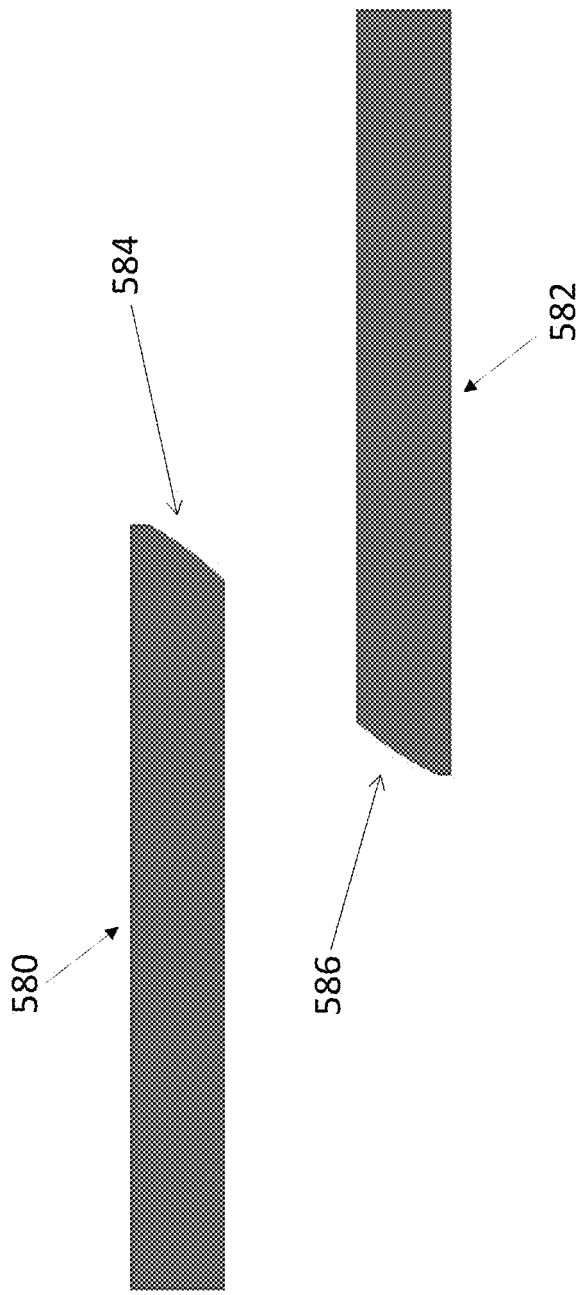
FIG. 34 illustrates an exemplary embodiment of electrodes that are pre-shaped to simulate the shape of a worn electrode.

As a parallel electrode wears, the end of the electrode erodes, changing the shape of the electrode. In some embodiments, the end of the parallel electrode is formed during manufacturing to resemble the shape of a worn electrode. FIG. 34 depicts a parallel electrode pair 580, 582 with exemplary shaping 584, 586. This approach can provide benefits in NO production consistency over the service life of an electrode pair. Power consumption of the plasma will also be more consistent, allowing power as a proxy for plasma generation to be more easily used as a feedback parameter for closed loop control. A pre-shaped electrode end profile can also reduce particulate generation and electrode sputtering by slowing the rate of erosion. This approach also reduces the break-in period of an electrode, the amount of NO production and/or time required for a new electrode to start producing consistent amounts of NO for a given plasma setting. In some embodiments, a NO generator compensates for the initial break-in of an electrode assembly by varying plasma parameters to achieve target NO production levels while an electrode wears and/or breaks in. In some embodiments, electrode break-in compensation consists of utilizing a look-up table to determine a NO production correction factor based on the cumulative run time of an electrode and/or the cumulative NO produced by an electrode. The NO production correction factor can be multiplied with a plasma parameter (frequency, duty cycle) to compensate for the age of the electrode.

Figure 35:
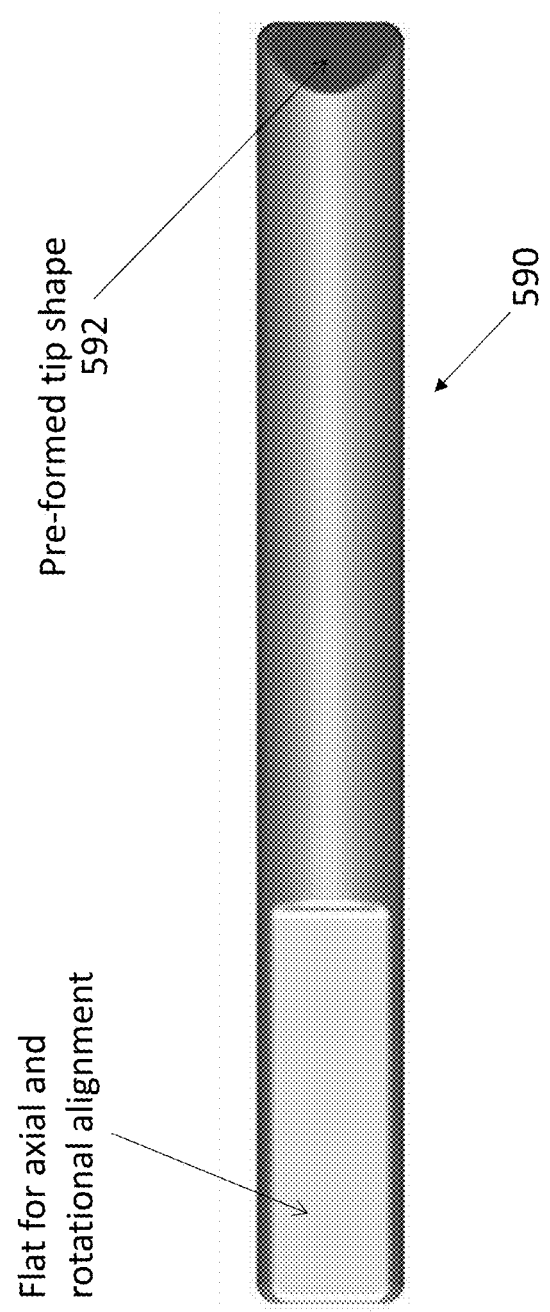
FIG. 35 depicts an electrode with features to reduce wear and facilitate alignment.

FIG. 35 depicts a single electrode 590 from a parallel electrode design. The tip of the electrode 592 is pre-formed in the shape of a worn electrode to reduce break-in time and improve consistency of production during its service life. The other end has a flat surface machined into it. This surface is keyed to align the end feature with the plasma path direction (i.e. orient the electrode rotationally with respect to the electrode gap) when mounted into an electrode chamber.

Figures 36A, 36B:
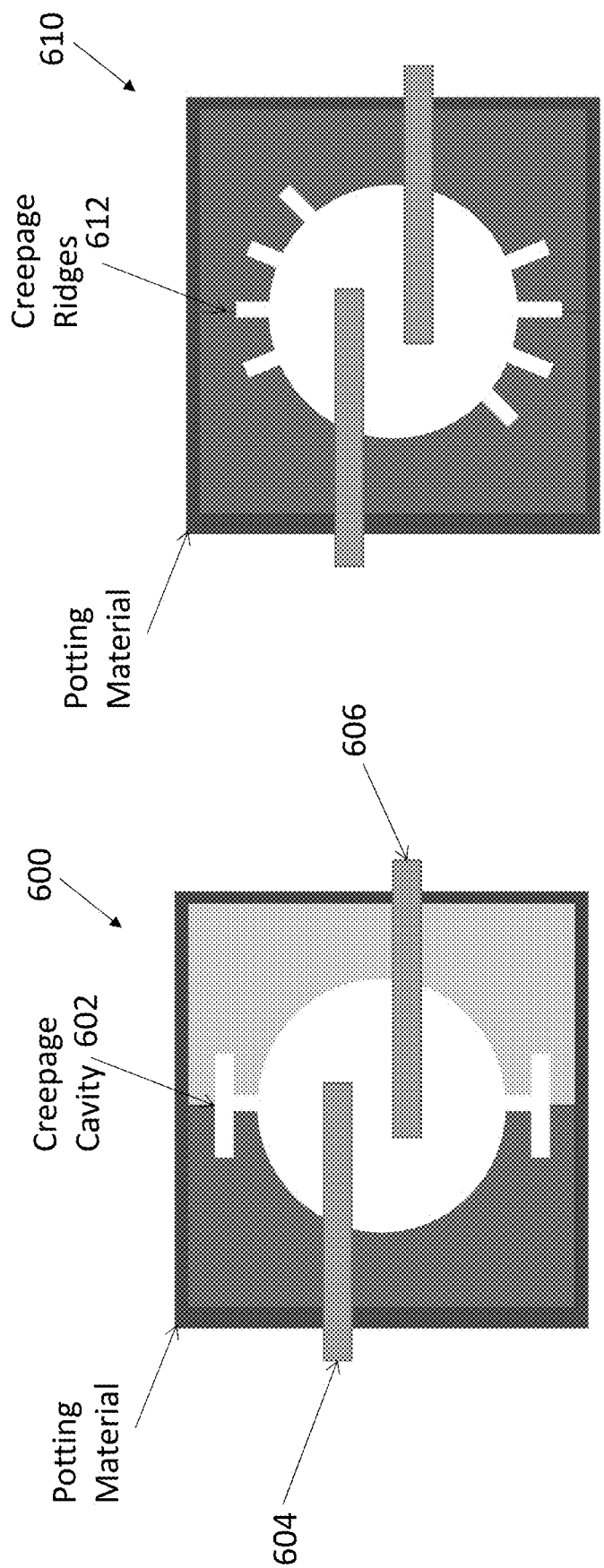
FIG. 36A depicts an exemplary embodiment of a split plasma chamber with creepage cavities.
FIG. 36B depicts an exemplary embodiment of a plasma chamber with ridges on the internal surfaces to increase creepage distance.

FIG. 36A depicts the cross-section of a split plasma chamber 600. The interface between the two halves of the chamber includes a creepage cavity 602 to increase the surface distance from one electrode 604 to the other electrode 606. The two halves of the chamber can be held together in many ways including but not limited to threaded fasteners, adhesive, thermal bonding, clamps, or external potting material (shown). FIG. 36B depicts a parallel electrode plasma chamber 610 with ridges 612 on the inner bore to increase surface distance to mitigate against electrical creepage. In this embodiment, the plasma chamber can be cast or machined from an appropriate material to include the ridges.

Figure 37:
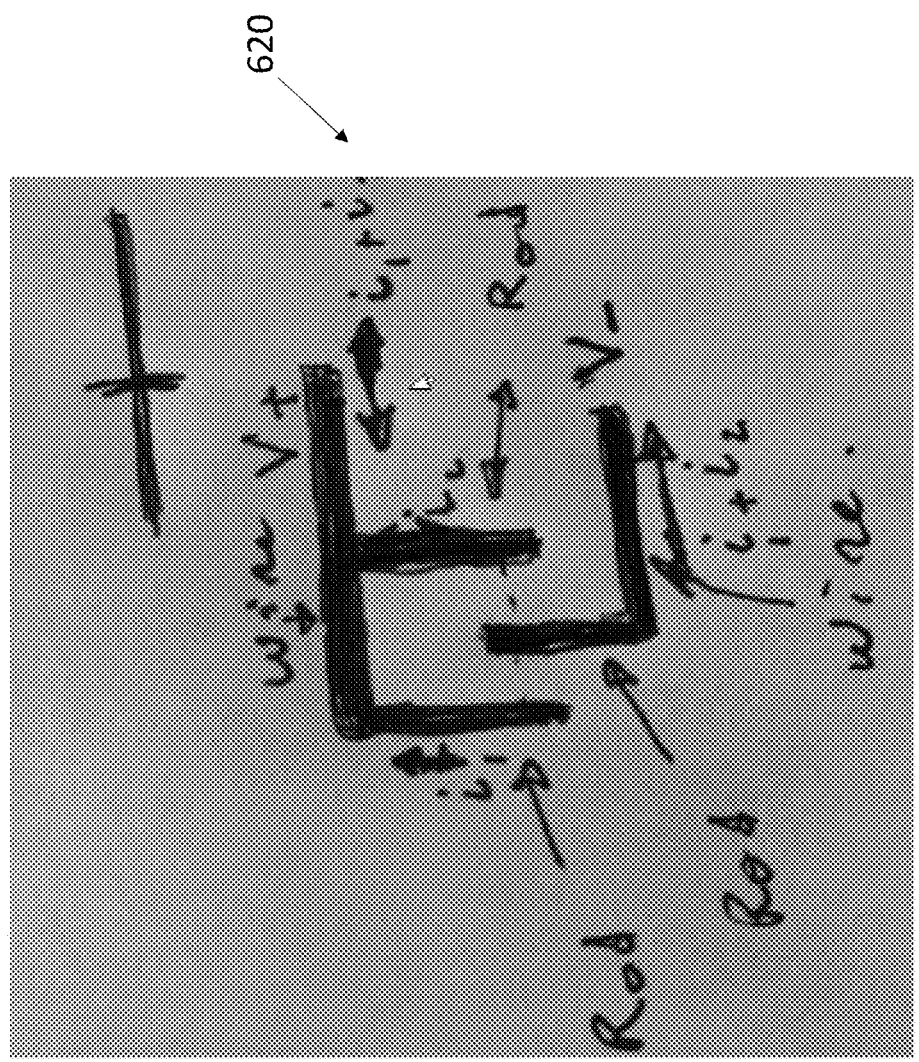
FIG. 37 depicts an embodiment of a parallel electrode design with two electrodes at one potential and a third electrode at an opposing electrical potential.

In some embodiments, a parallel electrode design 620 with more than two electrodes can be used, as shown in FIG. 37. FIG. 37 depicts an embodiment with two electrodes at one potential and a third electrode at an opposing electrical potential. Gaps are formed between the first electrode and the third electrode and between the second electrode and the third electrode. In some embodiments, both gaps are the same to provide redundant gaps and longer electrode life. As the system operates, arcing occurs at either gap but only one at a time. This approach provides additional electrode gaps for longer electrode service life without adding additional hardware and/or software complexity. Electrical breakdown can occur in both gaps at a similar rate of occurrence, wearing both gaps evenly.

Figure 38:
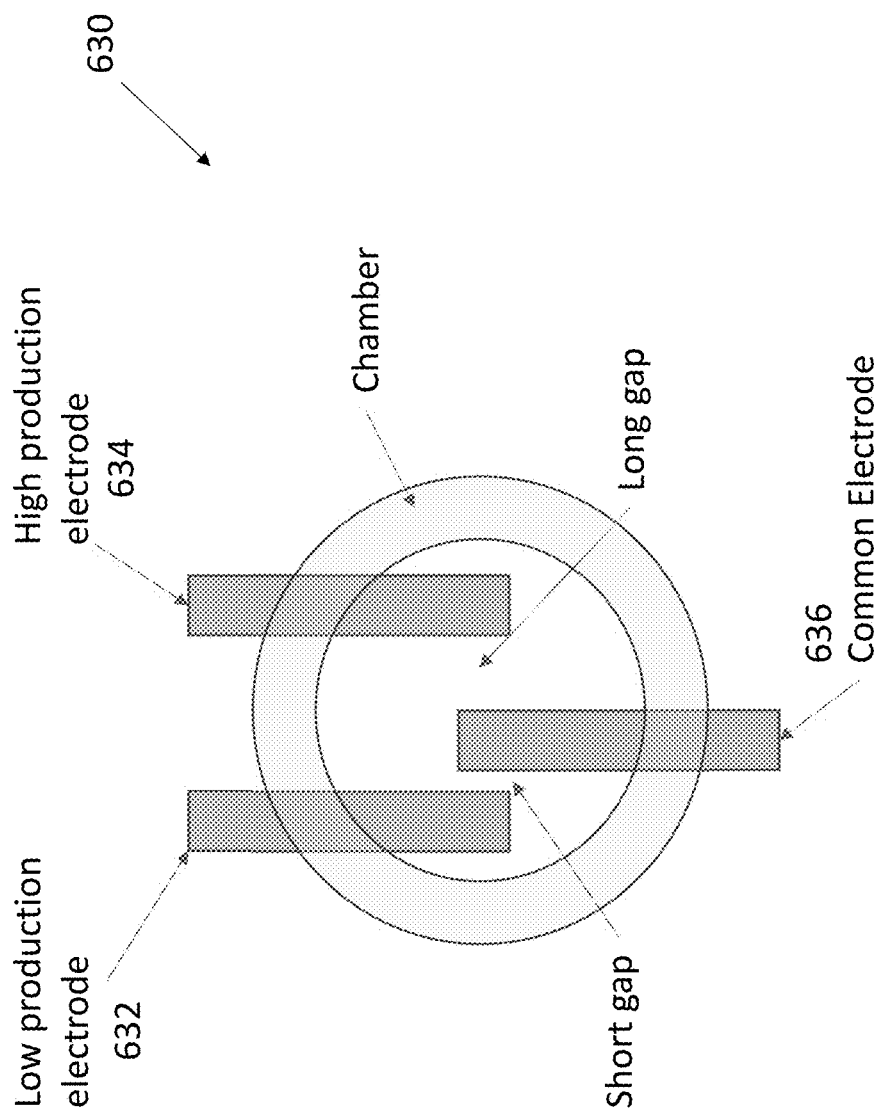
FIG. 38 depicts an exemplary embodiment of a multiple parallel electrode design.
Figure 39:
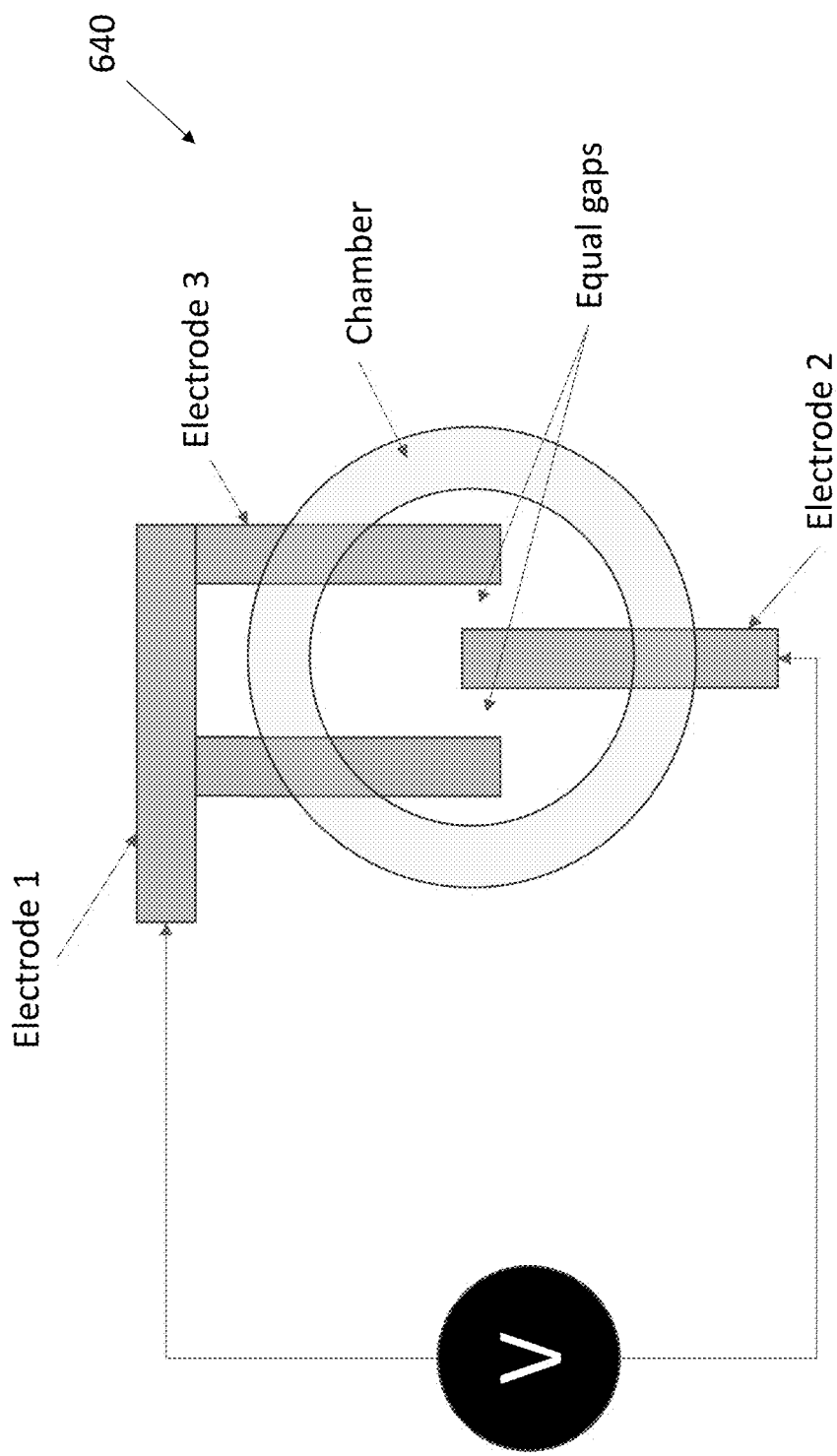
FIG. 39 illustrates an exemplary embodiment of a multi-gap parallel design where multiple electrodes are electrically connected, and gaps are the same size.
Figure 40:
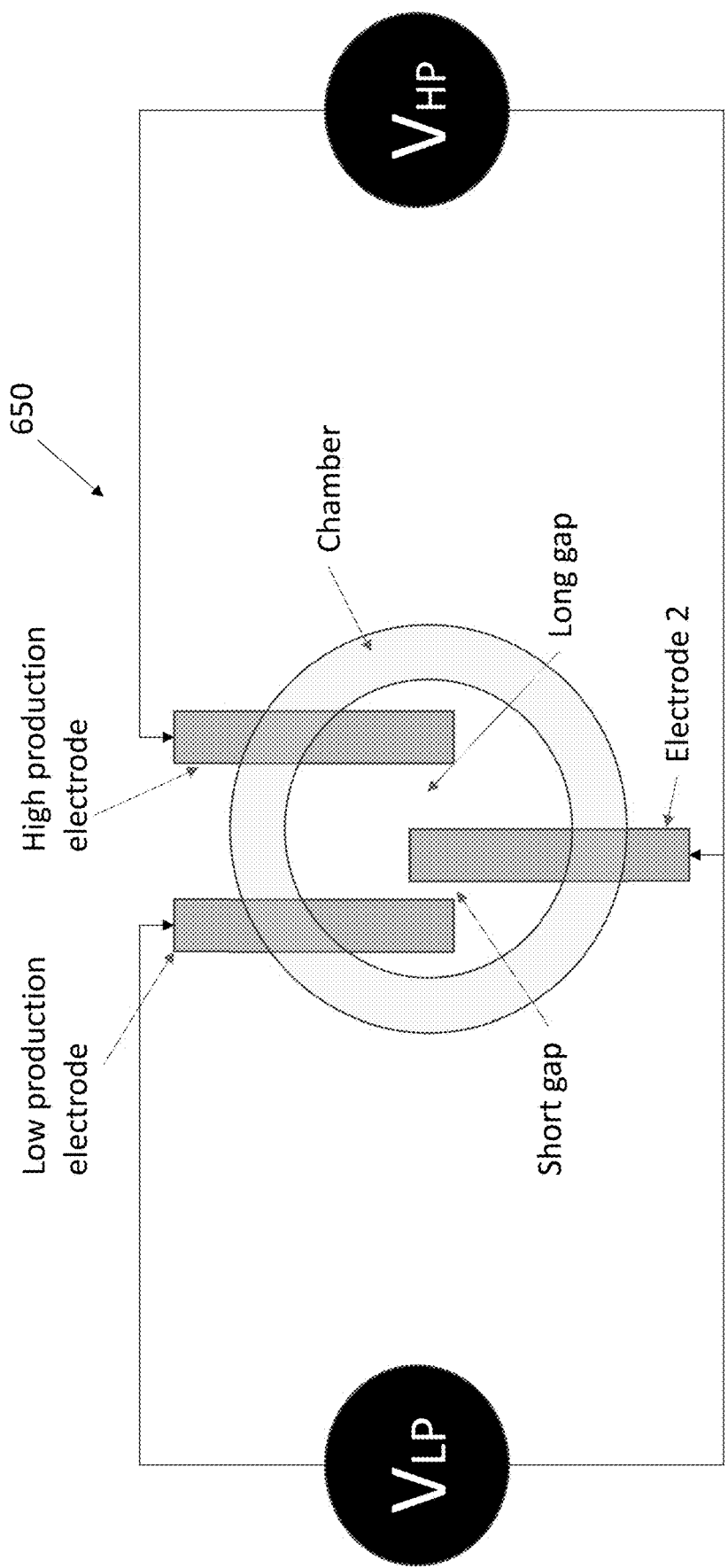
FIG. 40 illustrates an exemplary embodiment of a parallel electrode design with multiple gaps that are dissimilar.
Figure 41:
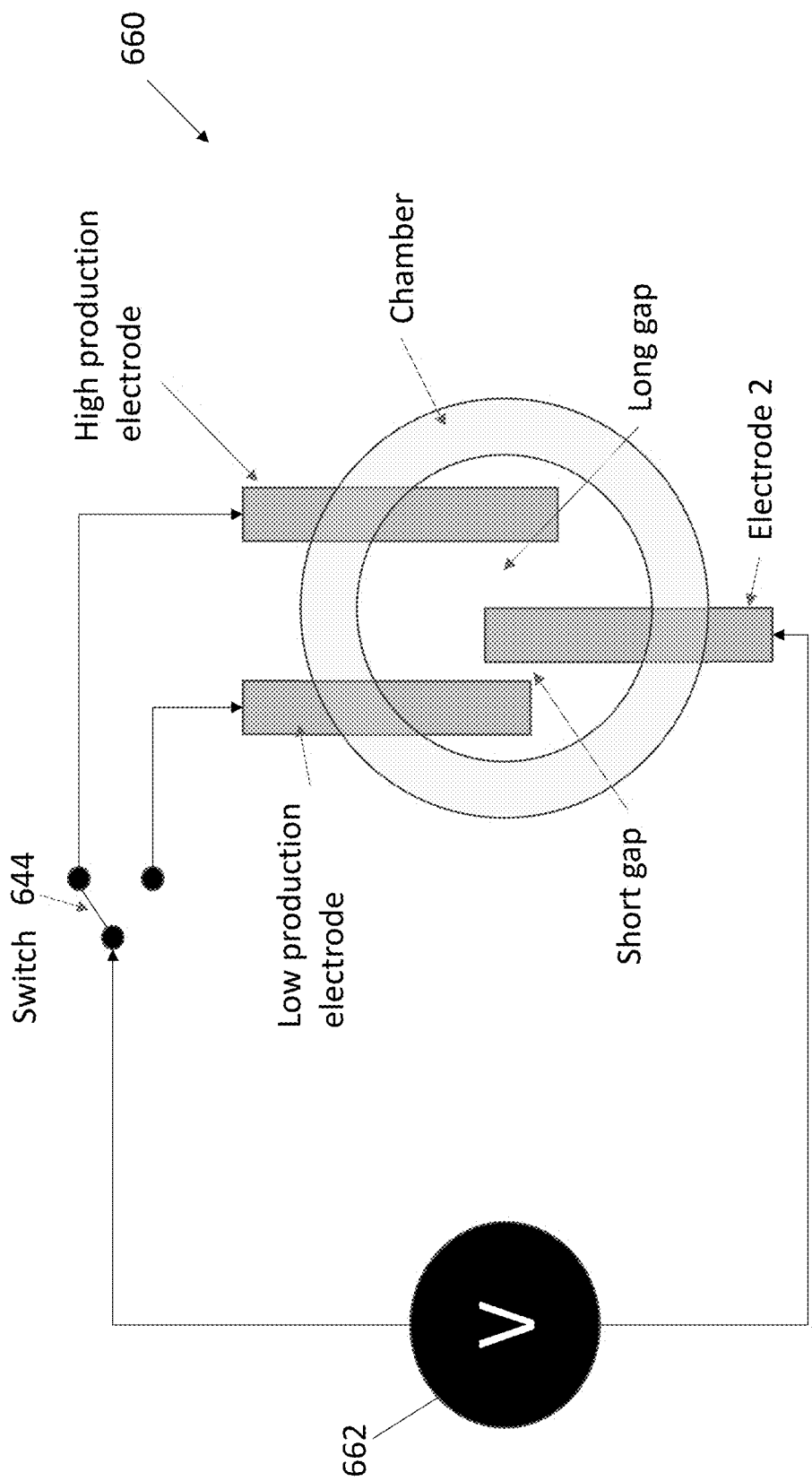
FIG. 41 illustrates an exemplary embodiment of a parallel electrode design with a single power source and a switch to select between gaps.

FIG. 38 depicts a multiple parallel electrode design 630 where two electrical circuits are formed with three electrodes 632, 634, 636. In FIG. 38, a first electrode gap is smaller than a second electrode gap to enable a wider range of NO production. FIG. 39 depicts a multiple parallel electrode design 640 with all gaps the same size. In some embodiments, a NO generation system uses the two gaps independently, shifting from small gap for low NO production to large gap for high NO production, depending on the overall NO production required. In some embodiments, a small gap of 1 mm is used for NO production from 10 to 1000 ppm·slpm and a large gap of 2.5 mm is used for production from 1000 ppm·slpm to 10,000 ppm·slpm. In some embodiments, a NO generation system shifts from small gap to large gap within the span of a single discharge event with ions from the short gap plasma facilitating the breakdown at the large gap. In some embodiments, power for each gap is provided by independent power supplies. In some embodiments, a switch can be used to direct power from a single power supply to any one or more gaps. FIG. 40 illustrates a parallel electrode design 650 that is energized by independent voltage sources. FIG. 41 illustrates a parallel electrode design 660 that is energized by a single voltage source 662 that uses a switch 664 to select which electrode gap to activate.

Parallel electrodes can present more than one discrete arcing location. It follows that high power efficiencies can be achieved by focusing reactant gas flow at the arcing locations, thereby improving gas/plasma interaction. In some embodiments, the number of reactant gas flow nozzles is equal to the number of arcing locations. In some embodiments, reactant gas flow through the nozzles is controlled in either a binary or analog sense based on the amount of arcing occurring at a corresponding electrode gap. In some embodiments, lower NO concentration product gas is achieved by flowing reactant gas through a nozzle that is not directed at an active electrode pair, thereby decreasing the amount of reactant gas converted to NO for a given reactant gas flow rate. In some embodiments, a slit nozzle is used to direct a wide fan of reactant gas across the arcing locations of a parallel electrode.

Over time, an end edge of the parallel electrode can erode and become more rounded. In some embodiments, electrodes are rotated about their long axis to present a new, sharper edge to the gap. In some embodiments, a parallel electrode can be indexed to 2 or more rotational locations, enabling greater longevity and production consistency from a single electrode pair.

Figure 42:
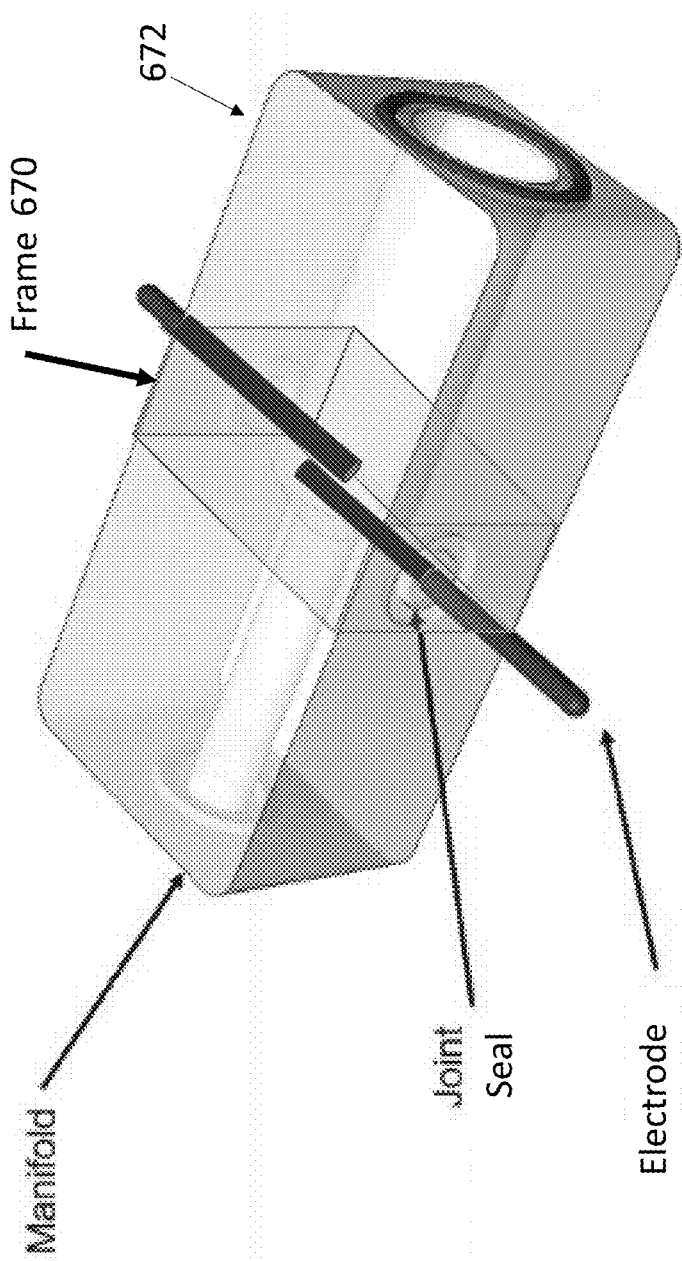
FIG. 42 illustrates an exemplary embodiment of a replaceable parallel electrode design.

As electrodes wear, NO production characteristics can differ from what they were when the electrode was new. An electrode and/or chamber can be replaced to prolong the service life of the rest of the NO generation system. As electrodes wear, in some embodiments, the entire electrode/plasma chamber assembly is removed and replaced. In some embodiments, electrodes are mounted to a frame. When electrodes are replaced, only the electrodes and frame are replaced, rather than the some or all of the plasma chamber. This reduces expense of replacement. FIG. 42 depicts an example of a replaceable electrode frame 670. As shown, the plasma chamber 672 can be split into a left and right end to remove the electrode frame. Sealing between the plasma chamber and frame can be accomplished any number of ways, including but not limited to O-rings, compression fittings, gaskets, or tape around the circumference of the assembly. In some embodiments, the frame and electrodes can be replaced by a user and are disposable. The frame can be made from any high temperature, non-electrically conductive material, such as ceramic, glass or high-temperature polymer.

Multiple Parallel Electrodes

Figure 43:
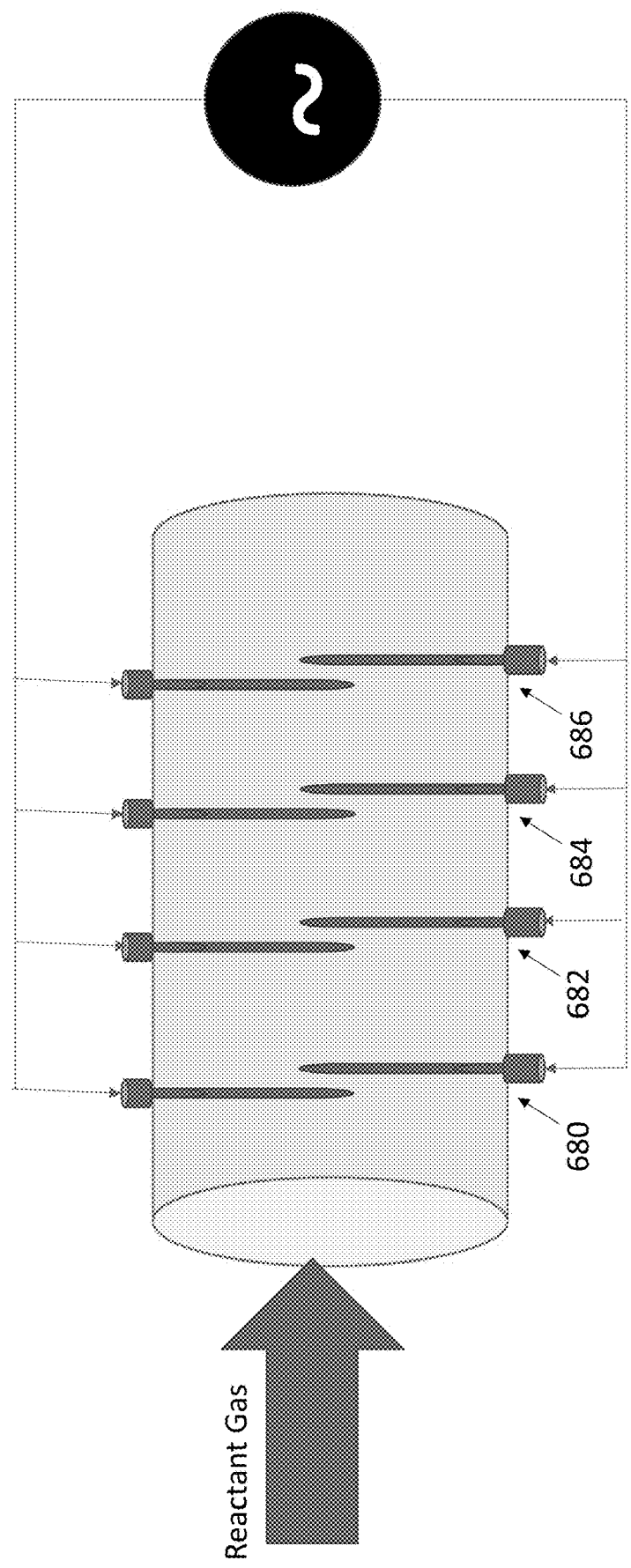
FIG. 43 illustrates an exemplary embodiment of a multiple parallel electrode design powered by a single power source.
Figure 44:
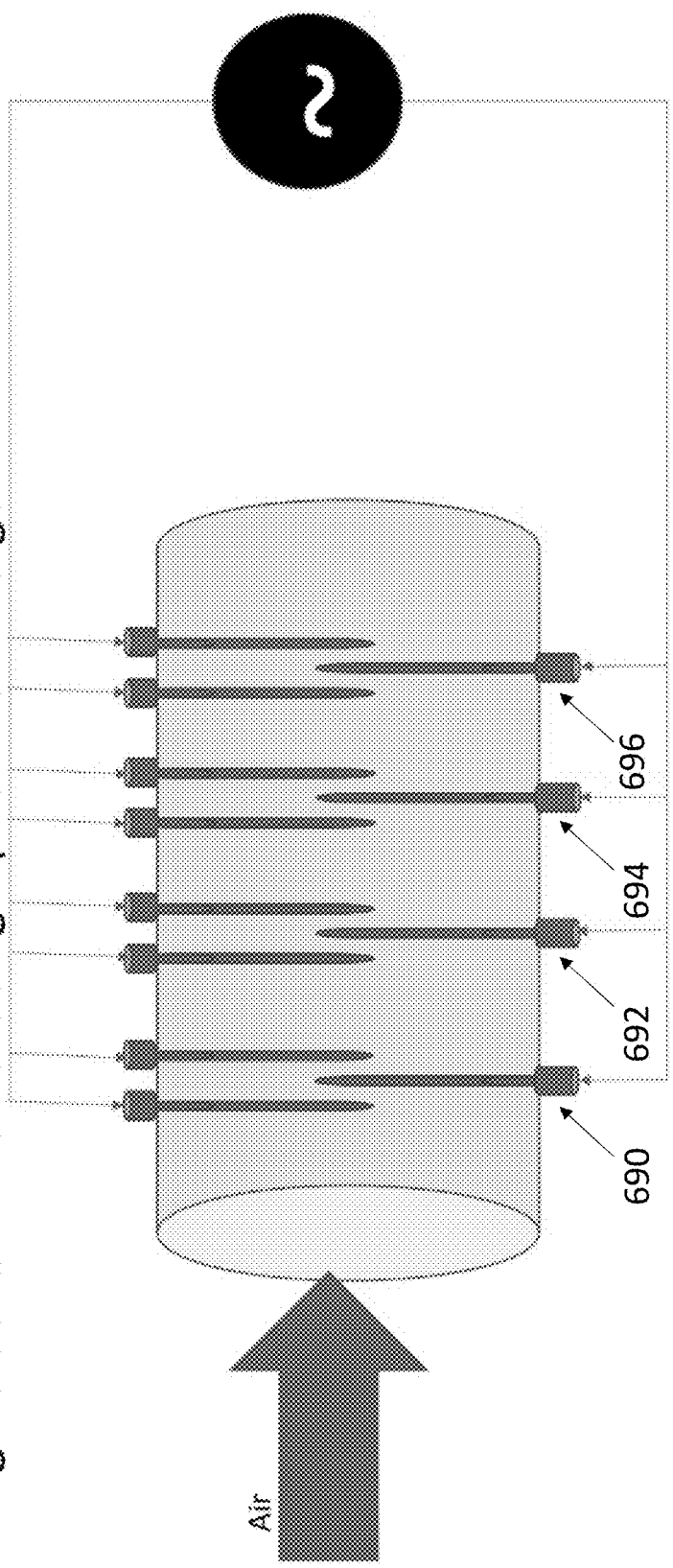
FIG. 44 illustrates an embodiment of a parallel electrodes in a plasma chamber.

In some embodiments, an array of parallel electrodes provides multiple electrode gaps. In some embodiments, all of the electrode gaps have the same distance so that there is no propensity to arc in one location over another. As shown in an exemplary embodiment in FIG. 43, a design is shown with multiple pairs of parallel electrodes 680, 682, 684, 686 powered by a single power source. In an exemplary embodiment depicted in FIG. 44, there are four sets of triple electrodes 690, 692, 693, 696 that are grouped into two polarities (upper and lower). Each triple electrode includes two electrode gaps between overlapping electrodes. In total, there are 8 electrode gaps in the design shown in FIG. 44. In some embodiments, all of the electrodes are in the same plane. In some embodiments, each triple electrode set is in a plane that is orthogonal to the direction of gas flow. As electrodes wear, the gap increases and requires a higher voltage to breakdown. With multiple electrode gaps in parallel, electrical breakdown occurs at the smallest gap which will shift locations as the electrodes wear. This approach offers a benefit of prolonged service life due to the increased number of electrode gaps. Electrical discharge only occurs at one gap per discharge event, so overall NO production levels are similar with a multiple gap array as to a single electrode gap.

In some embodiments, each triple electrode set is independently controlled. In one approach a first triple electrode is utilized for a certain period of time and/or cycles and/or power before switching to another triple electrode. In some embodiments, electrodes are utilized until they reach a particular temperature prior to switching to another electrode pair. This can prevent electrodes from getting too hot which can affect wear rates, particulate generation and nearby mate.

Figure 45B:
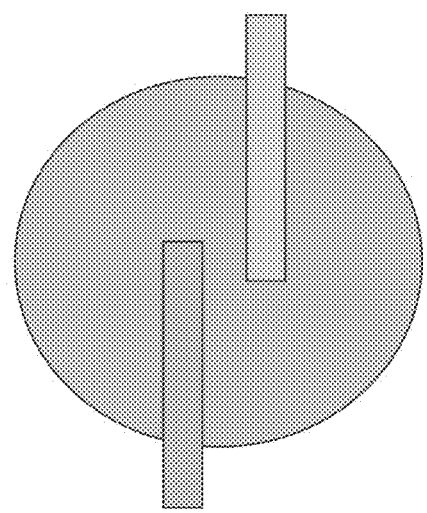
FIG. 45A and FIG. 45B illustrate an exemplary embodiment of multiple parallel electrodes having multiple electrode gaps.
Figure 45A:
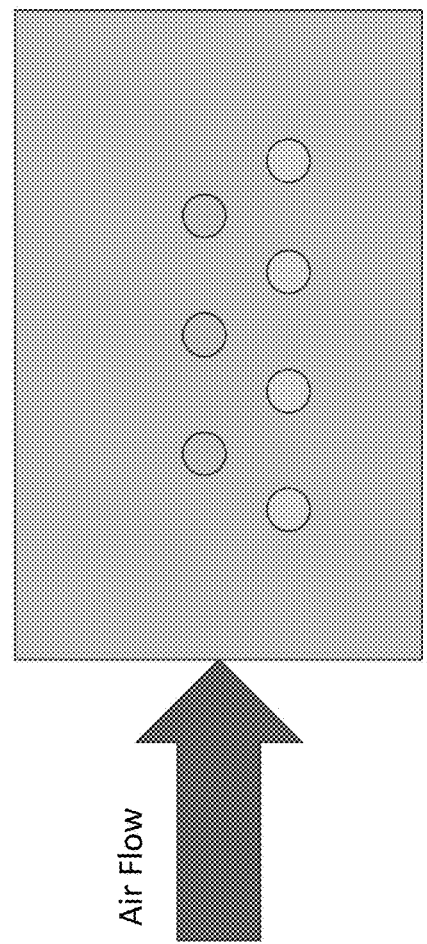

In FIG. 45A and FIG. 45B, multiple electrode gaps are formed from multiple parallel electrodes (i.e., a parallel electrode array). Reactant gas flow is directed towards the gap between the electrodes. Reactant gas can be passed through either a circular or a slit orifice. For example, four electrodes can enter the chamber from one side and five electrodes can enter the chamber from another side. Arcing occurs where the electrodes overlap, forming a gap. For example, nine electrodes form 6 electrical gaps. Other quantities of electrodes can also be used, with higher quantity of electrodes resulting in longer service life.

Figure 46:
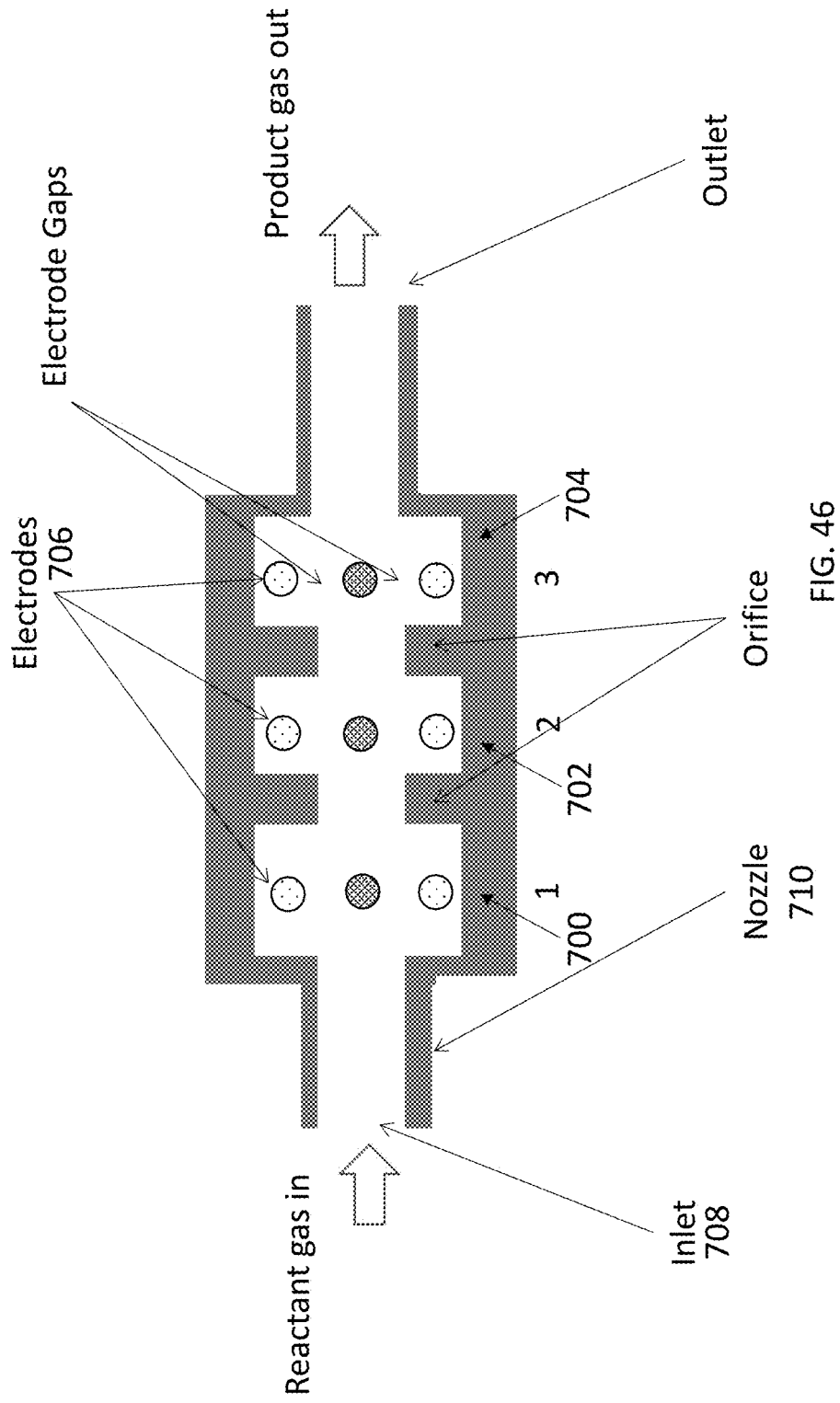
FIG. 46 illustrates an exemplary embodiment of a plasma chamber with multiple nozzles.

Another embodiment of a parallel electrode array is depicted in FIG. 46. This embodiment consists of a series of multiple chambers 700, 702, 704, each containing two or more electrodes 706. Reactant gas enters the assembly through an inlet 708. The gas passes through a nozzle 710 that aligns the reactant gas flow for the first electrode chamber 700. This exemplary plasma chamber has three electrodes: upper and lower electrodes emanating from a wall away from the viewer and a central electrode emanating from the wall closest to the viewer. The reactant gas flow bifurcates around the central electrode and through upper and lower electrode gaps. Plasma activity between center electrode and the upper and lower electrodes generates NO in the reactant gas, forming a product gas. An orifice (or nozzle) between the first and second chambers converges the reactant gas flow again and directs reactant gas towards the center electrode in the second chamber. In some embodiments, the orifice (or nozzle) between each of the chambers has the same diameter as the nozzle 710. In some embodiments, the nozzle 710 and each of the orifices may have different diameters. In some embodiments, the design objective is to have similar reactant gas velocity in the electrode gap within each chamber for there to be consistent NO generation from each of the chambers.

Figure 47A:
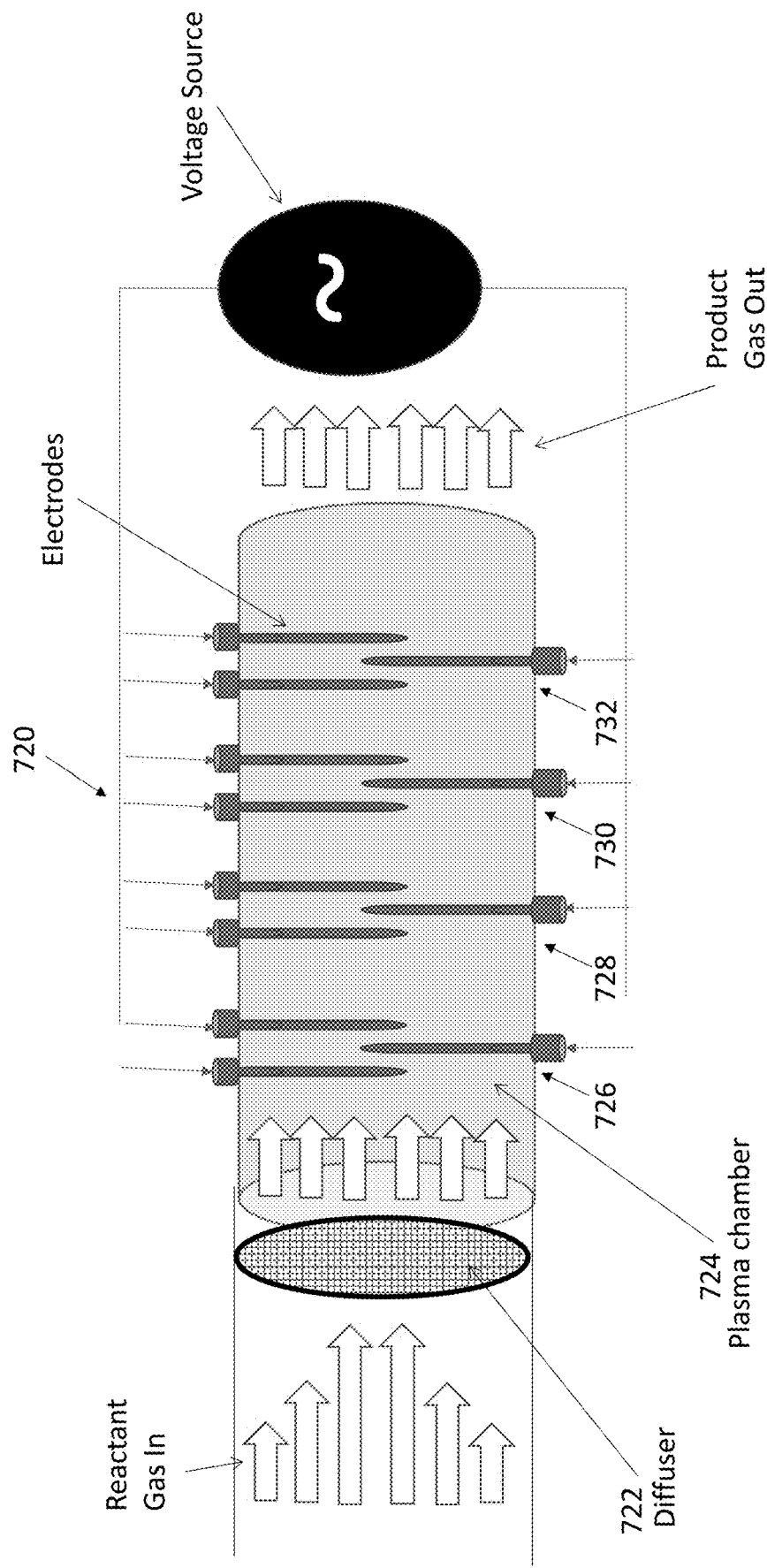
FIG. 47A illustrates the use of a reactant gas diffuser.

FIG. 47A presents another embodiment of a parallel array design 720. Reactant gas passes through a diffuser 722 prior to entering the plasma chamber 724 or as it enters the plasma chamber. The diffuser evens out the gas velocity across the width of the plasma chamber to make NO production more consistent between the electrical discharge locations. Four sets of triple electrodes 726, 728, 730, 732 provide sixteen arcing locations. In the embodiment depicted, all electrode gaps are energized simultaneously with only one gap breaking down at a time. In some embodiments, (not shown), one or more diffusers are located along the length of the plasma chamber to even out of the gas velocity. In some embodiments, there is a diffuser prior to each electrode set.

Figure 47B:
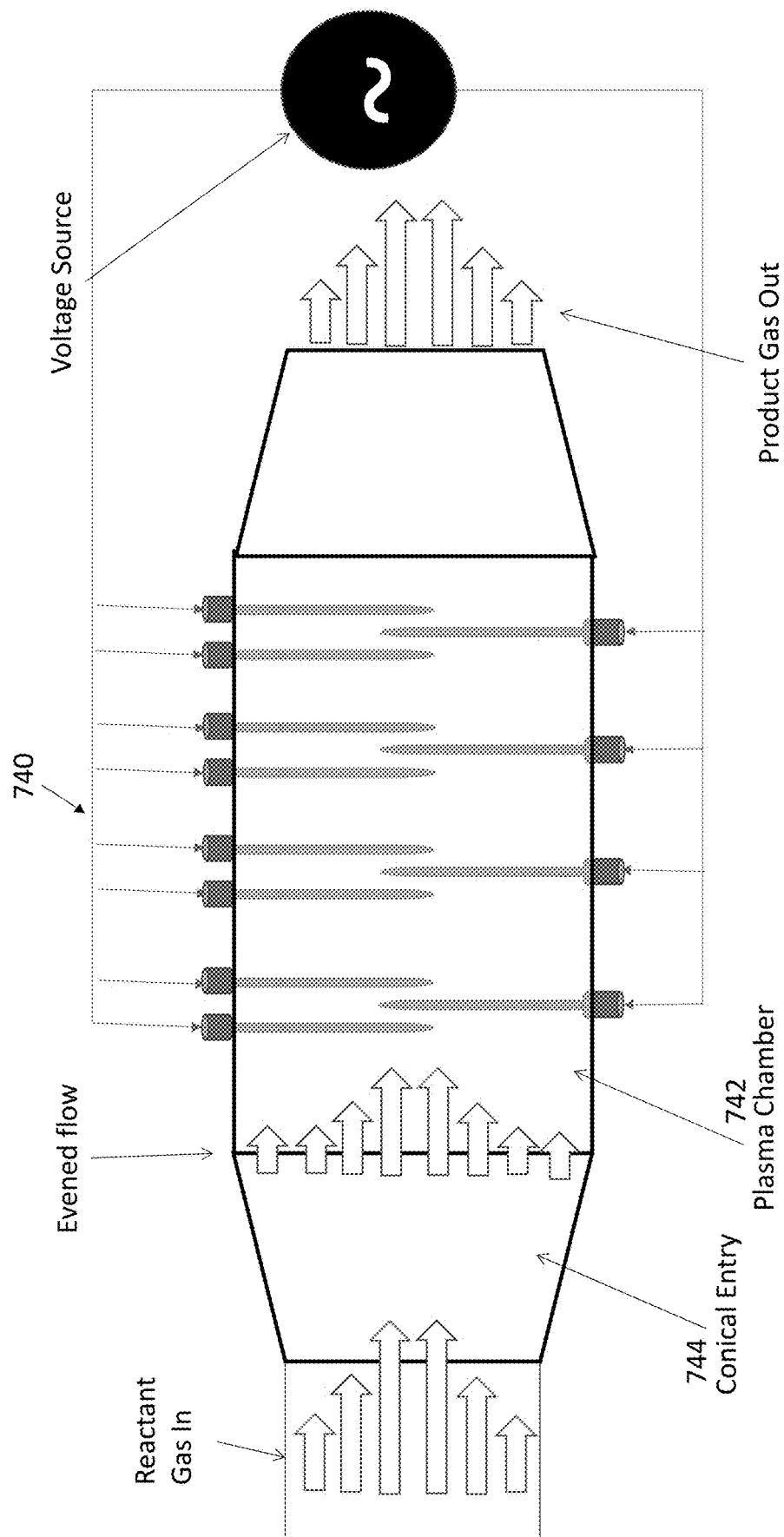
FIG. 47B illustrates the use of a conical reactant gas flow path at the inlet to a plasma chamber.

FIG. 47B depicts an embodiment of a parallel array design 740 with four sets of triple electrodes. Reactant gas enters the plasma chamber 742 with a velocity profile typical of laminar flow. The gas flow enters a conical section 744 that increases in diameter along the length at an angle shallow enough that prevents eddies in the flow, slows the velocity of the reactant gas, and effectively evens out the gas velocity profile as it enters the electrode region of the chamber. An optional cone on the downstream end of the plasma chamber can reduce the diameter of the product gas flow and increase the velocity of the gas with minimal flow restriction.

Figure 48:
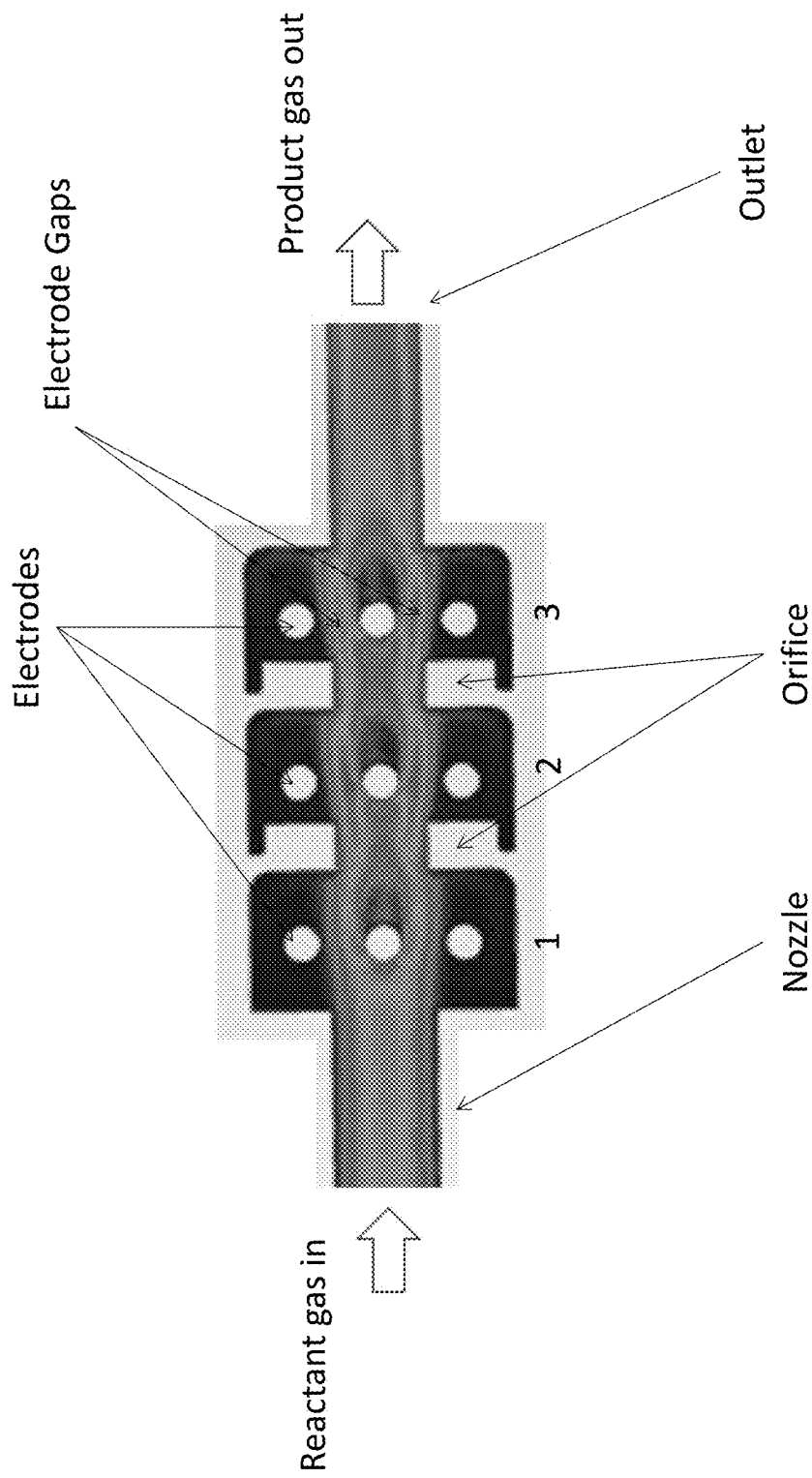
FIG. 48 provides computational modeling results for a plasma chamber with multiple nozzles.

FIG. 48 depicts a computational model of gas velocity through the chamber at a flow rate of 0.15 slpm. Other embodiments are designed for a flow rate through the chamber of 0.1 to 10 lpm. In some embodiments, the reactant gas flow rate through the chambers is a constant value, making it easier to predict and manage the gas velocities within the chamber. The embodiment depicted in FIG. 46 includes 9 electrodes that form six electrode gaps and twelve arching locations. This design, and others like it, can significantly prolong the service life of a NO generator in a compact design.

A parallel electrode array can be used to produce consistent levels of NO production when all electrodes in the array are energized at once and when electrodes are energized in discrete pairs. Energizing all electrodes at once results in electrical break-down in only one electrode gap at a time. As electrodes wear and the gap between them increases, electrical breakdown will tend to occur at the pair of electrodes with the shortest gap, thereby distributing the use/wear amongst electrode gaps and prolonging the lifetime of the overall electrode assembly.

Figure 49:
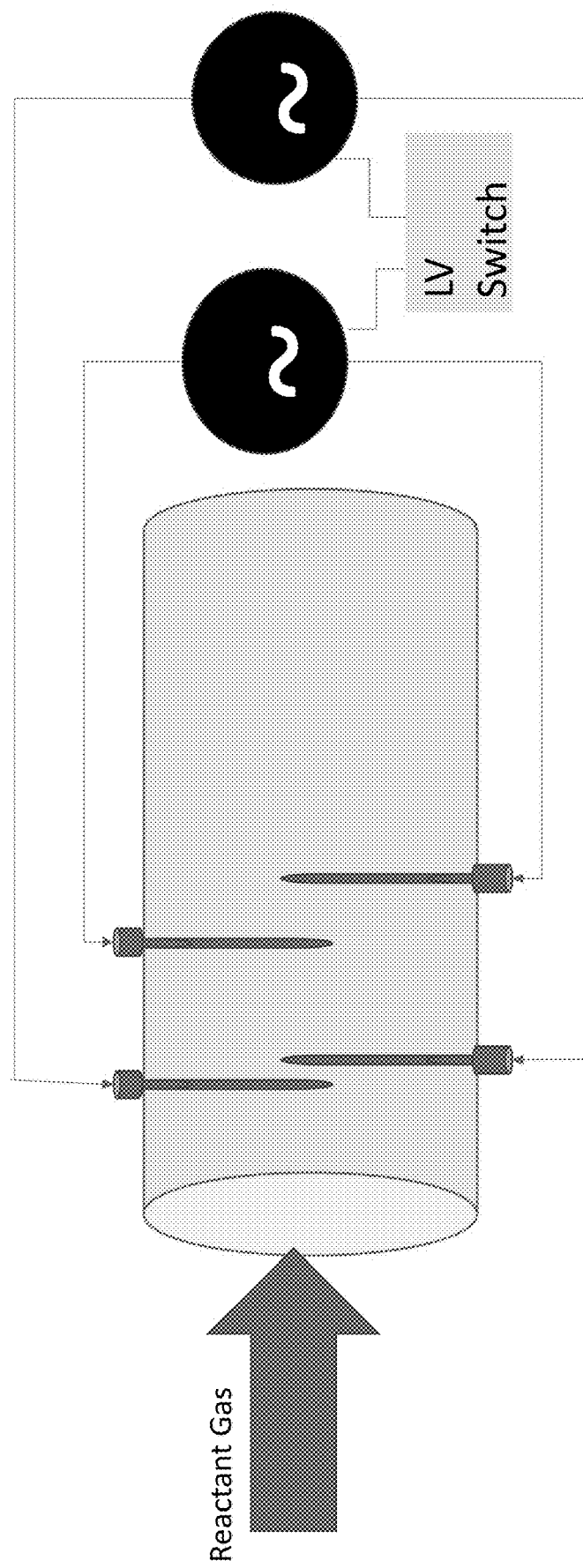
FIG. 49 illustrates an exemplary embodiment of a multiple parallel electrode design.

FIG. 49 depicts another embodiment of a parallel array plasma chamber. Two pairs of electrodes with different gaps are located in the same plasma chamber. Each pair of electrodes is driven by independent power sources. The system selects between power supplies on the low voltage side of the circuit. This approach can improve the NO production range of a NO generator. One or both electrode pairs can be utilized at one time. In one embodiment, the smaller gap is 0.5 mm and the larger gap is 2.5 to 3.5 mm, depending on maximum production requirements. In some embodiments, as shown, the small gap is closer a common nozzle than the large gap to provide more even reactant gas flow profile in both gaps.

Modular Gliding Arc Edge Design

Figure 50:
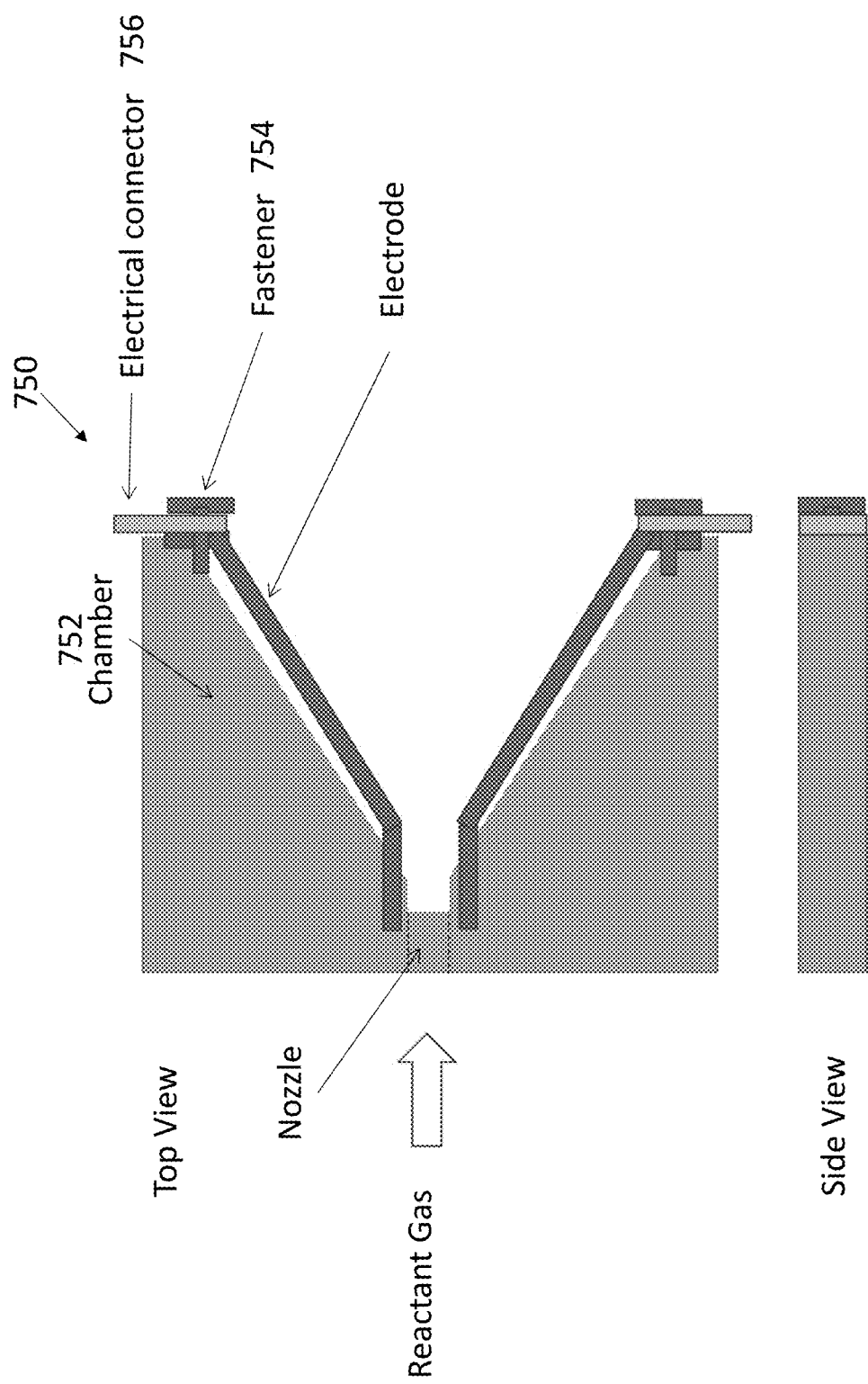
FIG. 50 depicts an exemplary embodiment of a gliding electrode plasma chamber with replaceable gliding elements.

FIG. 50 depicts an embodiment of a modular gliding arc design 750. The electrodes include an edge that can be replaced. Each electrode consists of an edge that is secured to a plasma chamber 752. The upstream end with small gap is connected to the plasma chamber by inserting into a corresponding hole (shown) or being attached with a fastener 754 (e.g., rivet, screw, etc. not shown). In the embodiment depicted, electrical connections 756 to the high voltage circuit are also located and secured with the fastening process. This image is a cutaway view. Assembly is done by inserting the electrode into the plasma chamber from the right side of the image and securing the electrode to the chamber. During use, the plasma chamber is sealed with a cover (not shown) that protects the electrode from damage and prevents loss of reactant and product gases. The gliding electrode edge can be constructed from a multitude of materials, including but not limited to iridium, titanium, rubidium, stainless steel, ruthenium, tungsten and other high melting point metals.

Gliding Arc Cartridge Design

Figure 51:
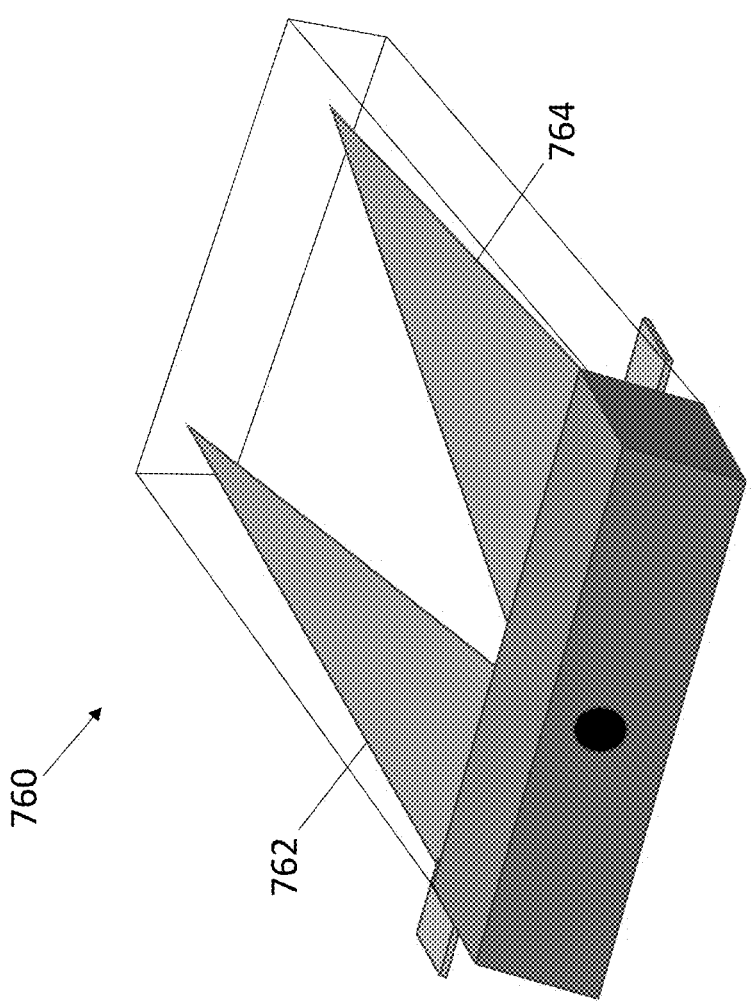
FIG. 51 depicts an embodiment of a replaceable gliding arc electrode assembly.

FIG. 51 depicts an embodiment of an electrode cartridge 760 including two gliding arc electrodes 762, 764 connected to a nozzle component. This design can facilitate replacement of electrodes and prolongs the service life of the rest of the components of a NO generator. The nozzle and electrodes are rigidly connected, which can ensure proper alignment of the nozzle and alignment and spacing between electrodes. By improving nozzle and electrode alignment, the need for field calibration after electrode replacement is diminished. In the embodiment shown, the shape of the electrodes is triangular. In some embodiments, the electrodes are shaped like rods or strips of material. Tab connectors on the right and left of the image for connecting to the high voltage circuit. In one embodiment, the gliding arc cartridge establishes electrical connections between the electrodes and the generation device as the cartridge is inserted, with the tabs registering withing corresponding electrical connectors. FIG. 51 depicts a protective cover around the electrodes. In some embodiments, the cover protects the electrodes from contamination and damage and is removed prior to electrode installation. In another embodiment, the cover is open on the downstream end like a sleeve. The sleeve is permanently connected to the electrodes and is inserted with the electrodes into the NO generation device. The sleeve collects sputtered materials during use so that they do not accumulate on the walls of the plasma chamber over time since sputtering could lead to electrical creepage and NO production losses.

Figure 52:
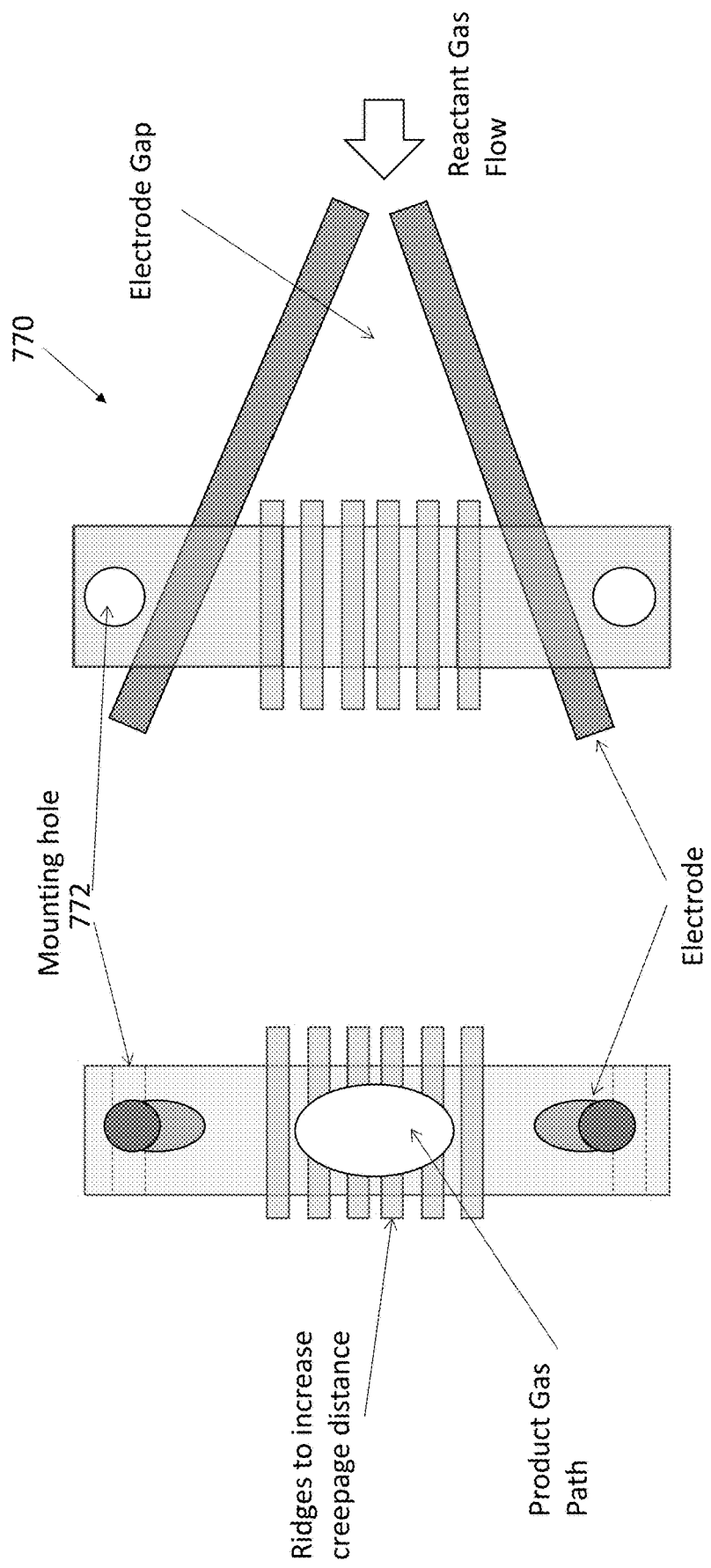
FIG. 52 depicts an exemplary embodiment of a replaceable gliding arc electrode with alignment feature.

In some embodiments, a gliding arc electrode insert enables replacement of electrodes. FIG. 52 depicts an embodiment of a replaceable gliding arc electrode insert 770. Reactant gas enters the insert and passes through the small gap of the electrodes. Arcs travel to the left in the image until they collapse or are electrically shut off. Product gas passes through a hole in the electrode frame. The electrode frame is made from a non-conductive material, such as glass, ceramic, polymer, or a composite material. The insert is secured to the plasma chamber with screws inserted through mounting holes 772. The rods can be rigidly held at the correct angle and gap, eliminating potential error in these parameters during installation.

Figures 53A, 53B:
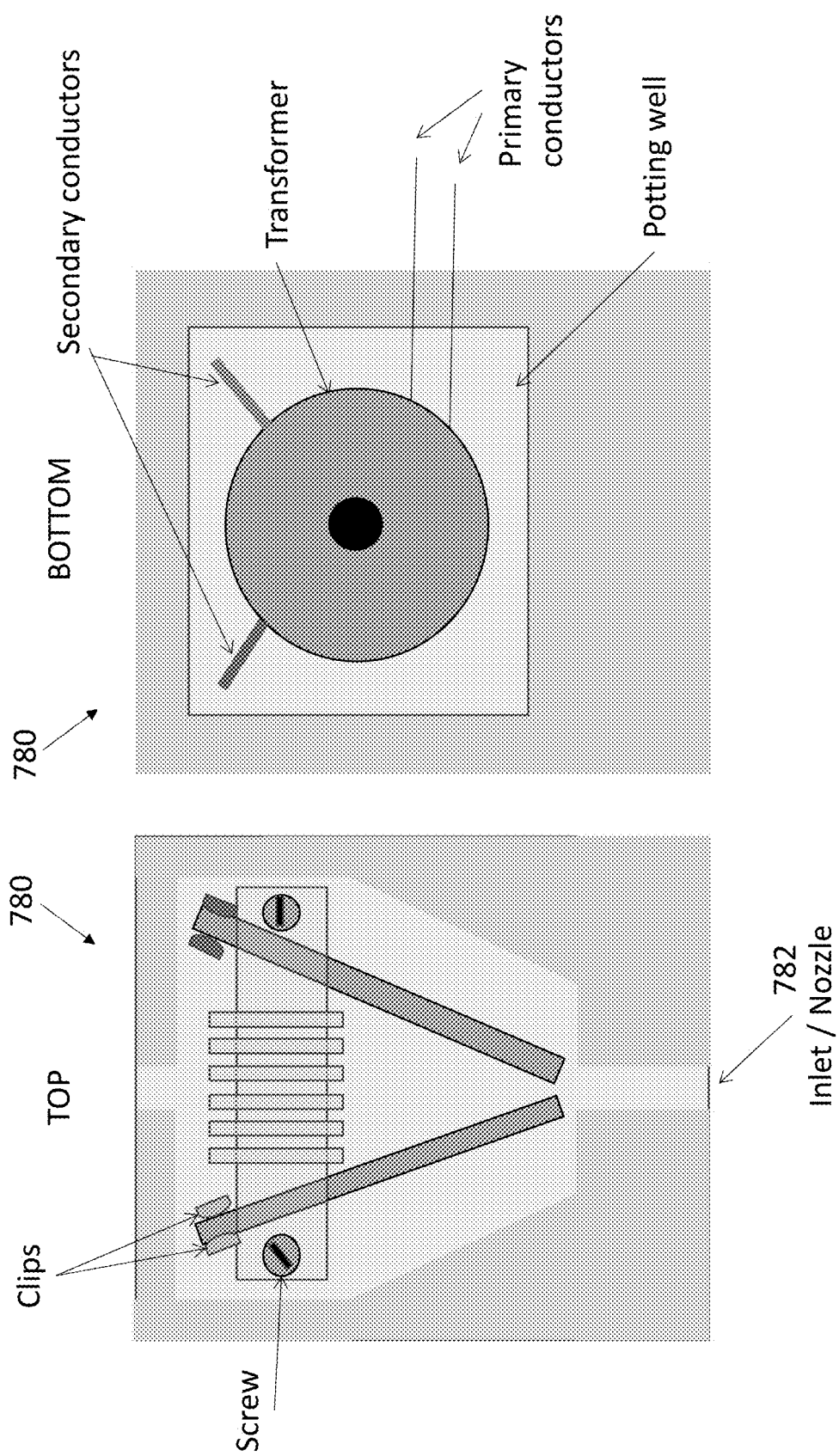
FIG. 53A and FIG. 53B depicts an exemplary embodiment of a plasma chamber assembly with replaceable gliding arc electrodes and embedded transformer.

FIG. 53A and FIG. 53B depict an embodiment of a gliding arc insert 780 mounted into a plasma chamber. FIG. 53A illustrates a top view of the chamber. Reactant gas enters the chamber through the inlet/nozzle 782 and travels up through the small gap and out the top of the chamber. The electrode insert is secured with screws. The electrodes connect to clips in the chamber to receive high voltage. FIG. 53B depicts the bottom view of the plasma chamber. The high voltage transformer is potted into a well withing the plasma chamber. Wires from the secondary pass through the plasma chamber wall to the clips to make the secondary circuit.

Figure 54:
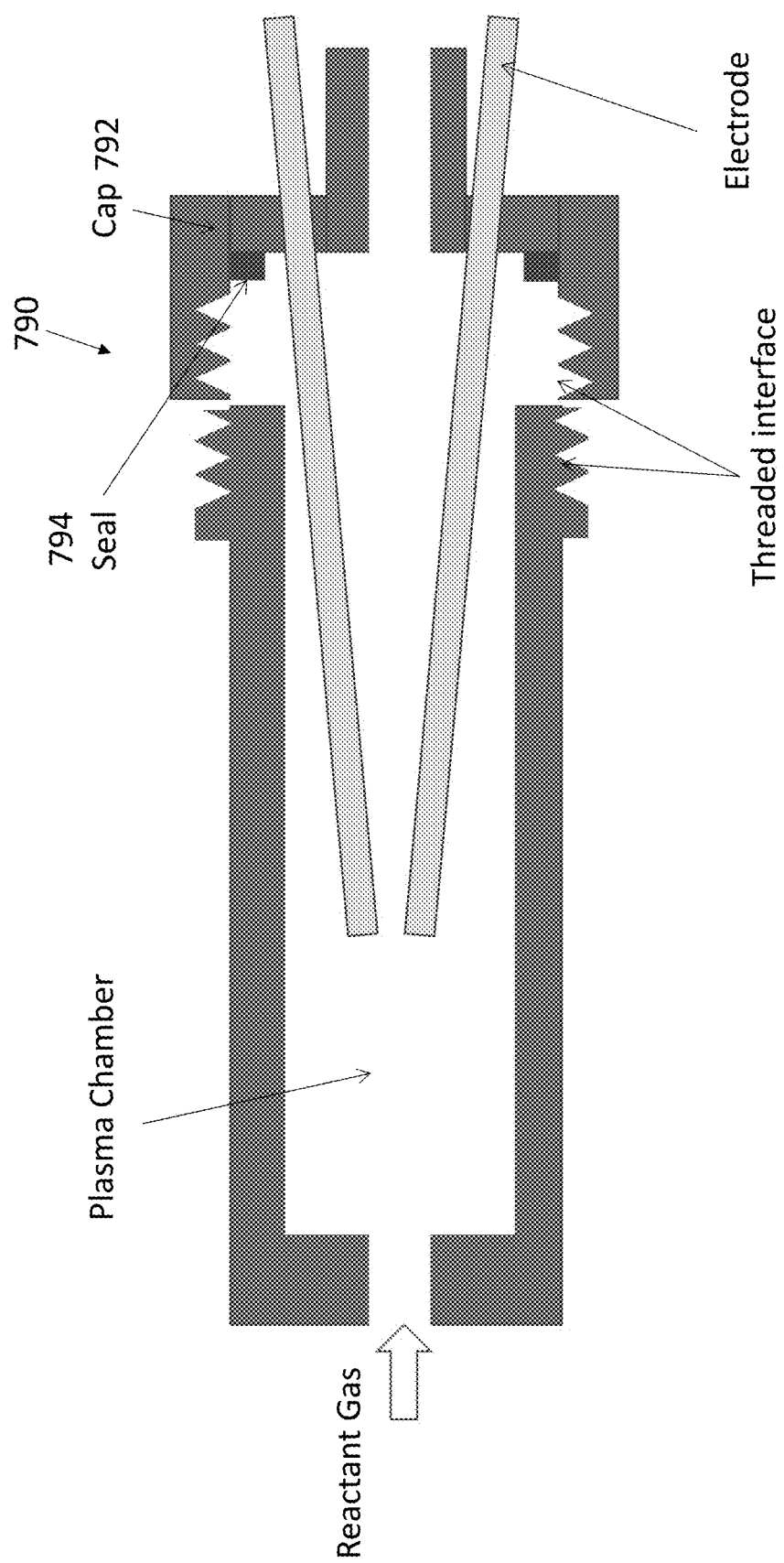
FIG. 54 depicts an exemplary embodiment of gliding arc electrodes integrated into an end cap of a plasma chamber.

FIG. 54 depicts an alternative replacement gliding arc design 790 with electrodes integral to a threaded cap 792. The cap maintains the small gap and angle of the electrodes and is threaded into the plasma chamber. Reactant gas can pass through an optional diffuser to even out reactant gas flow across the chamber and decreases the effect of variance in cap position (i.e. how tight the cap is). Product gas exits the right end of the figure. The cap seals to the chamber with a seal 794 (e.g., face, o-ring, lip, compression). The cap and chamber are made from non-electrically conductive materials (e.g., plastic, ceramic, glass, composite).

Offset Gliding Arc Design

Figure 55:
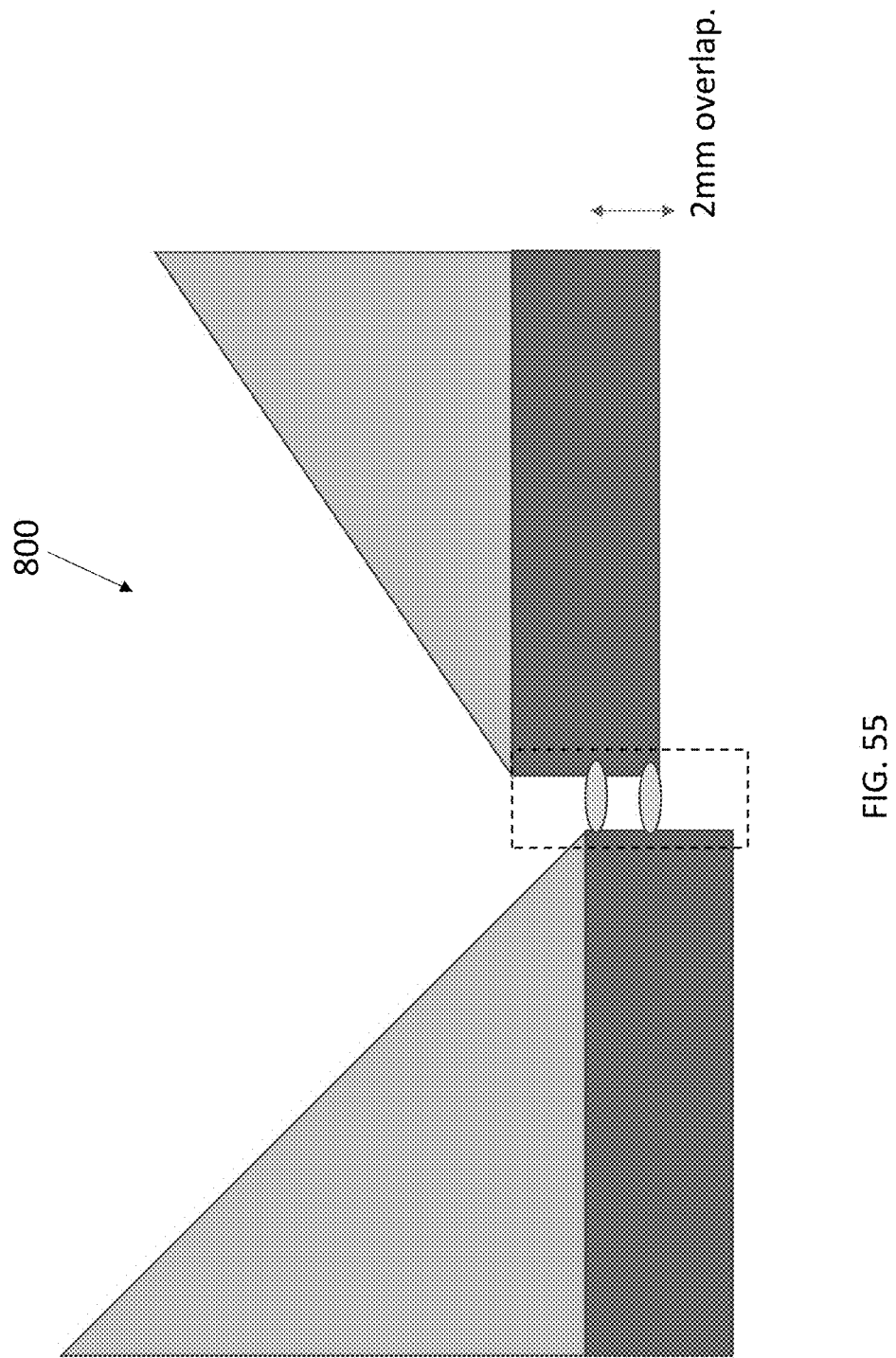
FIG. 55 illustrates an exemplary embodiment of a gliding arc electrode.

In some embodiments, a gliding arc electrode 800, as shown in 3D in FIG. 55, is used where the two electrodes are intentionally mis-aligned so they are not in the same plane. This approach can facilitate electrical breakdown when an AC voltage is used. Electrical breakdown occurs from the edge of one electrode to the gap-facing surface of the other electrode when the AC voltage has one polarity and arcs from the edge of the other electrode to the gap-facing surface of the other electrode when voltage polarity is reversed. In some embodiments, arc initiator rods are located at the small gap to facilitate breakdown and provide additional material for longevity, as shown in 3D in FIG. 56. FIG. 56 is an end view of the electrodes from the perspective of a little above the nozzle. As shown, a pair of gliding arc electrodes 810, 812 are positioned downstream (away) from the small gap where the rods are. After establishing breakdown between the plasma initiator rods, the plasma travels down the gliding arc surfaces, pushed by the reactant gas flow. In some embodiments, an insulator (e.g., ceramic) is used to product a triple junction effect in the gap between the insulator and electrode material to elevate the electric field in the vicinity of the electrode gap and facilitate electrical breakdown within the gap. After break-down, reactant gas flow pushes plasma arcs down the edges of the elongated electrodes. In some embodiments, the material of the arc initiation material is different than the elongated electrode material. In some embodiments, the arc initiation material is iridium, and the elongated surfaces are titanium to benefit from the high temperature durability of iridium and the lower cost of titanium.

Gliding Arc Array

Figure 57B:
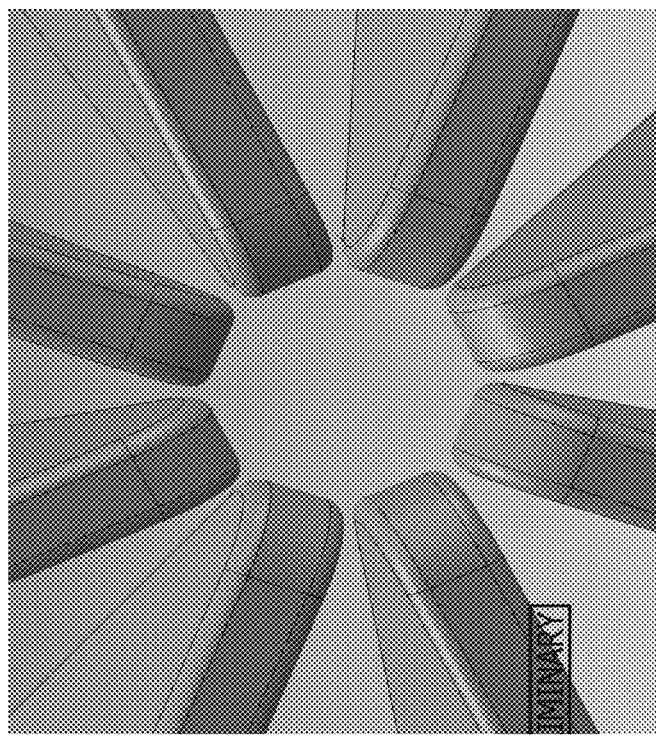
FIG. 57B presents a close up view of the gap region of a 4-pair gliding arc electrode array shown in FIG. 57A.
Figure 57A:
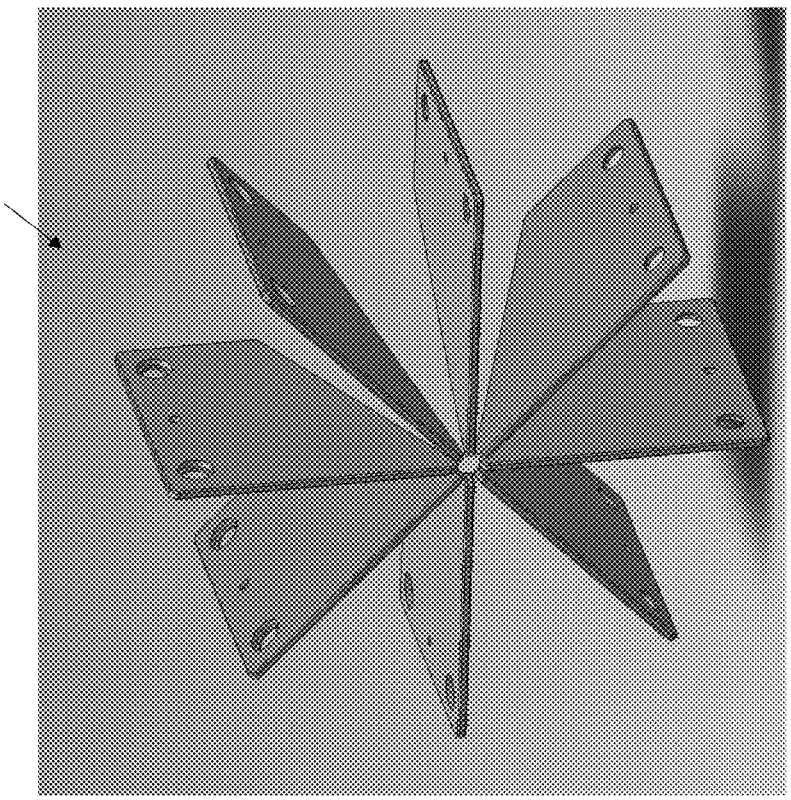
FIG. 57A illustrates an exemplary embodiment of a 4-pair gliding arc electrode array.

In some embodiments, the longevity of a NO generation system is prolonged by utilizing multiple pairs of gliding arc electrodes. FIG. 57A and FIG. 57B depict an embodiment of a gliding arc electrode array 820 with four pairs of electrodes. Reactant gas is directed through the center of the array, typically focused by a nozzle (not shown). Electrodes are energized in opposing pairs so that electrical breakdown and arc travel occurs within only one pair at a time. In some embodiments, the electrical breakdown is directed to a different pair of electrodes with each discharge to minimize electrode heating. For example, a discharge cycle can be as follows: pair 1, then pair 2, then pair 3, then pair 4, then pair 1 and so on. In some embodiments, a single pair of electrodes is utilized exclusively until they have been determined to be sufficiently worn, then the NO generator begins utilizing the next pair of electrodes in the series. This determination can be based on the number of discharges, the quantity of NO generated or measured performance characteristics, such as break down time, peak voltage, NO production levels, or other parameters. A gliding arc array design can provide equivalent NO production levels to a single pair of electrodes while prolonging assembly service life and maintaining a chamber design that is more compact than multiple chambers in series.

Figure 58B:
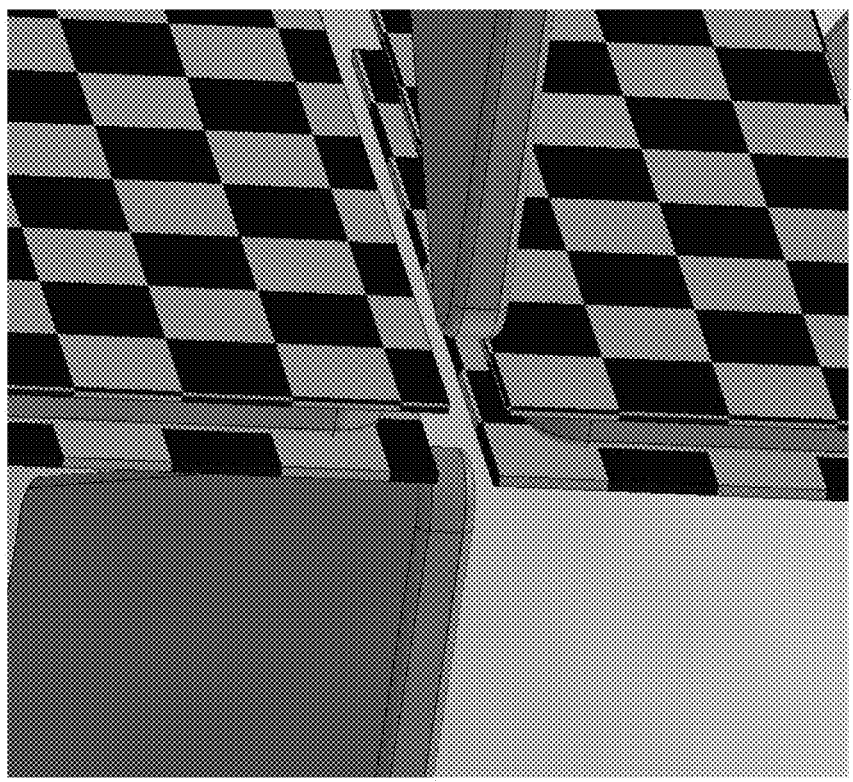
FIG. 58A and FIG. 58B depict an exemplary embodiment of a 2-pair gliding arc electrode array with dielectric material between electrodes.
Figure 58A:
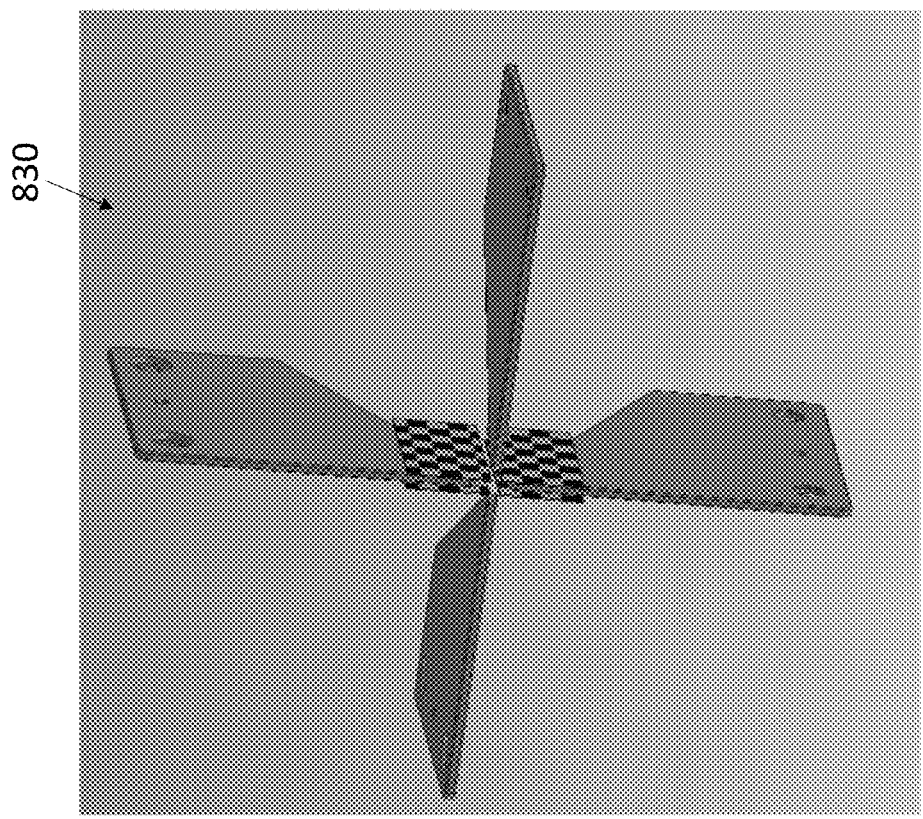

FIG. 58A depicts an embodiment of a gliding arc array design 830 with two pairs of electrodes. FIG. 58B shows a zoomed-in view of the gliding arc array design of FIG. 58A. Dielectric material is located between the electrodes to ensure that arcing only occurs between specific electrode pairs. Example dielectric materials include polymers, glass, and non-conductive ceramics.

Figure 59B:
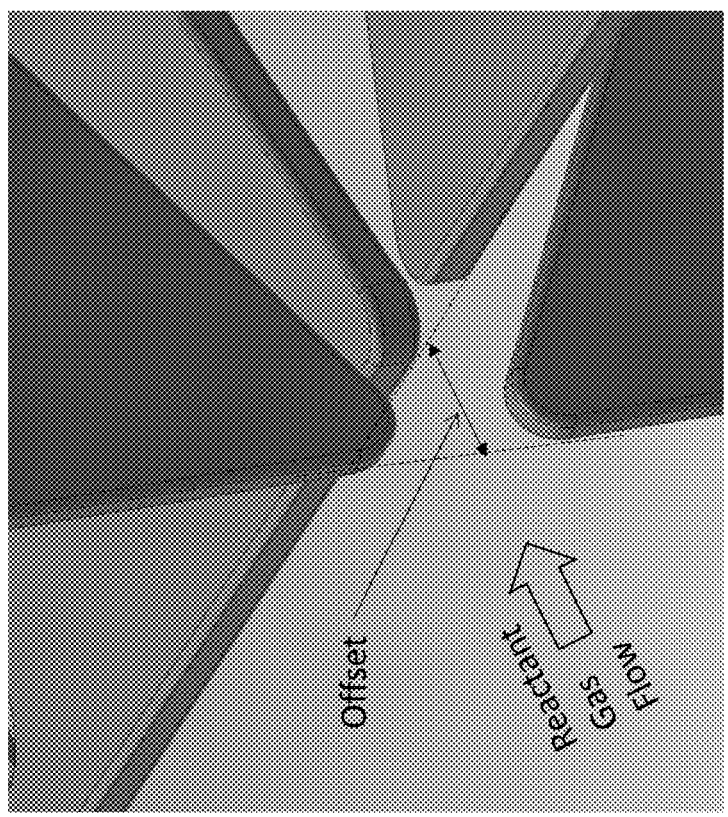
FIG. 59A and FIG. 59B depict an exemplary embodiment of an offset gliding arc array.
Figure 59A:
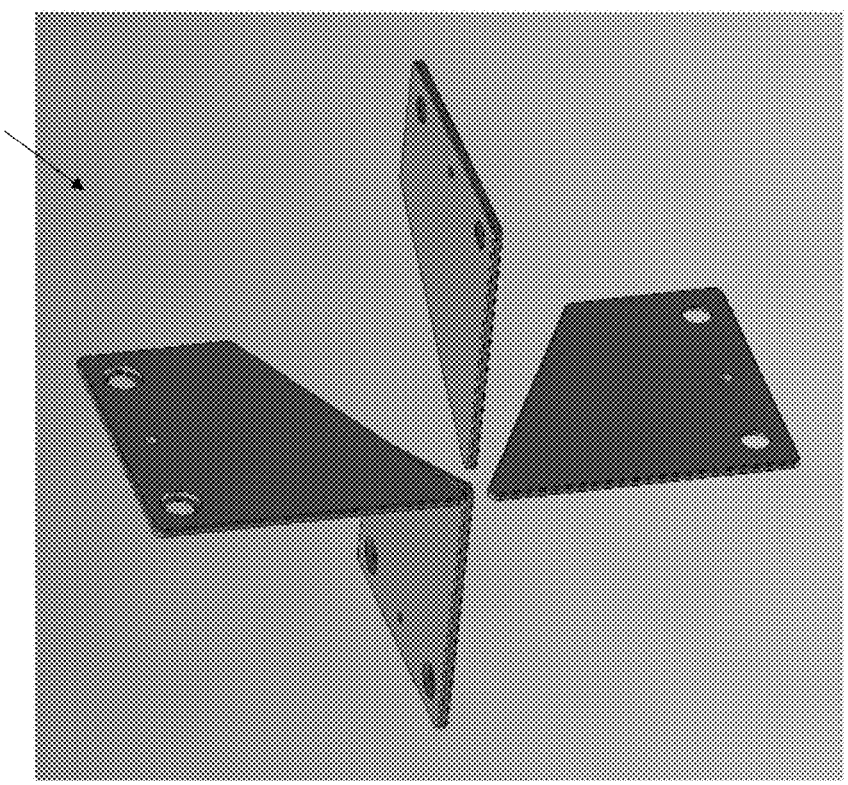

FIG. 59A and FIG. 59B depict a gliding arc array 840 with two pairs of electrodes that are offset in the direction of reactant gas flow. In some embodiments, reactant gas is focused through a nozzle (not shown). The offset in location of the pairs of electrodes enables a short electrode gap to be used and a single nozzle can provide reactant gas flow to two electrode pairs, simplifying the pneumatic architecture of a system. Additional electrode pairs can be added to this design with appropriate offset. In some embodiments, the electrode pairs are energized one pair at a time, beginning with a first pair and advancing to a second pair of electrodes for a subsequent discharge or when the first pair has been exhausted. In another embodiment, all of the electrode pairs are energized at the same time with only one discharge occurring with each application of high voltage. In this embodiment, the electrode pair that arcs varies with each discharge in a seemingly random manner, but the wear of the electrode pairs over time is even across the multiple pairs of electrodes. The offset in the direction of reactant gas flow can result in different reactant gas velocity at the electrode gap when different electrode pairs are used. This can result in variance in production between electrode pairs unless compensation is applied. In some embodiments, this effect is compensated for by dynamically changing the orifice size or which orifice is used, depending on which electrode pair is being used. In some embodiments, each of the electrode pairs is calibrated for NO production based on the reactant gas flow that they receive from a single nozzle. The NO generation system can detect and/or control which electrode breaks down and vary the duty cycle of the electrical discharge to ensure generation of a target amount of NO with each discharge.

In some embodiments, the gap is the same for each of the electrode pairs in an array of electrodes so that each pair is functionally equivalent with the others. In some embodiments, the gap varies between electrode pairs so that specific electrode pairs are energized for specific levels (or ranges) of NO production. In some embodiments, one or more nozzles are directed towards the electrode gap(s) and a combination of one or more of the nozzles is selected to achieve a particular NO production level or range.

Electrode Wear Detection

As electrodes wear, the gap between them can change. For example, sharp features can become rounded and the distance between electrodes can increase. Increases in electrode gap can affect the break-down voltage, break down timing and level of NO production. In some embodiments, the break-down time is used as an indicator of electrode gap/wear. In some embodiments, the phase angle between the AC voltage and the AC current at the gap are an indicator of electrode gap length. Because plasma impedance is mostly resistive and longer gaps are associated with higher resistance, the change in gap length may be observable as a change in the ratio of active power in the plasma to reactive power in the AC resonant circuit, which manifests as a phase shift. In some embodiments, the cumulative electrode use is used as a predictor of electrode gap. Cumulative use can be a function of one or more of cumulative run time, median moles of NO produced, cumulative number of discharges, and cumulative moles of NO produced.

Larger gaps require larger voltage to break down. In some embodiments, a NO generation system uses the high voltage magnitude of one or more discharges to determine the electrode gap. In some embodiments, a NO generation system uses one or more of the following parameters in addition to breakdown voltage to infer electrode gap: thermionic emissions, reactant gas humidity, reactant gas temperature, electrode temperature, plasma chamber temperature, and initial electrode gap.

In some embodiments, a NO generation system can generate an alarm and/or prompt electrode replacement based on the measured/indicated electrode gap. In some embodiments, a NO generation system can compensate for changes to electrode gap in order to maintain accurate NO production. For example, longer gaps indicate longer arcs that create more NO. In response to longer gaps, as can occur with electrode erosion, some embodiments of a NO generation system can do one or more of decrease the electrode current, decrease the discharge duration, change the discharge current/time relationship, and/or decrease the frequency of discharges.

Electrode Wear Compensation

The factory production calibration for an electrode pair may not be accurate throughout the expected life (wear) of the electrodes. In other words, the amount of NO generated by a particular frequency and/or duty cycle of electrical discharges can shift as a function of electrode wear and erosion. In some embodiments, a NO generation system includes an adaptive calibration scheme whereby a series of production calibration curves (production to Duty Cycle) are established and utilized during the life of the electrode to ensure accurate generation/delivery as the electrode wears. In some embodiments, a single mathematical function is utilized to calculate the correct plasma parameters (e.g. frequency, duty cycle, etc.) as a function of one or more of an electrode's design (e.g. material, geometry, initial gap, etc.), and service life (e.g. cumulative NO produced (e.g. moles), cumulative run time, historical duty cycle applied (e.g. average, range, weighted average), voltage range applied (e.g. average, range, weighted average), power levels applied and other parameters pertaining to the electrodes use).

In some embodiments, the compensation algorithm consists of several calibration curves, the first curve representing the actual calibration of the electrode at time=0 (factory). In one embodiment, subsequent curves are based on actual calibration of worn electrodes to account to non-linear wear as electrodes "break-in." In some embodiments, assume that the form of the initial calibration curve is similar over time and multiply the calibration curve with a scaling factor. For example, if after a given amount of production or a given amount of time at a given setpoint (moles or ppm*lpm*time) the average production has shifted by 10%, then a subsequent calibration curve may be generated by inducing an equivalent shift (in this case 10%) on the t=0 curve. The same process may be followed to generate as many subsequent calibration curves as observed production checkpoints for a population of electrodes as they wear.

In one embodiment, once the series of production calibration curves is established, the system selects a calibration curve to use based on the amount of total NO delivered (in moles) historically produced by the electrode. In some embodiments, the system interpolates between two or more discrete curves for finer resolution adjustments to NO production as a function of electrode wear. It should be noted that the term "electrode wear" applies to changes in the electrode gap as well as the rounding or sharp features over time.

The generation and adaptive selection of calibration curves (or interpolation thereof) may also be based on detected power or current draw over time (as the electrode wears), or any other parameter that may be strongly correlated to production as the electrode wears, rather than or in addition electrode history.

Since electrode wear patterns may be dependent on the usage profile (NO setpoint, flow rate, time), leading to increased wear patterns at specific portions of the electrode, it may be possible to interpolate between calibration curves based on the usage history. For example, a gliding arc electrode typically set to a 20 ppm NO target or less uses a particular range of the electrode surface associated with duty cycles required to generate low production levels. It follows that wear of the electrode would be in the region of the electrode where the arcing has occurred and not along the entire length of the electrode. In some embodiments, adaptive calibration is only applied to a first portion of the electrode (closest gap) whereas calibration for portions associated with longer duty cycles continue to refer to the factory curve (Time zero). These approaches to characterizing electrodes before use and adapting to real time measurements of electrode performance present ways of maintaining required production accuracy of an electrode system, thereby prolonging the service life.

Discharge Monitoring

In some embodiments, a sensor monitors the travel of a gliding arc. In some embodiments, the sensor is comprised of one or more of an optical sensor, a thermal sensor, or a camera. In some embodiments, the phase angle of voltage and current is used to infer a gap and infer where along the arc is along the length of the electrode. For further illustration, when an AC arc is located at the small gap of a variable gap electrode, more reactive power (or imaginary power) is generated than active, NO-generating power. Contrastingly, in large gap, more active power is produced. Imaginary power is power within capacitors and inductors within the high-voltage circuitry. The shorter the length of the arc, the closer the resistance is to zero. In this case, the majority of the apparent power would be circulating within the circuit (capacitors and inductors), and the phase angle approaches 90 degrees. If all the power was to be in arc discharge, the phase angle would be 0 degrees. It follows that as an arc moves from the short gap to the large gap, the amount of power within the arc increases and the phase angle decreases. In some embodiments, a NO generation system can determine the electrode gap and adjust the electrical discharge characteristics to produce a specific quantity of NO. As an electrode wears, the gap can become larger, producing physically longer arcs that produce greater amounts of NO. A NO generation system can compensate for an increase in electrode gap by decreasing the duty cycle and/or decreasing the current in the arc, for example.

In the event that an arc does not travel as far as expected, a NO generation system can prolong an electrical discharge to achieve a target amount of NO production.

Electrode Cooling

Electrode erosion can increase with electrode temperature. Each arcing event adds thermal energy to an electrode. This thermal energy can build up, increasing the electrode temperature and accelerating electrode wear. Electrode temperature can be reduced using various methods, including the use of a spooled wire electrode and a hollow electrode.

Electrode Replacement

Electrode replacement can be done on an as-needed basis, prophylactically, as part of planned maintenance or other frequencies. A sample work-flow for replacing the electrodes is as follows:

a. Power down device. (Allows cool-down)
    b. Remove side-plate, breaking electrical and pneumatic connections
    c. Remove plasma chamber
    d. Exchange electrodes (may include plasma chamber)
    e. Re-assemble unit (2x)

Figure 60B:
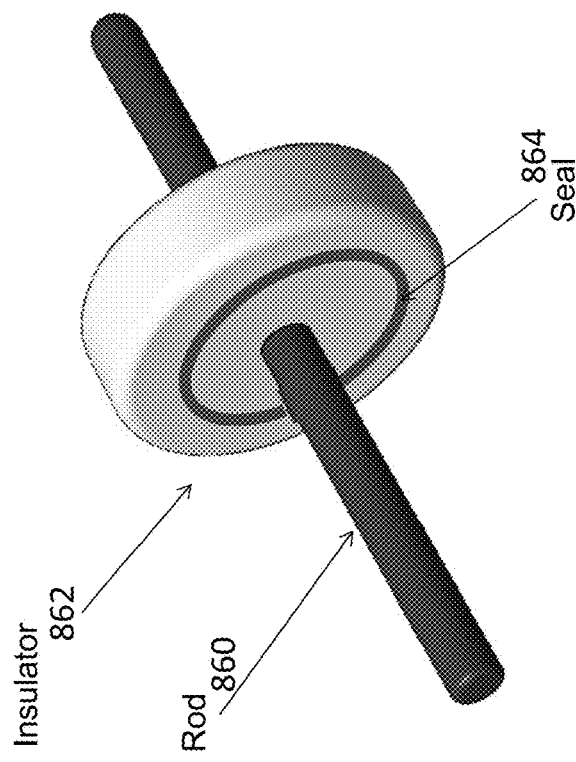
FIG. 60B depicts an embodiment of replaceable parallel electrodes.
Figure 60A:
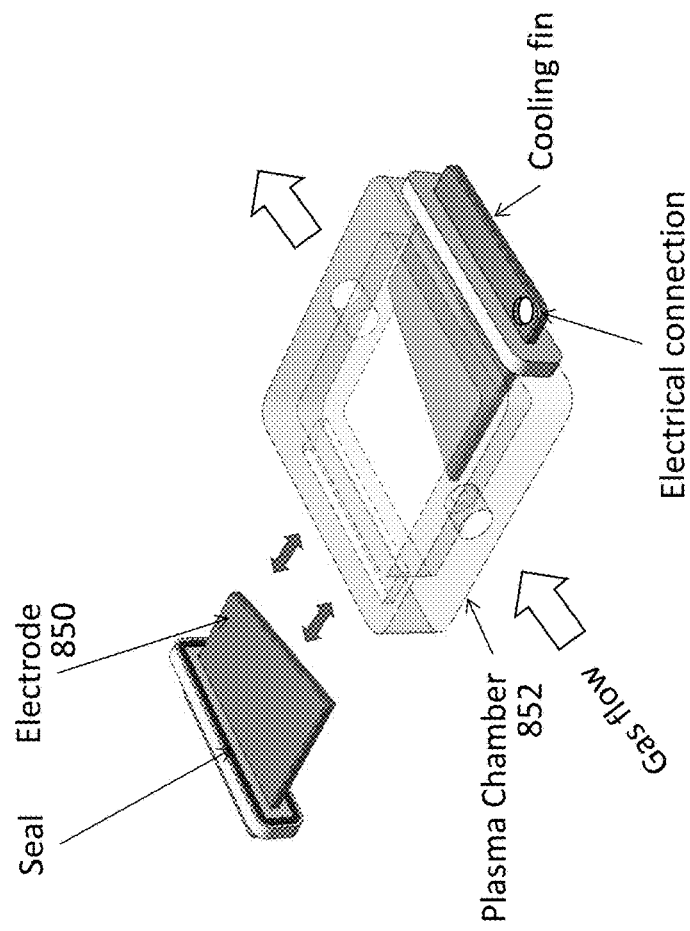
FIG. 60A depicts an embodiment of replaceable gliding arc electrodes.

FIG. 60A and FIG. 60B depict exemplary embodiments of replaceable electrodes and plasma chambers. FIG. 60A depicts a gliding arc plasma chamber 852 that includes slots on the sides to receive replacement electrodes 850. The electrodes seal against the chamber with an O-ring seal. An exposed electrode surface on the exterior of the chamber can be utilized to cool the electrode passively or actively. FIG. 60B depicts a replaceable electrode rod 860 with electrical insulator 862 and a seal 864, such as an O-ring seal, that can be inserted into the side of a plasma chamber.

Figure 61:
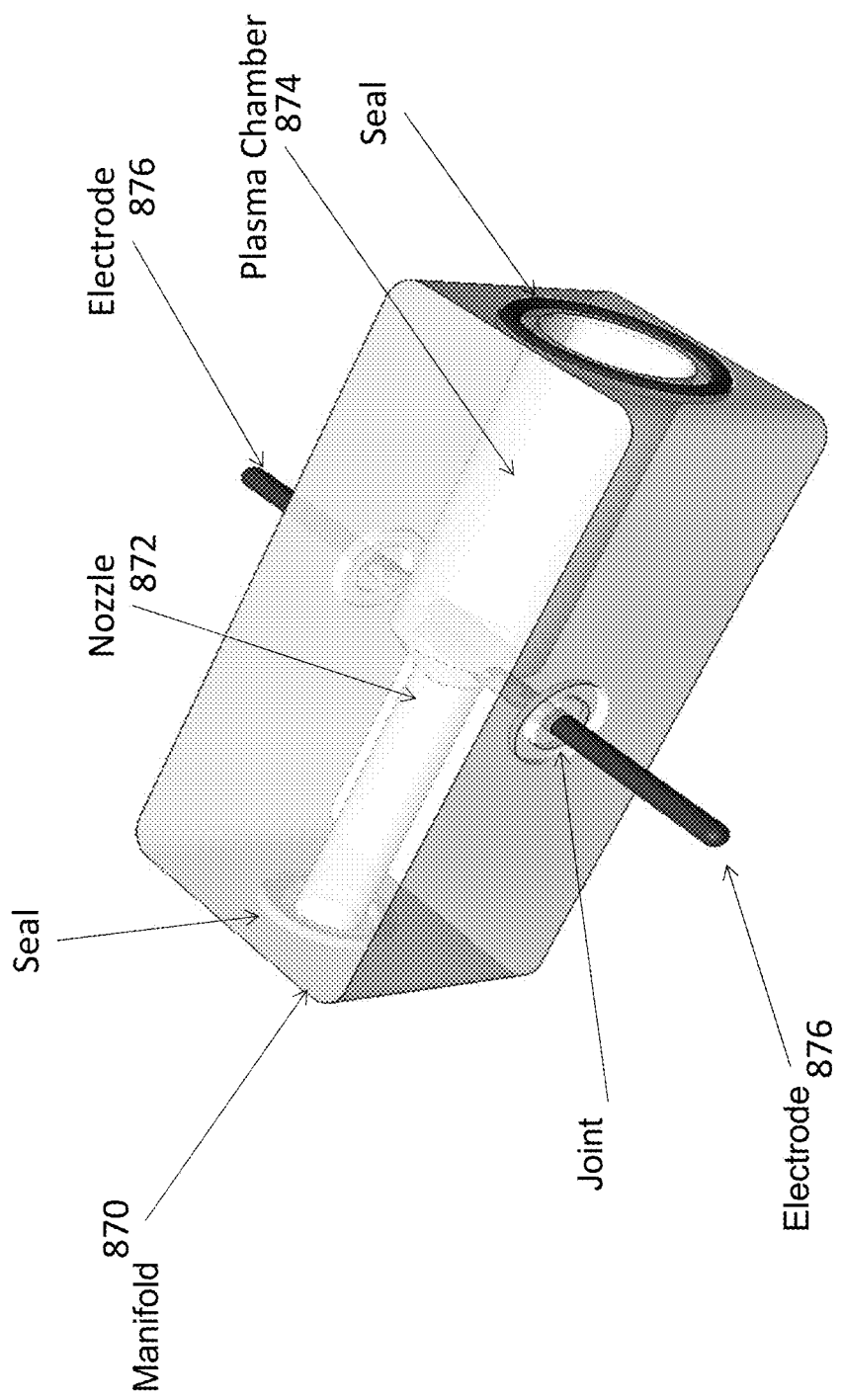
FIG. 61 depicts a plasma chamber assembly with parallel electrodes.

FIG. 61 depicts an embodiment of a replaceable manifold 870 with a nozzle 872, a plasma chamber 874, and electrodes 876. In some embodiments, the electrodes are sealed and affixed to the manifold with brazed joints. In some embodiments, the manifold is constructed of one or more of glass or ceramic. The seals between the manifold and rest of the NO generation system can be accomplished with compression fittings, O-rings, lip seals, face seals for example.

Figure 62:
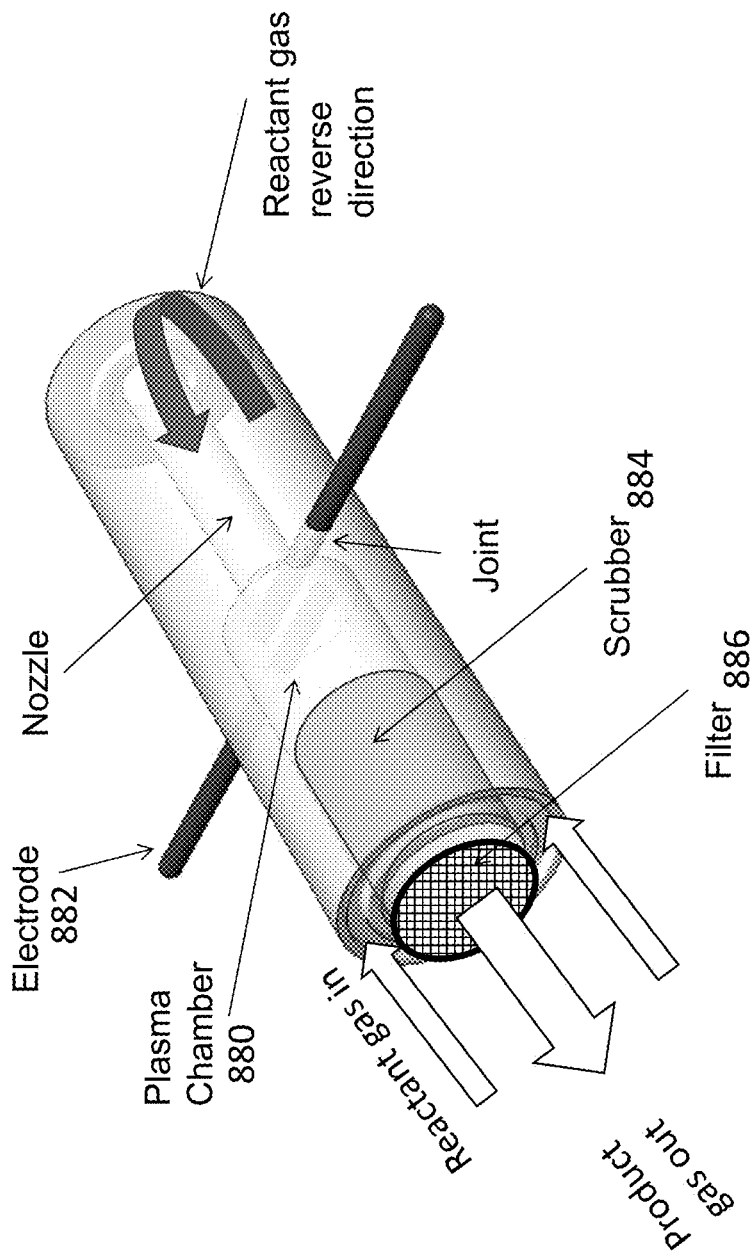
FIG. 62 depicts an exemplary embodiment of a replaceable plasma chamber and scrubber assembly.

FIG. 62 depicts an embodiment of a plasma chamber 880 in which electrodes 882 are integrated into the product gas scrubber. This solution enables a system to eliminate the NO production variance associated with electrode wear by inserting new electrodes at greater frequency. Inexpensive electrode materials (e.g. stainless steel, titanium) can be utilized to reduce cost of the disposable electrode/scrubber component. Reactant gas enters through an annular space and travels the length of the assembly before returning through a central lumen (See curved arrow depicting a U-turn). The lumen acts as a nozzle to focus reactant gas towards an electrode gap within a plasma chamber. NO is generated in the plasma chamber. In some embodiments, as shown, an optional scrubber 884 and filter 886 are included to remove $NO_2$ and particulates from the product gas. The replaceable plasma chamber interfaces with the overall system with gas seals and a retention mechanism. In some embodiments, the plasma chamber inserts into the system with a bayonet interface. In some embodiments, the electrode serves as the bayonet feature to retain the replaceable component in the reusable portion of the system. In some embodiments, the replaceable plasma chamber includes a Faraday cage. In some embodiments, the Faraday cage consists of a metallized surface that makes electrical contact with the rest of the system (not shown).

In some embodiments, a NO generation system is recalibrated after the electrodes have been replaced. This can be a manual operation involving calibration gases and/or known NO measurement devices. It can also be an automatic method, relying on calibrated gas sensors within the NO generation system.

In general, it is desirable for electrode replacement to not require any tools for removal and installation. All pneumatic connections should be accomplished in one step. In some embodiments, the mechanical connection is completed as a protective cover is installed, the protective covering serving as protection against one or more of high voltage, user contact, particulate and fluids.

Spooled Wire Electrode

Figure 63:
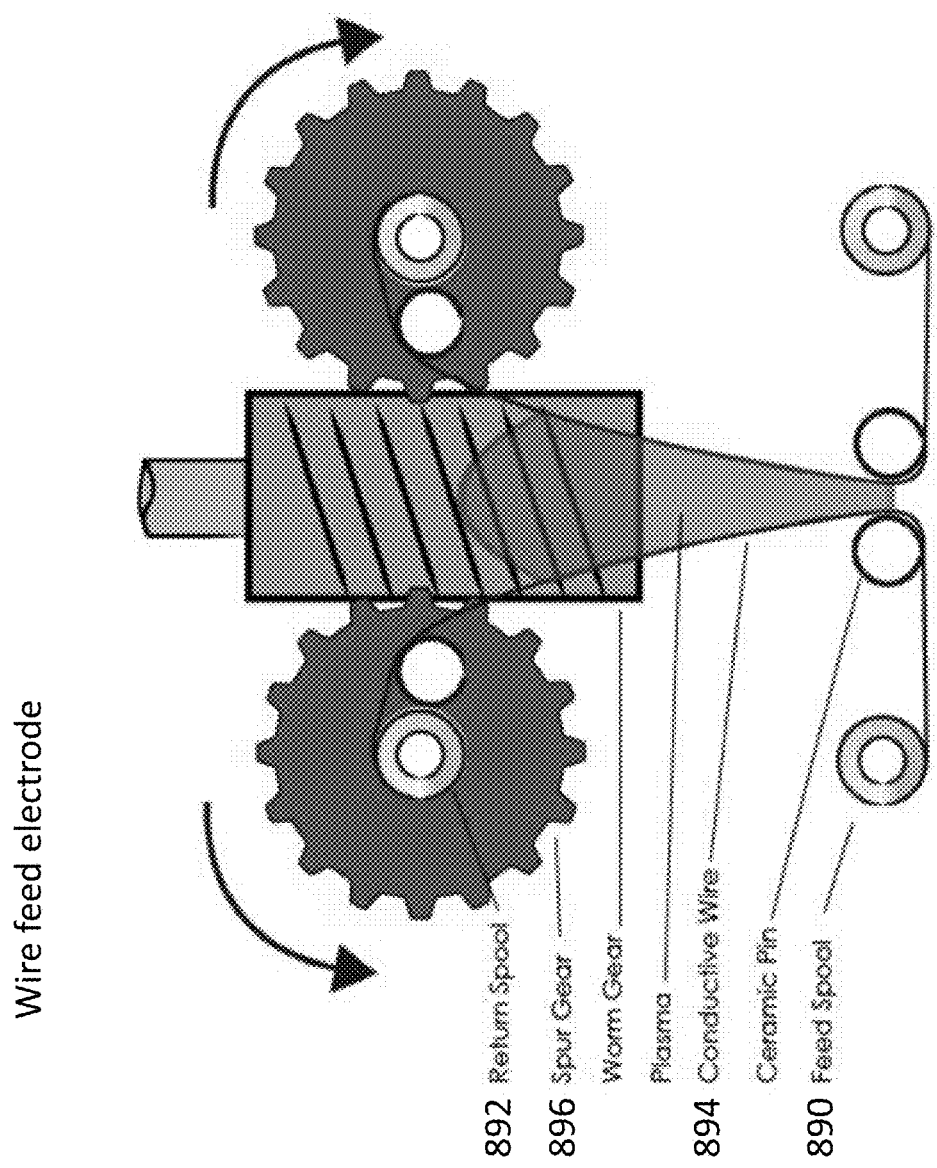
FIG. 63 illustrates an exemplary embodiment of a spooled wire electrode.

FIG. 63 depicts an embodiment where electrodes comprise wires 894 on spools. For example, the spools can include feed spools 890 and return spools 892. As the electrode wears, the spools can rotate, presenting fresh electrode material to the gap. For example, the spool can advance to a fresh electrode between patients. This approach allows for a longer time between service and more consistent NO generation over the electrode service life. In addition, a thin wire constrains the plasma to a smaller area thereby increasing production stability. This approach also efficiently uses electrode material since most of the wire surface area will be in contact with plasma. There can also be a cost reduction due to minimal material requirements, enabling the use of precious metal and/or electroplated/coated wire.

In the embodiment depicted in FIG. 63, electrode wire travel is controlled by a single worm drive gear 896. This ensures even travel of both electrode wires while minimizing the need for additional motors. Motion of the electrode wire can be continuous or step-wise. The length of the gliding arc surface and the electrode wire can vary. For example, the gliding arc surface can be 2" long and the electrode wire can be 30" long. At regular time intervals, for example each month, the entire 2" of electrode wire is replaced by advancing the wire 2". In some embodiments, the electrode wire travels at 2" per hour to replace the entire electrode surface after each full day of use, requiring roughly 182" of electrode wire per side.

Electrode wire travel can occur concomitant with plasma arcing. Electrode wires can be provided on separate spools as shown or be wrapped around a common spool. In some embodiments, the electrode wire travel rate is related to one or more of NO production, environmental conditions, and operating temperature. For example, in some embodiments, wire travel rate increases when operating temperatures are higher to compensate for accelerated electrode wear. In some embodiments, wire travel rate is slow when a NO generator is producing low levels of NO and increases for high NO production levels to maximize the use of the electrode material. In some embodiments, the electrode wire is advanced between patient treatments. In some embodiments, the electrode wire is advanced at the beginning or end of use of the plasma chamber.

Convection from Reactant Gas

Electrodes can be cooled by the reactant gas flowing through the plasma chamber. In some embodiments, reactant gas is actively cooled prior to entering the plasma chamber. In some embodiments, reactant gas is insulated from and routed away from heat sources within a NO generation device prior to injection into the plasma chamber. In some embodiments, reactant gas loses pressure as it enters the plasma chamber to decrease temperature. In some embodiments, a plasma chamber includes a plurality of nozzles for flowing gas over electrodes for cooling, rather than plasma generation. In some embodiments, electrodes have ridges, cooling fins, and/or other features to increase convective cooling.

External Electrode Cooling

Figure 64:
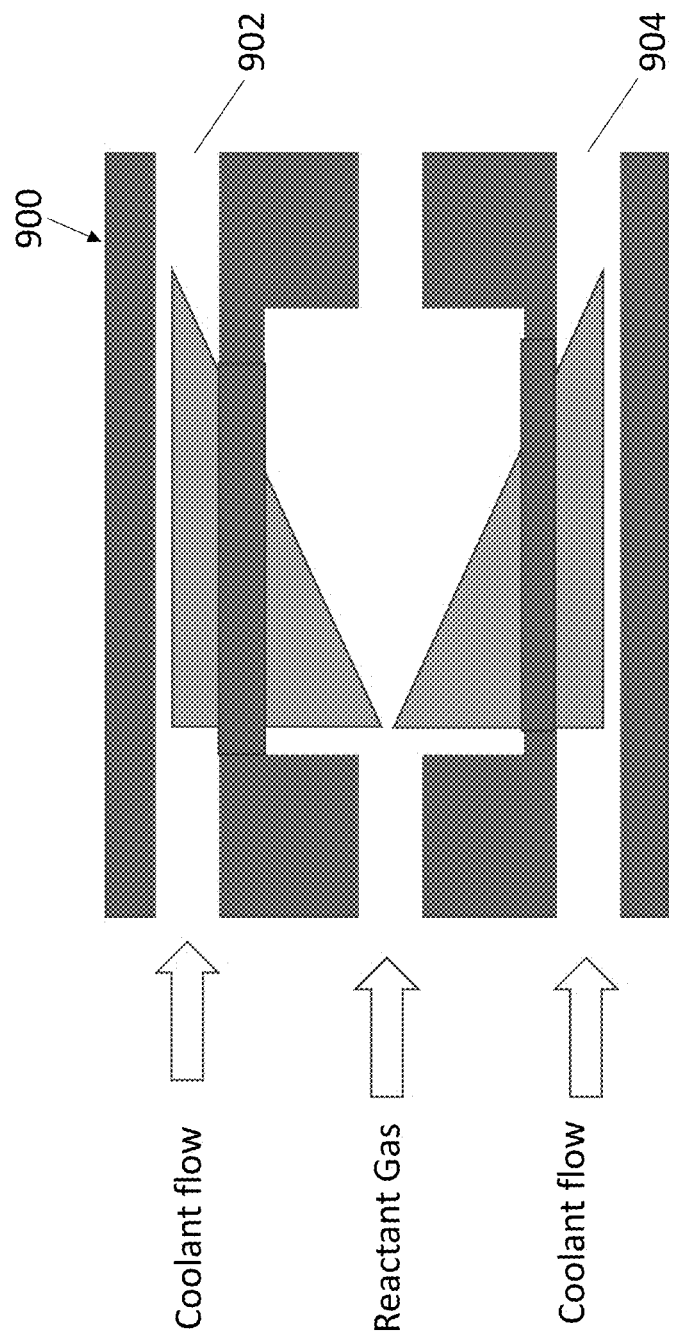
FIG. 64 illustrates an exemplary embodiment of an electrode design with external cooling features.

In some embodiments, a flow of gas external to the plasma chamber cools the electrodes. FIG. 64 depicts a design where reactant gas flows through a plasma chamber 900 in the center. A separate flow of gas or liquid flows through separate channels 902, 904 to cool the electrode material.

Hollow Electrodes

Figure 65:
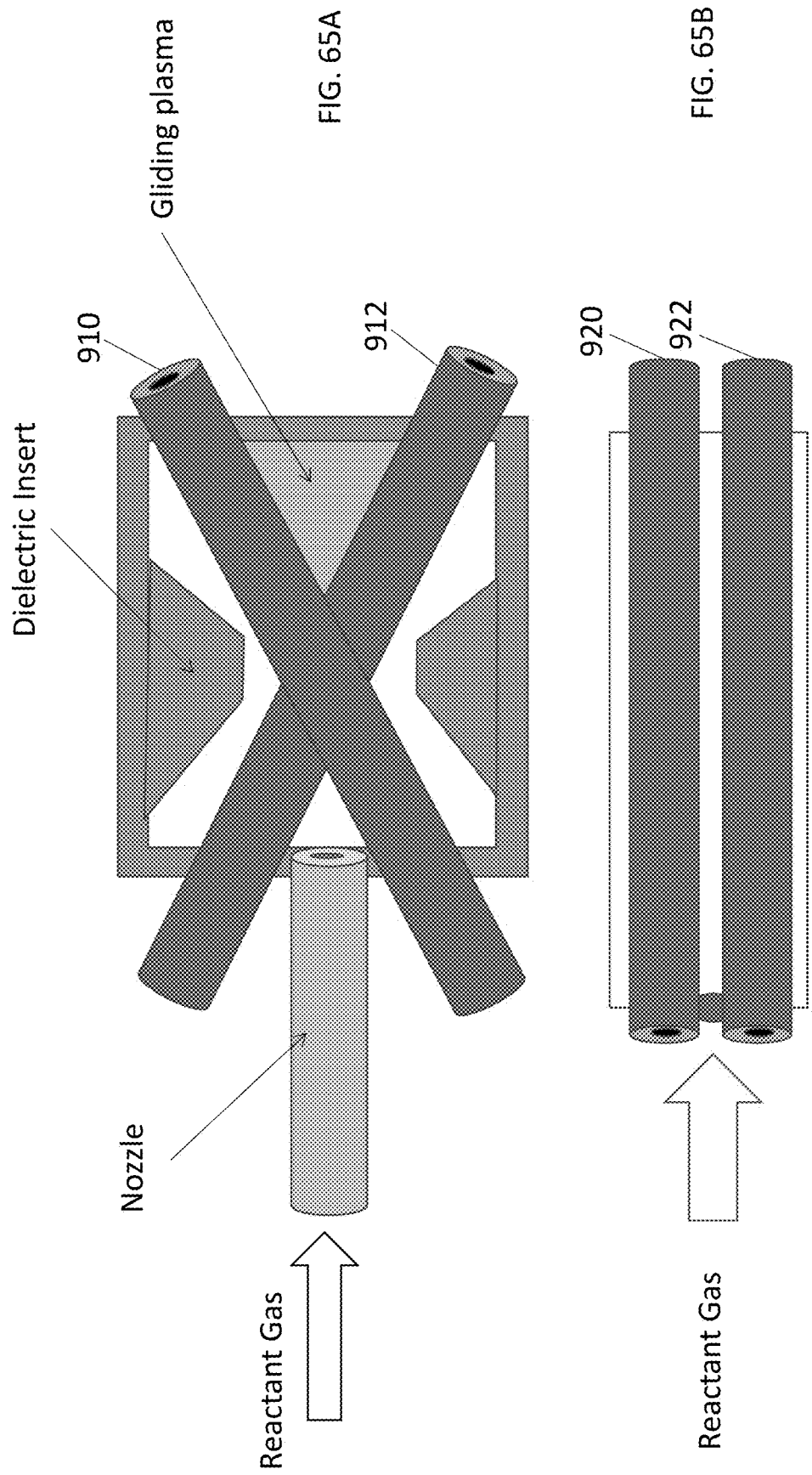
FIG. 65A and FIG. 65B illustrate exemplary embodiments of straight tube electrodes that overlap with a specific electrode gap.

In some embodiments, coolant gas or liquid passes through hollow electrodes to reduce temperature, as shown in FIG. 65A and FIG. 65B. FIG. 65A and FIG. 65B depict straight tube electrodes 910, 912 (FIG. 65A) and straight tube electrodes 920, 922 (FIG. 65B) that overlap with a specific electrode gap. Reactant gas is introduced to the chamber through a nozzle directed towards the gap. Straight tubes are depicted for their ease in manufacturing. In some embodiments, electrodes are curved to provide alternative electrode gap topology and rate changes. Owing to the orientation of the electrodes, the plasma will tilt with respect to the chamber. A nozzle directs reactant gas toward the gap. Features in the walls of the plasma chamber decrease dead volume in the system and keep the reactant gas flow focused on the electrode gap. In some embodiments, a slit nozzle focuses the reactant gas in the region of plasma generation. In some embodiments, the slit nozzle is not parallel to the electrodes. Instead, it is tilted to be parallel with the electrical arcs between electrodes. In some embodiments, the chamber and electrode assembly can be inserted into the system in the reverse orientation to use a common nozzle and increase their service life. In some embodiments, flow through the chamber can be reversed to lengthen the service life of electrodes and the time between device service.

In some embodiments, the electrodes are coated on the inside with ceramic, polymer, or another electrically insulating material to prevent electrical shorting through conductive cooling fluids. The cross-section of the tubular electrodes can be round, square, hexagonal, teardrop shape, or some other shape. A sharp edge, such as found on a teardrop shape can increase electrical field in the gap when the sharp edge is oriented towards the gap.

In some embodiments, a slit nozzle is used that is parallel to the orientation of the plasma. This approach focuses the reactant gas more than a single circular nozzle in the electrode gap to increase NO production.

In some embodiments, the direction of reactant gas flow can be reversed to double the life of electrodes. This can be accomplished pneumatically by routing gas the opposite direction through the chamber. In some embodiments, the nozzle and chamber are separable such that the plasma chamber can be removed and inserted in the reverse direction. This approach can apply to solid and/or hollow electrodes.

Coolant for the electrodes can be a gas (air, nitrogen, etc.), or a liquid (water, ethylene glycol, mineral oil, etc.). When liquids are utilized for cooling, non-electrically conductive liquids can be used to prevent shorting of the high voltage circuit through the cooling system. Alternatively, independent cooling systems can be used for each electrode. In some embodiments of liquid cooling, a closed loop coolant path is used. In some embodiments, liquid passes through the electrodes and returns to a reservoir to lose heat. In some embodiments, a heat exchanger with cooing fins is used to dissipate heat from the electrode coolant. In some embodiments, a heat exchanger is located within a NO generator such that box cooling air is used to cool the coolant. In some embodiments, a thermo-electric device is used to actively cool electrode gas or liquid coolant.

Figure 66:
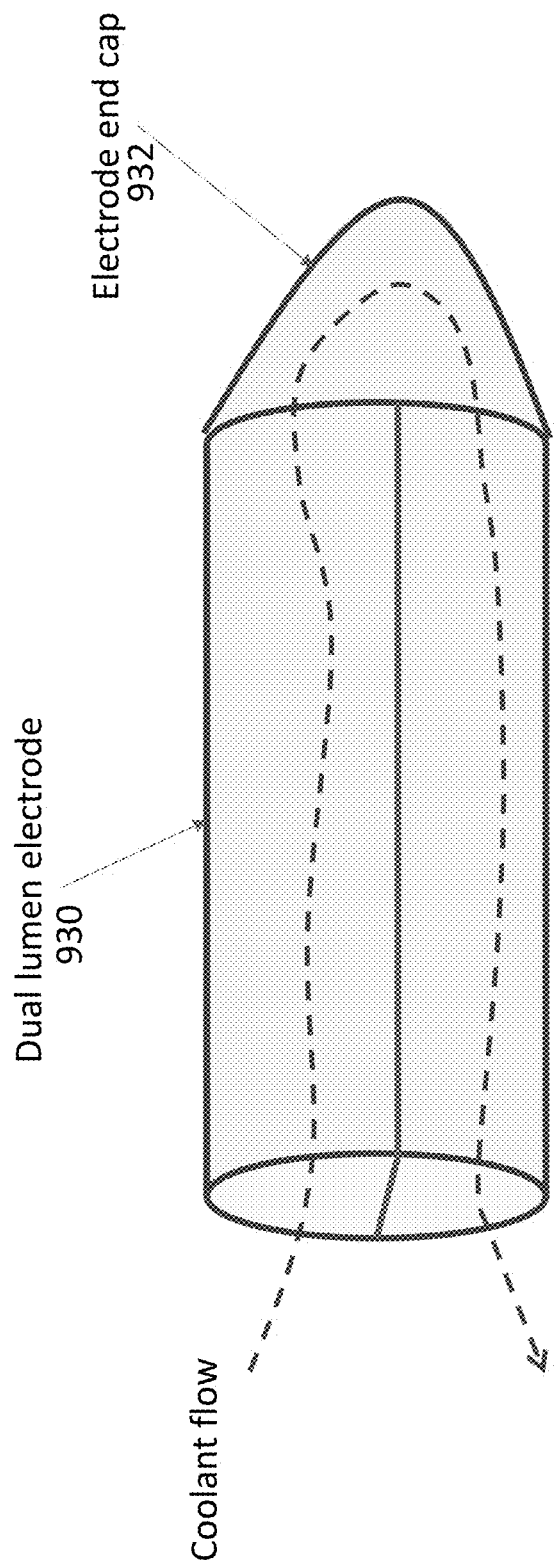
FIG. 66 illustrates an exemplary embodiment of a dual lumen cooled electrode.

FIG. 66 depicts an embodiment of a dual lumen cooled electrode 930. Coolant enters and exits from the same end of the electrode. The electrode is constructed from a dual lumen extrusion with an end cap 932 to direct flow from one lumen to the other. In some embodiments, the end cap is welded, soldered, brazed, or bonded to the extrusion to provide a fluid-tight connection.

FIG. 67A and FIG. 67B illustrate embodiments of tubular electrodes (electrodes 940, 942 in FIG. 67A and electrode 950 in FIG. 67B) with a single bend or arc. This approach enables a gliding arc design while facilitating separation of the electrodes to control arcing and minimize the potential for creepage along the internal walls of the plasma chamber. In some embodiments, the electrodes begin parallel and then diverge. In some embodiments, electrodes enter the chamber at a converging angle and reach a point of closest proximity, where electrical breakdown takes place. From the breakdown location, the electrodes diverge again. Arcs initiated at the breakdown location travel along the electrodes in the direction of gas flow. The angle of bend or arc can vary. For example, in FIG. 67A, the electrodes 940, 942 can include a 30 degree bend so there is no interference with the nozzle and there is discrete location for breakdown. FIG. 67B illustrates an electrode 950 with a single bend, and that electrode can be rotated about the long axis such that the shorter leg of the electrode can go in the opposite direction.

Thermal Coupling of Electrode to Chamber

Another means to reduce electrode temperature is to ensure thermal coupling between the electrodes and the plasma chamber. In some embodiments, a thermal paste is used between the electrode and plasma chamber to improve thermal conductivity. In some embodiments, a plasma chamber is made from a thermally conductive and non-electrically conductive material.

Scrubber

Cage Capture

In some embodiments, cage capture technology is used to selectively remove $NO_2$ from product gas. Cage capture involves the use of custom nanomaterials to selectively attract specific types of molecules chemically and/or physically. This approach effectively attracts and retains pollutants within the structure of the cage capture material. It can allow for increases in absorption capacity and environmental robustness (e.g., immunity to environmental humidity). In some embodiments, $NO_2$ in a gas stream is sequestered into a molecular cage within the cage capture material and stored in the form of $N_2O_4$. In some embodiments, the cage capture reaction is reversible, enabling cage capture materials to be reused multiple times. In one embodiment, soaking the scrubber in water dissolves the $N_2O_4$, forming nitric acid in the process. In some embodiments, the $NO_2$ scrubber of a NO device can be removed and soaked in water to remove the $NO_2$ from the scrubber material. The nitric acid formed is then neutralized with an alkaline material prior to disposal into a sewer. In one embodiment, the pH of the nitric acid is neutralized with an alkaline material (e.g., sodium hydroxide or soda lime) to a value of 5.5 to 8.5 before disposal. The benefit of this approach is that a scrubber using cage capture technology can be reused over many cycles, reducing the amount of material that goes to the landfill or incinerator. In some embodiments, the cage capture material is a metal-organic framework (e.g., Manchester Framework Material MFM-520).

Scrubber Design

Figure 68:
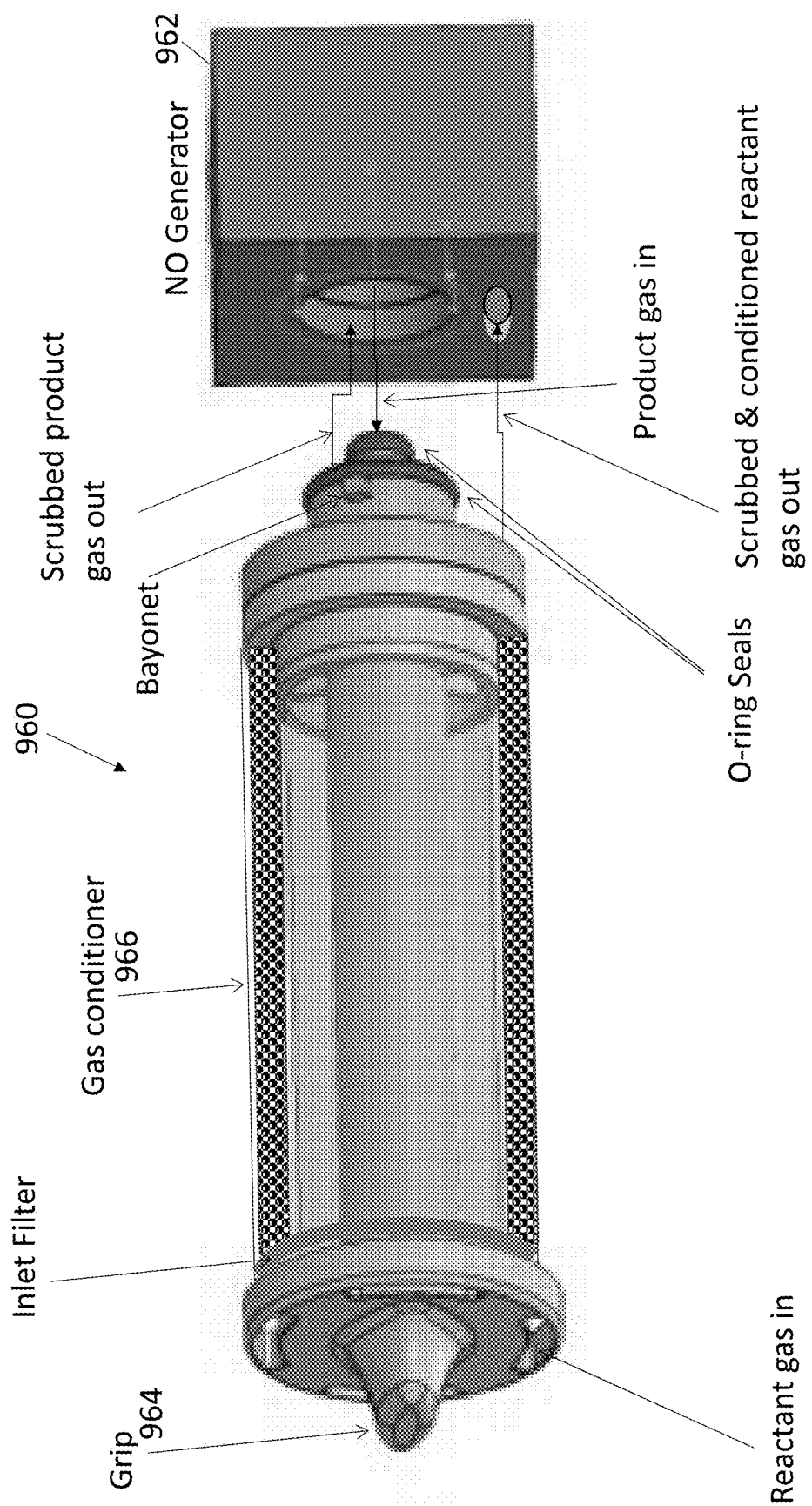
FIG. 68 depicts an embodiment of a gas conditioning cartridge for reactant gas and product gas.
Figure 69:
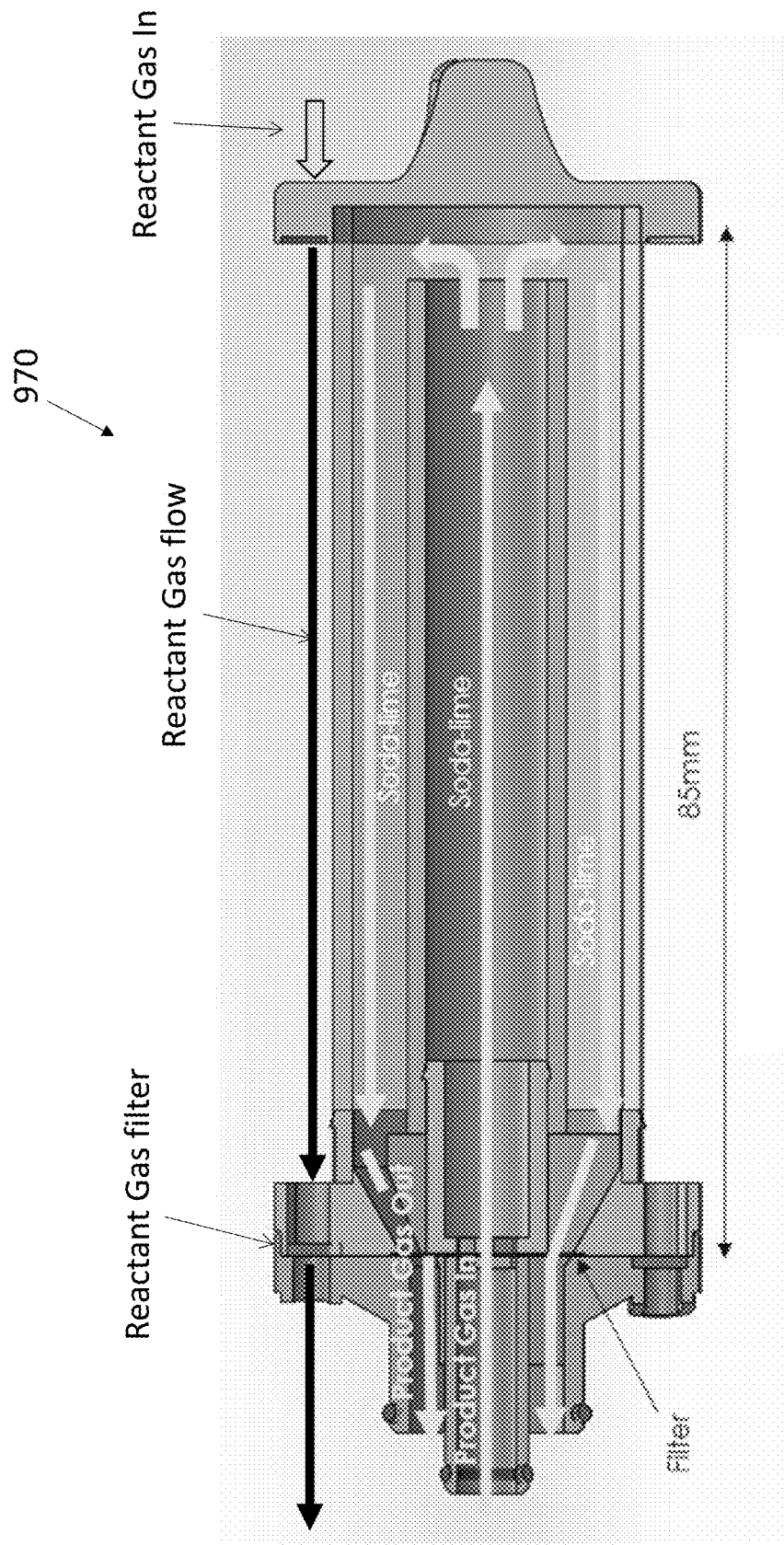
FIG. 69 presents the gas flow paths through an exemplary gas conditioning cartridge.

In some embodiments, a replaceable $NO_2$ scrubber cartridge 960 can interface with the NO generator 962 with a triple lumen connection that engages with a twist (e.g. bayonet fitting or threads), as shown in FIG. 68. In FIG. 68, the scrubber cartridge is cylindrical in shape. Reactant gas (e.g., air) enters the scrubber cartridge through one or more holes. A grip handle 964 can be used for twisting the cartridge to engage the cartridge with the controller, twisting the cartridge for removal from the NO generator and pulling the cartridge out of the NO generator. Reactant gas passes through a particle filter and then through a bed of gas conditioning material 966 (e.g., activated carbon for VOC removal, molecular sieve for VOC removal and water removal, etc.). Reactant gas then passes the end of the scrubber cartridge 960 and enters into the NO generator 962, where it is converted to a product gas. Product gas exits the NO generator through a central lumen where it enters the cartridge. In some embodiments, the product gas passes directly from the right end to the left end of the cartridge without any $NO_2$ scrubber. In some embodiments, the gas is scrubbed for $NO_2$ as it traverses from right to left. The scrubber material can be one or more $NO_2$ scrubber materials in granular, sheet, coating and other form factors. Once the product gas reaches the left end of the scrubber cartridge, it passes radially out to a return layer. Within the return layer, the product gas is scrubbed to remove $NO_2$ prior exiting the cartridge and returning to the NO generator. Radial (e.g., O-ring) or face seals are utilized to prevent fluid communication between the gas pathways. In some embodiments, the reactant gas conditioning is handled with a separate cartridge and not included in the scope of the product gas scrubber. In other embodiments, the reactant gas passes through the product gas scrubber as shown but is not scrubbed. FIG. 69 provides additional detail to the flow path of reactant gas and product gas through a scrubber cartridge 970. In this embodiment, reactant gas is only filtered (not scrubbed or desiccated). The embodiment of FIG. 69 also shows product gas scrubbing in both the outbound and return flow paths.

In some embodiments, gas flow within a scrubber cartridge may be parallel to the long axis of the scrubber with gas flowing through filters and media in a sequential fashion. In some embodiments, filtration and/or scrubbing is accomplished as gas flows radially from an inner location within the scrubber housing to an outer location (or vice-versa).

Scrubber Cartridge Retention

In some embodiments, the NO generator includes an interlock to prevent insertion and/or removal of a scrubber cartridge. In some embodiments, the interlock is activated during NO treatment to prevent a user from removing a scrubber cartridge and interrupting therapy.

Reactant Gas Scrubbing

In some embodiments, reactant gas is scrubbed to remove VOCs and other contaminants that may be present in the environment prior to passing through the plasma chamber. VOC removal from reactant gas can be important in two ways: (1) it controls the inputs to the plasma chamber to limit the types of chemical reactions occurring within the plasma chamber, and (2) it mitigates against VOC cross-sensitivity in sensors within the pneumatic path, such as the NO sensor. In some embodiments, the reactant gas scrubber contains one or more of activated charcoal, molecular sieve material, or cage capture material. The reactant gas scrubber can be a stand-alone scrubber, or combined with an inlet filter, product gas scrubber, electrode and/or other disposable and semi-disposable components of a NO generation system.

Figure 70:
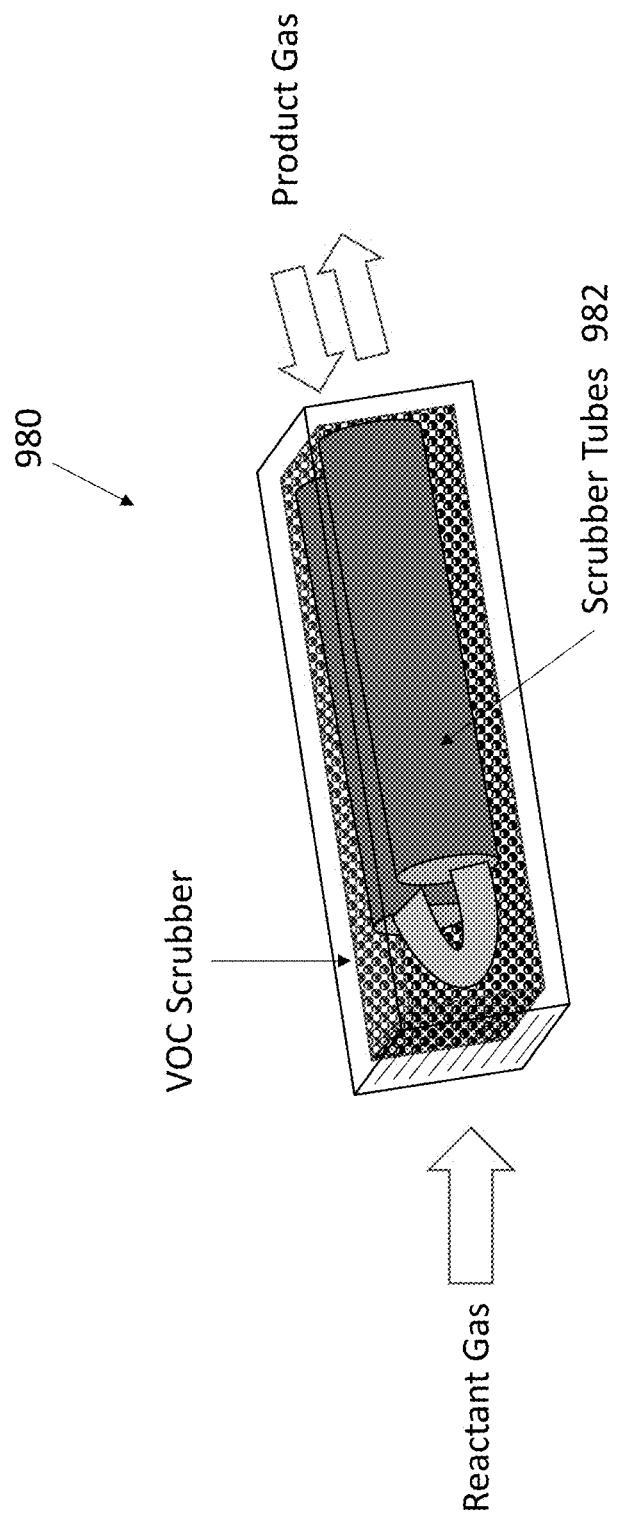
FIG. 70 illustrates an exemplary embodiment of a product gas scrubber cartridge.

FIG. 70 depicts a product gas scrubber cartridge 980 including two scrubber tubes 982 for removing $NO_2$ from product gas. A housing around the scrubber tubes provides a conduit for ambient air to be filtered and passed into the NO generator. activated charcoal) for VOCs, NOx compounds and other to clean the reactant gas prior to use.

Extrusions that Scrub

In some embodiments, a tube or conduit for the flow of product gas includes a material for scrubbing $NO_2$. In some embodiments, a material that sequesters $NO_2$ is coated along a surface of an extrusion. In some embodiments, the ID of a tube is coated. Coatings can be made from one or more $NO_2$ scrubber material alone. In one embodiment, a third material is used to bind the $NO_2$ scrubber material to the substrate tubing material. In some embodiments, a $NO_2$ scrubbing material is mixed with a matrix material that adheres to the substrate tubing material.

In some embodiments, the tube is comprised of a co-extrusion where the inner extrusion is comprised at least in part of an $NO_2$-scrubber material.

In some embodiments, the entire tube is comprised of a material that has been compounded with a $NO_2$-scrubber material. In some embodiments, a polymer such as polyurethane or PEBAX compounded with, for example, soda lime.

Figure 71:
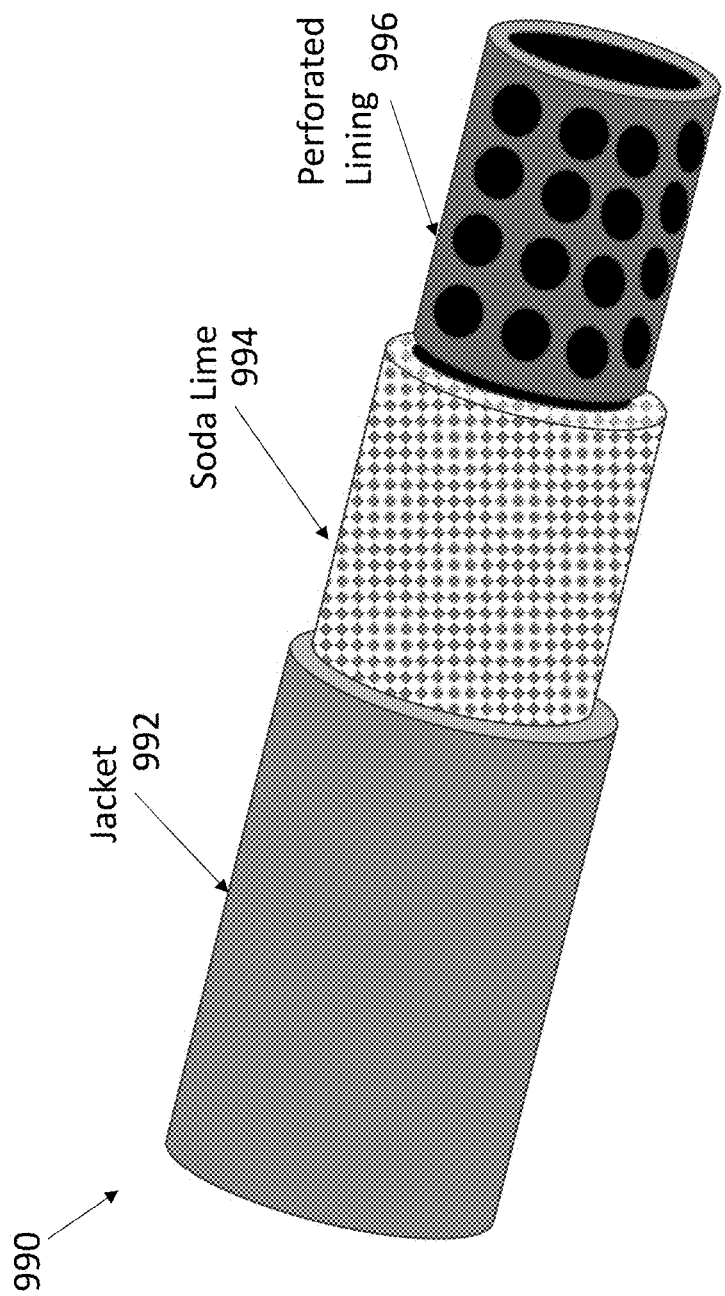
FIG. 71 illustrates an exemplary embodiment of a scrubber tube.

In some embodiments, a tube 990, as shown in FIG. 71, is comprised of three layers: an outer jacket layer 992 that is impermeable to product gas, a middle layer 994 comprised of a scrubber material, and a perforated inner layer 996 that permits passing of product gas into the middle layer while also preventing scrubber material from the middle layer from migrating. In some embodiments, scrubber material particles are used to construct the middle layer.

The level of scrubbing of a coated tube is a function of one or more of available tube surface area, tube length, coating chemistry, available scrubber material surface area, gas velocity, gas flow state (laminar vs. turbulent), density of the coating, age of coating, and environmental factors (pressure, temperature, humidity).

Gas Sampling

In some embodiments, sample gases are chilled prior to or within a water trap to promote water condensation and improve water removal from a gas sample. In some embodiments, this eliminates the need for Nafion tubing to reduce the humidity of the gas sample. In some embodiments, cooling is achieved by one or more of a thermoelectric cooler, ice, and a pressure drop. In some embodiments, a gas sample passes through Nafion tubing where a heating element increases the temperature and lowers the relative humidity outside the Nafion tubing thereby removing water content from the gas sample. In some embodiments, the humidity of the gas sample is measured and the temperature of the heating element is modulated to maintain gas sample humidity within a target range. In some embodiments, the target gas sample range is 30 to 70% relative humidity. In some embodiments, a thermoelectric cooler is used to cool a water trap while simultaneously warming the environment around Nafion tubing to dry sample gas.

In some embodiments, sample gases are passed through and/or near desiccant that removes excess humidity. In some embodiments, sample gases pass through Nafion tubing that is located in a bed of desiccant. In some embodiments, desiccant is in the form of beads. In some embodiments, desiccant is selected to maintain a particular humidity range so that it absorbs humidity from excessively humid sample gas and provides humidity to excessively dry sample gas. In some embodiments, desiccant is packaged with a water trap so that it is replaced periodically by the user without adding a use step.

NO sensors can drift over time. In a scenario where a NO sensor drifts up, a NO controller can generate a high NO alarm based on false information. This is a concern because, a typical NO delivery system will stop therapy in the presence of a high inhaled NO alarm. In some embodiments, a NO generation system can check the validity of a high NO alarm by assessing NO production levels to determine whether or not NO production has increased. NO production can be assessed by measurement of one or more of product gas NO concentration, plasma activity (current, voltage, power, light emissions), diluted product gas NO concentration, product gas flow rate, reactant gas flow rate, and other parameters related to NO production. By confirming that NO production has not changed, there is no mechanism for inhaled NO concentration to increase and a NO generation and delivery system can infer that the inhaled NO concentration sensor has drifted up. This enables a NO generation and delivery system in the presence of a high inhaled NO reading to decrease the severity of the alarm condition and continue treatment.

Compensation for Inhaled Gas Mixture

The gas mixture within the inspiratory limb of a device varies from treatment to treatment. Some patients receive supplemental oxygen while others receive supplemental Helium.

Oxygen Compensation

Inhaled oxygen levels can range from atmospheric (21%) to pure oxygen (100%). The density of air is 1.225 kg/m3 while the density of oxygen is 1.429 kg/m3. Worst case, a system calibrated at atmospheric levels of oxygen to operate without inspiratory gas mixture compensation will experience a 16% measurement error in inspiratory mass flow measurements when 100% oxygen is utilized. Compensation for mass flow measurement errors can be made for various oxygen fractions within the inspiratory limb. In some embodiments, a controller determines the oxygen level and/or nitrogen level within the breathing circuit based on an oxygen sensor measurement and/or user input and adjusts the calibration of the inspiratory flow sensor, accordingly. In some embodiments, the NO generation system measures the nitrogen content within the inspiratory gas and infers that the balance of the gas is oxygen as an input to the mass flow measurement compensation. In some embodiments, the calibration of the inspiratory flow sensor is compensated by looking up an appropriate calibration for the inspiratory flow sensor according to the indicated oxygen level. In some embodiments, the compensation value is based on prior characterization of the sensor with various levels of oxygen. In some embodiments, the compensation is simply calculated based on the ratio of the gas density of the indicated gas mixture vs. the gas mixture the system was calibrated with. In another embodiment, the NO device uses the measured NO concentration in the inspired gas as feedback to the NO generation/delivery system to drive inhaled NO concentrations to the target value.

Helium Treatment

In some embodiments, the patient inspiratory flow includes helium mixed with air, oxygen and potentially other gases (AKA Heliox treatment). The density of the inspired gas changes, which can affect the calibration of the mass flow sensor in the system by up to a factor of 2. In some embodiments, the system enables the user to enter the amount of helium in the inspired gas and the device treatment controller compensates for the amount of helium in the mass flow sensor calibration. In some embodiments, a NO generation system includes a helium sensor to measure the fraction of helium in the inspired gas. This measurement is then used as an input to the controller to shift the calibration of the inspired gas mass flow sensor, accordingly. In another embodiment, a sensor measuring inhaled NO concentrations is used as feedback to drive inhaled NO concentrations to the target value.

Similar approaches can be utilized for other supplemental inspiratory gases and combinations thereof that can be sensed.

Pulsed NO Delivery

Constant Duration NO Pulsing

Pulsed NO delivery can allow for savings in energy and delivering NO to specific parts of the lung. In some embodiments, a NO generator and/or delivery system always generates NO pulses of the same duration. In one embodiment, all pulses last 0.5 seconds. In some embodiments, a NO generator and/or delivery system does one or more of the following to accurately dose a patient while delivering constant duration pulses: alter pulse flow rate, alter pulse concentration, alter pulse onset timing with respect to breath initiation, and dose a subset of breaths (breath skipping). In some embodiments, a NO generation and/or delivery system delivers pulses to a patient based on a dithering algorithm that tracks NO demand vs. NO delivered over time such that a new pulse is delivered to the patient whenever the NO demand exceeds NO delivered.

Patient Indication Compensation

In some embodiments, a NO delivery device alters the NO pulse strategy according to the patient diagnosis, as indicated by an external user (care provider), or patient, or based on input to the NO generator. As an example, Interstitial Lung Disease (ILD) is a clinical condition where the lung tissue of a patient scars up, loses its elasticity and has reduced compliance. Patients have to labor with their respiratory muscles to expand their lungs to bring in enough air and often cannot bring in sufficient air. Thickening of the gas exchange membrane in the air sacs (alveoli) with scar tissue and reduced ventilation in heavily scarred areas of the lung lead to low oxygen levels systemically. ILD patients typically have a breathing waveform that can be identified by its rapid transitions from inhalation to exhalation, faster than normal respiratory rates, and lack of a pause after exhalation. These patients can benefit from receiving NO throughout the breath, so that blood vessels in healthier regions of the lung can be dilated leading to reduced blood flow in the sickest part of the lung. It follows, that a NO delivery device should dose the early part of inspiration in these patients, and not the final portion of the breath that travels to the anatomic the sickest lung and the dead space. This same approach for pulsed dosing is applicable to patients with a left ventricular assist device and pulmonary hypertension even if the entire lung is healthy and able to take up oxygen.

Another patient indication is Chronic Obstructive Pulmonary Disease. These patients tend to have one or more diseased regions of the lung with the remaining lung more or less healthy. Medical research has shown that these patients tend to recruit the healthy parts of the lung before the unhealthy parts of the lung during inhalation. NO dosing of the unhealthy parts of the lung can result in increased blood flow to the unhealthy parts and actually decrease patient oxygenation overall. Thus, it is beneficial in these patients as in ILD to dose only an initial portion of the patient inspiration. The fraction of the inspiration that can be dosed to benefit the patient will vary from patient to patient.

Patient oxygenation is an indication of patient well-being. This parameter can be measured by an SpO2 sensor built into the NO delivery device or measured by an external device and communicated to the NO delivery device. In some embodiments, a NO delivery device that measures or receives SpO2 information from an external device can determine an optimal fraction of inspiration to dose using a closed-loop control scheme (this could also apply to ILD). In some embodiments, the fraction of the breath that should be dosed is entered into the device by an external user.

Gas Sensor Calibration

Sensors within a NO generation and/or delivery system require calibration from time to time with the gas sensors being no exception. State of the art calibration involves a 15 minute process whereby the user connects various calibration gases to the gas sensor bank of a gas analyzer so that the system can obtain high and low readings for a calibration of each type of gas sensor. Oxygen sensors can be calibrated using atmospheric air (20.8% oxygen) and another value. In some embodiments, a gas containing no oxygen (e.g. NO in a balance of N2) is used to provide a zero value for the oxygen sensor. In some embodiments, oxygen from the hospital supply is utilized to obtain a high calibration reading (e.g. 100% O2).

In some embodiments, NO and $NO_2$ gas sensors are calibrated using a calibration kit. A calibration gas kit (CGK) provides automated calibration of a 3P-001 device with known gas concentrations. In one embodiment, the GCK includes calibration gas cylinders, flow regulators, tubing, one or more smart chips and unique connectors that resemble the components that already interface with the NO device (e.g. a water trap, a scrubber cartridge, or a gas conditioning cartridge). In some embodiments, power to the CGK is provided by and controlled by the NO generation/delivery device.

Figure 72:
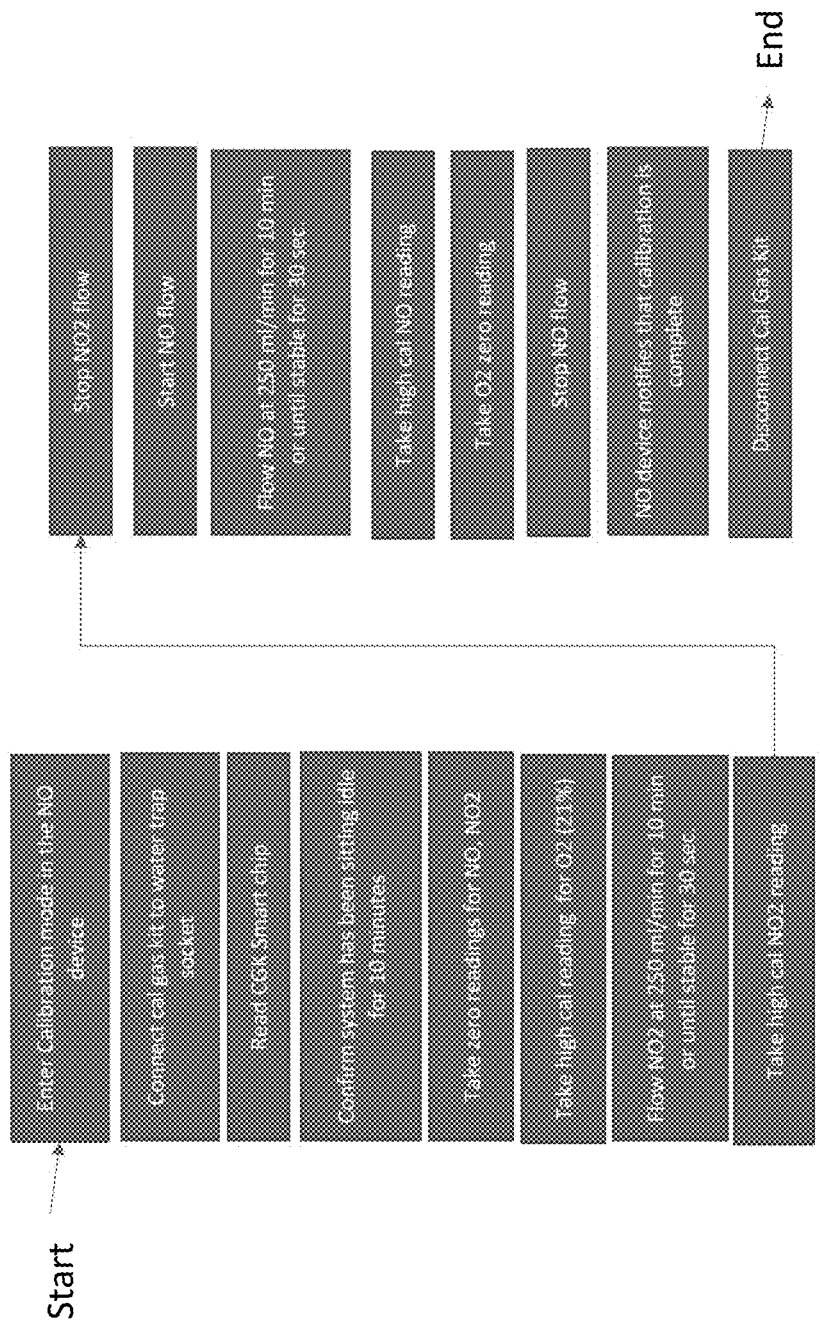
FIG. 72 depicts a flowchart showing an exemplary process for calibrating gas sensors on a NO device.

The t90 (i.e. the rise time of a gas sensor from 10% to 90% of full scale) of an electrochemical sensor can be very slow with some approaching 400 seconds. Some gas sensor manufacturers recommend that calibration gas flows past the sensor for the lessor of either 10 minutes or when the sensor signal has not changed for 30 seconds for each sensor prior to taking a calibration reading. FIG. 72 depicts an exemplary flow chart showing a typical sequence of steps to calibrate sensors for NO, $NO_2$ and $O_2$ on a NO device. Calibration gases enter the system through the water trap connection, which is the route that normal inspired gas samples pass through.

Figure 73:
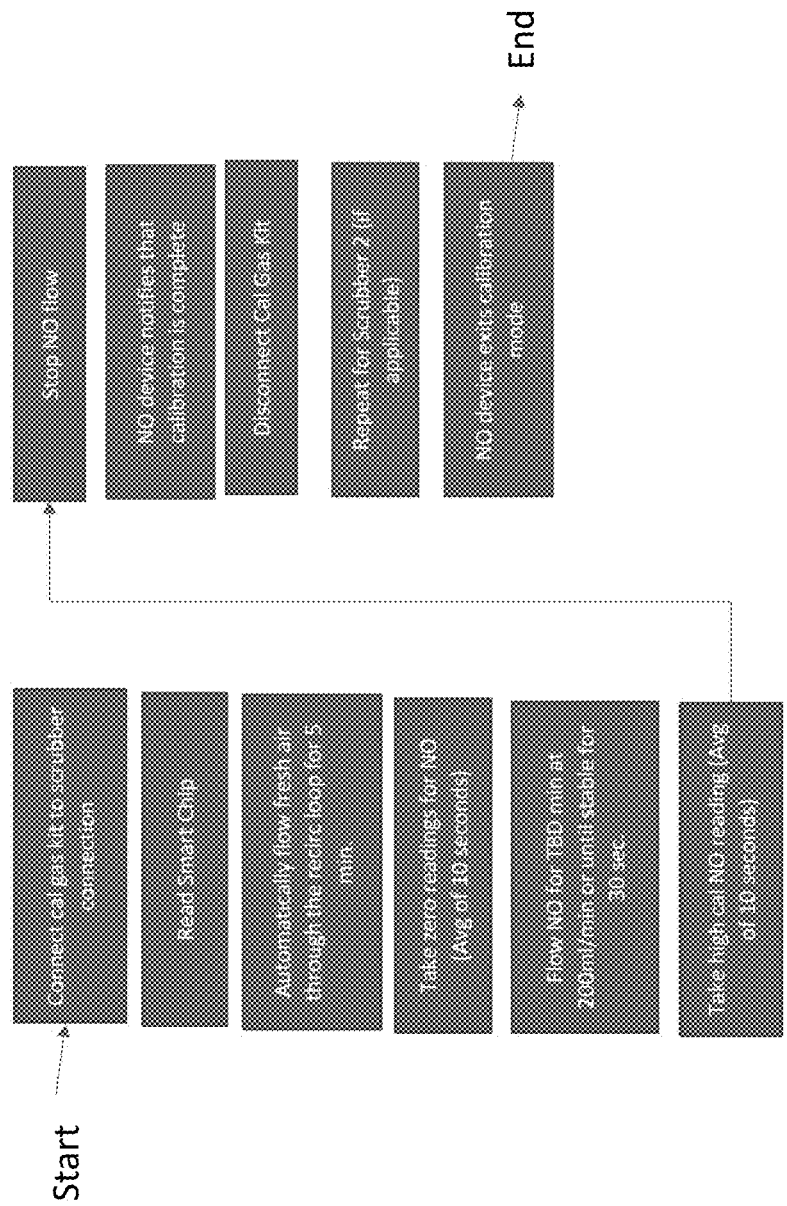
FIG. 73 depicts a flowchart showing an exemplary process for calibrating a NO sensor within a recirculation architecture.

FIG. 73 depicts a typical sequence of steps to calibrate the NO sensor within a recirculation architecture. The recirculation loop is first purged with air to obtain a true zero reading for the sensor. Then, high concentration NO calibration gas is passed by the NO sensor for sufficient time that the sensor reading has settled. In some embodiments, calibration gas is introduced to the system through an external interface that typically handles reactant gas or product gas. In some embodiments, the calibration gas is introduced to the NO system through a port that is normally occupied by a replaceable scrubber. In some embodiments, the calibration gas is introduced to the system through a dedicated port for calibration gas.

Figure 74:
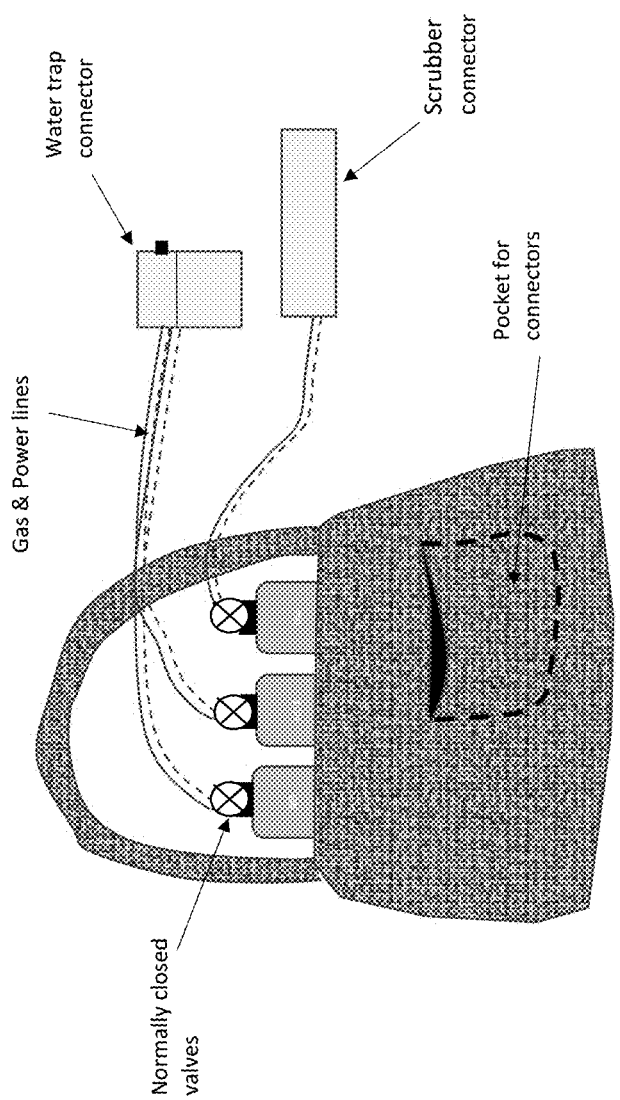
FIG. 74 depicts an exemplary embodiment of a gas calibration kit.

FIG. 74 depicts an embodiment of a gas calibration kit. The consists of an enclosure (e.g., box or satchel) that houses calibration gas bottles. In some embodiments, the calibration gas bottles are 1.6l in size, pressurized to 1000 psi and can provide sufficient gas for roughly 35 calibrations. Each bottle includes valves at the top to control the flow of gas from the bottle. The valves are normally closed so that when no power is applied to the gas calibration kit or if the kit is turned off (e.g., self-powered kits), the valves close to prevent the loss or contamination of calibration gases. In some embodiments, a manual valve is located on the gas cylinders in series with the automatic valves for further mitigation against gas loss and/or contamination.

In the gas calibration kit shown, the two cylinders on the left are utilized to calibrate gas sensors that measure inspired concentrations of NO and $NO_2$. A zero value for NO and $NO_2$ can either be obtained from the Oxygen calibration step or from ambient air. In some embodiments, a calibration gas cylinder includes NO and $NO_2$ in a balance of $N_2$, in which case only one inhaled gas calibration cylinder is required in the kit. Example concentrations for the NO and $NO_2$ calibration gases are 100 ppm and 5 ppm, respectively. The kit also includes a gas cylinder for calibration of an internal, high concentration NO sensor furthest to the right. In some embodiments, the high calibration gas concentration is 2500 ppm. Other embodiments calibrate the internal high NO sensor with gas ranging from 1000 ppm to 3000 ppm.

In the embodiment depicted, the gas calibration kit interfaces with a NO device through existing interfaces. Sample inspiratory gas normally flows through a water trap into the system. Hence, a water-trap shaped-connector enables the GCK to introduce calibration gases to the inspired gas measurement sensors. The GCK provides calibration gas under pressure. In some embodiments, the GCK pushes calibration gases through the inhaled gas sensor path. In other embodiments, the gas sampling pump within the NO device pulls calibration gas into the NO device from the GCK. Typically, the flow rate during calibration is identical to the flow rate during operation (e.g. in the range of 100 to 300 ml/min). The high concentration NO calibration gas enters the NO system using a connector that resembles a $NO_2$ scrubber.

In the embodiment depicted, power is provided to the GCK through electrical connections established with the pneumatic connections. This power can be used to open gas valves, power a microprocessor, read from memory devices, and other uses. In some embodiments, the GCK includes a battery or receives power from a wall outlet or other external source.

In some embodiments, data are exchanged between the NO device and the GCK. For example, the GCK can provide the NO device with the actual concentration of the calibration gases, their expiration date, lot number, and a count of calibrations performed. The NO device can reject calibration gases that are expired or have been used a sufficient number of times that the calibration gas concentration may have been altered.

FIG. 74 shows a pocket for storage of the gas connections when the GCK is not in use. In some embodiments, the GCK can support calibration of inspired gas sensors and an internal high NO sensor simultaneously. In some embodiments, the GCK also interface to hospital high concentration oxygen (e.g. 100%) if oxygen high cal is performed at non-atmospheric levels.

In some embodiments, the mechanical interfaces include a smart chip connection, similar to what is used by the system to communicate with disposable components. The NO delivery device reads the smart chip and identifies the component inserted to be part of a GCK and can automatically enter a calibration mode and/or calibration sequence. The smart chip can include information including but not limited to: cal gas concentration, Cal gas lot number, Cal gas expiration date, CGK serial number, and number of calibrations remaining.

Ambient pressure changes resulting from altitude and/or weather shall be accommodated by the NO generation device (e.g. gas sample pump, recirculation flow controller).

User Safety

In some embodiments, a NO generation or delivery device measures the ambient air to check that NO and $NO_2$ levels are safe for the clinicians. In some embodiments, the NO device utilizes the same sensors that are used to analyze inhaled gas. In some embodiments, a dedicated sensor is used for safety monitoring. In some embodiments, the NO generation device generates an alarm (e.g. audible, visible) when $NO_2$ levels exceed a threshold (e.g. 2 ppm).

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

What is claimed is:

1. A system for generating nitric oxide, comprising:
a plasma chamber housing two or more electrodes in communication with a resonant high voltage circuit configured to send a signal to the plasma chamber for generating nitric oxide in a product gas from a flow of a reactant gas; and
a controller configured to generate a pulse width modulation signal having multiple harmonic frequencies to excite the resonant high voltage circuit, wherein the controller is configured to adjust a duty cycle of the pulse width modulation signal, the controller selecting the duty cycle based on a target voltage before plasma formation and a target current after plasma formation in the plasma chamber.

2. The system of claim 1, wherein the voltage before plasma formation and the current after plasma formation are independently controlled by varying harmonic amplitudes in the pulse width modulation signal.

3. The system of claim 2, wherein the harmonic amplitudes are varied by alternating between two or more duty cycles of the pulse width modulation signal.

4. The system of claim 2, wherein control of the current after plasma formation allows for current modulation within a plasma pulse.

5. The system of claim 1, wherein the controller is configured to adjust a concentration of nitric oxide in the product gas.

6. The system of claim 1, wherein the controller is configured to facilitate breakdown in an electrode gap in the plasma chamber.

7. The system of claim 1, wherein the controller is configured to optimize a ratio between NO and $NO_2$ in the product gas.

8. The system of claim 1, wherein the controller is configured to compensate for changes to an electrode in the plasma chamber.

9. The system of claim 8, wherein changes to the electrode include electrode wear.

10. The system of claim 1, wherein the controller is configured to compensate for reactant properties in the system, including at least one of humidity, oxygen/nitrogen ratio, temperature and pressure.

11. The system of claim 1, wherein the controller is configured to pulse modulate the plasma to control the NO production rate.

12. A method for generating nitric oxide, comprising:
- energizing a plasma chamber using a resonant high voltage circuit to generate nitric oxide in a product gas from a flow of a reactant gas; and
- generating, using a controller in communication with the resonant high voltage circuit, a pulse width modulation signal having multiple harmonic frequencies to excite the resonant high voltage circuit; and
- adjusting, using the controller, a duty cycle of the pulse width modulation signal, the controller selecting the duty cycle based on a target voltage before plasma formation and a target current after plasma formation in the plasma chamber.

* * * * *